(12) United States Patent
Murakami et al.

(10) Patent No.: US 12,418,343 B2
(45) Date of Patent: Sep. 16, 2025

(54) COMMUNICATION DEVICE

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/070,821

(22) Filed: Nov. 29, 2022

(65) Prior Publication Data
US 2023/0089454 A1    Mar. 23, 2023

Related U.S. Application Data

(63) Continuation of application No. 16/868,797, filed on May 7, 2020, now Pat. No. 11,546,057, which is a
(Continued)

(30) Foreign Application Priority Data

Nov. 13, 2017 (JP) .................................. 2017-218649
Nov. 29, 2017 (JP) .................................. 2017-228604
(Continued)

(51) Int. Cl.
*H04B 10/112* (2013.01)
*H02J 50/30* (2016.01)
(Continued)

(52) U.S. Cl.
CPC ............ *H04B 10/116* (2013.01); *H02J 50/30* (2016.02); *H02J 50/40* (2016.02); *H02J 50/80* (2016.02);
(Continued)

(58) Field of Classification Search
None
See application file for complete search history.

(56) References Cited

U.S. PATENT DOCUMENTS

| 4,161,650 A | 7/1979 | Caouette |
| 4,850,044 A | 7/1989 | Block |

(Continued)

FOREIGN PATENT DOCUMENTS

| CN | 105553551 | 5/2016 | |
| CN | 205864025 | * 1/2017 | ................ H02J 7/02 |

(Continued)

OTHER PUBLICATIONS

International Search Report (ISR) issued on Dec. 11, 2018 in International (PCT) Application No. PCT/JP2018/041627.
(Continued)

*Primary Examiner* — Li Liu
(74) *Attorney, Agent, or Firm* — Wenderoth, Lind & Ponack, L.L.P.

(57) ABSTRACT

A mobile terminal is a communication device that communicates using visible light, and includes: a plurality of light emitters, each of which is disposed along the front surface of the mobile terminal and transmits a visible light signal; and a plurality of light receivers, each of which is disposed along the front surface and receives a visible light signal. The plurality of light emitters are disposed on the left side of all of the plurality of light receivers, and the plurality of first light receivers are disposed on the right side of all of the plurality of light emitters.

2 Claims, 110 Drawing Sheets

Related U.S. Application Data continuation of application No. PCT/JP2018/041627, filed on Nov. 9, 2018.

(30) Foreign Application Priority Data

Feb. 2, 2018 (JP) .................................. 2018-017635
Jul. 6, 2018 (JP) .................................. 2018-129388

(51) Int. Cl.
*H02J 50/40* (2016.01)
*H02J 50/80* (2016.01)
*H02J 50/90* (2016.01)
*H04B 10/114* (2013.01)
*H04B 10/116* (2013.01)
*H04B 10/80* (2013.01)

(52) U.S. Cl.
CPC ............ *H02J 50/90* (2016.02); *H04B 10/114* (2013.01); *H04B 10/806* (2013.01); *H04B 10/808* (2013.01)

(56) References Cited

U.S. PATENT DOCUMENTS

| | | | |
|---|---|---|---|
| 5,258,867 A | 11/1993 | Iggulden | |
| 5,416,627 A | 5/1995 | Wilmoth | |
| 5,821,731 A * | 10/1998 | Kuki | H02J 7/0045 |
| | | | 320/108 |
| 5,986,790 A | 11/1999 | Ota et al. | |
| 6,064,502 A | 5/2000 | Burns | |
| 6,661,546 B1 | 12/2003 | Plett | |
| 7,389,052 B2 | 6/2008 | Oettinger | |
| 7,715,723 B2 | 5/2010 | Kagawa | |
| 8,788,676 B2 | 7/2014 | Alameh | |
| 9,826,293 B2 | 11/2017 | Gauthier | |
| 10,109,183 B1 | 10/2018 | Franz | |
| 10,448,472 B2 | 10/2019 | Pederson | |
| 10,756,839 B1 | 8/2020 | Cheung | |
| 2002/0131121 A1 | 9/2002 | Jeganathan | |
| 2002/0149825 A1 | 10/2002 | Levy | |
| 2004/0208439 A1 | 10/2004 | Bell | |
| 2006/0018216 A1 | 1/2006 | Morris | |
| 2007/0147843 A1 | 6/2007 | Fujiwara | |
| 2009/0079388 A1 * | 3/2009 | Reddy | G06Q 40/12 |
| | | | 320/109 |
| 2009/0274467 A1 | 11/2009 | Morris | |
| 2010/0028018 A1 | 2/2010 | Tan | |
| 2011/0050164 A1 | 3/2011 | Partovi | |
| 2011/0200338 A1 | 8/2011 | Yokoi | |
| 2011/0254377 A1 * | 10/2011 | Wildmer | B60L 53/126 |
| | | | 307/104 |
| 2011/0254503 A1 * | 10/2011 | Widmer | B60L 53/12 |
| | | | 320/108 |
| 2011/0279244 A1 * | 11/2011 | Park | H02J 50/90 |
| | | | 320/108 |
| 2012/0220239 A1 | 8/2012 | Hosoya et al. | |
| 2013/0029595 A1 * | 1/2013 | Widmer | B60L 53/126 |
| | | | 455/39 |
| 2013/0236192 A1 | 9/2013 | Deicke | |
| 2014/0292270 A1 | 10/2014 | Ichikawa | |
| 2015/0071638 A1 | 3/2015 | Heroux | |
| 2015/0191094 A1 | 7/2015 | Maekawa | |
| 2015/0246620 A1 | 9/2015 | Fukushima | |
| 2016/0043565 A1 * | 2/2016 | Asaoka | H02J 50/10 |
| | | | 307/104 |
| 2016/0119060 A1 | 4/2016 | Byers | |
| 2017/0001531 A1 | 1/2017 | Takatsu et al. | |
| 2017/0149270 A1 | 5/2017 | Adams | |
| 2017/0180046 A1 | 6/2017 | Stout et al. | |
| 2017/0195044 A1 | 7/2017 | Shatz | |
| 2018/0227051 A1 | 8/2018 | Shim | |
| 2018/0241420 A1 * | 8/2018 | Nakano | H04B 1/0064 |
| 2018/0302159 A1 | 10/2018 | Ritchie | |
| 2019/0081706 A1 | 3/2019 | Neilson | |
| 2019/0082520 A1 | 3/2019 | Noshad | |
| 2019/0123588 A1 | 4/2019 | Kim | |
| 2019/0275901 A1 * | 9/2019 | Widmer | B60L 53/66 |
| 2020/0203823 A1 * | 6/2020 | Shoji | H01P 5/02 |
| 2020/0298714 A1 * | 9/2020 | Widmer | B60L 53/30 |
| 2022/0144106 A1 * | 5/2022 | Widmer | B60L 53/11 |

FOREIGN PATENT DOCUMENTS

| | | |
|---|---|---|
| JP | 8-149079 | 6/1996 |
| JP | 2015-88981 | 5/2015 |
| WO | 2011/055536 | 5/2011 |
| WO | 2011/127455 | 10/2011 |
| WO | 2013/069089 | 5/2013 |
| WO | 2014/050778 | 4/2014 |
| WO | 2014/054352 | 4/2014 |
| WO | 2015/141732 | 9/2015 |

OTHER PUBLICATIONS

Extended European Search Report issued Dec. 14, 2020 in corresponding European Patent Application No. 18876957.4.
Extended European Search Report issued Jan. 8, 2024 in corresponding European Patent Application No. 23201241.9.

* cited by examiner

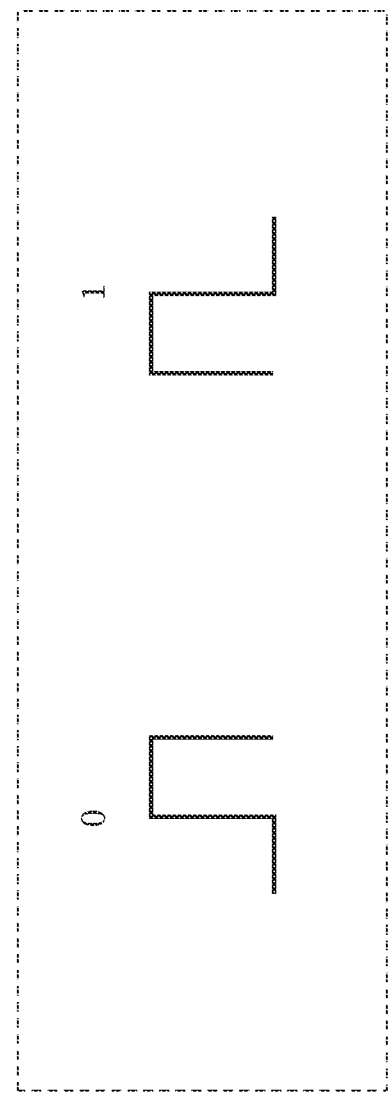

COMMUNICATION DEVICE

CROSS REFERENCE TO RELATED APPLICATIONS

This application is a continuation of U.S. application Ser. No. 16/868,797, filed May 7, 2020, which is a U.S. continuation application of PCT International Patent Application Number PCT/JP2018/041627 filed on Nov. 9, 2018, claiming the benefit of priority of Japanese Patent Application Number 2017-218649 filed on Nov. 13, 2017, Japanese Patent Application Number 2017-228604 filed on Nov. 29, 2017, Japanese Patent Application Number 2018-017635 filed on Feb. 2, 2018, and Japanese Patent Application Number 2018-129388 filed on Jul. 6, 2018, the entire contents of which are hereby incorporated by reference.

BACKGROUND

1. Technical Field

The present disclosure relates to a communication device.

2. Description of the Related Art

A conventional example of a communication method performed using a plurality of antennas is a communication method called multiple-input multiple-output (IMO). In multi-antenna communication typified by MIMO, data reception quality and/or a data communication rate (per unit time) can be enhanced by modulating transmission data of a plurality of streams and simultaneously transmitting modulated signals from different antennas using the same frequency (common frequency).

Furthermore, in such multi-antenna communication, an antenna having a quasi-omni pattern which allows a transmitting device to have a substantially constant antenna gain in various directions in a space may be used when multicast/broadcast communication is performed. For example, WO2011/055536 discloses that a transmitting device transmits a modulated signal using an antenna having a quasi-omni pattern.

SUMMARY

As described above, a communication method that uses a plurality of antennas has been proposed, but there is also a demand for further improvement in performance and support for new forms of services for a communication device that communicates using visible light.

A communication device according to one aspect of the present disclosure communicates using visible light, and includes: a plurality of first light emitters, each of which is disposed along a first surface of the communication device and transmits a visible light signal; and a plurality of first light receivers, each of which is disposed along the first surface and receives a visible light signal. The plurality of first light emitters are disposed on a first side of all of the plurality of first light receivers, and the plurality of first light receivers are disposed on a second side of all of the plurality of first light emitters, the first side and the second side being in opposite directions along a first axis.

The present disclosure makes it possible to facilitate the improvement in performance of a communication device and support for new forms of services.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 97B is for illustrating Manchester coding scheme;

DETAILED DESCRIPTION OF THE EMBODIMENTS

Hereinafter, first, an example of a communication method that uses a plurality of antennas and can be applied to the communication system (to be described later) according to the present disclosure.

Embodiment 1

Figure 1:
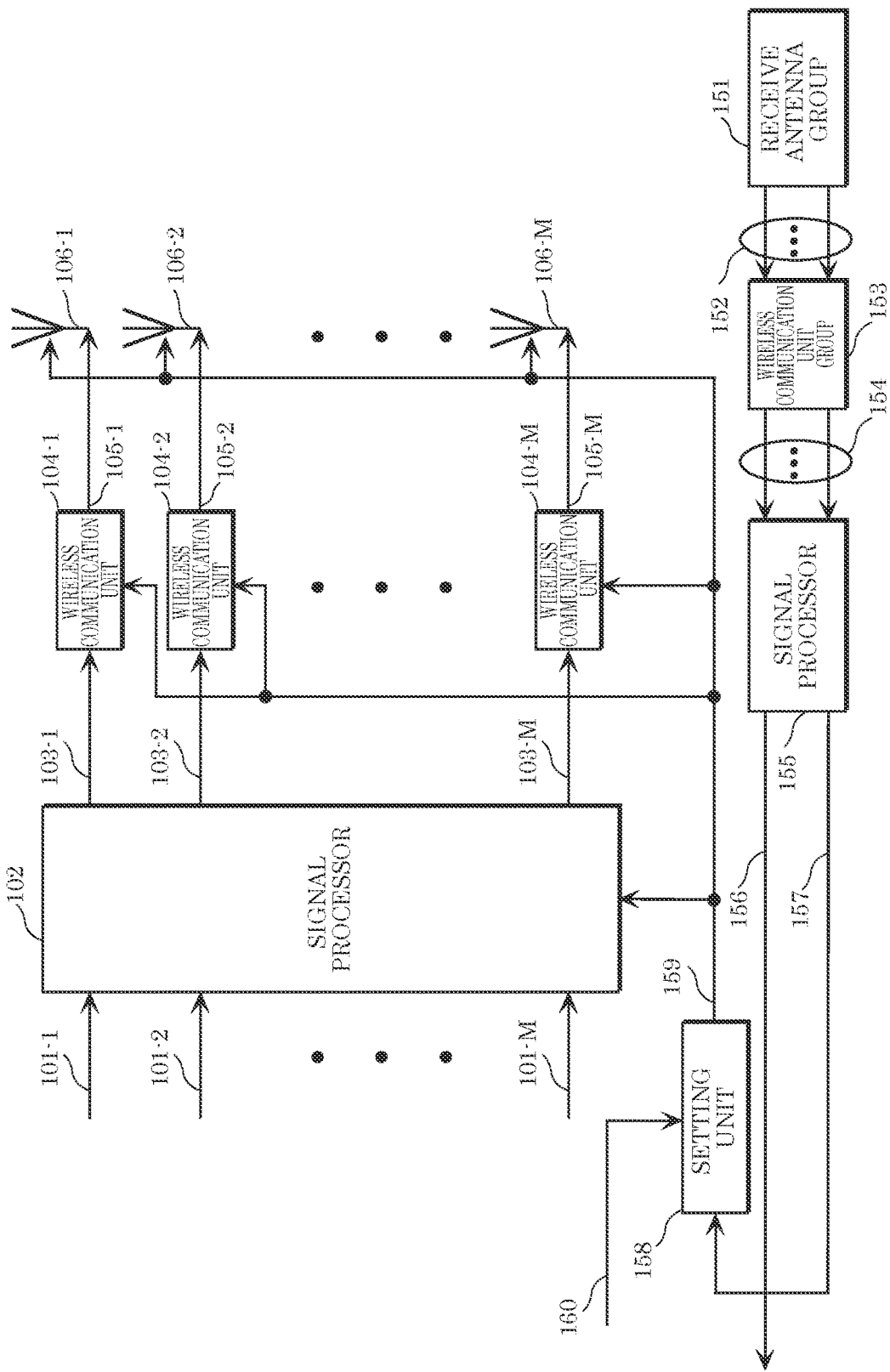
FIG. 1 is a diagram illustrating an example of a configuration of a base station.

FIG. 1 illustrates an example of a configuration of a base station (or an access point, for instance) in the present embodiment.

101-1 denotes #1 information, 101-2 denotes #2 information, and 101-M denotes #M information. 101-$i$ denotes #i information, where i is an integer of 1 or greater and M or smaller. Note that M is an integer greater than or equal to 2. Note that not all the information items from #1 information to #M information are necessarily present.

Signal processor 102 receives inputs of #1 information 101-1, #2 information 101-2, #M information 101-M, and control signal 159. Signal processor 102 performs signal processing based on information included in control signal 159 such as "information on a method of error correction coding (a coding rate, a code length (block length))", "information on a modulation method", "information on precoding", "a transmitting method (multiplexing method)", "whether to perform transmission for multicasting or transmission for unicasting (transmission for multicasting and transmission for unicasting may be carried out simultaneously)" "the number of transmission streams when multicasting is performed", and "a transmitting method performed when transmitting a modulated signal for multicasting (this point will be later described in detail)", and outputs signal 103-1 obtained as a result of the signal processing, signal 103-2 obtained as a result of the signal processing, . . . , and signal 103-M obtained as a result of the signal processing, that is, signal 103-$i$ obtained as a result of the signal processing. Note that not all the signals from signal #1 obtained as a result of the signal processing to signal #M obtained as a result of the signal processing are necessarily present. At this time, signal processor 102 performs error correction coding on #i information 101-$i$, and thereafter maps resultant information according to a modulation method which has been set, thus obtaining a baseband signal.

Signal processor 102 collects baseband signals corresponding to information items, and precodes the baseband signals. For example, orthogonal frequency division multiplexing (OFDM) may be applied.

Wireless communication unit 104-1 receives inputs of signal 103-1 obtained as a result of the signal processing and control signal 159. Wireless communication unit 104-1 performs processing such as band limiting, frequency conversion, and amplification, based on control signal 159, and outputs transmission signal 105-1. Then, transmission signal 105-1 is output as a radio wave from antenna unit 106-1.

Similarly, wireless communication unit 104-2 receives inputs of signal 103-2 obtained as a result of the signal processing and control signal 159. Wireless communication unit 104-2 performs processing such as band limiting, frequency conversion, and amplification, based on control signal 159, and outputs transmission signal 105-2. Then, transmission signal 105-2 is output as a radio wave from antenna unit 106-2. A description of wireless communication unit 104-3 to wireless communication unit 104-(M−1) is omitted.

Wireless communication unit 104-M receives inputs of signal 103-M obtained as a result of the signal processing and control signal 159. Wireless communication unit 104-M performs processing such as band limiting, frequency conversion, and amplification, based on control signal 159, and outputs transmission signal 105-M. Then, transmission signal 105-M is output as a radio wave from antenna unit 106-M.

Note that the wireless communication units may not perform the above processing when a signal obtained as a result of the signal processing is not present.

Wireless communication unit group 153 receives inputs of received signal group 152 received by receive antenna group 151. Wireless communication unit group 153 performs processing such as frequency conversion and outputs baseband signal group 154.

Signal processor 155 receives an input of baseband signal group 154, and performs demodulation and error correction decoding, and thus also performs processing such as time synchronization, frequency synchronization, and channel estimation. At this time, signal processor 155 receives modulated signals transmitted by one or more terminals and performs processing, and thus obtains data transmitted by the one or more terminals and control information transmitted by the one or more terminals. Accordingly, signal processor 155 outputs data group 156 corresponding to the one or more terminals, and control information group 157 corresponding to the one or more terminals.

Setting unit 158 receives inputs of control information group 157 and setting signal 160. Setting unit 158 determines, based on control information group 157, "a method of error correction coding (a coding rate, a code length (block length))", "a modulation method", "a precoding method", "a transmitting method", "antenna settings", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting", for instance, and outputs control signal 159 that includes such information items determined.

Antenna units 106-1, 106-2, . . . , and 106-M each receive an input of control signal 159. The operation at this time is to be described with reference to FIG. 2.

Figure 2:
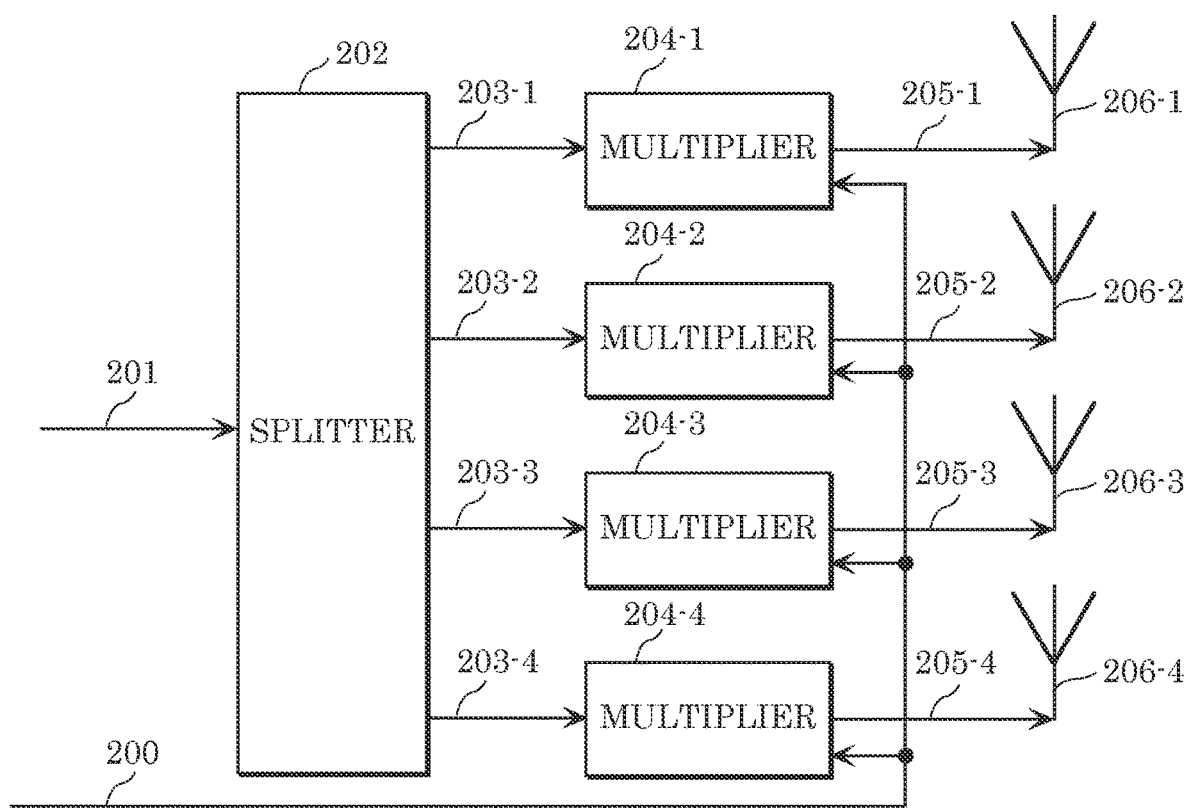
FIG. 2 is a diagram illustrating an example of a configuration of an antenna unit of the base station.

FIG. 2 illustrates an example of a configuration of antenna units 106-1, 106-2, . . . , and 106-M. Each antenna unit includes a plurality of antennas, as illustrated in FIG. 2. Note that FIG. 2 illustrates four antennas, yet each antenna unit may include at least two antennas. Note that the number of antennas is not limited to 4.

FIG. 2 illustrates a configuration of antenna unit 106-i, where i is an integer of 1 or greater and M or smaller.

Splitter 202 receives an input of transmission signal 201 (corresponding to transmission signal 105-i in FIG. 1). Splitter 202 splits transmission signal 201, and outputs signals 203-1, 203-2, 203-3, and 203-4.

Multiplier 204-1 receives inputs of signal 203-1 and control signal 200 (corresponding to control signal 159 in FIG. 1). Multiplier 204-1 multiplies signal 203-1 by coefficient W1, based on information on a multiplication coefficient included in control signal 200, and outputs signal 205-1 obtained as a result of the multiplication. Note that coefficient W1 can be defined by a complex number. Accordingly, W1 can also be a real number. Thus, if signal 203-1 is v1(t), signal 205-1 obtained as a result of the multiplication can be expressed by W1×v1(t) (t denotes time). Then, signal 205-1 obtained as a result of the multiplication is output as a radio wave from antenna 206-1.

Similarly, multiplier 204-2 receives inputs of signal 203-2 and control signal 200. Multiplier 204-2 multiplies signal 203-2 by coefficient W2, based on information on a multiplication coefficient included in control signal 200, and outputs signal 205-2 obtained as a result of the a multiplication. Note that coefficient W2 can be defined by a complex number. Accordingly, W2 can also be a real number. Thus, if signal 203-2 is v2(t), signal 205-2 obtained as a result, of the multiplication can be expressed by W2×v2(t) (t denotes time). Then, signal 205-2 obtained as a result of the multiplication is output as a radio wave from antenna 206-2.

Multiplier 204-3 receives inputs of signal 203-3 and control signal 200. Multiplier 204-3 multiplies signal 203-3 by coefficient W3, based on information on a multiplication coefficient included in control signal 200, and outputs signal 205-3 obtained as a result of the multiplication. Note that coefficient W3 can be defined by a complex number. Accordingly, W3 can also be a real number. Thus, if signal 203-3 is expressed by v3(t), signal 205-3 obtained as a result of the multiplication can be expressed by W3×v3(t) denotes time). Then, signal 205-3 obtained as a result of the multiplication is output as a radio wave from antenna 206-3.

Multiplier 204-4 receives inputs of signal 203-4 and control signal 200. Multiplier 204-2 multiplies signal 203-4 by coefficient W4, based on information on a multiplication coefficient included in control signal 200, and outputs signal 205-4 obtained as a result of the multiplication. Note that coefficient W4 can be defined by a complex number. Accordingly, W4 can also be a real number. Thus, if signal 203-4 is v4(t), signal 205-4 obtained as a result of the multiplication can be expressed by W4×v4(t) (t denotes time). Then, signal 205-4 obtained as a result of the multiplication is output as a radio wave from antenna 206-4.

Note that the absolute value of W1, the absolute value of W2, the absolute value of W3, and the absolute value of W4 may be equal to one another.

Figure 3:
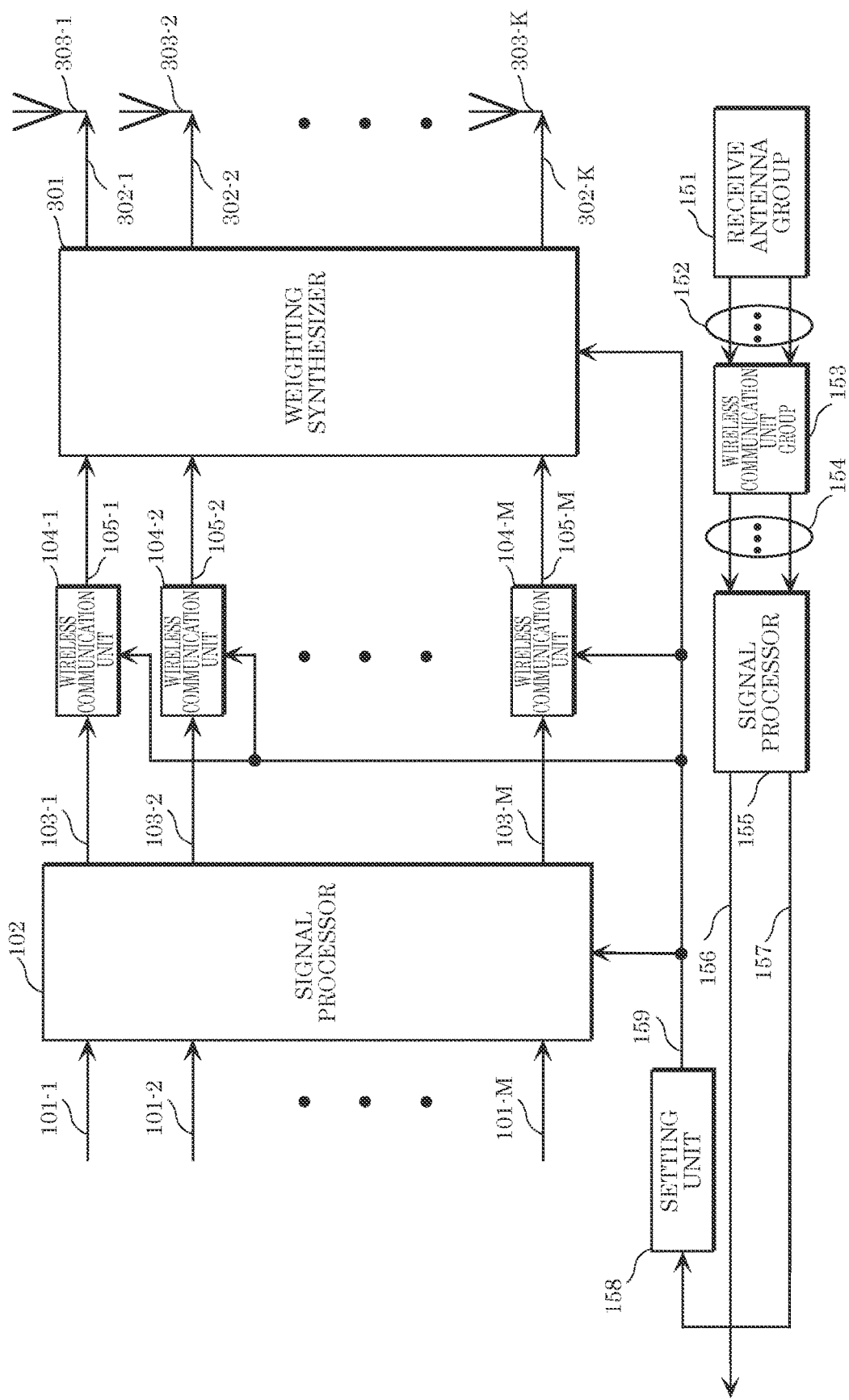
FIG. 3 is a diagram illustrating an example of a configuration of the base station.

FIG. 3 illustrates a configuration of the base station different from the configuration of the base station in FIG. 1 in the present embodiment. In FIG. 3, the same reference numerals are assigned to elements which operate in the same manner as those in FIG. 1, and a description thereof is omitted below.

Weighting synthesizer 301 receives inputs of modulated signal 105-1, modulated signal 105-2, . . . , modulated signal 105-1, and control signal 159. Then, weighting synthesizer 301 weighting synthesizes modulated signal 105-1, modulated signal 105-2, . . . , and modulated signal 105-M, based on information on weighting synthesis included in control signal 159, and outputs signals 302-1, 302-2, . . . , and 302-K obtained as a result of the weighting synthesis. K is an integer of 1 or greater. Signal 302-1 obtained as a result of the weighting synthesis is output as a radio wave from antenna 303-1, signal 302-2 obtained as a result of the weighting synthesis is output as a radio wave from antenna 303-2, . . . , and signal 302-K obtained as a result of the weighting synthesis is output as a radio wave from antenna 303-K.

Signal $y_i(t)$ 302-i (i is an integer of 1 or greater and K or smaller) obtained as a result of the weighting synthesis is expressed as follows (t denotes time).

[Math. 1]

$$y_i(t) = A_{i1} \times x_1(t) + A_{i2} \times x_2(t) + \ldots + A_{iM} \times x_M(t) \quad \text{Expression (1)}$$
$$= \sum_{j=1}^{M} A_{ij} \times x_j(t)$$

Note that in Expression (1), is a value which can be defined by a complex number. Accordingly, can also be a real number, and $x_j(t)$ is modulated signal 105-j, where j is an integer of 1 or greater and M or smaller.

Figure 4:
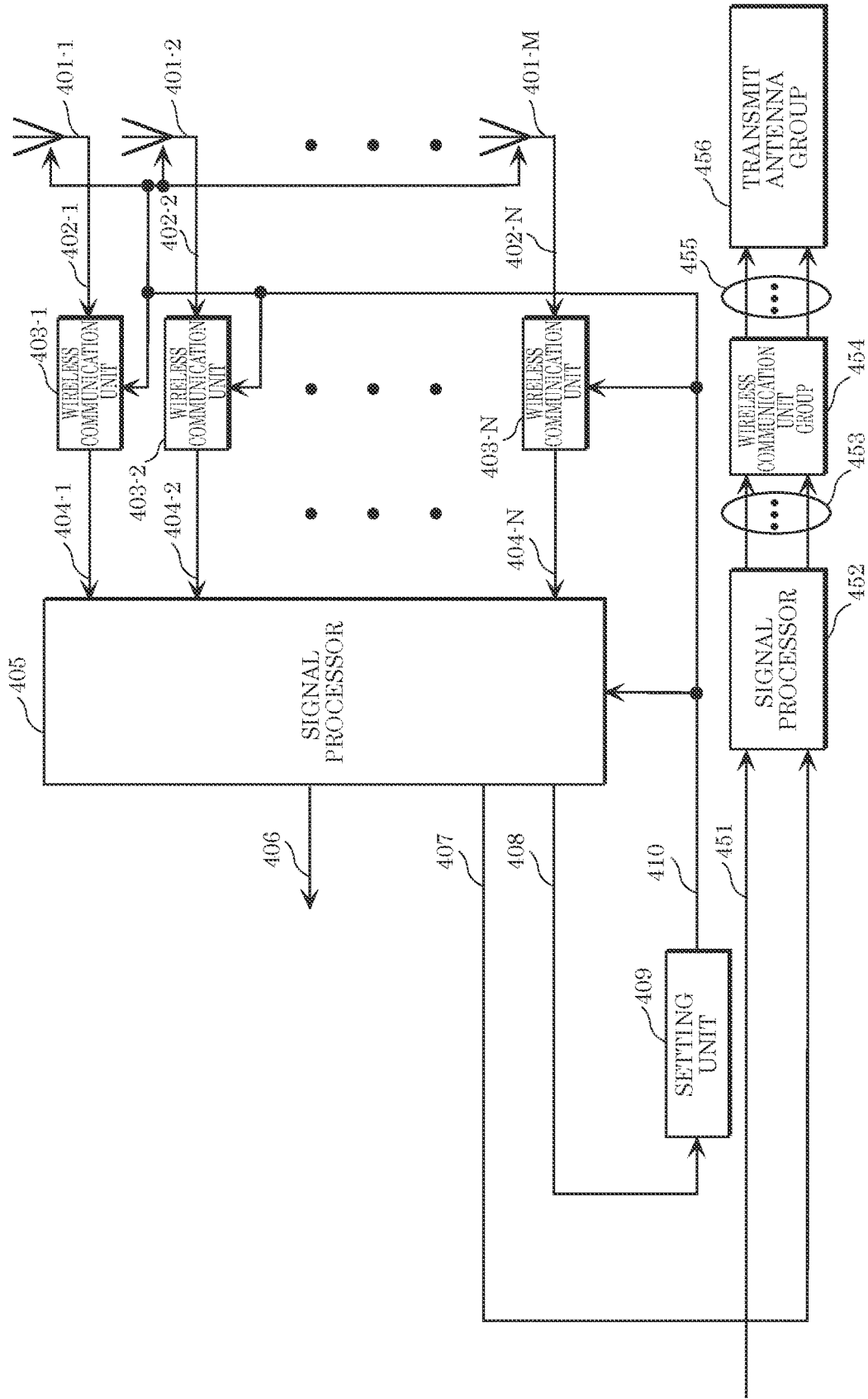
FIG. 4 is a diagram illustrating an example of a configuration of a terminal.

FIG. 4 illustrates an example of a configuration of a terminal. Antenna units 401-1, 401-2, . . . , and 401-N each receive an input of control signal 410, where N is an integer of 1 or greater.

Wireless communication unit 403-1 receives inputs of received signal 402-1 received by antenna unit 401-1 and control signal 410. Based on control signal 410, wireless communication unit 403-1 performs processing such as frequency conversion on received signal 402-1, and outputs baseband signal 404-1.

Similarly, wireless communication unit 403-2 receives inputs of received signal 402-2 received by antenna unit 401-2 and control signal 410. Based on control signal 410, wireless communication unit 403-2 performs processing such as frequency conversion on received signal 402-2, and outputs baseband signal 404-2. Note that a description of wireless communication units 403-3 to 403-(N−1) is omitted.

Wireless communication unit 403-N receives inputs of received signal 402-N received by antenna unit 401-N and control signal 410. Based on control signal 410, wireless communication unit 403-N performs processing such as frequency conversion on received signal 402-N, and outputs baseband signal 404-N.

Note that not all of wireless communication units 403-1, 403-2, . . . , and 403-N may operate. Accordingly, not all of baseband signals 404-1, 404-2, and 404-N are necessarily present.

Signal processor 405 receives inputs of baseband signals 404-1, 404-2, . . . , 404-N, and control signal 410. Based on control signal 410, signal processor 405 performs demodulation and error correction decoding processing, and outputs data 406, control information 407 for transmission, and control information 408. Specifically, signal processor 405 also performs processing such as time synchronization, frequency synchronization, and channel estimation.

Setting unit 409 receives an input of control information 408. Setting unit 409 performs setting with regard to a receiving method, and outputs control signal 410.

Signal processor 452 receives inputs of information 451 and control information 407 for transmission. Signal processor 452 performs processing such as error correction coding and mapping according to a modulation method which has been set, and outputs baseband signal group 453.

Wireless communication unit group 454 receives an input of baseband signal group 453. Wireless communication unit group 454 performs processing such as band limiting, frequency conversion, and amplification, and outputs transmission signal group 455. Transmission signal group 455 is output as a radio wave from transmit antenna group 456.

Figure 5:
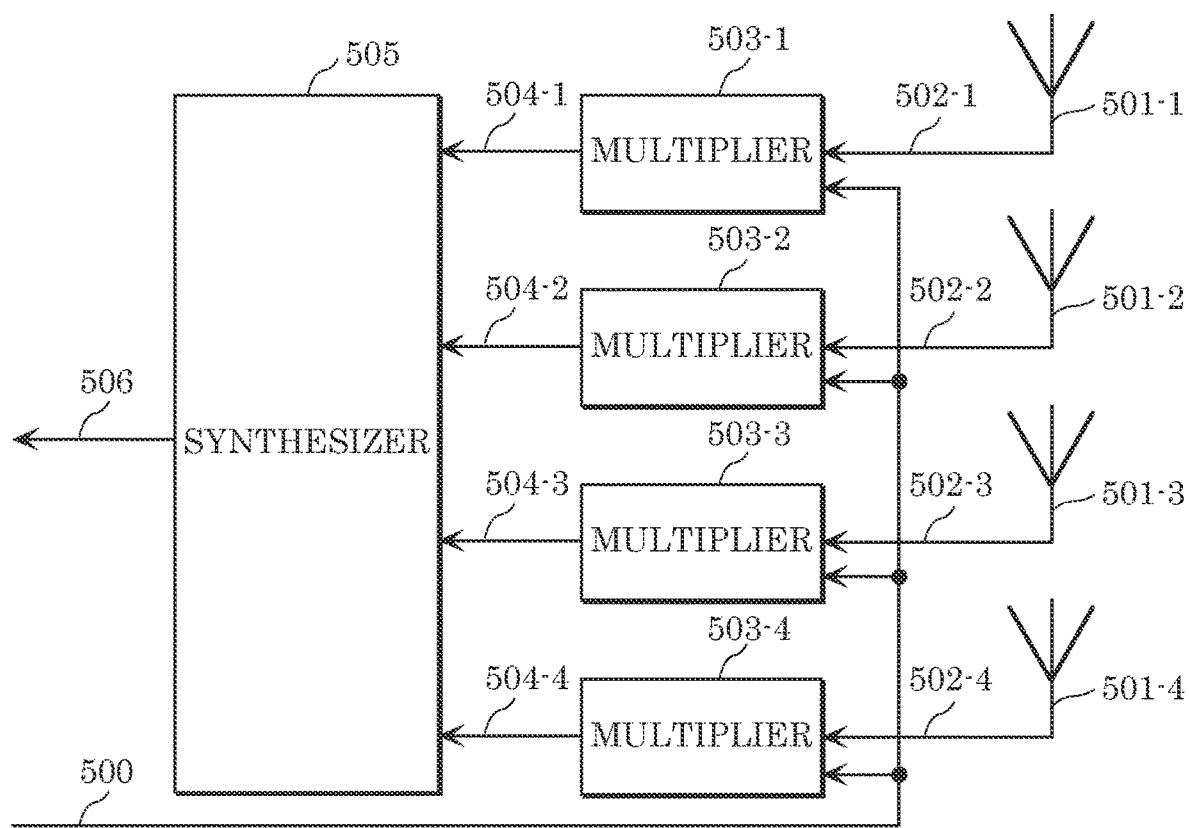
FIG. 5 is a diagram illustrating an example of a configuration of an antenna unit of a terminal.

FIG. 5 illustrates an example of a configuration of antenna units 401-1, 401-2, . . . , and 401-N. Each antenna unit includes a plurality of antennas, as illustrated in FIG. 5. Note that FIG. 5 illustrates four antennas, yet each antenna unit may include at least two antennas. Note that the number of antennas included in each antenna unit is not limited to 4.

FIG. 5 illustrates a configuration of antenna unit 401-$i$, where i is an integer of 1 or greater and N or smaller.

Multiplier 503-1 receives inputs of received signal 502-1 received by antenna 501-1 and control signal 500 (corresponding to control signal 410 in FIG. 4). Multiplier 503-1 multiplies received signal 502-1 by coefficient D1, based on information on a multiplication coefficient included in control signal 500, and outputs signal 504-1 obtained as a result of the multiplication. Note that coefficient D1 can be defined by a complex number. Accordingly, D1 can also be a real number. Thus, if received signal 502-1 is expressed by e1($t$), signal 504-1 obtained as a result of the multiplication can be expressed by D1×e1($t$) (t denotes time).

Similarly, multiplier 503-2 receives inputs of received signal 502-2 received by antenna 501-2 and control signal 500. Based on information on a multiplication coefficient included in control signal 500, multiplier 503-2 multiplies received signal 502-2 by coefficient D2, and outputs signal 504-2 obtained as a result of the multiplication. Note that coefficient D2 can be defined by a complex number. Accordingly, D2 can also be a real number. Thus, if received signal 502-2 is expressed by e2($t$), signal 504-2 obtained as a result of the multiplication can be expressed by D2×e2($t$) (t denotes time).

Multiplier 503-3 receives inputs of received signal 502-3 received by antenna 501-3 and control signal 500. Based on information on a multiplication coefficient included in control signal 500, multiplier 503-3 multiplies received signal 502-3 by coefficient D3, and outputs signal 504-3 obtained as a result of the multiplication. Note that coefficient D3 can be defined by a complex number. Accordingly, D3 can also be a real number. Thus, if received signal 502-3 is expressed by e3($t$), signal 504-3 obtained as a result of the multiplication can be expressed by D3×e3($t$) (t denotes time).

Multiplier 503-4 receives inputs of received signal 502-4 received by antenna 501-4 and control signal 500. Based on information on a multiplication coefficient included in control signal 500, multiplier 503-4 multiplies received signal 502-4 by coefficient D4, and outputs signal 504-4 obtained as a result of the multiplication. Note that coefficient D4 can be defined by a complex number. Accordingly, 174 can also be a real number. Thus, if received signal 502-4 is expressed by e4 ($t$), signal 504-4 obtained as a result of the multiplication can be expressed by D4×e4($t$) (t denotes time).

Synthesizer 505 receives inputs of signals 504-1, 504-2, 504-3, and 504-4 obtained as a result of the multiplication. Synthesizer 505 adds signals 504-1, 504-2, 504-3, and 504-4 obtained as a result of the multiplication, and outputs synthesized signal 506 (corresponding to received signal 402-$i$ in FIG. 4). Thus, synthesized signal 506 is expressed by D1×e1($t$)+D2×e2($t$)+D3×e3($t$)+D4×e4($t$).

Figure 6:
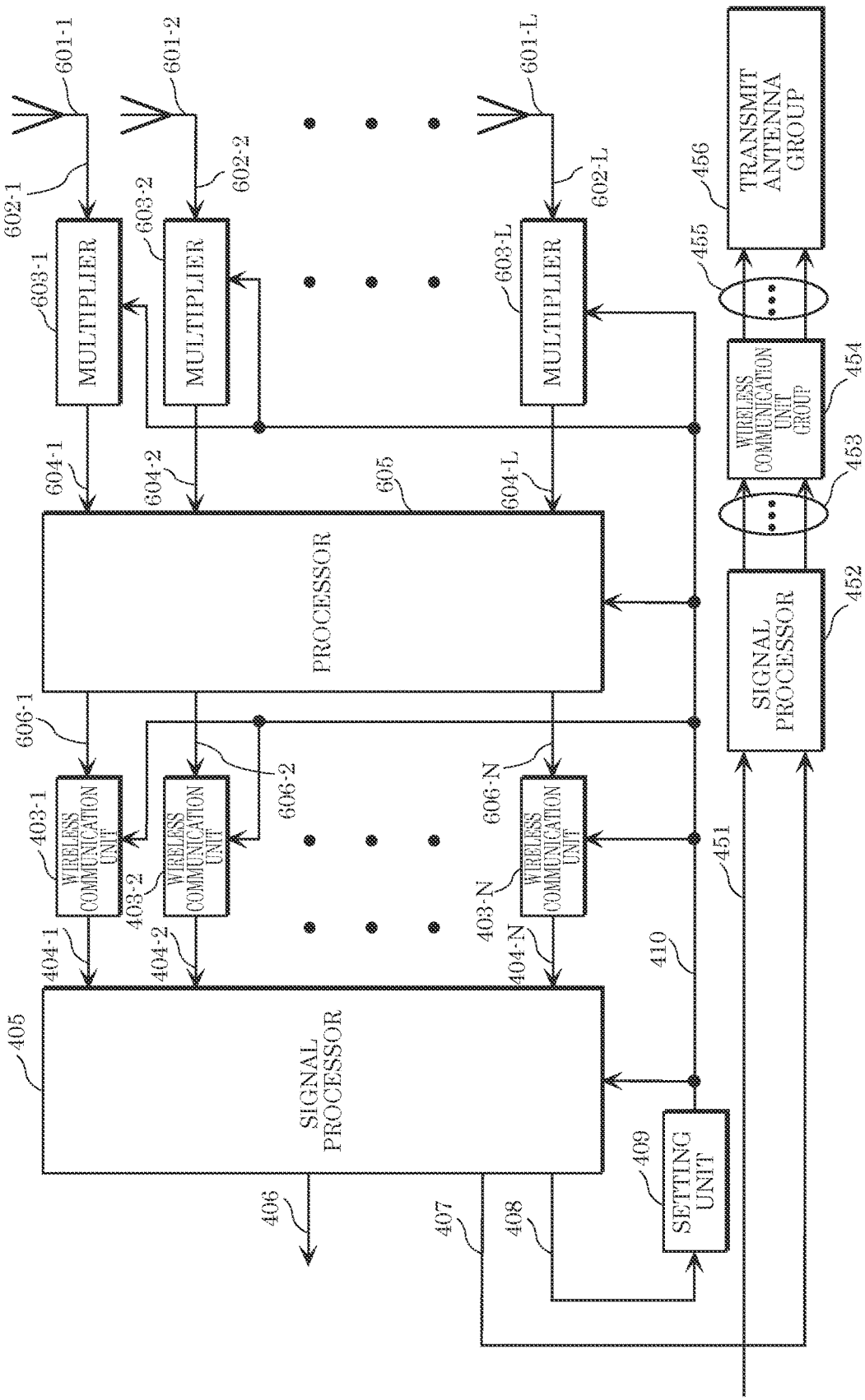
FIG. 6 is a diagram illustrating an example of a configuration of a terminal.

FIG. 6 illustrates a configuration of a terminal different from the configuration of the terminal in FIG. 4 in the present embodiment. Elements which operate in the same manner as those in FIG. 4 are assigned the same reference numerals in FIG. 6, and a description thereof is omitted below.

Multiplier 603-1 receives inputs of received signal 602-1 received by antenna 601-1 and control signal 410. Based on information on a multiplication coefficient included in control signal 410, multiplier 603-1 multiplies received signal 602-1 by coefficient G1, and outputs signal 604-1 obtained as a result of the multiplication. Note that coefficient G1 can be defined by a complex number. Accordingly, G1 can also be a real number. Thus, if received signal 602-1 is expressed by c1($t$), signal 604-1 obtained as a result of the multiplication can be expressed by G1×c1($t$) (t denotes time).

Similarly, multiplier 603-2 receives inputs of received signal 602-2 received by antenna 601-2 and control signal 410. Based on information on a multiplication coefficient included in control signal 410, multiplier 603-2 multiplies received signal 602-2 by coefficient G2, and outputs signal 604-2 obtained as a result of the multiplication. Note that coefficient G2 can be defined by a complex number. Accordingly, G2 can also be a real number. Thus, if received signal 602-2 is expressed by c2($t$), signal 604-2 obtained as a result of the multiplication can be expressed by G2×c2($t$) (t denotes time). A description of multiplier 603-3 to multiplier 603-(L-1) is omitted.

Multiplier 603-L receives inputs of received signal 602-L received by antenna 601-L and control signal 410. Based on information on a multiplication coefficient included in control signal 410, multiplier 603-L multiplies received signal 602-T, by coefficient GL, and outputs signal 6041 obtained as a result of the multiplication. Note that coefficient GL can be defined by a complex number. Accordingly, GL can also be a real number. Thus, if received signal 602-L is expressed by cL(t), signal 604-L obtained as a result of the multiplication can be expressed by GL×cL(t) (t denotes time).

Accordingly, multiplier 603-$i$ receives inputs of received signal 602-$i$ received by antenna 601-$i$ and control signal 410. Based on information on a multiplication coefficient included in control signal 410, multiplier 603-$i$ multiplies received signal 602-$i$ by coefficient Gi, and outputs signal 604-$i$ obtained as a result of the multiplication. Note that coefficient Gi can be defined by a complex number. Accordingly, Gi can also be a real number. Thus, if received signal 602-*i* is expressed by ci (t), signal 604-*i* obtained as a result of the multiplication can be expressed by Gi×ci(t) (t denotes time). Note that i is an integer of 1 or greater and L or smaller, and L is an integer of 2 or greater.

Processor 605 receives inputs of signals 604-1, 604-2, . . . , and 604-L obtained as a result of the multiplication and control signal 410. Based on control signal 410, processor 605 performs signal processing, and outputs signals 606-1, 606-2, . . . , and 606-N obtained as a result of the signal processing, where N is an integer of 2 or greater. At this time, signal 604-*i* obtained as a result of the multiplication is expressed by $p_i(t)$ (i is an integer of 1 or greater and L or smaller). Then, signal 606-*j* ($r_j(t)$) as a result of the processing is expressed as follows (j is an integer of 1 or greater and N or smaller).

[Math. 2]

$$r_j(t) = B_{j1} \times p_1(t) + B_{j2} \times p_2(t) + \ldots + B_{jL} \times p_L(t) \quad \text{Expression (2)}$$
$$= \sum_{i=1}^{L} B_{ji} \times p_i(t)$$

Note that in Expression (2), $B_{ji}$ is a value which can be defined by a complex number. Accordingly, $B_{ji}$ can also be a real number.

Figure 7:
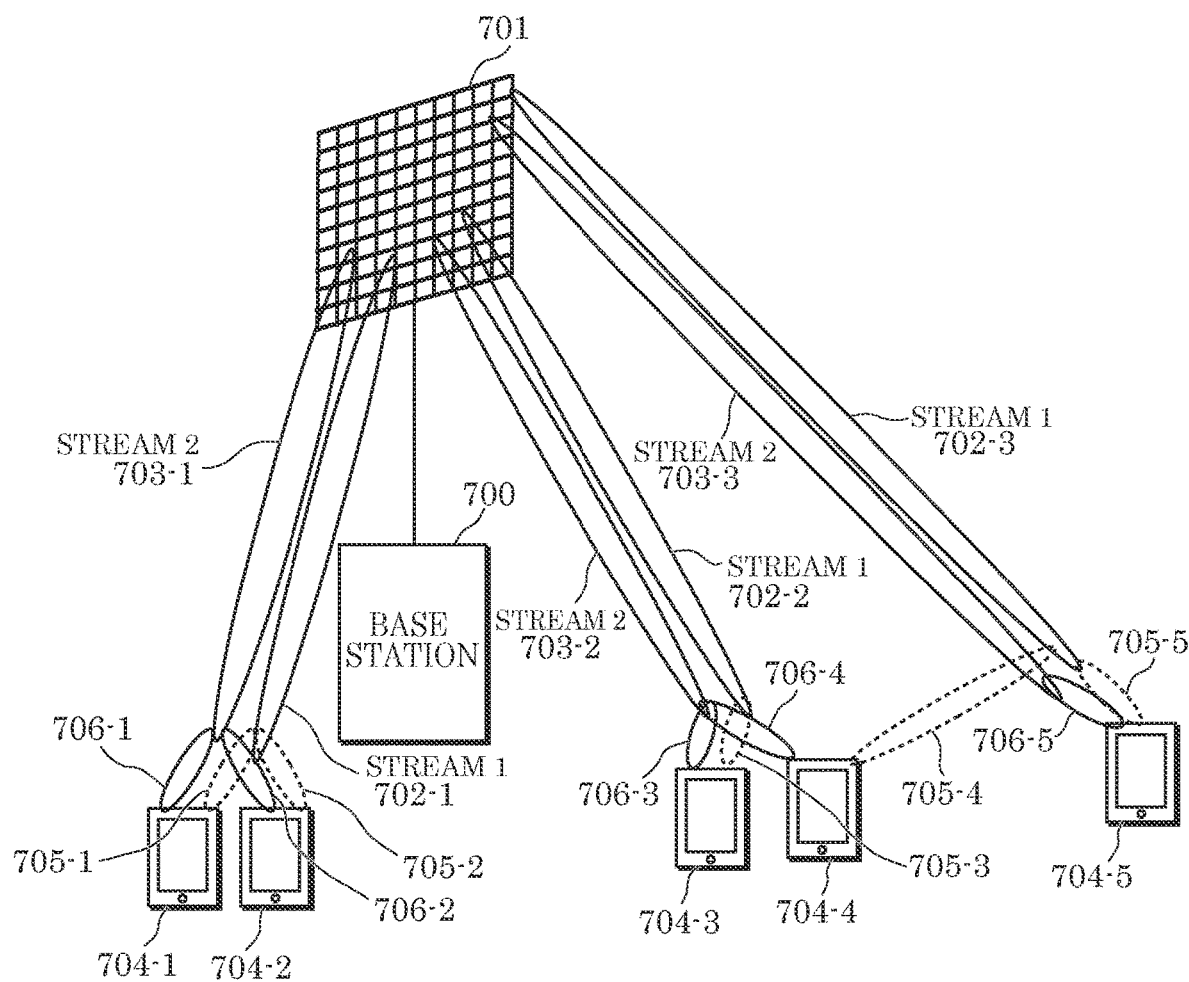
FIG. 7 is a diagram illustrating an example of a state of communication between the base station and terminals.

FIG. 7 illustrates an example of a state of communication between the base station and terminals. Note that the base station may be referred to as an access point or a broadcast station, for instance.

Base station 700 includes a plurality of antennas, and transmits a plurality of transmission signals from antenna 701 for transmission. At this time, base station 700 has a configuration as illustrated in FIG. 1 or 3, for example, and performs transmission beamforming (directivity control) by signal processor 102 (anchor weighting synthesizer 301) performing precoding (weighting synthesis).

FIG. 7 illustrates transmission beam 702-1 for transmitting data of stream 1, transmission beam 702-2 for transmitting data of stream 1, and transmission beam 702-3 for transmitting data of stream 1.

FIG. 7 illustrates transmission beam 703-1 for transmitting data of stream 2, transmission beam 703-2 for transmitting data of stream 2, and transmission beam 703-3 for transmitting data of stream 2.

Note that in FIG. 7, the number of transmission beams for transmitting data of stream 1 is 3 and the number of transmission beams for transmitting data of stream 2 is 3, yet the present disclosure is not limited to such numbers. The number of transmission beams for transmitting data of stream 1 may be at least two, and the number of transmission beams for transmitting data of stream 2 may be at least two.

FIG. 7 includes terminals 704-1, 704-2, 704-3, 704-4, and 704-5, and the terminals have the configuration same as the configuration of the terminals illustrated in FIGS. 4 and 5, for example.

For example, terminal 704-1 performs directivity control for receiving, via "signal processor 405" and/or "antennas 401-1 to 401-N" and/or "multipliers 603-1 to 603-L, and processor 605", and forms receiving directivity 705-1 and receiving directivity 706-1. Receiving directivity 705-1 allows terminal 704-1 to receive and demodulate transmission beam 702-1 for transmitting data of stream 1, and receiving directivity 706-1 allows terminal 704-1 to receive and demodulate transmission beam 703-1 for transmitting data of stream 2.

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 702-1 for transmitting data of stream 1, and receiving directivity 706-2 allows terminal 704-2 to receive and demodulate transmission beam 703-1 for transmitting data of stream 2.

Terminal 704-3 performs directivity control for receiving, via "signal processor 405" and/or "antennas 401-1 to 401-N" and/or "multipliers 603-1 to 603-L, and processor 605", and forms receiving directivity 705-3 and receiving directivity 706-3. Receiving directivity 705-3 allows terminal 704-3 to receive and demodulate transmission beam 702-2 for transmitting data of stream 1, and receiving directivity 706-3 allows terminal 704-3 to receive and demodulate transmission beam 703-2 for transmitting data of stream 2.

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 702-3 for transmitting data of stream 1, and receiving directivity 706-4 allows terminal 704-4 to receive and demodulate transmission beam 703-2 for transmitting data of stream 2.

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 702-3 for transmitting data of stream 1, and receiving directivity 706-5 allows terminal 704-5 to receive and demodulate transmission beam 703-3 for transmitting data of stream 2.

In FIG. 7, a terminal selects, according to a spatial position, at least one transmission beam from among transmission beams 702-1, 702-2, and 702-3 for transmitting data of stream 1, and can obtain data of stream 1 with high quality by directing a receiving directivity to the selected transmission beam(s). Furthermore, the terminal selects, according to a spatial position, at least one transmission beam from among transmission beams 703-1, 703-2, and 703-3 for transmitting data of stream 2, and can obtain data of stream 2 with high quality by directing a receiving directivity to the selected transmission beam(s).

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band) or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 7, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 7, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 7, information indicating that the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data. A configuration of a control information symbol will be later described in detail.

Figure 8:
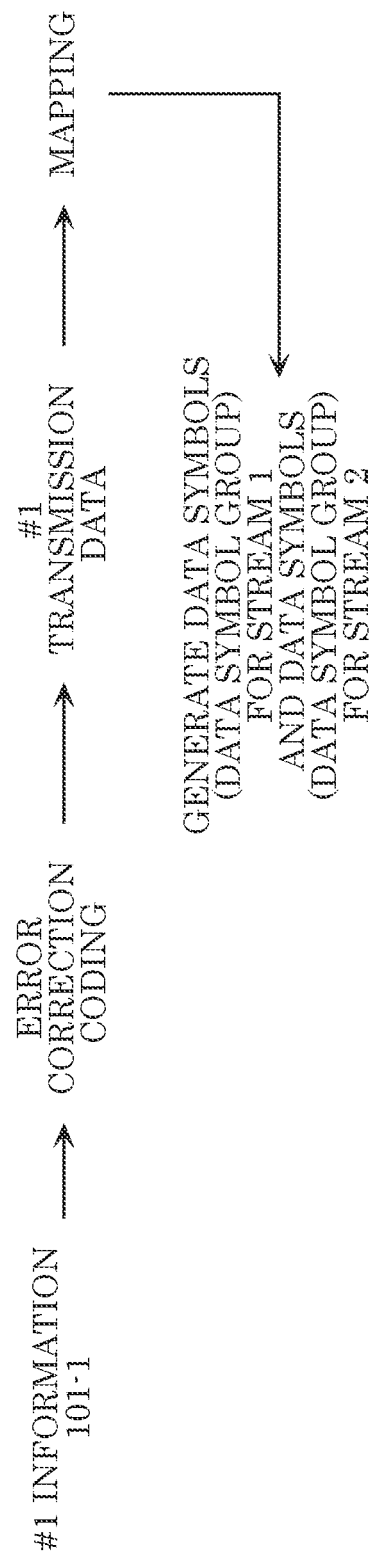
FIG. 8 is a diagram for describing a relation of a plurality of streams.

FIG. 8 is a drawing for describing a relation between #i information 101-*i* in FIGS. 1 and 3 and "stream 1" and "stream 2" described with reference to FIG. 7. For example, processing such as error correction coding is performed on #1 information 101-1, and data obtained as a result of the error correction coding is obtained. The data obtained as a result of the error correction coding is named #1 transmission data. Data symbols are obtained by mapping #1 transmission data. By separating data symbols into data symbols for stream 1 and data symbols for stream 2, data symbols (data symbol group) for stream 1 and data symbols (data symbol group) for stream 2 are obtained. The symbol group for stream 1 includes data symbols (data symbol group) for stream 1, and is transmitted from the base station in FIGS. 1 and 3. The symbol group for stream 2 includes data symbols (data symbol group) for stream 2, and is transmitted from the base station in FIGS. 1 and 3.

Figure 9:
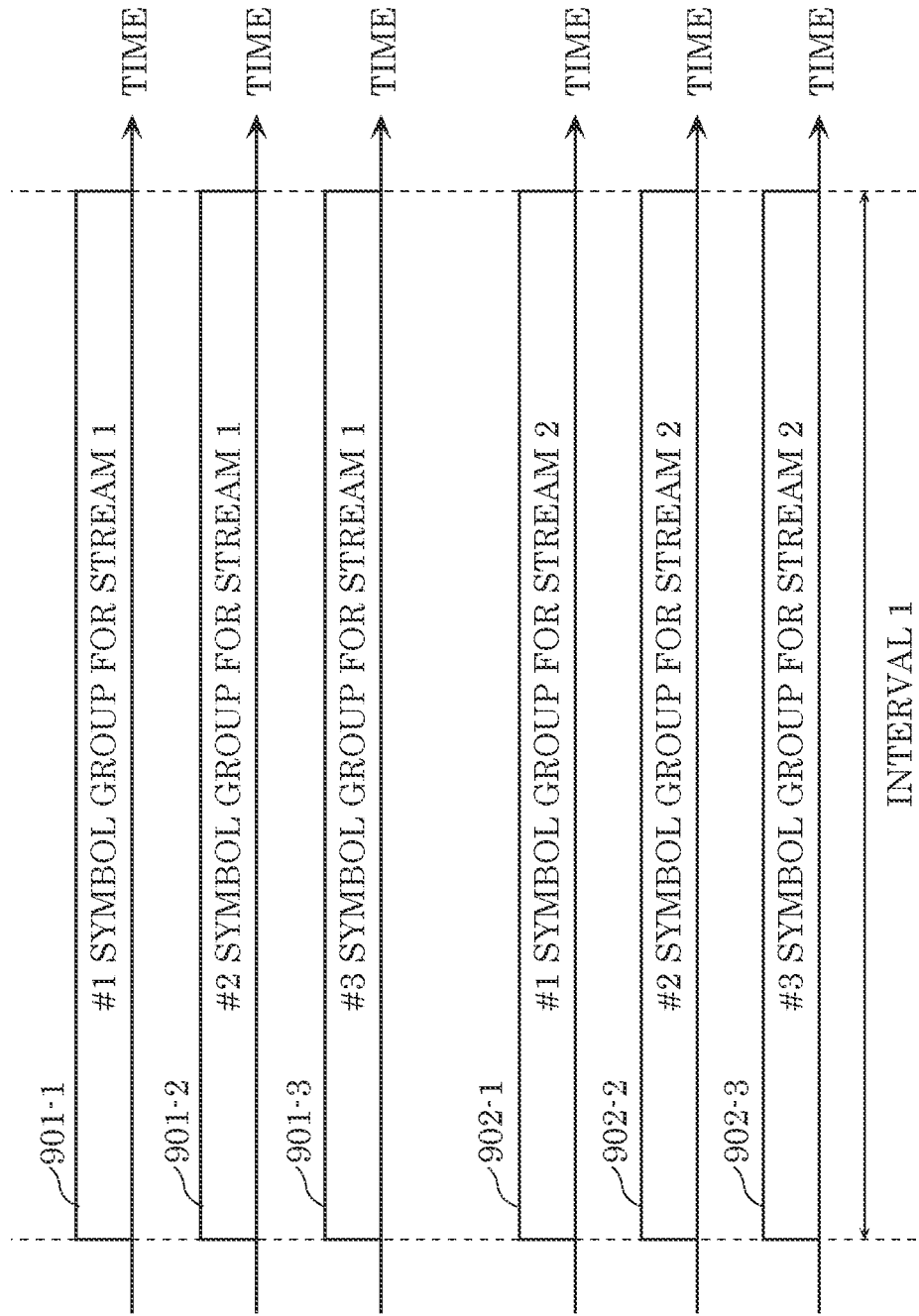
FIG. 9 is a diagram illustrating an example of a frame configuration.

FIG. 9 illustrates an example of a frame configuration when the horizontal axis indicates time.

1 symbol group 901-1 for stream 1 in FIG. 9 is a symbol group for transmission beam 702-1 for transmitting data of stream 1 in FIG. 7.

2 symbol group 901-2 for stream 1 in FIG. 9 is a symbol group for transmission beam 702-2 for transmitting data of stream 1 in FIG. 7.

3 symbol group 901-3 for stream 1 in FIG. 9 is a symbol group for transmission beam 702-3 for transmitting data of stream 1 in FIG. 7.

1 symbol group 902-1 for stream 2 in FIG. 9 is a symbol group for transmission beam 703-1 for transmitting data of stream 2 in FIG. 7.

2 symbol group 902-2 for stream 2 in FIG. 9 is a symbol group for transmission beam 703-2 for transmitting data of stream 2 in FIG. 7.

3 symbol group 902-3 for stream 2 in FIG. 9 is a symbol group for transmission beam 703-3 for transmitting data of stream 2 in FIG. 7.

1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are present in time interval 1, for example.

As described above, #1 symbol group 901-1 for stream 1 and #2 symbol group 902-1 for stream 2 are transmitted using the same frequency (the same frequency band), #2 symbol group 901-2 for stream 1 and #2 symbol group 902-2 for stream 2 are transmitted using the same frequency (the same frequency band), and #3 symbol group 901-3 for stream 1 and #3 symbol group 902-3 for stream 2 are transmitted using the same frequency (the same frequency band).

For example, "data symbol group A for stream 1" and "data symbol group A for stream 2" are generated from information, following the procedure in FIG. 8. The symbol group, namely "data symbol group A-1 for stream 1" which includes the same symbols as symbols included in "data symbol group A for stream 1", the symbol group, namely "data symbol group A-2 for stream 1" which includes the same symbols as symbols included in "data symbol group A for stream 1", and the symbol group, namely "data symbol group A-3 for stream 1" which includes the same symbols as symbols included in "data symbol group A for stream 1" are prepared.

Thus, the symbols included in "data symbol group A-1 for stream 1", the symbols included in "data symbol group A-2 for stream 1", and the symbols included in "data symbol group A-3 for stream 1" are the same.

At this time, #1 symbol group 901-1 for stream 1 in FIG. 9 includes "data symbol group A-1 for stream 1", #2 symbol group 901-2 for stream 1 in FIG. 9 includes "data symbol group A-2 for stream 1", and #3 symbol group 901-3 for stream 1 in FIG. 9 includes "data symbol group A-3 for stream 1". Accordingly, #1 symbol group 901-1 for stream 1, #2 symbol group 901-2 for stream 1, and #3 symbol group 901-3 for stream 1 include the same data symbol group.

The symbol group, namely "data symbol group A-1 for stream 2" which includes the same symbols as symbols included in "data symbol group A for stream 2", the symbol group, namely "data symbol group A-2 for stream 2" which includes the same symbols as symbols included in "data symbol group A for stream 2", and the symbol group, namely "data symbol group A-3 for stream 2" which includes the same symbols as symbols included in "data symbol group A for stream 2" are prepared.

Accordingly, the symbols included in "data symbol group A-1 for stream 2", the symbols included in "data symbol group A-2 for stream 2", and the symbols included in "data symbol group A-3 for stream 2" are the same.

At this time, #1 symbol group 902-1 for stream 2 in FIG. 9 includes "data symbol group A-1 for stream 2", #2 symbol group 902-2 for stream 2 in FIG. 9 includes "data symbol group A-2 for stream 2", and #3 symbol group 902-3 for stream 2 in FIG. 9 includes "data symbol group A-3 for stream 2". Accordingly, #1 symbol group 902-1 for stream 2, #2 symbol group 902-2 for stream 2, and #3 symbol group 902-3 for stream 2 include the same data symbol group.

Figure 10:
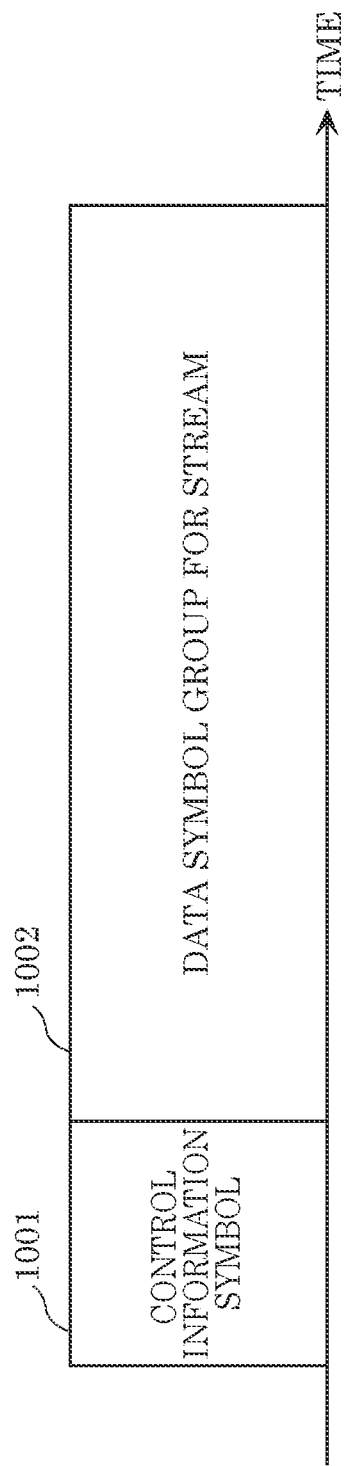
FIG. 10 is a diagram illustrating an example of a frame configuration.

FIG. 10 illustrates an example of a frame configuration of "symbol group #Y for stream X" (X=1, 2; Y=1, 2, 3) described with reference to FIG. 9. In FIG. 10, while the horizontal axis indicates time, 1001 denotes a control information symbol and 1002 denotes a data symbol group for a stream. At this time, data symbol group 1002 for the stream includes symbols for transmitting "data symbol group A for stream 1" or "data symbol group A for stream 2" described with reference to FIG. 9.

Note that a multi-carrier method such as the orthogonal frequency division multiplexing (OFDM) method may be used for the frame configuration in FIG. 10, and symbols may be present in the direction of the frequency axis, in this case. The symbols may include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 10, and control information symbol 1001 and data symbol group 1002 for a stream may be arranged in any manner. Note that the reference symbol may be referred to as a preamble and a pilot symbol.

The following describes a configuration of control information symbol 1001.

Figure 11:
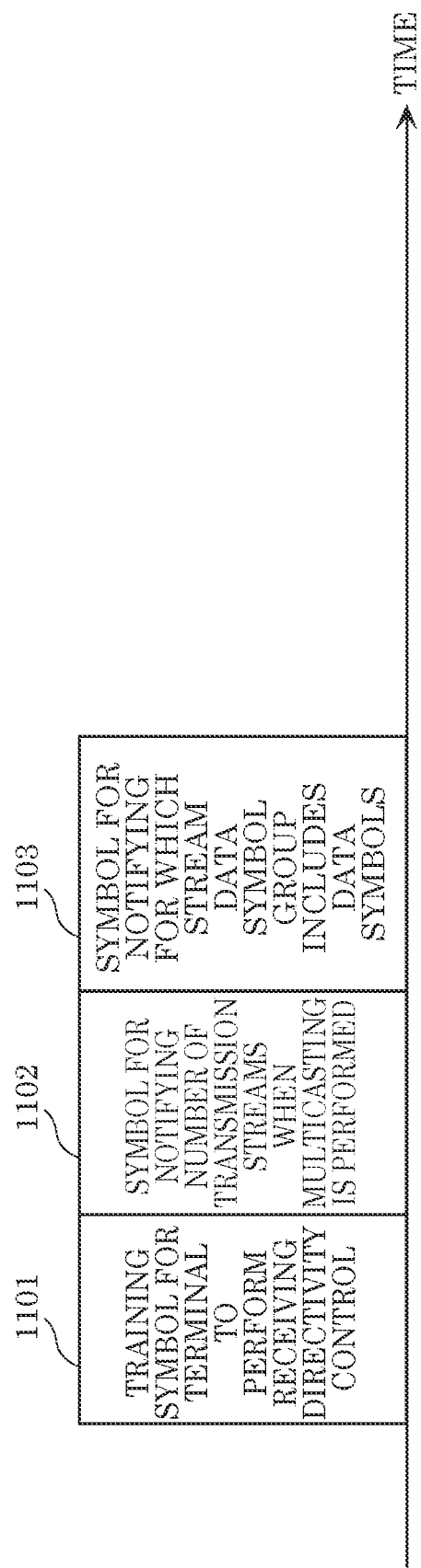
FIG. 11 is a diagram illustrating an example of a symbol configuration.

FIG. 11 illustrates an example of a configuration of symbols transmitted as a control information symbol in FIG. 10, and the horizontal axis indicates time. In FIG. 11, a terminal receives "training symbol for a terminal to perform receiving directivity control" 1101 to determine a signal processing method for the directivity control for receiving, which is implemented by "signal processor 405" and/or "antennas 401-4 to 401-N" and/or "multipliers 603-1 to 603-L and processor 605".

A terminal receives "symbol for notifying the number of transmission streams when multicasting is performed" 1102 so that the terminal is informed of the number of streams to be obtained.

A terminal receives "symbol for notifying for which stream data symbols are" 1103 so that the terminal can be informed which stream has been successfully received among the streams which the base station is transmitting.

A description of an example with regard to the above is to be given.

The case where the base station transmits streams using transmission beams as illustrated in FIG. 7 is to be described. Specific information indicated by a control information symbol in #1 symbol group 901-1 for stream 1 in FIG. 9 is to be described.

In the case of FIG. 7, since the base station is transmitting "stream 1" and "stream 2", information indicated by "symbol for notifying the number of transmission streams when multicasting is performed" 1102 indicates "2".

1 symbol group 901-1 for stream 1 in FIG. 9 is for transmitting data symbols for stream 1, and thus information indicated by "symbol for notifying for which stream data symbols are" 1103 indicates "stream 1".

The case where, for example, a terminal receives #1 symbol group 901-1 for stream 1 in FIG. 9 is to be described. At this time, the terminal becomes aware that "the number of transmission streams is 2" from "symbol for notifying the number of transmission streams when multicasting is performed" 1102, and that the terminal has obtained "data symbols for stream 1" from "symbol 1103 for notifying for which stream data symbol group includes data symbols".

After that, since the terminal becomes aware that "the number of transmission streams is 2" and the obtained data symbols are "data symbols for stream 1", the terminal is aware that the terminal is to obtain "data symbols for stream 2". Thus, the terminal can start operation for searching for a symbol group for stream 2. For example, the terminal searches for one of transmission beams for transmitting #1 symbol group 902-1 for stream 2, #2 symbol group 902-2 for stream 2, and #3 symbol group 902-3 for stream 2 in FIG. 9.

Then, the terminal obtains one of transmission beams for transmitting #1 symbol group 902-1 for stream 2, #2 symbol group 902-2 for stream 2, and #3 symbol group 902-3 for stream 2, to obtain data symbols for both streams 1 and 2.

Configuring control information symbols in this manner yields an advantageous effect that a terminal can obtain data symbols precisely.

As described above, the base station transmits data symbols using a plurality of transmission beams, and a terminal selectively receives a transmission beam with good quality among the plurality of transmission beams in multicast transmission and broadcast data transmission, and furthermore, transmission directivity control and receiving directivity control have been performed on modulated signals transmitted by the base station, thus achieving advantageous effects of increasing an area where high data receiving quality is achieved.

In the above description, a terminal performs receiving directivity control, yet advantageous effects can be obtained as mentioned above without the terminal performing receiving directivity control.

Note that the modulating method for "data symbol group for a stream" 1002 in FIG. 10 may be any modulating method, and a mapping method according to the modulating method for "data symbol group for a stream" 1002 may be changed for each symbol. Accordingly, a phase of a constellation may be changed for each symbol on an in-phase I-quadrature Q plane after mapping.

Figure 12:
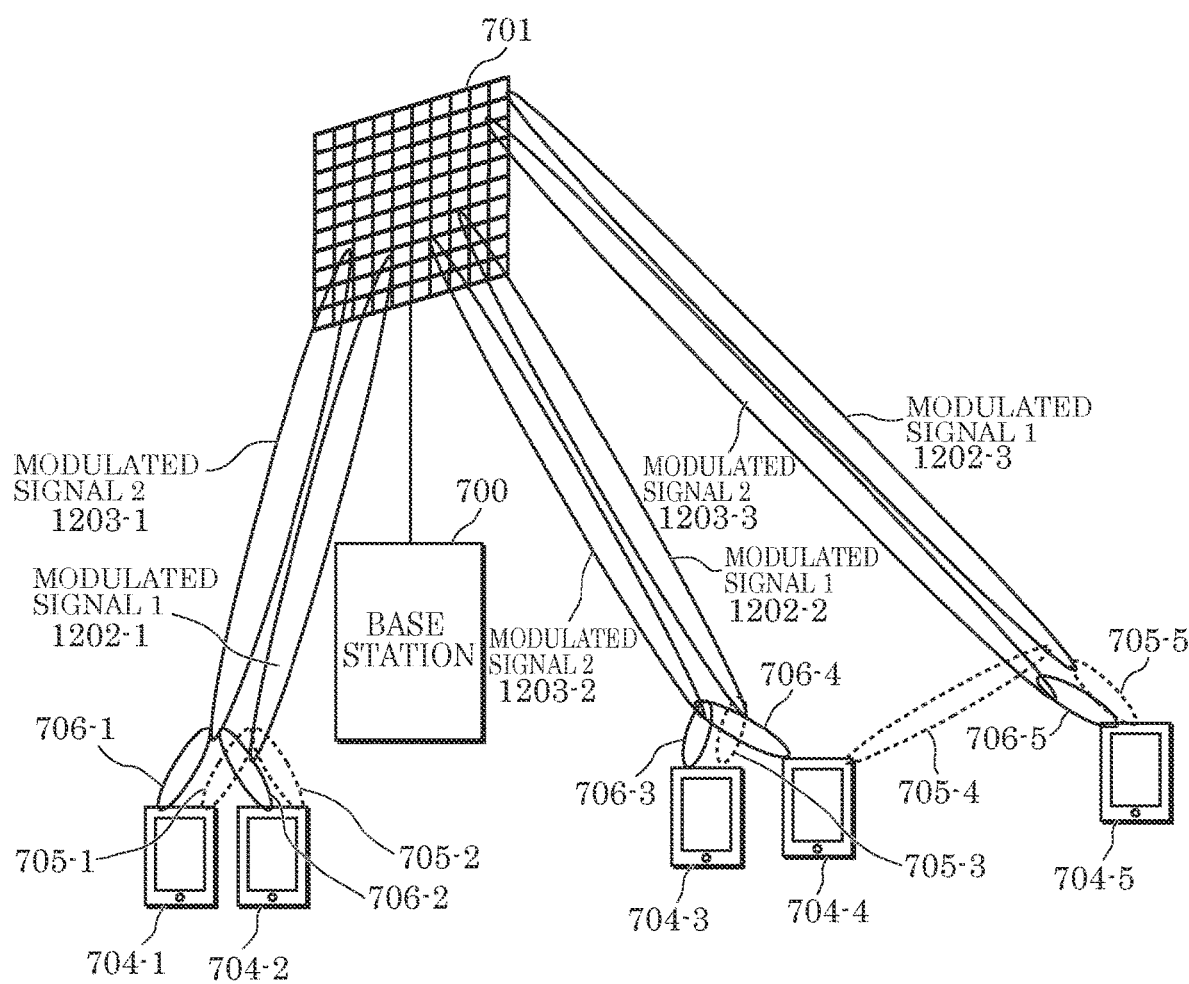
FIG. 12 is a diagram illustrating an example of a state of communication between the base station and terminals.

FIG. 12 illustrates an example of a state of communication between a base station and terminals different from the example in FIG. 7. Note that elements which operate in the same manner as those in FIG. 7 are assigned the same reference numerals in FIG. 12.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

FIG. 12 illustrates transmission beam 1202-1 for transmitting "modulated signal 1", transmission beam 1202-2 for transmitting "modulated signal 1", and transmission beam 1202-3 for transmitting "modulated signal 1".

FIG. 12 illustrates transmission beam 1203-1 for transmitting "modulated signal 2", transmission beam 1203-2 for transmitting "modulated signal 2", and transmission beam 1203-3 for transmitting "modulated signal 2".

Note that although in FIG. 12, the number of transmission beams for transmitting "modulated signal 1" is 3 and the number of transmission beams for transmitting "modulated signal 2" is 3, the present disclosure is not limited to such numbers, and the number of transmission beams for transmitting "modulated signal 1" may be at least 2 and the number of transmission beams for transmitting "modulated signal 2" may be at least 2. A detailed description of "modulated signal 1" and "modulated signal 2" will be given later.

FIG. 12 includes terminals 704-1, 704-2, 704-3, 704-4, and 704-5, and the terminals have the same configuration as those in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 1202-1 for transmitting "modulated signal 1", and receiving directivity 706-1 allows terminal 704-1 to receive and demodulate transmission beam 1203-1 for transmitting "modulated signal 2".

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 1202-1 for transmitting "modulated signal 1", and receiving directivity 706-2 allows terminal 704-2 to receive and demodulate transmission beam 1203-1 for transmitting "modulated signal 2".

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 1202-2 for transmitting "modulated signal 1", and receiving directivity 706-3 allows terminal 704-3 to receive and demodulate transmission beam 1203-2 for transmitting "modulated signal 2".

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 1202-3 for transmitting "modulated signal 1", and receiving directivity 706-4 allows terminal 704-4 to receive and demodulate transmission beam 1203-2 for transmitting "modulated signal 2".

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 1202-3 for transmitting "modulated signal 1", and receiving directivity 706-5 allows terminal 704-5 to receive and demodulate transmission beam 1203-3 for transmitting "modulated signal 2".

Distinguishing points in FIG. 12 are that a terminal selects, based on a spatial position, at least one transmission beam from among transmission beams 1202-1, 1202-2, and 1202-3 for transmitting "modulated signal 1", and can obtain "modulated signal 1" with high quality by directing a receiving directivity to the selected transmission beam(s). Further, the terminal selects, based on a spatial position, at least one transmission beam from among transmission beams 1203-1, 1203-2, and 1203-3 for transmitting "modulated signal 2", and can obtain "modulated signal 2" with high quality by directing a receiving directivity to the selected transmission beam(s).

Note that base station 700 transmits transmission beam 1202-1 for transmitting "modulated signal 1" and transmission beam 1203-1 for transmitting "modulated signal 2" using the same frequency (the same frequency band) at the same time. Then, base station 700 transmits transmission beam 1202-2 for transmitting "modulated signal 1" and transmission beam 1203-2 for transmitting "modulated signal 2" using the same frequency (the same frequency band) at the same time. Further, base station 700 transmits transmission beam 1202-3 for transmitting "modulated signal 1" and transmission beam 1203-3 for transmitting modulated signal 2" using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 12, information indicating "to perform transmission for multicasting" is input to setting unit 158 according to setting signal 160.

Setting signal 160 includes information with regard to "the number of transmission modulated signals when multicasting is performed" and if the base station performs transmission as illustrated in FIG. 12, information indicating that "the number of transmission modulated signals is 2" is input to setting unit 158 according to setting signal 160.

Setting signal 160 may include information with regard to "how many transmission beams are to be used to transmit each modulated signal". If the base station performs transmission as illustrated in FIG. 12, information indicating that "the number of transmission beams for transmitting modulated signal 1 is 3 and the number of transmission beams for transmitting modulated signal 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission modulated signals when multicasting is performed", information with regard to "how many transmission beams are to be used to transmit each modulated signal". Accordingly, a terminal can appropriately receive data. A configuration of a control information symbol will be later described in detail.

Figure 13:
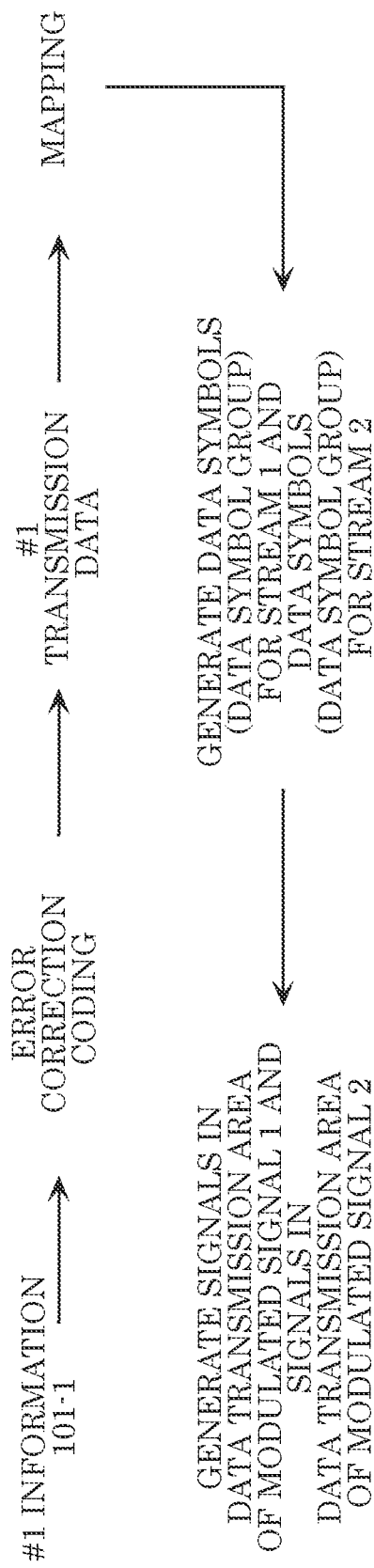
FIG. 13 is a diagram illustrating a relation of a plurality of modulated signals.

FIG. 13 is a drawing for describing a relation between #i information 101-*i* in FIGS. 1 and 3 and "modulated signal 1" and "modulated signal 2" described with reference to FIG. 12.

For example, #1 information 101-1 is subjected to error correction coding, for instance, and data obtained as a result of the error correction coding is obtained. The data obtained as a result of the error correction coding is named #1 transmission data. Data symbols are obtained by mapping #1 transmission data. The data symbols are separated into data symbols for stream 1 and data symbols for stream 2, so that data symbols (data symbol group) for stream 1 and data symbols (data symbol group) for stream 2 are obtained. At this time, a data symbol having symbol number i for stream 1 is s1(*i*) and a data symbol having symbol number i for stream 2 is s2(*i*). Then, "modulated signal 1" tx1(*i*) having symbol number i is expressed as follows, for example.

[Math. 3]

$$tx1(i)=\alpha(i)s1(i)+\beta(i)\times s2(i) \quad \text{Expression (3)}$$

Then, "modulated signal 2" tx2(*i*) having symbol number i is expressed as follows, for example.

[Math. 4]

$$tx2(i)=\gamma(i)\times s1(i)+\delta(i)\times s2(i) \quad \text{Expression (4)}$$

Note that in Expressions (3) and (4), α(i) can be defined by a complex number (and thus may be a real number), β(i) can be defined by a complex number (and thus may be a real number), γ(i) can be defined by a complex number (and thus may be a real number), and δ(i) can be defined by a complex number (and thus may be a real number). Furthermore, although α(i) is indicated, α(i) may not be a function of symbol number i (may be a fixed value), although α(i) is indicated, β(i) may not be a function of symbol number i (may be a fixed value), although γ(i) is indicated, γ(i) may not be a function of symbol number i (may be a fixed value), and although δ(i) is indicated, δ(i) may not be a function of symbol number i (may be a fixed value).

Then, "a symbol group for modulated signal 1" which includes "signals in a data transmission area of modulated signal 1" which are constituted by data symbols is transmitted from the base station in FIG. 1 or 3. Further, "a symbol group for modulated signal 2" which includes "signals in a data transmission area of modulated signal 2" which are constituted by data symbols is transmitted from the base station in FIG. 1 or 3.

Note that signal processing such as phase modification and cyclic delay diversity (CDD) may be performed on "modulated signal 1" and "modulated signal 2". Note that the method for signal processing is not limited to those.

Figure 14:
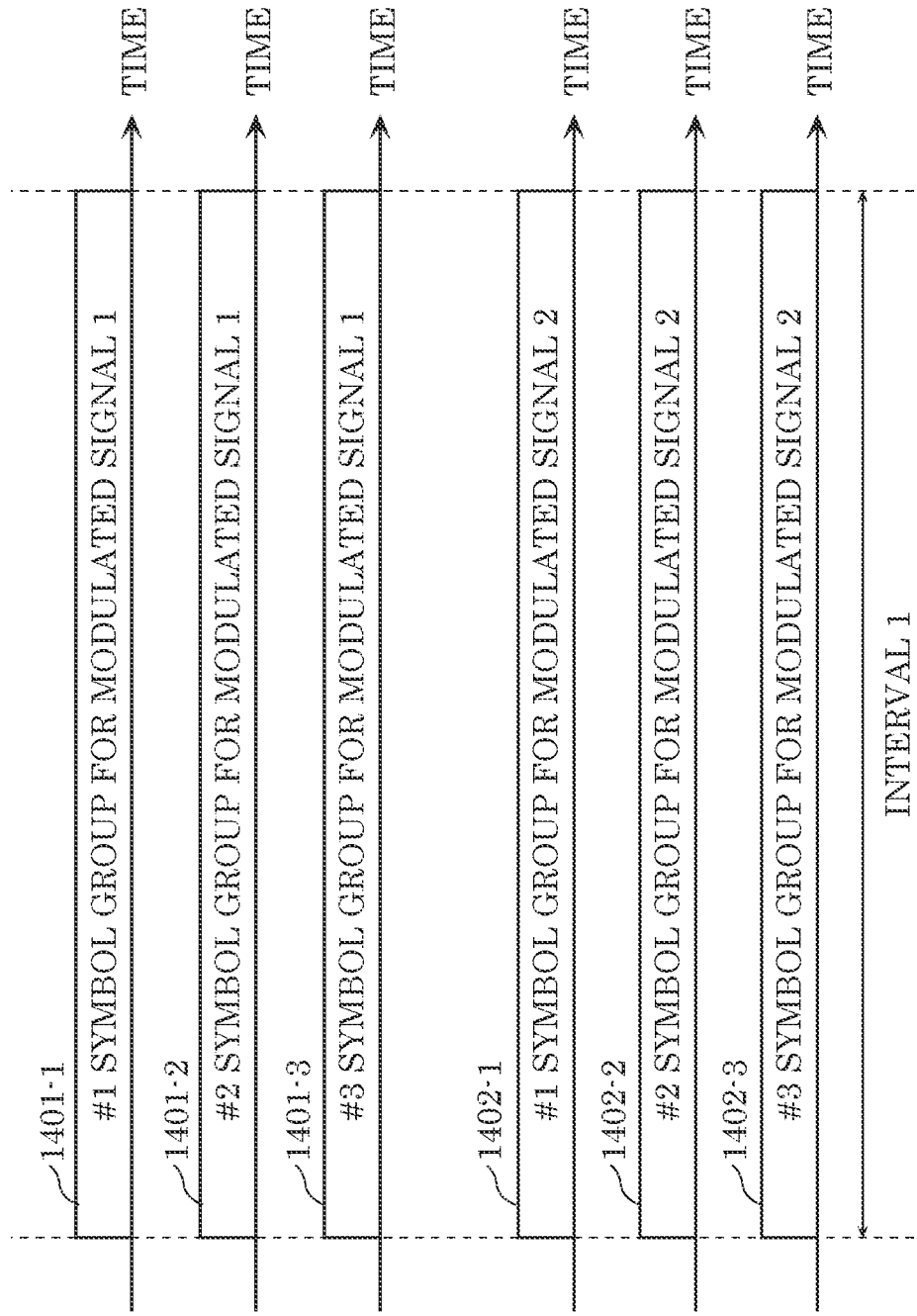
FIG. 14 is a diagram illustrating an example of a frame configuration.

FIG. 14 illustrates an example of a frame configuration when the horizontal axis indicates time.

1 symbol group (1401-1) for modulated signal 1 in FIG. 14 is a symbol group for transmission beam 1202-1 for transmitting data of modulated signal 1 in FIG. 12.

2 symbol group (1401-2) for modulated signal 1 in FIG. 14 is a symbol group for transmission beam 1202-2 for transmitting data of modulated signal 1 in FIG. 12.

3 symbol group (1401-3) for modulated signal 1 in FIG. 14 is a symbol group for transmission beam 1202-3 for transmitting data of modulated signal 1 in FIG. 12.

1 symbol group (1402-1) for modulated signal 2 in FIG. 14 is a symbol group for transmission beam 1203-1 for transmitting data of modulated signal 2 in FIG. 12.

2 symbol group (1402-2) for modulated signal 2 in FIG. 14 is a symbol group for transmission beam 1203-2 for transmitting data of modulated signal 2 in FIG. 12.

3 symbol group (1402-3) for modulated signal 2 in FIG. 14 is a symbol group for transmission beam 1203-3 for transmitting data of modulated signal 2 in FIG. 12.

1 symbol group (1401-1) for modulated signal 1, #2 symbol group (1401-2) for modulated signal 1, #3 symbol group (1401-3) for modulated signal 1, #1 symbol group (1402-1) for modulated signal 2, #2 symbol group (1402-2) for modulated signal 2, and #3 symbol group (1402-3) for modulated signal 2 are present in time interval 1, for example.

As previously described, #1 symbol group (1401-1) for modulated signal 1 and #1 symbol group (1402-1) for modulated signal 2 are transmitted using the same frequency (the same frequency band), #2 symbol group (1401-2) for modulated signal 1 and #2 symbol group (1402-2) for modulated signal 2 are transmitted using the same frequency (the same frequency band), and #3 symbol group (1401-3) for modulated signal 1 and #3 symbol group (1402-3) for modulated signal 2 are transmitted using the same frequency (the same frequency band).

For example, "signal A in the data transmission area of modulated signal 1" and "signal A in the data transmission area of modulated signal 2" are generated from information in accordance with the procedure in FIG. 13.

"Signal A-1 in the data transmission area of modulated signal 1" which is a signal constituted by a signal equivalent to a signal which constitutes "signal A in the data transmission area of modulated signal 1", "signal A-2 in the data transmission area of modulated signal 1" which is a signal constituted by a signal equivalent to a signal which constitutes "signal A in the data transmission area of modulated signal 1", and "signal A-3 in the data transmission area of modulated signal 1" which is a signal constituted by a signal equivalent to a signal which constitutes "signal A in the data transmission area of modulated signal 1" are prepared (thus, the signal which constitutes "signal A-1 in the data transmission area of modulated signal 1", the signal which constitutes "signal A-2 in the data transmission area of modulated signal 1", and the signal which constitutes "signal A-3 in the data transmission area of modulated signal 1" are the same).

At this time, #1 symbol group (1401-1) for modulated signal 1 in FIG. 14 includes "signal A-1 in the data transmission area of modulated signal 1", #2 symbol group (1401-2) for modulated signal 1 in FIG. 14 includes "signal A-2 in the data transmission area of modulated signal 1", and #3 symbol group (1401-3) for modulated signal 1 in FIG. 14 includes "signal A-3 in the data transmission area of modulated signal 1". Specifically, #1 symbol group (1401-1) for modulated signal 1, #2 symbol group (1401-2) for modulated signal 1, and #3 symbol group (1401-3) for modulated signal 1 include equivalent signals.

Further, "signal A-1 in the data transmission area of modulated signal 2" which is a signal constituted by a signal equivalent to a signal which constitutes "signal A in the data transmission area of modulated signal 2", "signal A-2 in the data transmission area of modulated signal 2" which is a signal constituted by a signal equivalent to a signal which constitutes "signal A in the data transmission area of modulated signal 2", and "signal A-3 in the data transmission area of modulated signal 2" which is a signal constituted by a signal equivalent to a signal which constitutes "signal A in the data transmission area of modulated signal 2" are prepared (thus, the signal which constitutes "signal A-1 in the data transmission area of modulated signal 2", the signal which constitutes "signal A-2 in the data transmission area of modulated signal 2", and the signal which constitutes "signal A-3 in the data transmission area of modulated signal 2" are the same).

At this time, #1 symbol group (1402-1) for modulated signal 2 in FIG. 14 includes "signal A-1 in the data transmission area of modulated signal 2", #2 symbol group (1402-2) for stream 2 in FIG. 14 includes signal A-2 in the data transmission area of modulated signal 2", and #3 symbol group (1402-3) for modulated signal 2 in FIG. 14 includes "signal A-3 in the data transmission area of modulated signal 2". Specifically, #1 symbol group (1402-1) for modulated signal 2, #2 symbol group (1402-2) for modulated signal 2, and #3 symbol group (1402-3) for modulated signal 2 include equivalent signals.

Figure 15:
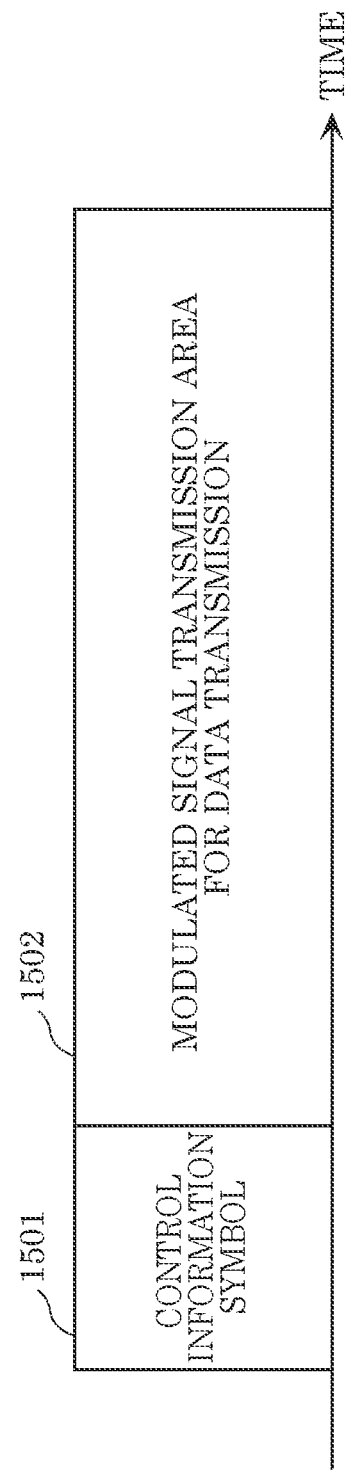
FIG. 15 is a diagram illustrating an example of a frame configuration.

FIG. 15 illustrates an example of a frame configuration of "symbol group #Y for modulated signal X" (X=1, 2; Y=1, 2, 3) described with reference to FIG. 14. In FIG. 15, the horizontal axis indicates time, 1501 indicates a control information symbol, and 1502 indicates a modulated signal transmission area for data transmission. At this time, modulated signal transmission area 1502 for data transmission includes symbols for transmitting "signal A in the data transmission area of modulated signal 1." or "signal A in the data transmission area of modulated signal 2" described with reference to FIG. 14.

Note that in the frame configuration in FIG. 15, a multicarrier method such as an orthogonal frequency division multiplexing (OFDM) method may be used, and in this case, symbols may be present in the direction of the frequency axis. The symbols may each include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 15, and control information symbol 1501 and modulated signal transmission area 1502 for data transmission may be arranged in any manner. A reference symbol may also be called a preamble and a pilot symbol, for example.

Next is a description of a configuration of control information symbol 1501.

Figure 16:
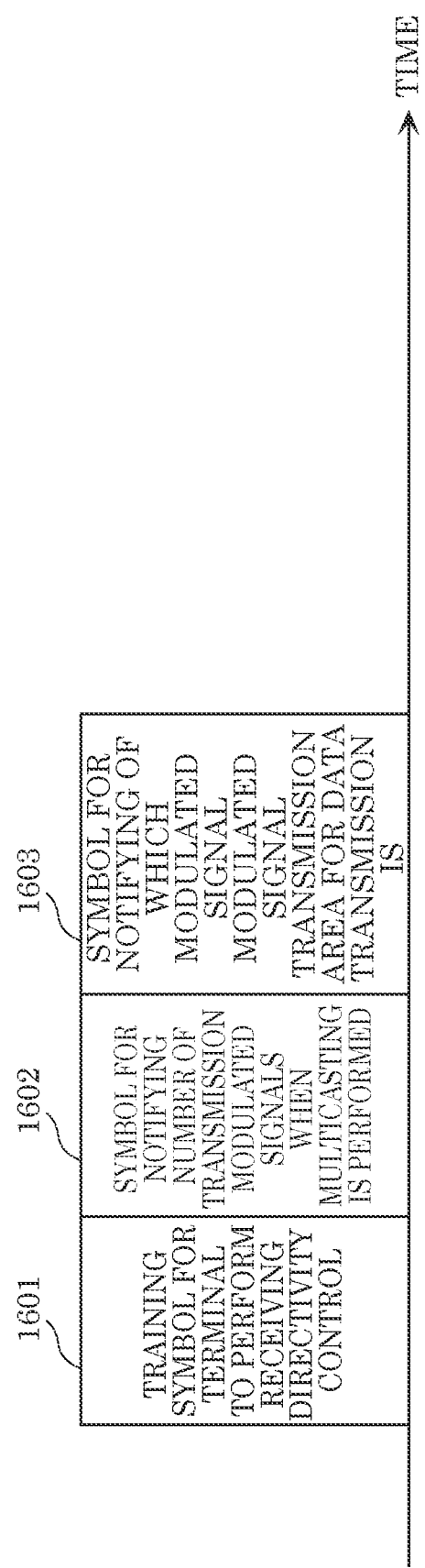
FIG. 16 is a diagram illustrating an example of a symbol configuration.

FIG. 16 illustrates an example of a configuration of symbols which are to be transmitted as a control information symbol in FIG. 15, and the horizontal axis indicates time. In FIG. 16, 1601 denotes "a training symbol for a terminal to perform receiving directivity control", and the terminal determines a signal processing method for the directivity control for receiving, which is performed by "signal processor 405" and/or "antennas 401-1 to 401-N" and/or "multipliers 603-1 to 603-1, and processor 605", by receiving "training symbol for a terminal to perform receiving directivity control" 1601.

1602 denotes "a symbol for notifying the number of transmission modulated signals when multicasting is performed", and the terminal is informed of the number of modulated signals which are to be obtained, by receiving "symbol for notifying the number of transmission modulated signals when multicasting is performed" 1602.

1603 denotes "a symbol for notifying of which modulated signal a modulated signal transmission area for data transmission is", and the terminal can be informed of which modulated signal has been successfully received among modulated signals which the base station is transmitting, by receiving "symbol for notifying of which modulated signal a modulated signal transmission area for data transmission is" 1603.

An example of the above is to be described.

Now consider the case where the base station is transmitting "modulated signals" using transmission beams as illustrated in FIG. 12. Specific information on a control information symbol in #1 symbol group 1401-1 for modulated signal 1 in FIG. 14 is to be described.

In the case of FIG. 12, the base station is transmitting "modulated signal 1" and "modulated signal 2", and thus information indicated by "symbol for notifying the number of transmission modulated signals when multicasting is performed" 1602 is "2".

1 symbol group 1401-1 for modulated signal 1 in FIG. 14 is for transmitting a signal in the data transmission area of modulated signal 1, and thus information indicated by "symbol for notifying of which modulated signal a modulated signal transmission area for data transmission is" 1603 indicates "modulated signal 1".

For example, a terminal is assumed to receive #1 symbol group 1401-1 for modulated signal 1 in FIG. 14. At this time, the terminal becomes aware that "the number of modulated signals is 2" is obtained from "symbol for notifying the number of transmission modulated signals when multicasting is performed" 1602, and that "modulated signal 1." from "symbol for notifying of which modulated signal a modulated signal transmission area for data transmission is" 1603.

The terminal then becomes aware that "the number of present modulated signals is 2" and that the obtained modulated signal is "modulated signal 1", and thus the terminal is aware that "modulated signal 2" is to be obtained. Accordingly, the terminal can start operation of searching for "modulated signal 2". The terminal searches for one of transmission beams for any of "#1 symbol group 1402-1 for modulated signal 2", "#2 symbol group 1402-2 for modulated signal 2", "#3 symbol group 1402-3 for modulated signal 2" in FIG. 14, for example.

The terminal obtains both "modulated signal 1" and "modulated signal 2", and can obtain data symbols for stream 1 and data symbols for stream 2 with high quality, by obtaining one transmission beam for "#1 symbol group 1402-1 for modulated signal 2", "#2 symbol group 1402-2 for modulated signal 2", and "#3 symbol group 1402-3 for modulated signal 2".

Configuring a control information symbol in the above manner yields advantageous effects that the terminal can precisely obtain data symbols.

As described above, in multicast data transmission and broadcast data transmission, the base station transmits data symbols using a plurality of transmission beams, and a terminal selectively receives a transmission beam with good quality among the plurality of transmission beams, thus achieving advantageous effects that a modulated signal which the base station has transmitted increases an area where high data receiving quality is achieved. This is because the base station performs transmission directivity control and receiving directivity control.

In the above description, a terminal performs receiving directivity control, yet advantageous effects can be obtained as mentioned above without the terminal performing receiving directivity control.

Note that the case where each terminal obtains both a modulated signal of stream 1 and a modulated signal of stream 2 is described with reference to FIG. 7, yet the present disclosure is not limited to such an embodiment. For example, an embodiment in which a modulated signal desired to be obtained varies depending on a terminal may be achieved as in a case where there are a terminal which desires to obtain a modulated signal of stream 1, a terminal which desires to obtain a modulated signal of stream 2, and a terminal which desires to obtain both a modulated signal of stream 1 and a modulated signal of stream 2.

Embodiment 2

Embodiment 1 has described a method in which a base station transmits data symbols using a plurality of transmission beams in multicast data transmission and broadcast data transmission. The present embodiment describes, as a variation of Embodiment 1, the case where a base station performs unicast data transmission as well as multicast data transmission and broadcast data transmission.

Figure 17:
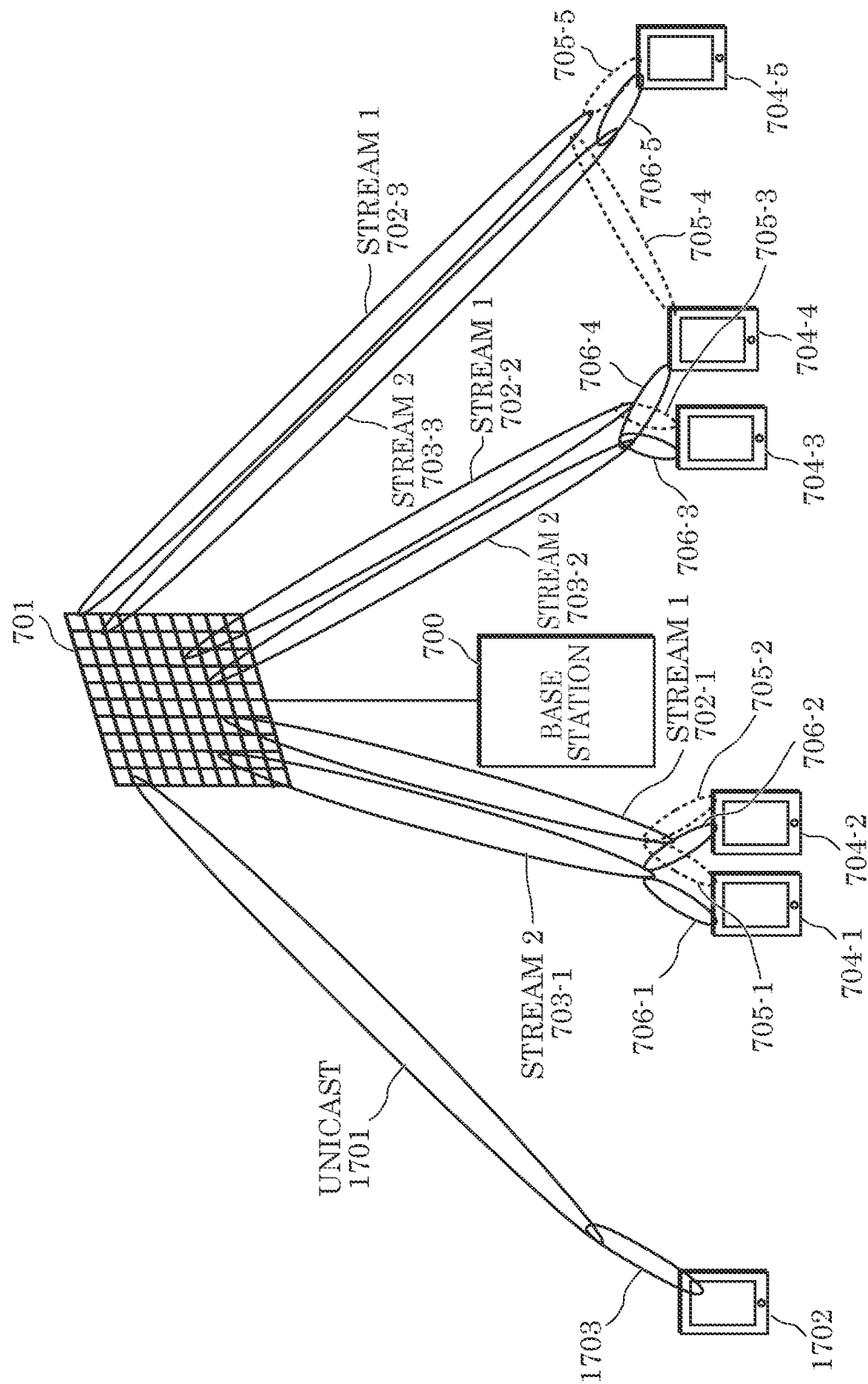
FIG. 17 is a diagram illustrating an example of a state of communication between the base station and terminals.

FIG. 17 illustrates an example of a state of communication between the base station (or an access point, for instance) and terminals. Elements which operate in the same manner as those in FIG. 7 are assigned the same reference numerals, and a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing preceding (weighting synthesis).

Then, transmission beams 702-1, 702-2, 702-3, 703-1, 703-2, and 703-3 are as described with reference to FIG. 7, and thus a description thereof is omitted.

Terminals 704-1, 704-2, 704-3, 704-4, and 704-5, and receiving directivities 705-1, 705-2, 705-3, 705-4, 705-5, 706-1, 706-2, 706-3, 706-4, and 706-5 are as described with reference to FIG. 7, and thus a description thereof is omitted.

In FIG. 17, a distinguishing point is that the base station performs multicasting, as described with reference to FIG. 7, and also base station 700 and a terminal (for example, 1702) perform unicast communication.

In addition to transmission beams for multicasting 702-1, 702-2, 702-3, 703-1, 703-2, and 703-3, in FIG. 17, base station 700 generates transmission beam 1701 for unicasting, and transmits to terminal 1702 data therefor. Note that FIG. 17 illustrates an example in which base station 700 transmits one transmission beam 1701 to terminal 1702. Yet, the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers (303-1 to 603-L and signal processor 605", and forms receiving directivity 1703. This allows terminal 1702 to receive and demodulate transmission beam 1701.

Note that in order to generate transmission beams which include transmission beam 1701, the base station performs precoding (weighting synthesis) using signal processor 102 (and/or weighting synthesizer 301) in the configuration as illustrated in FIG. 1 or 3, for example.

On the contrary, when terminal 1702 transmits a modulated signal to base station 700, terminal 1702 performs precoding (or weighting synthesis), and transmits transmission beam 1703. Base station 700 performs directivity control for receiving and forms receiving directivity 1701. Accordingly, base station 700 can receive and demodulate transmission beam 1703.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Then, transmission beam 1701 for unicasting may be a beam having the same frequency (the same frequency band) as or a different frequency (a different frequency band) from those of transmission beams 702-1, 702-2, 702-3, 703-1, 703-2, and 703-3.

A description has been given with reference to FIG. 17, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 17, information indicating "to perform both transmission for multicasting and transmission for unicasting" is input to setting unit 158 according to setting signal 160.

Also, setting signal 160 includes information with regard to "the number of transmission streams when multicasting, is performed" and if the base station performs transmission as illustrated in FIG. 17, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 17, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", information with regard to "how many transmission beams are to be used to transmit each stream", and others. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

Figure 18:
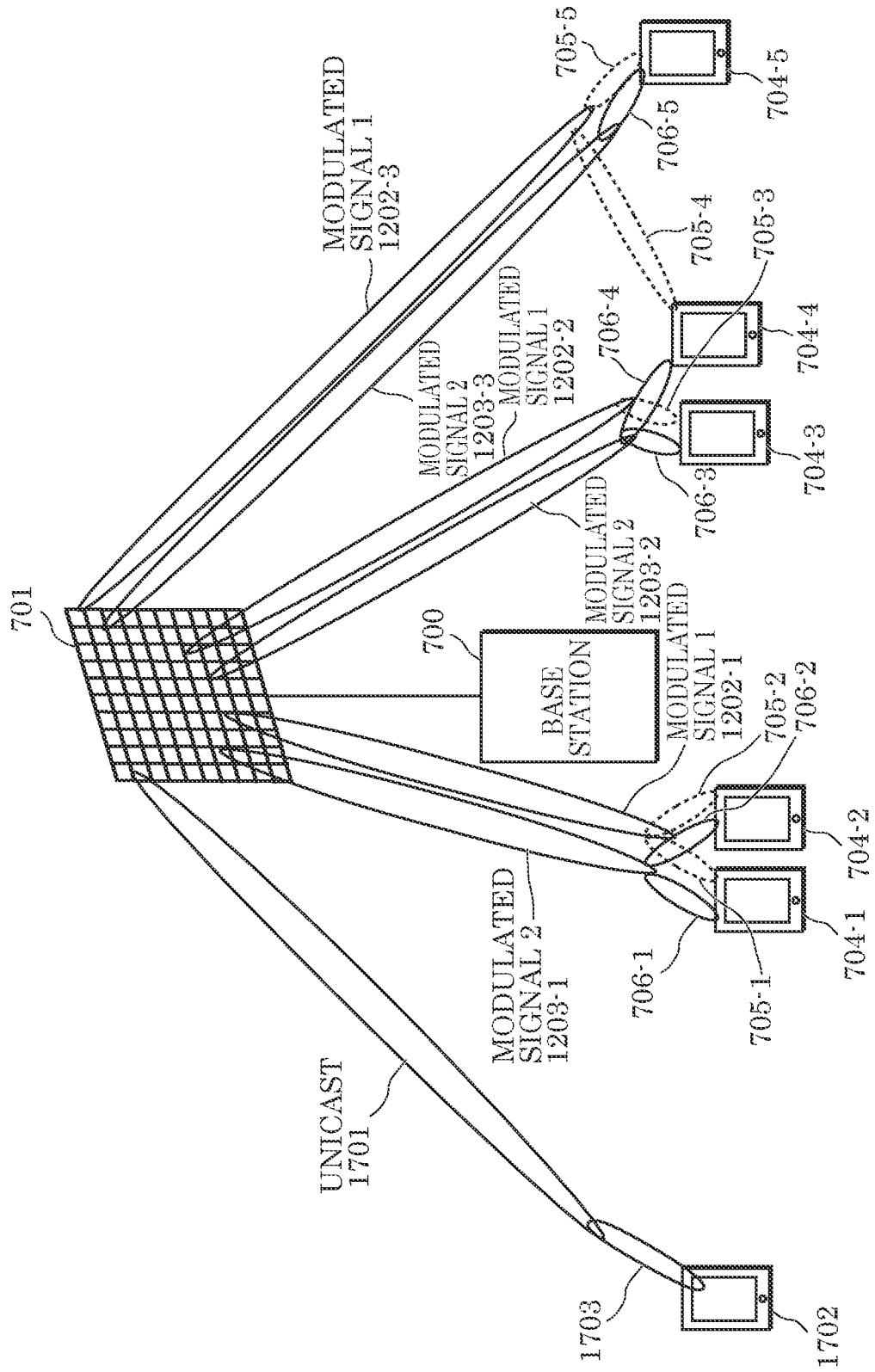
FIG. 18 is a diagram illustrating an example of a state of communication between the base station and terminals.

FIG. 18 illustrates an example of a state of communication between a base station (or an access point or the like) and terminals, and elements which operate in the same manner as those in FIGS. 7 and 12 are assigned the same reference numerals in FIG. 18, and a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 is as described with reference to FIG. 12, and thus a description thereof is omitted.

A description of terminals 704-1, 704-2, 704-3, 704-4, and 704-5, and receiving directivities 705-1, 705-2, 705-3, 705-4, 705-5, 706-1, 706-2, 706-3, 706-4, and 706-5 is as given with reference to FIG. 12, and thus a description thereof is omitted.

A distinguishing point in FIG. 18 is that while the base station performs multicasting, as described with reference to FIG. 12, base station 700 and a terminal (for example, 1702) perform unicast communication.

In FIG. 18, base station 700 generates transmission beam 1701 for unicasting in addition to transmission beams 1202-1, 1202-2, 1202-3, 1203-1, 1203-2, and 1203-3 for multicasting, and transmits to terminal 1702 data therefor. Note that FIG. 18 illustrates an example in which base station 700 transmits one transmission beam 1701 to terminal 1702, yet the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. Accordingly, terminal 1702 can receive and demodulate transmission beam 1701.

Note that in order to generate transmission beams which include transmission beam 1701, the base station performs precoding (weighting synthesis) in signal processor 102 (and/or, weighting synthesizer 301) in the configuration as illustrated in, for example, FIG. 1 or 3.

On the contrary, when terminal 1702 transmits a modulated signal to base station 700, terminal 1702 performs precoding (or weighting synthesis), and transmits transmission beam 1703, and base station 700 performs directivity control for receiving, and forms receiving directivity 1701. Accordingly, base station 700 can receive and demodulate transmission beam 1703.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

Transmission beam 1701 for unicasting may be a beam having the same frequency (the same frequency band) as or a different frequency (different frequency band) from those of transmission beams 1202-1, 1202-2, 1202-3, 1203-1, 1203-2, and 1203-3.

A description has been given with reference to FIG. 18, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 18, information indicating "to perform both transmission for multicasting and transmission for unicasting" is input to setting unit 158 according to setting signal 160.

Setting signal 160 also includes information with regard to "the number of transmission streams when multicasting is performed" and if the base station performs transmission as illustrated in FIG. 18, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 18, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", and information with regard to "how many transmission beams are to be used to transmit each stream", for instance. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

The following describes the case where the base station transmits a plurality of data by multicasting, as a variation of Embodiment 1.

Figure 19:
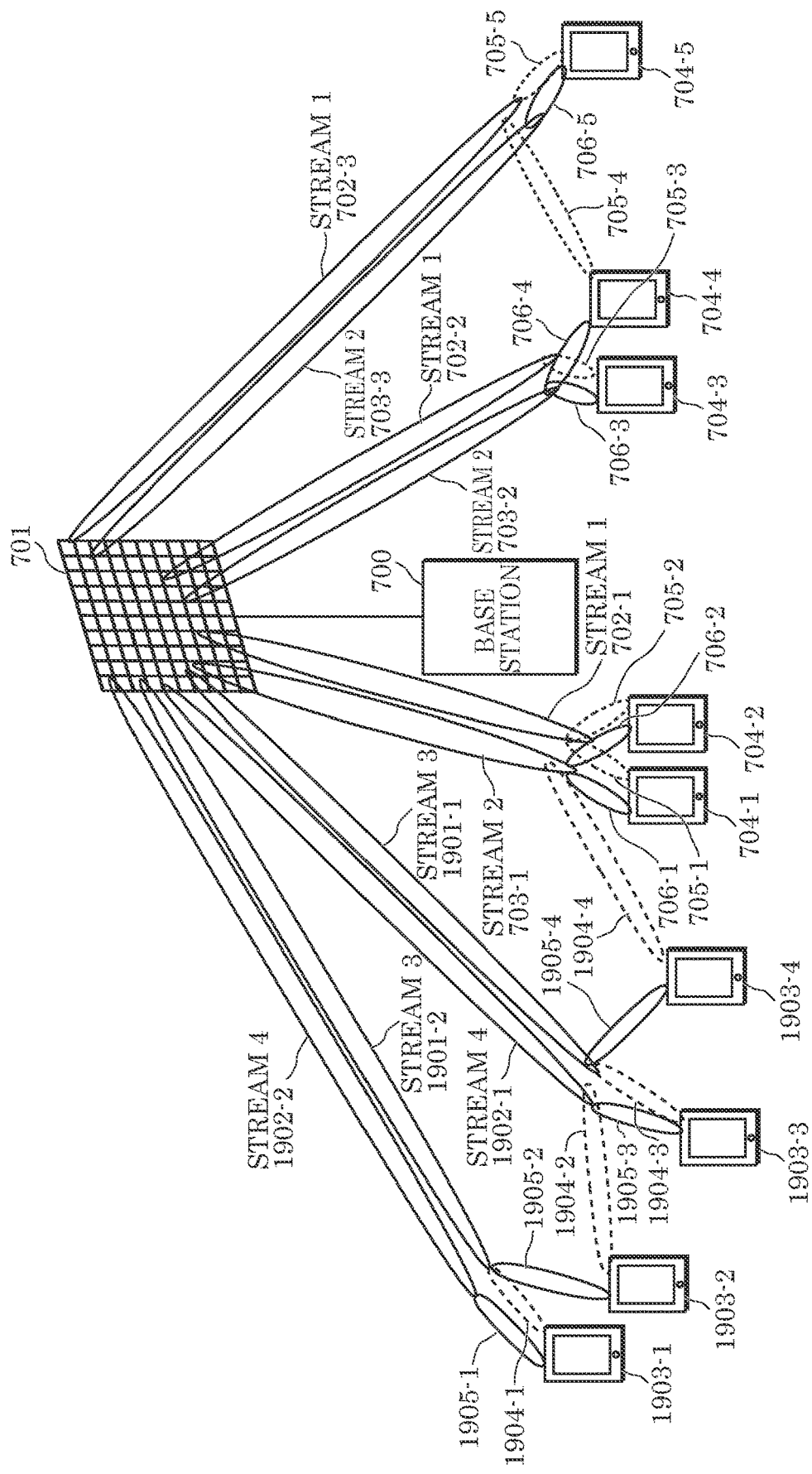
FIG. 19 is a diagram illustrating an example of a state of communication between the base station and terminals.

FIG. 19 illustrates an example of a state of communication between the base station (or an access point, for instance) and terminals, and elements which operate in the same manner as those in FIG. 7 are assigned the same reference numerals in FIG. 19, so that a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing preceding (weighting synthesis).

A description of transmission beams 702-1, 702-2, 702-3, 703-1, 703-2, and 703-3 is as given with reference to FIG. 7, and thus a description thereof is omitted.

A description of terminals 704-1, 704-2, 704-3, 704-4, and 704-5 and receiving directivities 705-1, 705-2, 705-3, 705-4, 705-5, 706-1, 706-2, 706-3, 706-4, and 706-5 is as described with reference to FIG. 7, and thus a description thereof is omitted.

Base station 700 transmits transmission beams 1901-1, 1901-2, 1902-1, and 1902-2, in addition to transmission beams 702-1, 702-2, 702-3, 703-1, 703-2, and 703-3.

Transmission beam 1901-1 is a transmission beam for transmitting data of stream 3. Transmission beam 1901-2 is also a transmission beam for transmitting data of stream 3.

Transmission beam 1902-1 is a transmission beam for transmitting data of stream 4. Transmission beam 1902-2 is also a transmission beam for transmitting data of stream 4.

Reference numerals 704-1, 704-2, 704-3, 704-4, 704-5, 1903-1, 1903-2, and 1903-3 denote terminals, and each have a configuration as illustrated in FIGS. 4 and 5, for example. Note that operation of terminals 704-1, 704-2, 704-3, 704-4, and 704-5 is as described with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 1901-2 for transmitting data of stream 3, and receiving directivity 1905-1 allows terminal 1903-1 to receive and demodulate transmission beam 1902-2 for transmitting data of stream 4.

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 1902-1 for transmitting data of stream 4, and receiving directivity 1905-2 allows terminal 1903-2 to receive and demodulate transmission beam 1901-2 for transmitting data of stream 3.

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 1901-1 for transmitting data of stream 3, and receiving directivity 1905-3 allows terminal 1903-3 to receive and demodulate transmission beam 1902-1 for transmitting data of stream 4.

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 703-1 for transmitting data of stream 2, and receiving directivity 1905-4 allows terminal 1903-4 to receive and demodulate transmission beam 1901-1 for transmitting data of stream 3.

In FIG. 19, a distinguishing point is that the base station transmits a plurality of streams each including data for multicasting, and also transmits each stream using a plurality of transmission beams, and each terminal selectively receives one or more transmission beams for one more streams among a plurality of streams.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Base station 700 transmits transmission beam 1901-1 for transmitting data of stream 3 and transmission beam 1902-1 for transmitting data of stream 4, using the same frequency (the same frequency band) at the same time. Base station 700 transmits transmission beam 1901-2 for transmitting data of stream 3 and transmission beam 1902-2 for transmitting data of stream 4, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 1901-1 and 1901-2 for transmitting data of stream 3 may be beams having the same frequency (the same frequency band), or may be beams having different frequencies (different frequency bands). Transmission beams 1902-1 and 1902-2 for transmitting data of stream 4 may be beams having the same frequency (the same frequency band), or may be beams having different frequencies (different frequency bands).

Then, data symbols for stream 1 and data symbols for stream 2 may be generated from #1 information 101-1 in FIG. 1, and data symbols for stream 3 and data symbols for stream 4 may be generated from #2 information 101-2. Note that error correction coding may be performed on each of #1 information 101-1 and #2 information 101-2, and thereafter data symbols may be generated therefrom.

Data symbols for stream 1 may be generated from #1 information 101-1 in FIG. 1, data symbols for stream 2 may be generated from #2 information 101-2 in FIG. 1, data symbols for stream 3 may be generated from #3 information 101-3 in FIG. 1, and data symbols for stream 4 may be generated from #4 information 101-4 in FIG. 1. Note that error correction coding may be performed on each of #1 information 101-1, #2 information 101-2, #3 information 101-3, and #4 information 101-4, and thereafter data symbols may be generated therefrom.

Specifically, data symbols for streams may be generated from any of the information in FIG. 1. This yields advantageous effect that a terminal can selectively obtain a stream for multicasting.

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission as illustrated in FIG. 19, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 19, information indicating that "the number of transmission streams is 4" is input to setting unit 158 according to setting signal 160.

Setting signal 160 may include information with regard to "how many transmission beams are to be used to transmit each stream". If the base station performs transmission as illustrated in FIG. 19, information indicating that "the number of transmission beams for transmitting stream 1 is 3, the number of transmission beams for transmitting stream 2 is 3, the number of transmission beams for transmitting stream 3 is 2, and the number of transmission beams for transmitting stream 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", and information with regard to "how many transmission beams are to be used to transmit each stream". Accordingly, a terminal can appropriately receive data.

The following describes the case where the base station transmits a plurality of data by multicasting, as a variation of Embodiment 1.

Figure 20:
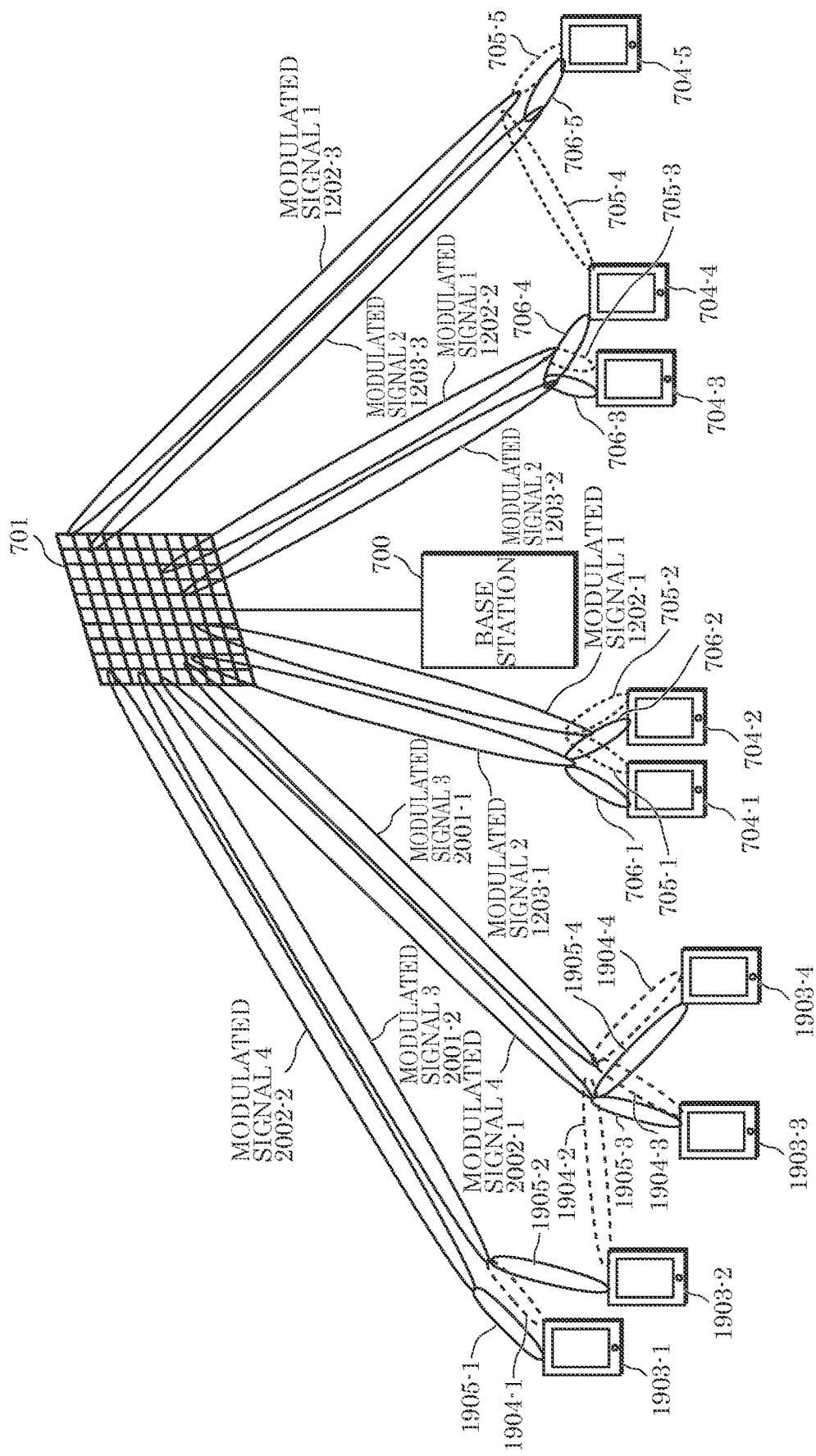
FIG. 20 is a diagram illustrating an example of a state of communication between the base station and terminals.

FIG. 20 illustrates an example of a state of communication between the base station (or an access point, for instance) and terminals, and elements which operate in the same manner as those in FIGS. 7, 12, and 19 are assigned the same reference numerals in FIG. 20, so that a detailed description thereof is omitted.

Base station 700 includes a plurality of antennas, and transmits a plurality of transmission signals from antenna 701 for transmission. At this time, base station 700 has a configurations illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2 and 1203-3 overlaps a description given with reference to FIG. 12, and thus a description thereof is omitted.

A description of terminals 704-1, 704-2, 704-3, 704-4, and 704-5, and receiving directivity 705-1, 705-2, 705-3, 705-4, 705-5, 706-1, 706-2, 706-3, 706-4, and 706-5 overlaps a description given with reference to FIG. 12, and thus a description thereof is omitted.

Base station 700 transmits transmission beams 2001-1, 2001-2, 2002-1 and 2002-2, in addition to transmission beams 1202-1, 1202-2, 1202-3, 1203-1, 1203-2, and 1203-3.

Transmission beam 2001-1 is a transmission beam for transmitting "modulated signal 3". Transmission beam 2001-2 is also a transmission beam for transmitting "modulated signal 3".

Transmission beam 2002-1 is a transmission beam for transmitting "modulated signal 4". Transmission beam 2002-2 is also a transmission beam for transmitting "modulated signal 4".

Terminals 704-1, 704-2, 704-3, 704-4, 704-5, 1903-1, 1903-2, and 1903-3 have the same configuration as those illustrated in FIGS. 4 and 5, for example. Note that operation of terminals 704-1, 704-2, 704-3, 704-4, and 704-5 is the same as a description given with reference to FIG. 7.

Terminal 1903-1 performs directivity control for receiving, via "signal processor 405" and/or "antennas 401-1 to 401-N" and/or "multipliers (303-1 to 603-L and processor 605", and forms receiving directivity 1904-1 and receiving directivity 1905-1. Receiving directivity 1904-1 allows terminal 1903-1 to receive and demodulate transmission beam 2001-2 for transmitting "modulated signal 3", and receiving directivity 1905-1 allows terminal 1903-1 to receive and demodulate transmission bean 2002-2 for transmitting "modulated signal 4".

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 2002-1 for transmitting "modulated signal 4", and receiving directivity 1905-2 allows terminal 1903-2 to receive and demodulate transmission beam 2001-2 for transmitting "modulated signal 3". Terminal 1903-3 performs directivity control for receiving, via "signal processor 405" and/or "antennas 401-1 to 401-N" and/or "multipliers 603-1 to 603-1, and processor 605", and forms receiving directivity 1904-3 and receiving directivity 1905-3. Receiving directivity 1904-3 allows terminal 1903-3 to receive and demodulate transmission beam 2001-1 for transmitting "modulated signal 3", and receiving directivity 1905-3 allows terminal 1903-3 to receive and demodulate transmission beam 2002-1 for transmitting "modulated signal 4".

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 2001-1 for transmitting "modulated signal 3", and receiving directivity 1905-4 allows terminal 1903-4 to receive and demodulate transmission beam 2002-1 for transmitting "modulated signal 4".

In FIG. 20, the base station transmits a plurality of modulated signals each including data for multicasting, and transmits each modulated signal using a plurality of transmission beams. Each terminal selectively receives one or more transmission beams used to transmit one or more streams among the plurality of modulated signals.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Base station 700 transmits transmission beam 2001-1 for transmitting "modulated signal 3" and transmission beam 2002-1 for transmitting "modulated signal 4", using the same frequency (the same frequency band) at the same time. Then, base station 700 transmits transmission beam 2001-2 for transmitting "modulated signal 3" and transmission beam 2002-2 for transmitting "modulated signal 4", using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands).

Transmission beams 703-1, 703-2, and 703-3 for transmitting data of stream 2 may be beams having the same frequency (the same frequency band), or may be beams having different frequencies (different frequency bands).

Transmission beams 2001-1 and 2001-2 for transmitting "modulated signal 3" may be beams having the same frequency (the same frequency band) or may be beams having different frequencies (different frequency bands). Transmission beams 2002-1 and 2002-2 for transmitting "modulated signal 4" may be beams having the same frequency (the same frequency band) or may be beams having different frequencies (different frequency bands).

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission illustrated in FIG. 19, information indicating "to perform transmission for multicasting" is input to setting unit 158 according to setting signal 160.

Setting signal 160 includes information with regard to "the number of transmission modulated signals when multicasting is performed.", and if the base station performs transmission illustrated in FIG. 20, information indicating "the number of transmission modulated signals is 4" is input to setting unit 158 according to setting signal 160.

Setting signal 160 may include information with regard to "how many transmission beams are to be used to transmit each modulated signal". When the base station performs transmission illustrated in FIG. 20, information indicating that "the number of transmission beams for transmitting modulated signal 1 is 3, the number of transmission beams for transmitting modulated signal 2 is 3, the number of transmission beams for transmitting modulated signal 3 is 2, and the number of transmission beams for transmitting modulated signal 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data.

Note that in FIG. 20, if a terminal receives both a transmission beam for "modulated signal 1", and a transmission beam for "modulated signal 2", the terminal can obtain data of stream 1 and data of stream 2 with high receiving quality.

Similarly, if a terminal receives both a transmission beam for "modulated signal 3", and a transmission beam for "modulated signal 4", the terminal can obtain data of stream 3 and data of stream 4 with high receiving quality.

FIG. 20 illustrates an example in which the base station transmits "modulated signal 1", "modulated signal 2", "modulated signal 3", and "modulated signal 4", yet the base station may transmit "modulated signal 5" and "modulated signal 6" for transmitting data of stream 5 and data of stream 6, respectively, and may transmit more modulated signals in order to transmit more streams. Note that the base station transmits each of the modulated signals using one or more transmission beams.

Furthermore, as described with reference to FIGS. 17 and 18, one or more transmission beams for unicasting (or receiving directivity control) may be present.

Figure 21:
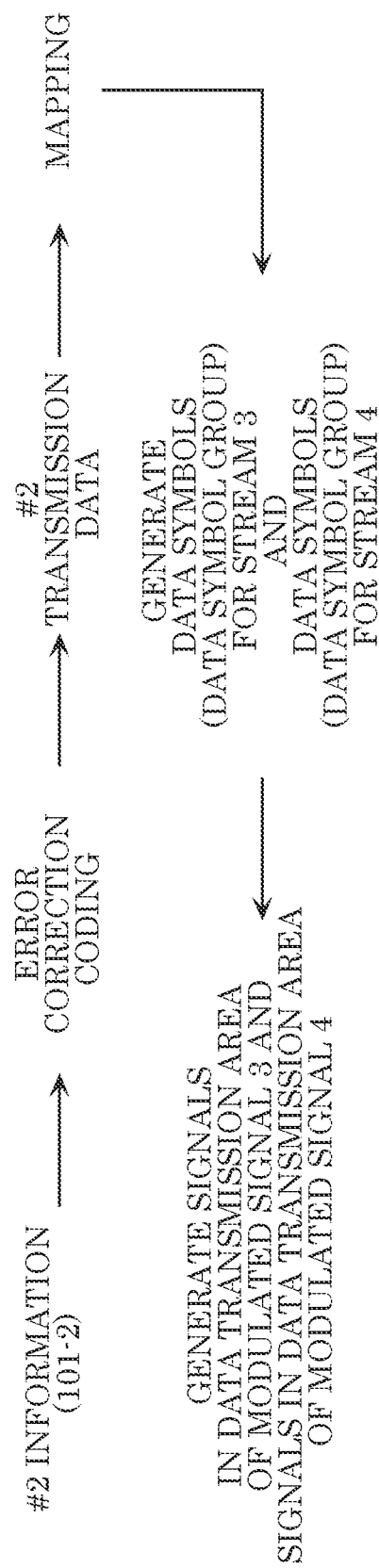
FIG. 21 is a diagram illustrating a relation of a plurality of modulated signals.

A description of a relation between "modulated signal 1" and "modulated signal 2" overlaps a description with reference to FIG. 13, and thus the description thereof is omitted. Here, a description of a relation between "modulated signal 3" and "modulated signal 4" is given with reference to FIG. 21.

For example, #2 information 101-2 is subjected to processing such as error correction coding, and data obtained as a result of the error correction coding is obtained. The data obtained as a result of the error correction coding is named #2 transmission data. Data symbols are obtained by mapping #2 transmission data. The data symbols are separated into data symbols for stream 3 and data symbols for stream 4, so that data symbols (data symbol group) for stream 3 and data symbols (data symbol group) for stream 4 are obtained. At this time, a data symbol having symbol number i for stream 3 is s3(i), and a data symbol having symbol number i for stream 4 is s4(i). Then, "modulated signal 3" tx3(i) having symbol number i is expressed as follows, for example.

[Math. 5]

$$tx3(i)=e(i){\times}s3(i)+f(i){\times}s4(i) \qquad \text{Expression (5)}$$

Then, "modulated signal 4" tx4(i) having symbol number i is expressed as follows, for example.

[Math. 6]

$$tx4(i)=g(i){\times}s3(i)+h(i){\times}s4(i) \qquad \text{Expression (6)}$$

Note that e(i), f(i), g(i), and h(i) in Expressions (5) and (6) can be defined by complex numbers, and thus may be real numbers.

Although e(i), f(i), g(i), and h(i) are indicated, e(i), f(i), g(i), and h(i) may not be functions of symbol number i and may be fixed values.

Then, the base station in FIG. 1 or 3 transmits "a symbol group for modulated signal 3" which includes "signals in a data transmission area of modulated signal 3" which are constituted by data symbols. Then, the base station in FIG. 1 or 3 transmits "a symbol group for modulated signal 4" which includes "signals in a data transmission area of modulated signal 4" which are constituted by data symbols.

Supplementary Note

As a matter of course, the present disclosure may be carried out by combining a plurality of the exemplary embodiments and other contents described herein.

Moreover, each exemplary embodiment and the other contents are only examples. For example, while a "modulating method, an error correction coding method (an error correction code, a code length, a coding rate and the like to be used), control information and the like" are exemplified, it is possible to carry out the present disclosure with the same configuration even when other types of a "modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, amplitude phase shift keying (APSK), pulse amplitude modulation (PAM), phase shift keying (PSK), and quadrature amplitude modulation ((IAN) may be applied, or in each modulating method, uniform mapping or non-uniform mapping may be performed. APSK includes 16APSK, G4APSK, 128APSK, 256APSK, 1024APSK, and 4096APSK, for example. PAM includes 4PAM, 8PAM, 16PAM, 64PAM, 128PAM, 25GPAM, 1024PAM, and 409GPANAM, for example. PSK includes BPSK, QPSK, BPSK, 16PSK, 64PSK, 128PSK, 256PSK, 1024PSK, and 4096PSK, for example. QAM includes 4QAM, 8QAM, 16QAM, 64QAM, 128QAM, 256QAM, 1024QAM, and 4096QAM, for example.

A method for arranging signal points, such as 2 signal points, 4 signal points, 8 signal points, 16 signal points, 64 signal points, 128 signal points, 256 signal points, and 1024 signal points on an I-Q plane (a modulating method having 2 signal points, 4 signal points, 8 signal points, 16 signal points, 64 signal points, 128 signal points, 256 signal points, and 1024 signal points, for instance) is not limited to a signal point arranging method according to the modulating methods described herein.

The "base station" described herein may be a broadcast station, a base station, an access point, a terminal, or a mobile phone, for example. Then, the "terminal" described herein may be a television, a radio, a terminal, a personal computer, a mobile phone, an access point, or a base station, for instance. The "base station" and the "terminal" in the present disclosure may be devices having a communication function, and such devices may be configured to be connected with devices for running applications such as a television, a radio, a personal computer, and a mobile phone, via a certain interface. Furthermore, in the present embodiment, symbols other than data symbols, such as, for example, a pilot symbol and a symbol for control information may be arranged in any manner in frames.

Then, any names may be given to a pilot symbol and a symbol for control information, and such symbols may be, for example, known symbols modulated using PSK modulation in a transmitting device or a receiving device. Alternatively, the receiving device may be able to learn a symbol transmitted by the transmitting device by establishing synchronization. The receiving device performs, using the symbol, frequency synchronization, time synchronization, channel estimation of each modulated signal (estimation of channel state information (CST)), and signal detection, for instance. Note that a pilot symbol may be referred to as a preamble, a unique word, a postamble, or a reference symbol, for instance.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to each exemplary embodiment, and can be carried out with various modifications. For example, the case where the present disclosure is performed as a communication device is described in each exemplary embodiment. However, the present disclosure is not limited to this case, and this communication method can also be used as software.

Note that a program for executing the above-described communication method may be stored in a ROM (Read Only Memory) in advance, and a CPU (Central Processing Unit) may be caused to operate this program.

Moreover, the program for executing the above-described communication method may be stored in a computer-readable storage medium, the program stored in the recording medium may be recorded in a RAM (Random Access Memory) of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Embodiment 3

The present embodiment describes a multicast communication method when beamforming different from the beamforming in Embodiments 1 and 2 is applied.

The configuration of the base station is as described with reference to FIGS. 1 to 3 in Embodiment 1, and thus a description of portions which operate in the same manner as those in Embodiment 1 is omitted. Also, the configuration of a terminal which communicates with a base station is as described with reference to FIGS. 4 to 6 in Embodiment 1, and thus a description of portions which operate in the same manner as those in Embodiment 1 is omitted.

The following describes an example of operation of a base station and a terminal in the present embodiment.

Figure 22:
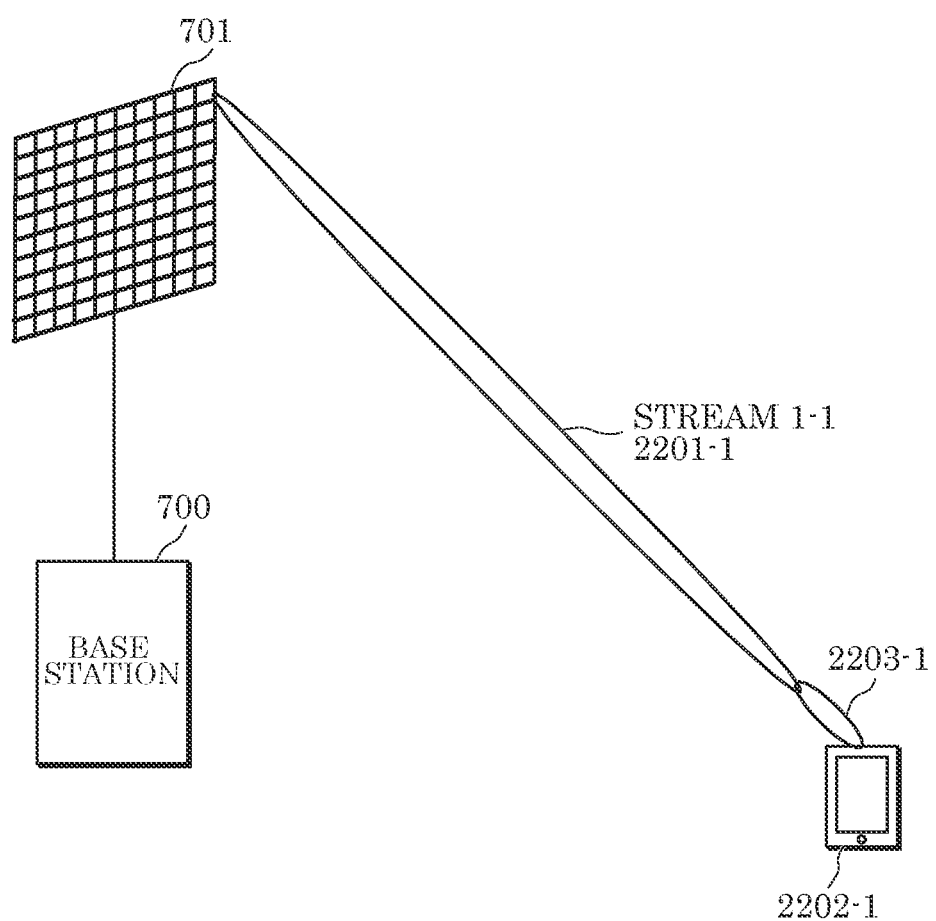
FIG. 22 is a diagram illustrating an example of a state of communication between the base station and a terminal.

FIG. 22 illustrates the case where the base station transmits a transmission stream for multicasting to one terminal.

FIG. 22, base station 700 transmits transmission beam 2201-1 for "stream 1-1 (a first beam for stream 1) (for multicasting)" from an antenna for transmission to terminal 2202-1, and terminal 2202-1 performs directivity control to generate receiving directivity 2203-1, and receives transmission beam 2201-1 for "stream 1-1".

Figure 23:
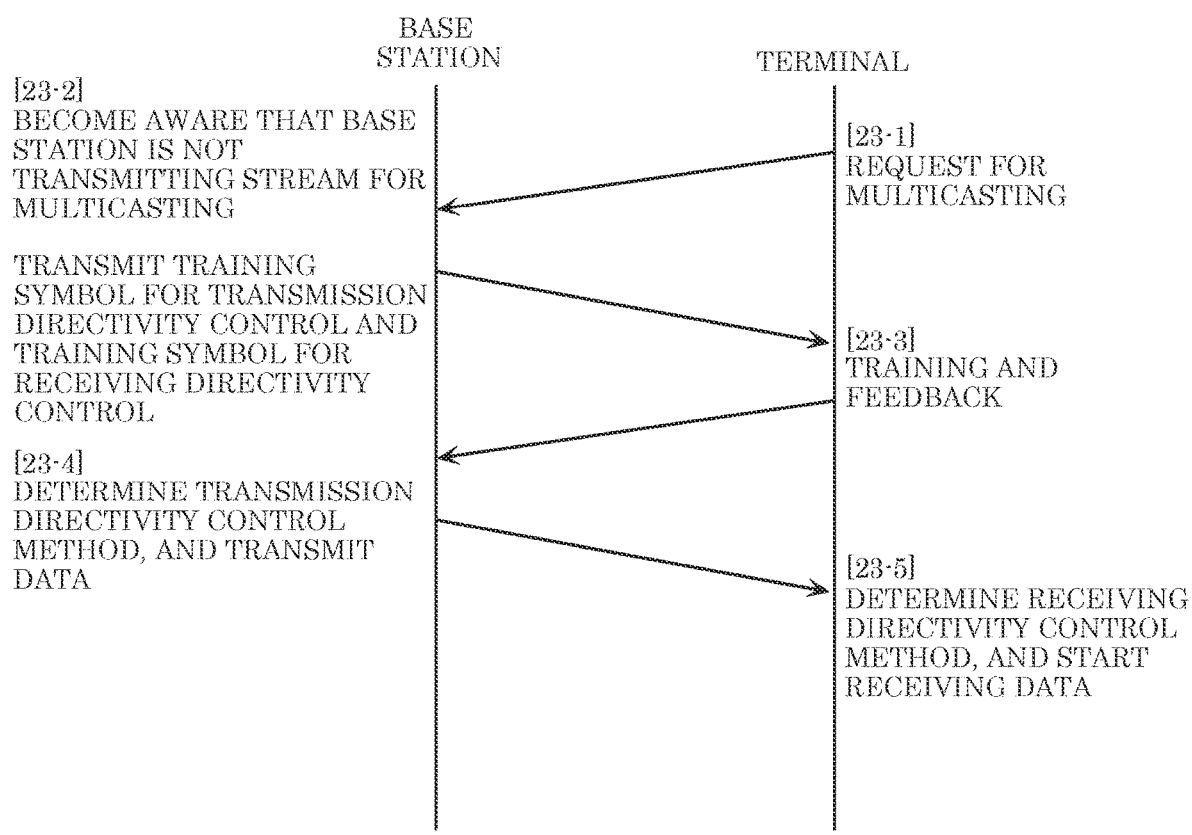
FIG. 23 is a diagram illustrating a procedure of performing communication between the base station and a terminal.

FIG. 23 is for describing a "procedure for performing communication between a base station and a terminal" to achieve the state of communication between the base station and the terminal as illustrated in FIG. 22.

[23-1] First, the terminal transmits a "request to transmit stream 1 by multicasting" to a base station.

[23-2] Upon receiving [23-1], the base station becomes aware that the base station "is not transmitting stream 1 by multicasting". Then, the base station transmits, to the terminal, a training symbol for transmission directivity control, and a training symbol for receiving directivity control, in order to transmit stream 1 by multicasting.

[23-3] The terminal receives the training symbol for transmission directivity control and the training symbol for receiving directivity control transmitted by the base station, and transmits feedback information to the base station in order that the base station performs transmission directivity control and the terminal performs receiving directivity control.

[23-4] The base station determines a method for transmission directivity control (determines, for instance, a weighting factor to be used for directivity control), based on the feedback information transmitted by the terminal, performs transmission directivity control, and transmits data symbols for stream 1.

[23-5] The terminal determines a receiving directivity control method. (determines, for instance, a weighting factor to be used for directivity control), and starts receiving the data symbols for stream 1 transmitted by the base station.

Note that the "procedure for a base station and a terminal to communicate" in FIG. 23 is an example, and the order of transmitting information items is not limited to the order in FIG. 23, and communication between the base station and the terminal can be similarly established even if the order of transmitting information items has changed. FIG. 23 illustrates, as an example, the case in which the terminal performs receiving directivity control, yet the terminal may not perform receiving directivity control. In such a case, the base station may not transmit a training symbol for receiving directivity control and the terminal does not determine a receiving directivity control method, in FIG. 23.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "1" in FIG. 22, yet the present disclosure is not limited to this.

When the terminal performs receiving directivity control, if the terminal has a configuration in FIG. 4, for example, multiplication coefficients for multipliers 503-1, 503-2, 503-3, and 503-4 in FIG. 5 are determined, whereas when the terminal has the configuration in FIG. 6, multiplication coefficients for multipliers 603-1, 603-2, . . . , and 603-L, for example, are determined.

Figure 24:
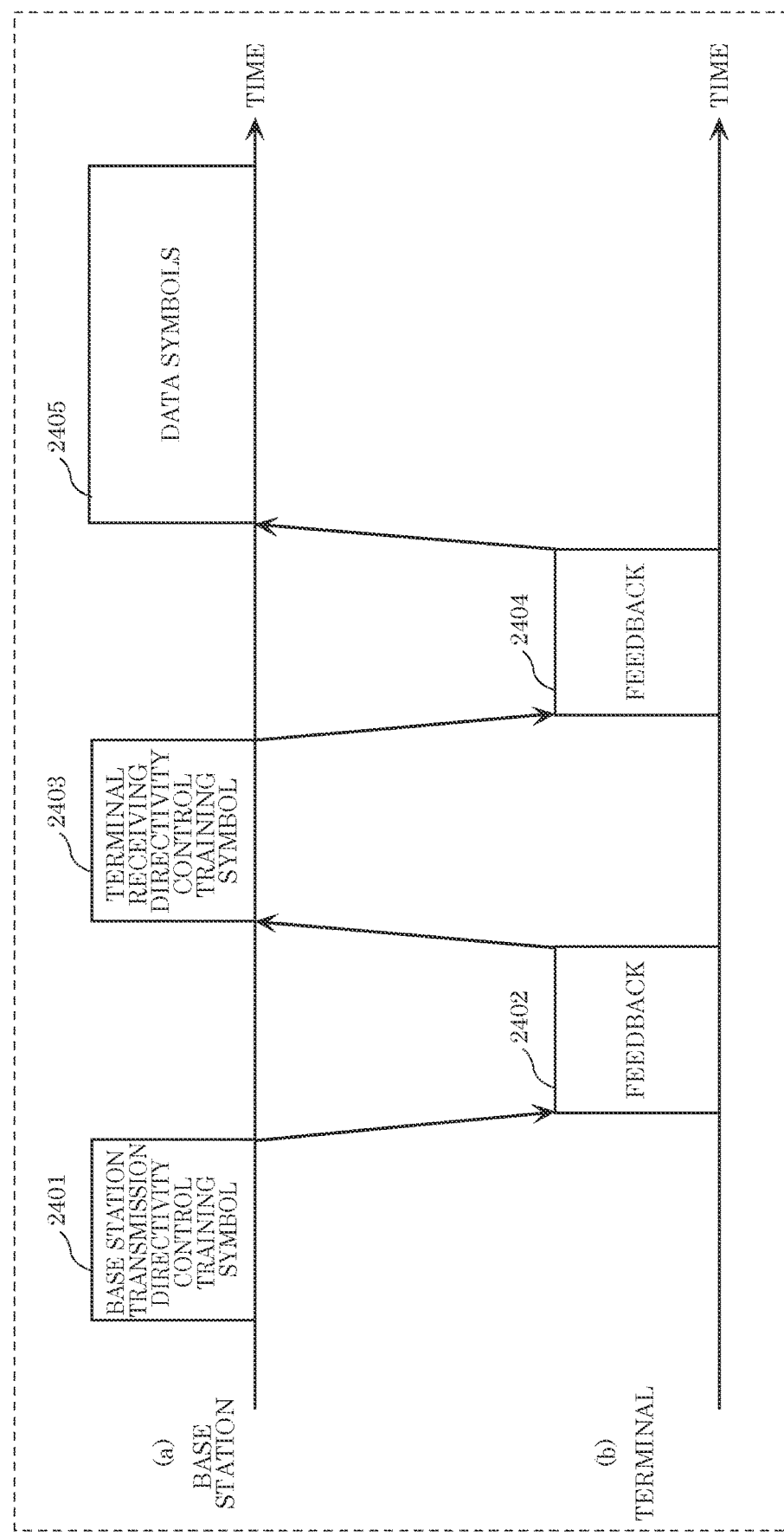
FIG. 24 is a diagram illustrating examples of symbols which the base station and a terminal transmit.

FIG. 24 is a diagram illustrating examples of symbols which the base station transmits and symbols which a terminal transmits along a time-axis, when the base station in FIG. 23 transmits a symbol for transmission directivity control, a symbol for receiving directivity control, and data symbols. In FIG. 24, (a) is a diagram illustrating examples of symbols which the base station transmits, along the time-axis, and (b) is a diagram illustrating examples of symbols which the terminal transmits along the time-axis, while the horizontal axis indicates time in both of (a) and (b).

When the base station and the terminal communicate with each other as illustrated in FIG. 23, first, the base station transmits "base station transmission directivity control training symbol" 2401 as illustrated in FIG. 24. For example, "base station transmission directivity control training symbol" 2401 includes a control information symbol and a known PSK symbol.

Then, the terminal receives "base station transmission directivity control training symbol" 2401 transmitted by the base station, and transmits, as feedback information symbol 2402, information on an antenna to be used by the base station for transmission and information on multiplication coefficients (or weighting factors) to be used for directivity control, for example.

The base station receives "feedback information symbol" 2402 transmitted by the terminal, determines an antenna to be used for transmission from feedback information symbol 2402, and determines a coefficient to be used for transmission directivity control from feedback information symbol 2402. After that, the base station transmits "terminal receiving directivity control training symbol" 2403. For example, "terminal receiving directivity control training symbol" 2403 includes a control information symbol and a known PSK symbol.

Then, the terminal receives "terminal receiving directivity control training symbol" 2403 transmitted by the base station, and determines an antenna which the terminal is to use for receiving and a multiplication coefficient which the terminal is to use for receiving directivity control, for example. Then, the terminal transmits feedback information symbol 2404, notifying that preparation for receiving data symbols is completed.

Then, the base station receives "feedback information symbol" 2404 transmitted by the terminal, and outputs data symbols 2405 based on feedback information symbol 2404.

Note that communication between the base station and the terminal in FIG. 24 is an example, and the order of transmitting symbols and the order in which the base station and the terminal transmit symbols are not limited to those illustrated therein. "Base station transmission directivity control training symbol" 2401, "feedback information symbol" 2402, "terminal receiving directivity control training symbol" 2403, "feedback information symbol" 2404, and "data symbols" 2405 may each include: a preamble for signal detection, time synchronization, frequency synchronization, frequency offset estimation, and channel estimation, a reference symbol, a pilot symbol, and a symbol for transmitting control information, for instance.

Figure 25:
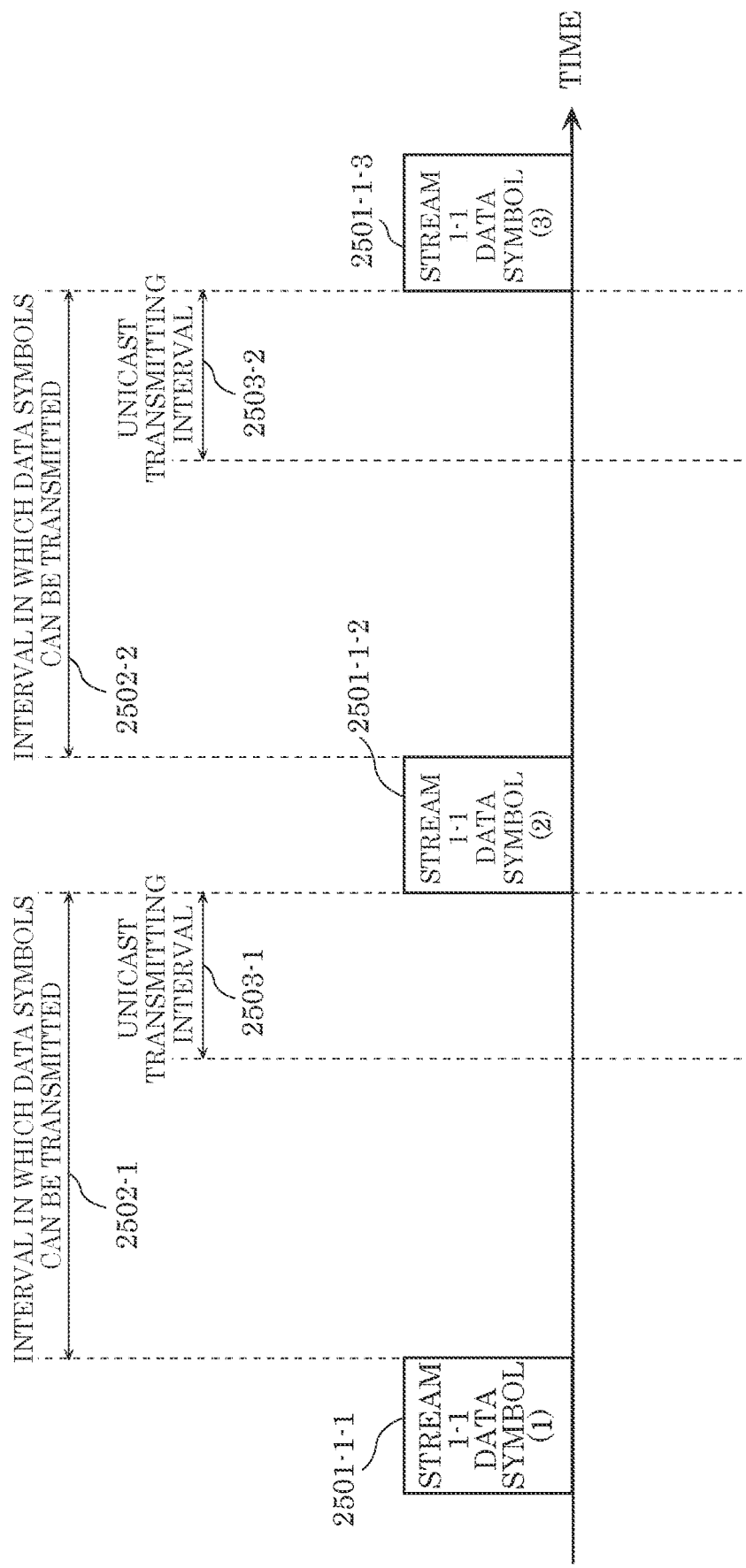
FIG. 25 is a diagram illustrating examples of symbols which the base station transmits.

FIG. 25 illustrates examples of symbols which the base station transmits when the base station transmits data symbols for stream 1 after communication between the base station and the terminal in FIG. 23 is completed, while the horizontal axis indicates time.

In FIG. 25, the base station transmits a first data symbol for transmission beam 1 for stream 1 as "stream 1-1 data symbol (1) (for multicasting)" 2501-1-1. After that, interval 2502-1 in which data symbols can be transmitted is arranged.

After that, the base station transmits a second data symbol for transmission beam 1 for stream 1 (for multicasting) as "stream 1-1 data symbol (2) (for multicasting)" 2501-1-2. After that, interval 2502-2 in which data symbols can be transmitted is arranged.

After that, the base station transmits a third data symbol for transmission beam 1 for stream 1 (for multicasting) as "stream1-1 data symbol (3) (for multicasting)" 2501-1-3.

Accordingly, the base station transmits data symbols for "stream (for multicasting) 1-1" 2201-1 illustrated in FIG. 22. Note that in FIG. 25, "stream 1-1 data symbol (1) (for multicasting)" 2501-1-1, "stream 1-1 data symbol (2) (for multicasting)" 2501-1-2, "data symbol 1-1 data symbol (3) (for multicasting)" 2501-1-3, and so on may each include, other than a data symbol, a preamble for signal detection, time synchronization, frequency synchronization, frequency offset estimation, and channel estimation, a reference symbol, a pilot symbol, and a symbol for transmitting control information, for instance.

Note that in FIG. 25, interval 2502-1 in which data symbols can be transmitted includes unicast transmitting interval 2503-1, and interval 2502-2 in which data symbols can be transmitted includes unicast transmitting interval 2503-2.

FIG. 25, a frame includes unicast transmitting intervals 2503-1 and 2503-2. For example, in FIG. 25, the base station may transmit symbols for multicasting in an interval within interval 2502-1 in which data symbols can be transmitted and other than unicast transmitting interval 2503-1, and an interval within interval 2502-2 in which data symbols can be transmitted and other than unicast transmitting interval 2503-2. This point will be described later using an example.

Thus, including a unicast transmitting interval in a frame is a useful feature for stably operating a wireless communication system. This point will be later described using an example. Note that the unicast transmitting intervals may not be in the temporal positions as illustrated in FIG. 25, and may be arranged in any temporal positions. Note that in the unicast transmitting intervals, the base station may transmit symbols or the terminal may transmit symbols.

Furthermore, a configuration may be adopted in which the base station can directly set a unicast transmitting interval, or as another method, the base station may set the maximum transmission-data transmission speed for transmitting symbols for multicasting.

For example, when the transmission speed at which the base station can transmit data is 2 Gbps (bps: bits per second) and the maximum transmission speed at which the base station can transmit data that can be assigned to transmit symbols for multicasting is 1.5 Gbps, a unicast transmitting interval corresponding to 500 Mbps can be set.

Accordingly, a configuration may be adopted in which the base station can indirectly set a unicast transmitting interval. Note that another specific example will be described later.

Note that in accordance with the state in FIG. 22, FIG. 25 illustrates a frame configuration in which "stream 1-1 data symbol (1) (for multicasting)" 2501-1-1, "stream 1-1 data symbol (2) (for multicasting)" 2501-1-2, and "stream 1-1 data symbol (3) (for multicasting)" 2501-1-3 are present, yet the present disclosure is not limited to such a frame configuration. For example, a data symbol for a stream for multicasting other than stream 1 (stream 1-1) may be present, a data symbol for stream 1-2 which is a second transmission beam for stream 1, and a data symbol for stream 1-3 which is a third transmission beam for stream 1 may be present. This point will be described later.

Figure 26:
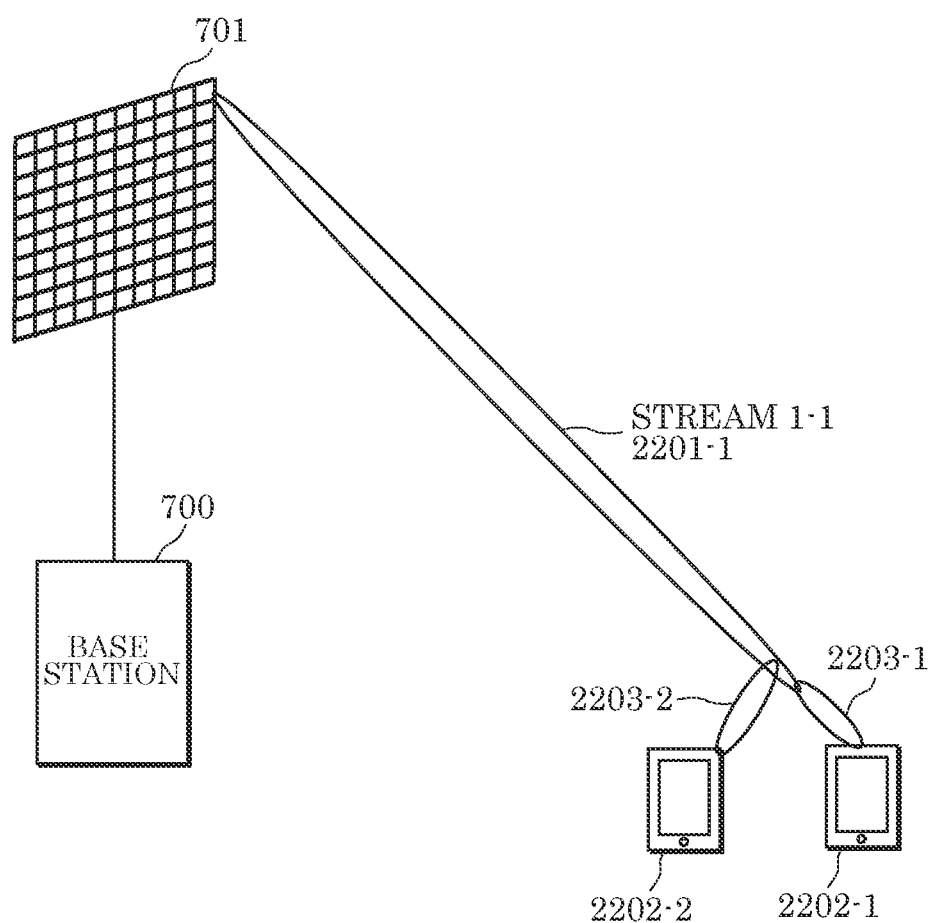
FIG. 26 is a diagram illustrating an example of a state of communication between the base station and terminals.

FIG. 26 illustrates a state when a terminal is newly added to the state in FIG. 22 in which the base station transmits transmission streams for multicasting to one terminal, and elements which operate in the same manner as those in FIG. 22 are assigned the same reference numerals.

In FIG. 26, the terminal newly added is 2202-2. Terminal 2202-2 generates receiving directivity 2203-2 by performing directivity control, and receives transmission beam 2201-1 for "stream 1-1 for multicasting)".

The following describes FIG. 26.

Figure 27:
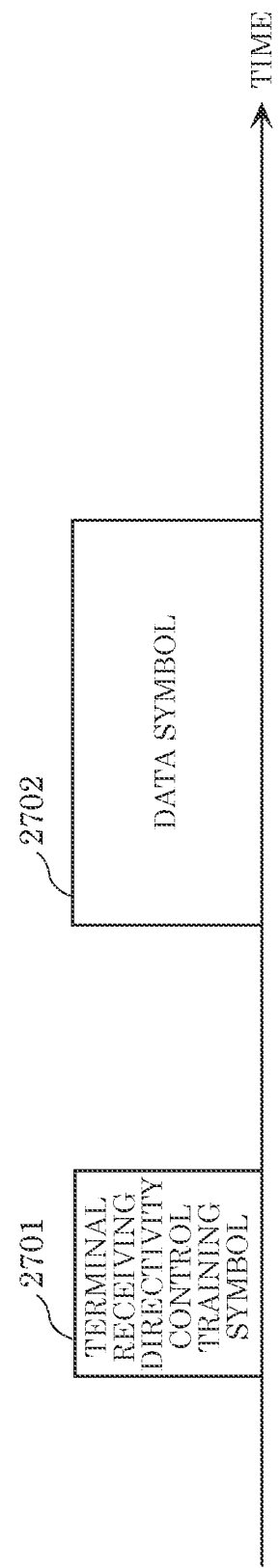
FIG. 27 is a diagram illustrating examples of symbols which the base station transmits.

In the following description, in FIG. 26, terminal 2202-2 newly participates in the multicast communication in a state where base station 700 and terminal 2202-1 are performing multicast communication. Thus, as illustrated in FIG. 27, the base station transmits "terminal receiving directivity control training symbol." 2701 and "data symbol" 2702, and does not transmit "base station transmission training symbol" illustrated in FIG. 24. Note that in FIG. 27, the horizontal axis indicates time.

Figure 28:
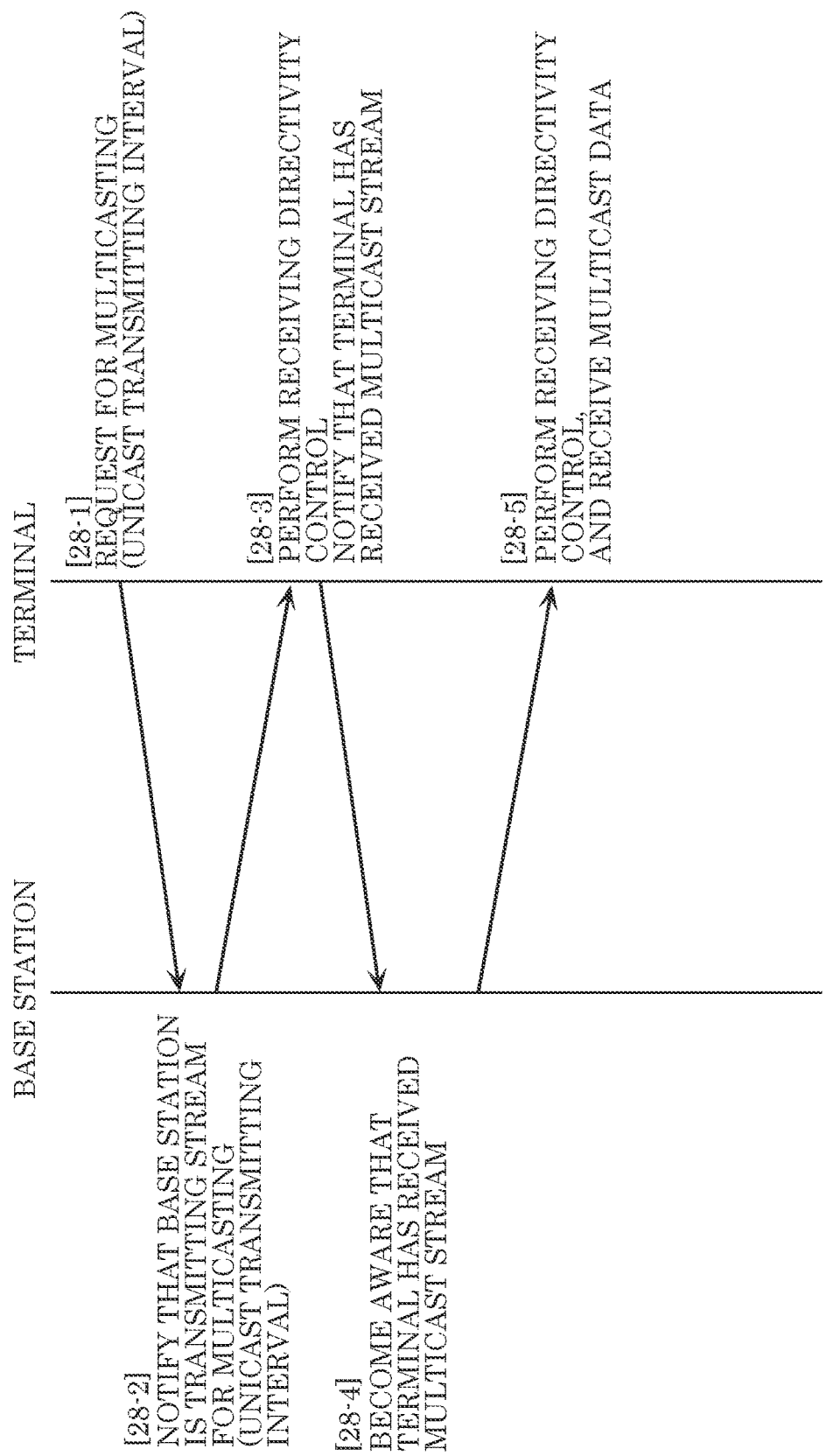
FIG. 28 is a diagram illustrating a procedure of performing communication between the base station and a terminal.

FIG. 28 illustrates an example of operation performed to achieve a state in which the base station transmits transmission beams for multicasting to two terminals as illustrated in FIG. 26.

[28-1] Terminal 2202-2 transmits a "request to transmit stream 1 by multicasting" to the base station. Note that the "request to transmit stream 1 by multicasting" is transmitted in a unicast transmitting interval in FIG. 25.

[28-2] Upon receiving [28-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[28-3] Upon receiving [28-2], terminal 2202-2 performs receiving directivity control, in order to start receiving stream 1 for multicasting. Then, terminal 2202-2 performs receiving directivity control, and notifies the base station that "terminal 2202-2 has successfully received stream 1 for multicasting".

[28-4] Upon receiving [28-3], the base station becomes aware that the terminal has successfully received "stream 1 for multicasting".

[28-5] Terminal 2202-2 performs receiving directivity control, and starts receiving "stream 1 for multicasting".

Figure 29:
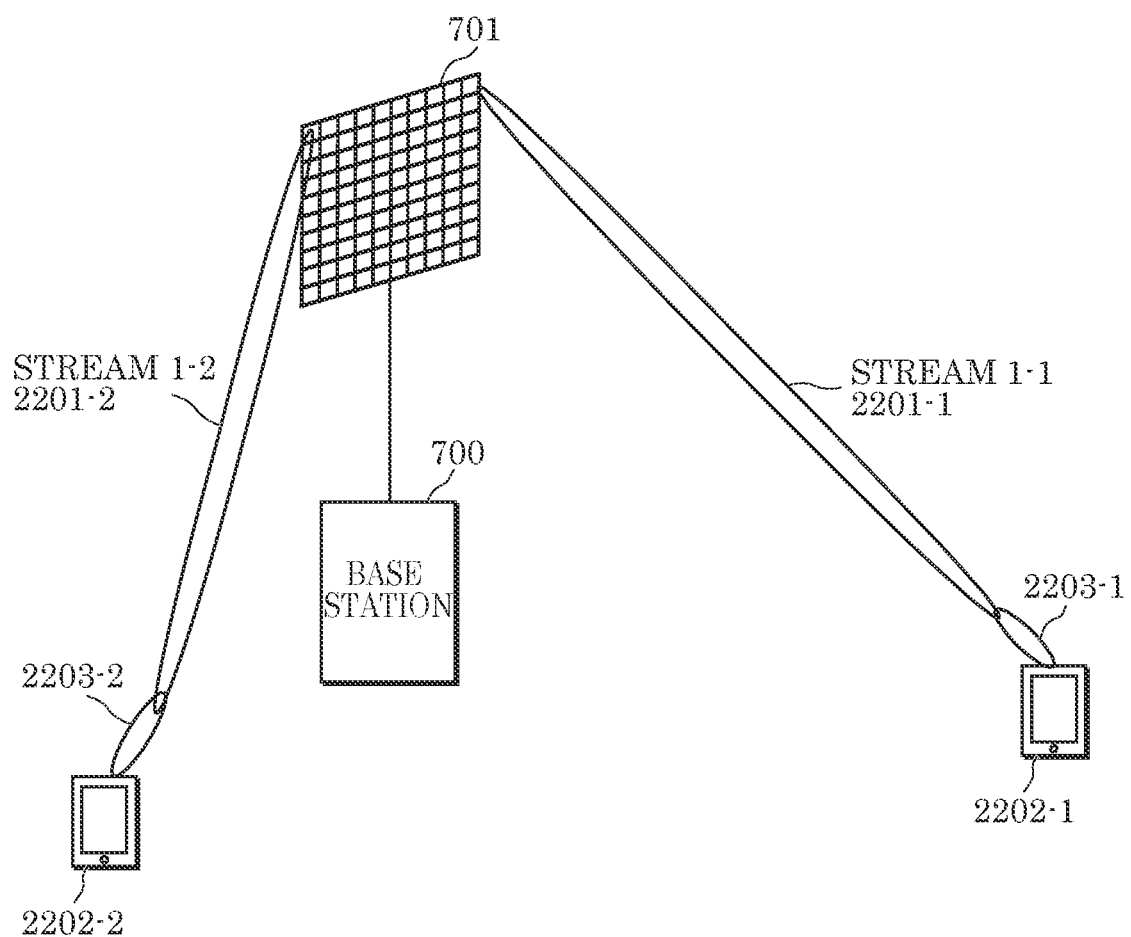
FIG. 29 is a diagram illustrating an example of a state of communication between the base station and terminals.

FIG. 29 illustrates that a terminal is newly added to a state in FIG. 22 in which the base station is transmitting a transmission stream for multicasting to one terminal. Elements which operate in the same manner as those in FIG. 22 are assigned the same reference numerals.

In FIG. 29, the terminal newly added is 2202-2. At this time, different points from FIG. 26 are that base station 700 newly transmits transmission beam 2201-2 for "stream 1-2 (second transmission beam for stream 1) (for multicasting)", and terminal 2202-2 performs directivity control to generate receiving directivity 2203-2, and receives transmission beam 2201-2 for "stream 1-2 (for multicasting)".

The following describes control for achieving the state as in FIG. 29.

In the following description, in FIG. 29, terminal 2202-2 newly participates in multicast communication in a state in which base station 700 and terminal 2202-1 are performing multicast communication.

Figure 30:
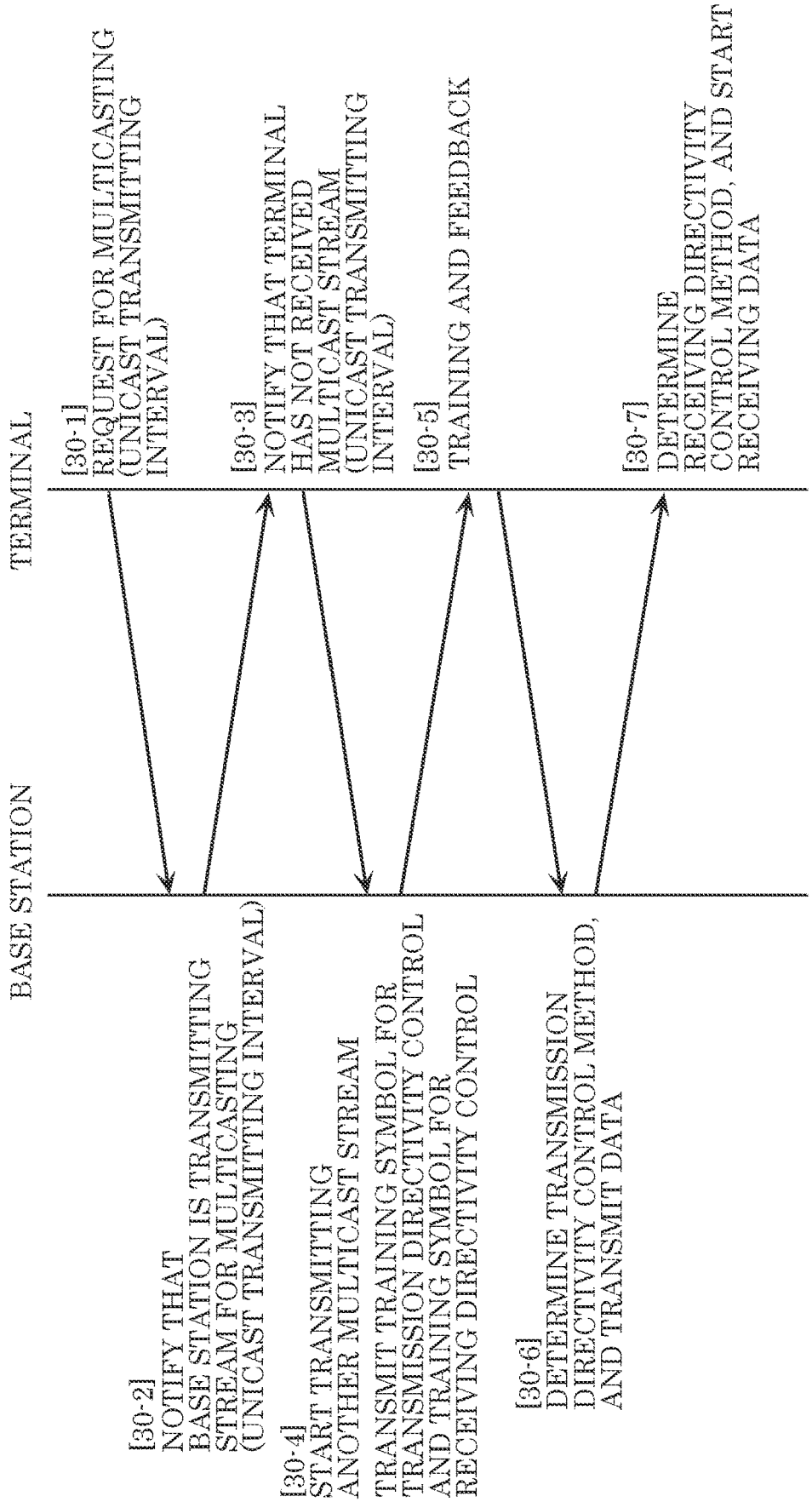
FIG. 30 is a diagram illustrating a procedure of performing communication between the base station and a terminal.

FIG. 30 illustrates an example of operation performed in order to achieve a state in which the base station transmits transmission beams for multicasting to two terminals, as illustrated in FIG. 29.

[30-1] Terminal 2202-2 transmits a "request to transmit stream 1 by multicasting" to the base station. Note that the "request to transmit stream 1 by multicasting" is transmitted in a unicast transmitting interval in FIG. 25.

[30-2] Upon receiving [30-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[30-3] Upon receiving [30-2], terminal 2202-2 notifies the base station that "terminal 2202-2 has not received stream 1 for multicasting". Note that terminal 2202-2 transmits the notification indicating that "stream 1 for multicasting is not received" in a unicast transmitting interval in FIG. 25.

[30-4] Upon receiving [30-3], the base station determines to transmit another transmission beam (specifically, transmission beam 2201-2 in FIG. 29) for stream 1 for multicasting. Note that here, the base station determines to transmit another transmission beam for stream 1 for multicasting, yet the base station may determine not to transmit another transmission beam for stream 1 for multicasting. This point will be later described.

Thus, the base station transmits a training symbol for transmission directivity control and a training symbol for receiving directivity control to terminal 2202-2, in order to transmit stream 1 by multicasting. Note that the base station transmits a transmission beam for stream 1-1 in FIG. 29, separately from transmission of these symbols. This point will be described later.

[30-5] Terminal 2202-2 receives a training symbol for transmission directivity control and a training symbol for receiving directivity control which the base station has transmitted, and transmits feedback information to the base station in order that the base station performs transmission directivity control and terminal 2202-2 performs receiving directivity control.

[30-6] Based on the feedback information transmitted by terminal 2202-2, the base station determines a method for transmission directivity control (determines, for instance, a weighting factor to be used when performing directivity control), and transmits a data symbol for stream 1 (transmission beam 2201-2 for stream 1-2 in FIG. 29).

[30-7] Terminal 2202-2 determines a receiving directivity control method (determines, for instance, a weighting factor to be used when performing directivity control), and starts receiving data symbols for stream 1 (transmission beam 2201-2 for stream 1-2 in FIG. 29) which the base station has transmitted.

Note that the "procedure for a base station and a terminal to communicate" in FIG. 30 is an example, and the order of transmitting information items is not limited to the order in FIG. 30. Thus, communication between the base station and the terminal can be similarly established even if the order of transmitting information items has changed.

FIG. 30 illustrates an example in which the terminal performs receiving directivity control, yet the terminal may not perform receiving directivity control. In such a case, the base station may not transmit a training symbol for receiving directivity control, and the terminal may not determine a receiving directivity control method, in FIG. 30.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "2" in the case of FIG. 29, yet the present disclosure is not limited to this.

Then, when terminals 2202-1 and 2202-2 perform receiving directivity control, if the terminals have a configuration in FIG. 4, for example, multiplication coefficients for multiplier 503-1, 503-2, 503-3, and 503-4 in FIG. 5 are determined, whereas when the terminals have a configuration in FIG. 6, multiplication coefficients for multipliers 603-1, 603-2, . . . , and 603-1, are determined, for example.

Figure 31:
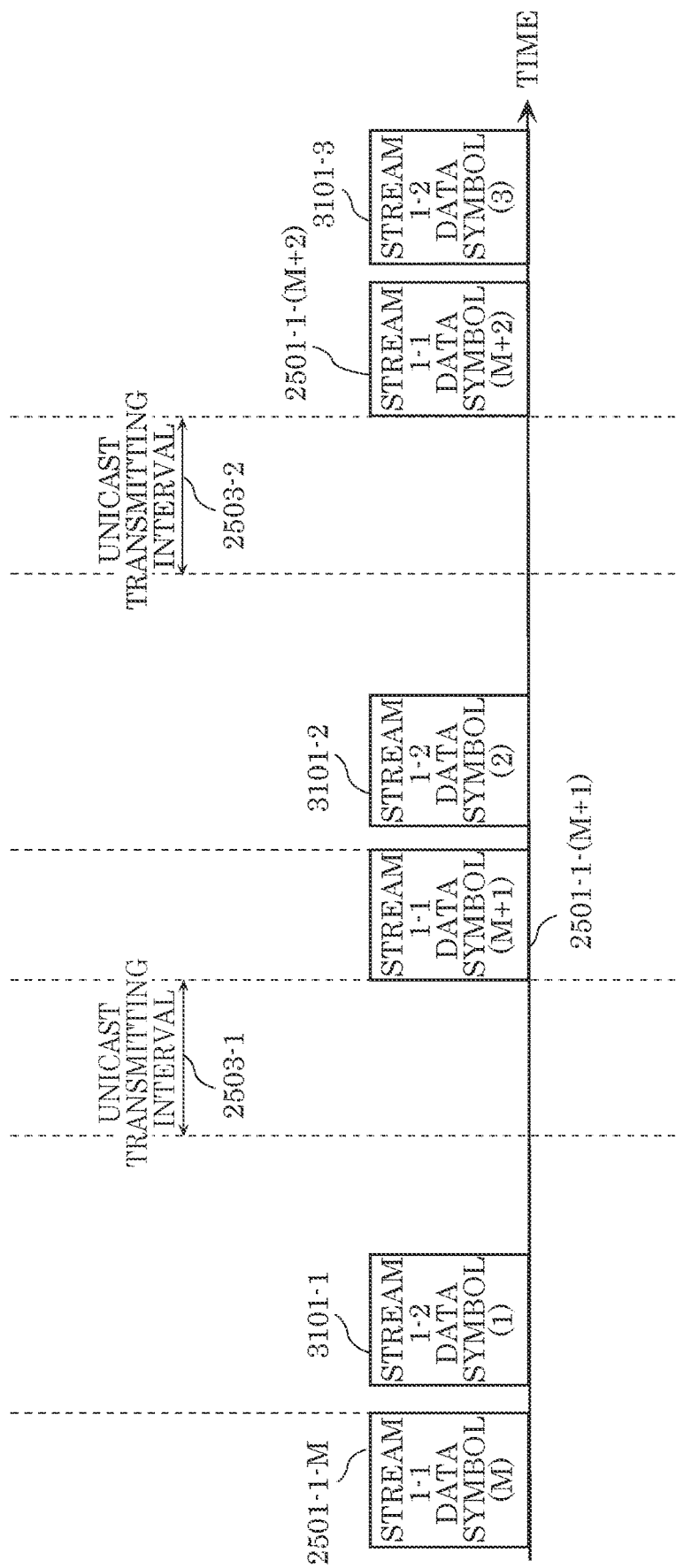
FIG. 31 is a diagram illustrating examples of symbols which the base station transmits.

FIG. 31 illustrates examples of symbols transmitted by the base station when the base station transmits data symbols for stream 1 after communication between the base station and the terminal in FIG. 30 is completed, while the horizontal axis indicates time.

In FIG. 31, "stream 1-1" in FIG. 29 is present, and thus similarly to FIG. 25, "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. Note that "(M), (M+1), (M+2)" are illustrated, and this is because stream 1-1 (for multicasting) is already present before stream 1-2 (for multicasting) is present. Accordingly, in FIG. 31, M is assumed to be an integer of 2 or greater.

Then, as illustrated in FIG. 31, "stream 1-2 data symbol (1) (for multicasting)" 3101-1, "stream 1-2 data symbol (2) (for multicasting)" 3101-2, and "stream 1-2 data symbol (3) (for multicasting)" 3101-3 are present in intervals other than unicast transmitting intervals 2503-1 and 2503-2.

The features are as follows as described above.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2) "stream 1-2 data symbol (1) (for multicasting)" 3101-1, "stream 1-2 data symbol (2) for multicasting)" 3101-2, and "stream 1-2 data symbol (3) (for multicasting)" 3101-3 are all data symbols for transmitting "stream 1".

The terminal can obtain "data of stream 1" by obtaining "data symbols for stream 1-1". The terminal can obtain "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3. Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

The above allows two terminals to receive multicast streams which the base station has transmitted. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

Figure 32:
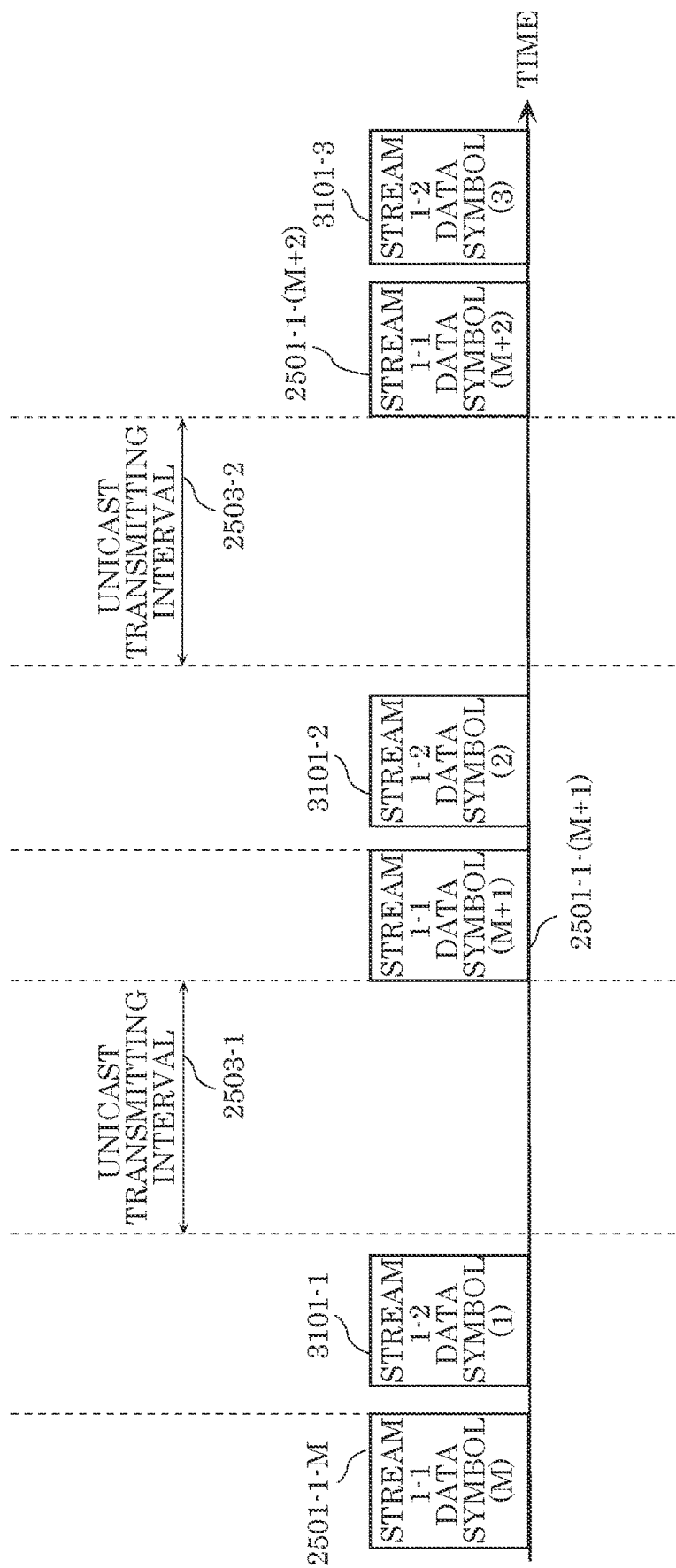
FIG. 32 is a diagram illustrating examples of symbols which the base station transmits.

FIG. 32 illustrates "examples of symbols which the base station transmits when the base station transmits data symbols (for stream 1) after communication between the base station and the terminal in FIG. 30 is completed", which are different from FIG. 31, where the horizontal axis indicates time. Note that elements which operate in the same manner as in FIGS. 25 and 31 are assigned the same reference numerals in FIG. 32.

Different points in FIG. 32 from FIG. 31 are that unicast transmitting intervals 2503-1 and 2503-2 are set to longer time periods, and thus the base station does not further add and transmit symbols for multicasting.

Figure 33:
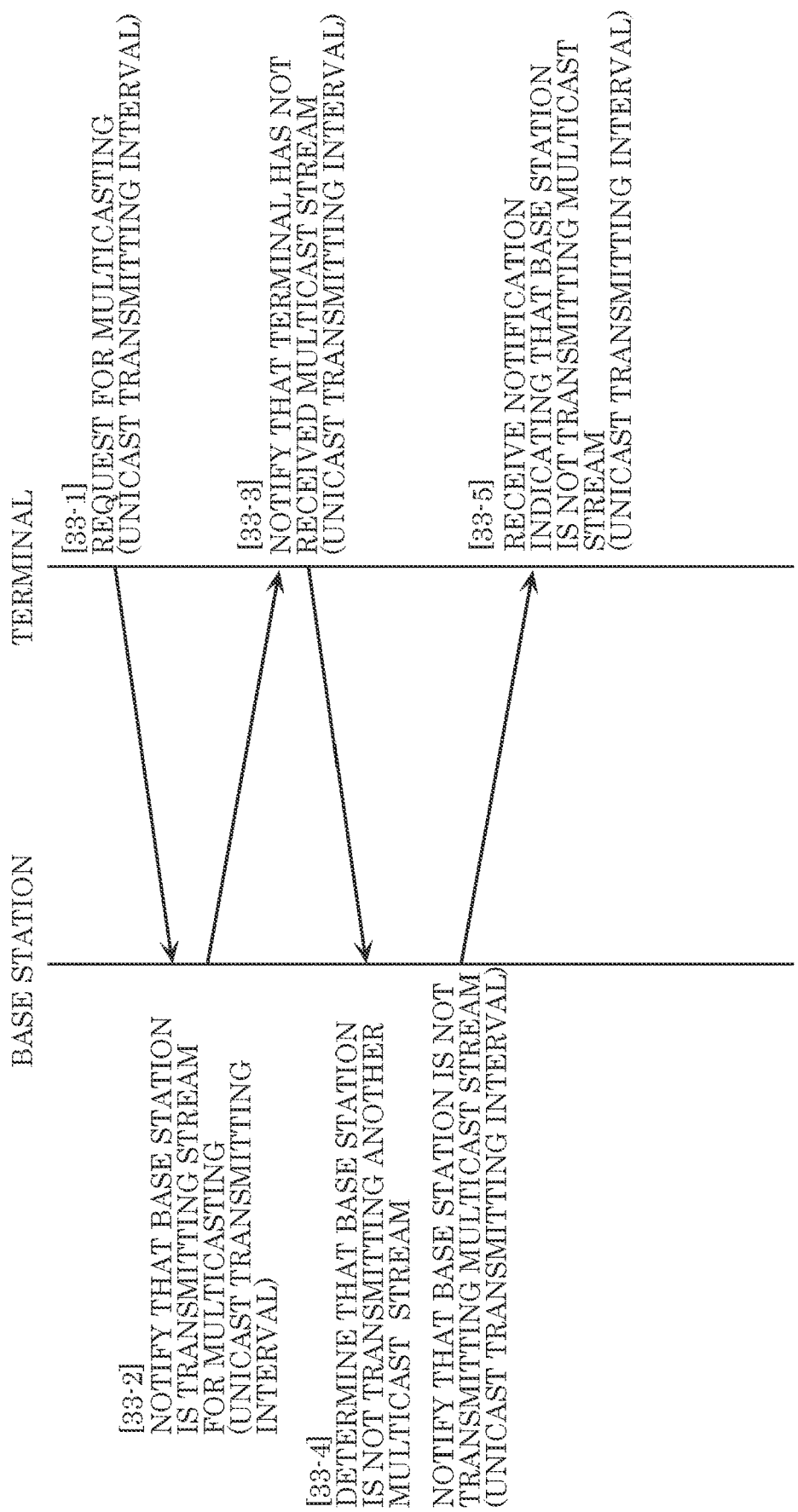
FIG. 33 is a diagram illustrating a procedure of performing communication between the base station and a terminal.

FIG. 33 illustrates an example of operation when new terminal 2202-3 transmits a request to the base station to add a transmission beam, in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[33-1] Terminal 2202-3 transmits to the base station a "request to transmit stream 1 by multicasting". Note that terminal 2202-3 transmits the "request to transmit stream 1 by multicasting" in a unicast transmitting interval in FIG. 32.

[33-2] Upon receiving [33-1], the base station notifies terminal 2202-3 that "the base station is transmitting stream 1 for multicastine". Note that the base station transmits the "notification indicating that the base station is transmitting stream 1 for multicasting" in a unicast transmitting interval in FIG. 32.

[33-3] Upon receiving [33-2], terminal 2202-3 notifies the base station that "terminal 2202-3 has not received stream 1 for multicasting". Note that terminal 2202-3 transmits the "notification indicating that stream 1 for multicasting has not been received" in a unicast transmitting interval in FIG. 32.

[33-4] Upon receiving [33-3], the base station determines whether a transmission beam other than the transmission beam for stream 1-1 and the transmission beam for stream 1-2 can be transmitted as a transmission beam for stream 1 for multicasting. At this time, taking into consideration that the frame is as illustrated in FIG. 32, the base station determines not to transmit another transmission beam for stream 1 for multicasting. Accordingly, the base station notifies terminal 2202-3 that "the base station is not to transmit another transmission beam for stream 1 for multicasting". Note that the base station transmits the "notification indicating that the base station is not to transmit another transmission beam for stream 1 for multicasting" in a unicast transmitting interval in FIG. 32.

[33-5] Terminal 2202-3 receives the "notification indicating that the base station is not to transmit another transmission beam for stream 1 for multicasting".

Note that the "procedure for a base station and a terminal to communicate" in FIG. 33 is an example, and the order of transmitting information items is not limited to the order in FIG. 33, so that communication between the base station and the terminal can be similarly established even if the order of transmitting items has changed. In this manner, if there are insufficient communication resources for multicast transmission, a multicast transmission beam may not be added.

Figure 34:
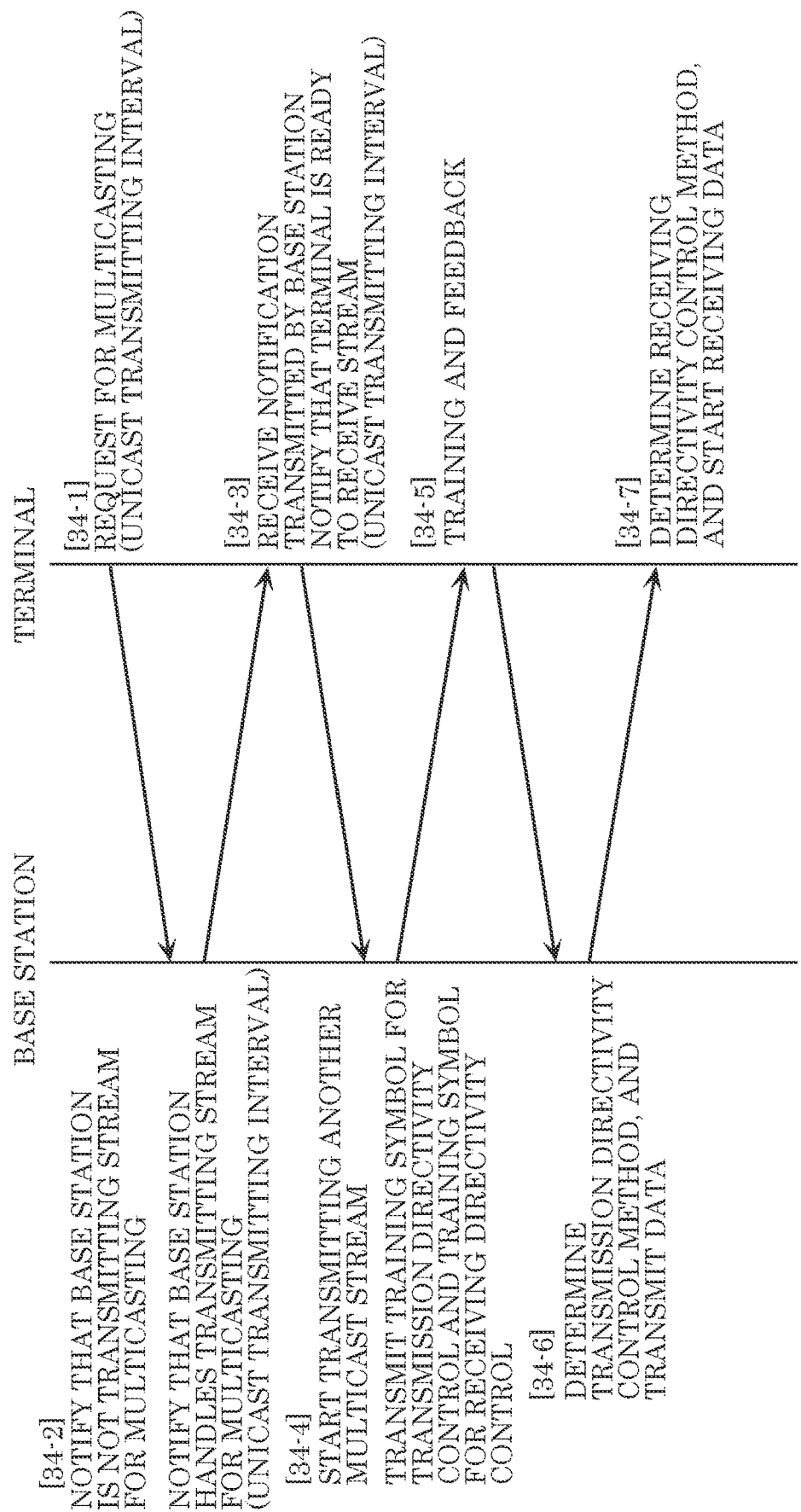
FIG. 34 is a diagram illustrating a procedure of performing communication between the base station and a terminal.

FIG. 34 illustrates an example of operation when new terminal 2202-3 transmits a request to the base station to add a transmission beam for another stream for multicasting (stream 2), in addition to transmission beams for multicasting, transmitted by the base station to two terminals (terminals 2202-1 and 2202-2), illustrated in FIG. 29. Note that a frame of a modulated signal transmitted by the base station is in the state as illustrated in FIG. 31.

[34-1] Terminal 2202-3 transmits to the base station a "request to transmit stream 2 by multicasting". Note that terminal 2202-3 transmits the "request to transmit stream 2 by multicasting" in unicast transmitting interval. 2503 in FIG. 31.

[34-2] Upon receiving [34-1], the base station notifies terminal 2202-3 that "the base station is not transmitting stream 2 for multicasting". In addition, the base station determines "whether the base station can add and transmit a transmission beam for stream 2 for multicasting". At this time, taking into consideration that the frame is in the state as illustrated in FIG. 31, the base station notifies terminal 2202-3 that "the base station is able to transmit a transmission beam for stream 2 for multicasting". Note that the base station transmits the "notification indicating that the base station is not transmitting stream 2 for multicasting" and the "notification indicating that the base station is able to transmit a transmission beam for stream 2 for multicasting" in unicast transmitting interval 2503 in FIG. 31.

[34-3] Upon receiving [34-2], terminal 2202-3 notifies the base station that "terminal 2203-3 is ready to receive stream 2 for multicasting". Note that terminal 2202-3 transmits the notification indicating that "terminal 2202-3 is ready to receive stream 2 for multicasting" in unicast transmitting interval 2503 in FIG. 31.

[34-4] Upon receiving [34-3], the base station determines to transmit a transmission beam for stream 2 for multicasting. Then, the base station transmits a training symbol for transmission directivity control and a training symbol for receiving directivity control, in order to transmit stream 2 to terminal 2202-3 by multicasting. Note that the base station transmits transmission beams for streams 1-1 and 1-2, as illustrated in FIG. 31, separately from transmission of the above symbols. This point will be described later.

[34-1] Terminal 2202-3 receives the training symbol for transmission directivity control and the training symbol for receiving directivity control which the base station has transmitted, and transmits feedback information to the base station in order that the base station performs transmission directivity control and terminal 2202-3 performs receiving directivity control.

[34-6] Based on the feedback information transmitted by terminal 2202-3, the base station determines a method for transmission directivity control (determines a weighting factor used for directivity control, for instance), and transmits data symbols for stream 2.

[34-7] Terminal 2202-3 determines a receiving directivity control method (determines a weighting factor used for directivity control, for instance), and starts receiving the data symbols for stream 2 which the base station has transmitted.

Note that the "procedure for a base station and a terminal to communicate" in FIG. 34 is an example, and the order of transmitting information items is not limited to the order in FIG. 34, and communication between the base station and the terminal can be similarly established even if the order of transmitting information items has changed. FIG. 34 illustrates an example in which the terminal performs receiving directivity control, yet the terminal may not perform receiving directivity control. In such a case, the base station may not transmit a training symbol for receiving directivity control, and the terminal does not determine a receiving directivity control method, in FIG. 34.

When the base station performs transmission directivity control, for example, multiplication coefficients for multipliers 204-1, 204-2, 204-3, and 204-4 in FIG. 2 are determined if the base station has a configuration in FIG. 1.

Then, when terminals 2202-1, 2202-2, and 2202-3 perform receiving directivity control, if the terminals have a configuration in FIG. 4, multiplication coefficients for multipliers 503-1, 503-2, 503-3, and 503-4 in FIG. 5 are determined, for example, whereas if the terminals have a configuration in FIG. 6, multiplication coefficients for multipliers 603-1, 603-2, ... , and 603-L are determined, for example.

Figure 35:
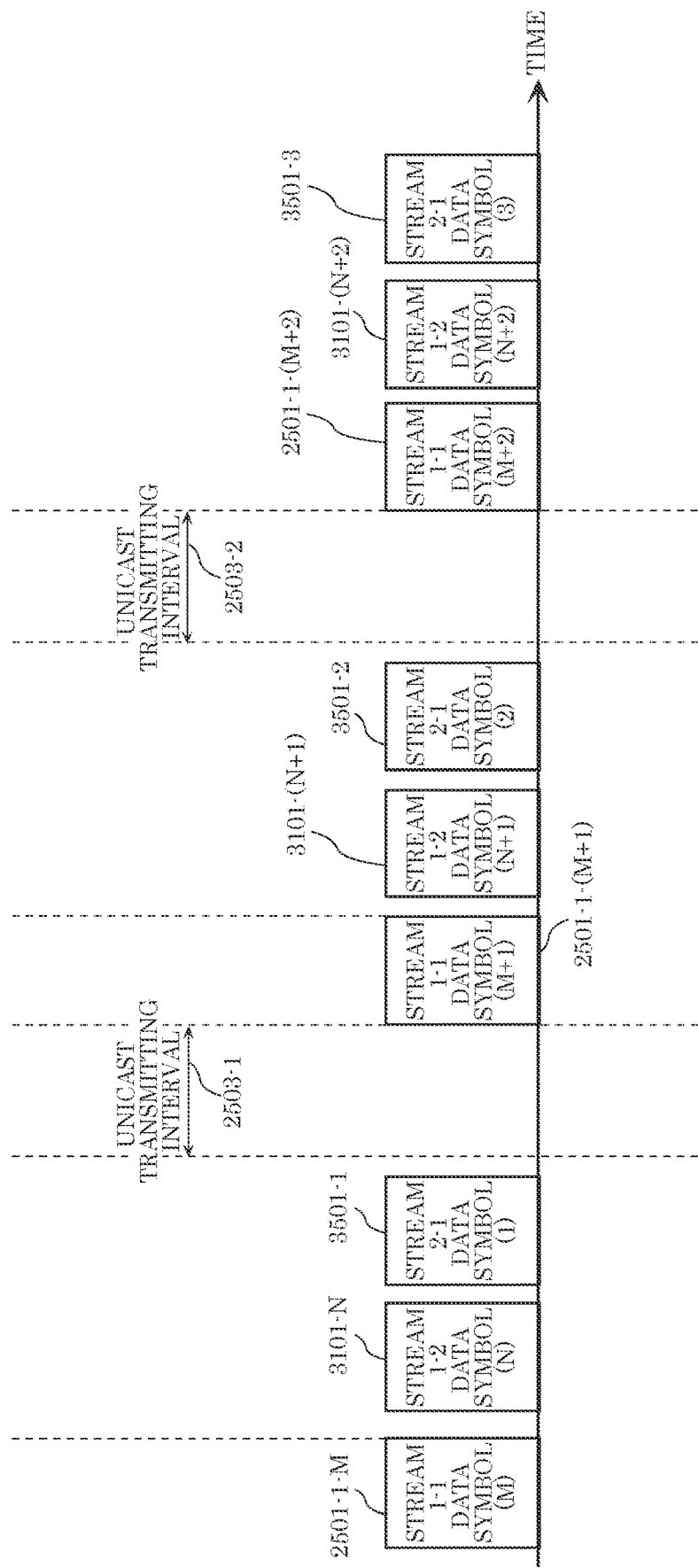
FIG. 35 is a diagram illustrating examples of symbols which the base station transmits.

FIG. 35 illustrates examples of symbols which the base station transmits when the base station transmits data symbols for stream 1 and stream 2 after communication between the base station and a terminal in FIG. 34 is completed, where the horizontal axis indicates time.

In FIG. 35, "stream 1-1" and "stream 1-2" illustrated in FIG. 31 are present, and thus "stream 1-1 data symbol (M)

(for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. In addition, "stream 1-2 data symbol (N) (for multicasting)" 3101-N, "stream 1-2 data symbol (N+1) (for multicasting)" 3101-(M+1) and "stream 1-2 data symbol (N+2) (for multicasting)" 3101-(N+2) are present. Note that N and M are integers of 2 or greater.

As illustrated in FIG. 35, in intervals other than unicast transmitting intervals 2503-1 and 2503-2, "stream 2-1 data symbol (1) (for multicasting)" 3501-1, "stream 2-1 data symbol (2) (for multicasting)" 3501-2, and "stream 2-1 data symbol (3) (for multicasting)" 3501-3 are present.

As described above, the features achieved at this time are as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for n multicasting)" 3101-(N+2) are all data symbols for transmitting "stream 1".

A terminal obtains "data of stream 1" by obtaining "data symbols for stream 1-1". Further, the terminal obtains "data of stream 1" by obtaining "data symbols for stream 1-2".

The directivities of transmission beams for "stream 1-1 data symbol. (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) is different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

"Stream 2-1 data symbol (1) (for multicasting)" 3501-1 "stream 2-1 data symbol (2) (for multicasting)" 3501-2, and "stream 2-1 data symbol (3) (for multicasting)" 3501-3 are data symbols for transmitting "stream 2".

A terminal obtains data of "stream 2" by obtaining "data symbols for stream 2-1". The above allows the terminal to receive a plurality of multicast streams (streams 1 and 2) transmitted by the base station. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

FIG. 32 illustrates "examples of symbols which the base station transmits when the base station transmits data symbols (for stream 1)", which is different from FIG. 35, where the horizontal axis indicates time. Note that elements which operate in the same manner as those in FIGS. 25 and 31 are assigned the same reference numerals in FIG. 32.

Different points in FIG. 32 from FIG. 35 are that unicast transmitting intervals 2503-1 and 2503-2 are set to longer time periods, and thus the base station does not add and transmit any more symbols for multicasting, that is, for example, symbols for a new stream.

Figure 36:
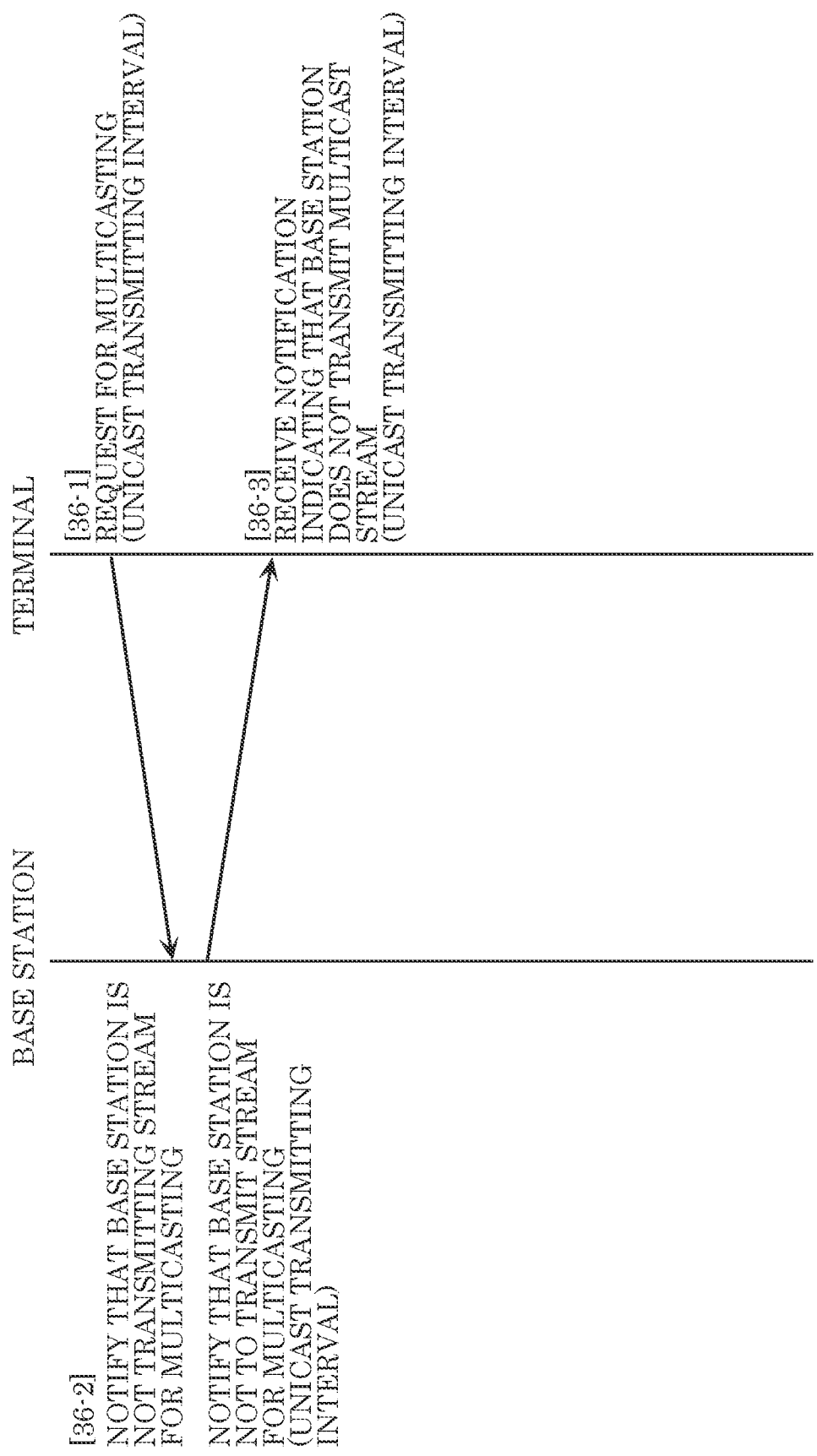
FIG. 36 is a diagram illustrating a procedure of performing communication between the base station and a terminal.

FIG. 36 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[36-1] Terminal 2202-3 transmits to the base station a "request to transmit stream 2 by multicasting". Note that terminal 2202-3 transmits the "request to transmit stream 2 by multicasting" in a unicast transmitting interval in FIG. 32.

[36-2] Upon receiving [36-1], the base station notifies terminal 2202-3 that "the base station is not transmitting stream 2 for multicasting". Note that the base station transmits the notification indicating that "the base station is not transmitting stream 2 for multicasting" in a unicast transmitting interval in FIG. 32. In addition, the base station determines whether a transmission beam for stream 2 for multicasting can be transmitted. Taking the frame illustrated in FIG. 32 into consideration, the base station determines not to transmit a transmission beam for stream 2 for multicasting. Thus, the base station notifies terminal 2202-3 that "the base station is not to transmit stream 2 for multicasting". Note that the base station transmits the "notification indicating that the base station is not to transmit stream 2 for multicasting" in a unicast transmitting interval in FIG. 32.

[36-3] Terminal 2202-3 receives the "notification indicating that the base station is not to transmit stream 2 for multicasting".

Note that the "procedure for a base station and a terminal to communicate" in FIG. 36 is an example, and the order of transmitting information items is not limited to the order in FIG. 36. Communication between the base station and the terminal can be similarly established even if the procedure of transmitting items has changed. In this manner, if there are insufficient communication resources for multicast transmission, a stream and a multicast transmission beam may not be added.

Note that a supplemental description of a method for setting unicast transmitting intervals 2503-1 and 2503-2 illustrated in, for instance, FIG. 35 is now given.

For example, in FIG. 35, the maximum value of the number of transmission beams for multicasting is determined in advance or is set.

In response to requests from the terminals, the base station transmits transmission beams for multicasting, the number of which is smaller than or equal to the maximum value. For example, in the case of FIG. 35, the number of transmission beams for multicasting is 3. Then, the base station transmits a plurality of transmission beams for multicasting, and temporal idle time after transmitting the transmission beams is set as a unicast transmitting interval.

The unicast transmitting intervals may be determined as described above.

Supplementary Note 1

Supplementary Note 1 describes the case where a base station performs unicast communication with a plurality of terminals, or in other words, communicates separately with a plurality of terminals.

At this time, for example, #1 symbol group 901-1 for stream 1, #2 symbol group 901-2 for stream 1, and #3 symbol group 901-3 for stream 1 in FIG. 9 may be control information for broadcast channels, that is, control information which the base station transmits to a plurality of terminals by broadcasting in order to perform data communication with the plurality of terminals. Note that control information is to be used to, for example, establish data communication between the base station and a terminal.

For example, #1 symbol group 901-1 for stream 1, #2 symbol group 901-2 for stream 1, and #3 symbol group 901-3 for stream 1 in FIG. 9 may be common search spaces. Note that a common search space is control information for cell control. Also, a common search space is control information broadcast to a plurality of terminals.

Similarly, for example, #1 symbol group 902-1 for stream 2, #2 symbol group 902-2 for stream 2, and #3 symbol group 902-3 for stream 2 in FIG. 9 may be control information for broadcast channels, that is, control information which the base station transmits to a plurality of terminals by broadcasting in order to perform data communication with the plurality of terminals.

For example, #1 symbol group 902-1 for stream 2, #2 symbol group 902-2 for stream 2, and #3 symbol group 902-3 for stream 2 in FIG. 9 may be common search spaces.

Note that features of #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, and #3 symbol group 1401-3 for modulated signal 1 in FIG. 14 may be control information for broadcast channels, that is, control information which the base station transmits to a plurality of terminals by broadcasting in order to perform data communication with the plurality of terminals.

In addition, for example, #1 symbol group 1401-1 for modulated signal 1, #2 symbol group 1401-2 for modulated signal 1, and #3 symbol group 1401-3 for modulated signal 1 in FIG. 14 may be common search spaces.

For example, #1 symbol group 1402-1 for modulated signal 2, #2 symbol group 1402-2 for modulated signal 2, and #3 symbol group 1402-3 for modulated signal 2 in FIG. 14 may be control information for broadcast channels, that is, control information which the base station transmits to a plurality of terminals by broadcasting in order to perform data communication with the plurality of terminals.

For example, #1 symbol group 1402-1 for modulated signal 2, #2 symbol group 1402-2 for modulated signal 2, and #3 symbol group 1402-3 for modulated signal 2 in FIG. 14 may be common search spaces.

Note that #1 symbol group 1401-1 for modulated signal 1, #2 symbol group 1401-2 for modulated signal 1, and #3 symbol group 1401-3 for modulated signal 1 in FIG. 14 are as described in the above embodiments, and #1 symbol group 1402-1 for modulated signal 2, #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be control information for broadcast channels, that is, control information which the base station transmits to a plurality of terminals by broadcasting in order to perform data communication with the plurality of terminals.

Stream 1-1 data symbol (1) 2501-1-1, stream 1-1 data symbol (2) 2501-1-2, and stream 1-1 data symbol (3) 2501-1-3 in FIG. 25 may be common search spaces.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be control information for broadcast channels, that is, control information which the base station transmits to a plurality of terminals by broadcasting in order to perform data communication with the plurality of terminals.

Further, stream 1-1 data symbol (M) 2501-1-M, stream 1-1 data symbol (M+1) 2501-1-(M+1), stream 1-1 data symbol (M+2) 2501-1-(M-+2), stream 1-2 data symbol (1) 3101-1, stream 1-2 data symbol (2) 3101-2, and stream 1-2 data symbol (3) 3101-3 in FIGS. 31 and 32 may be common search spaces.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 250-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be control information for broadcast channels, that is, control information which the base station transmits to a plurality of terminals by broadcasting in order to perform data communication with the plurality of terminals.

Further, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be common search spaces.

For example, stream 2-1 data symbol (1) 3501-1, stream 2-1 data symbol (2) 3501-2, and stream 2-1 data symbol (3) 3501-3 in FIG. 35 may be control information for broadcast channels, that is, control information which the base station transmits to a plurality of terminals by broadcasting in order to perform data communication with the plurality of terminals.

Further, stream 2-1 data symbol (1) 3501-1, stream 2-1 data symbol (2) 3501-2, and stream 2-1 data symbol (3) 3501-3 in FIG. 35 may be common search spaces.

Note that in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (M+2) 3101-1-(N+1), and stream 1-2 data symbol (N+2) 3101-(N+2) are as described in the above embodiments, and stream 2-1 data symbol (1) 3501-1, stream 2-1 data symbol (2) 3501-2, and stream 2-1 data symbol (3) 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 2

Supplementary Note 2 describes the case where the base station performs unicast communication with a plurality of terminals, or in other words, communicates separately with a plurality of terminals.

At this time, for example, #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 may be data addressed to the base station or data addressed to a terminal among a plurality of terminals communicating with the base station. At this time, such data may include control information.

Note that #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 may be data addressed to the base station or data addressed to a terminal among a plurality of terminals communicating with the base station. At this time, such data may include control information.

Note that #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be data addressed to the base station or data addressed to a terminal among a plurality of terminals communicating with the base station. At this time, such data may include control information.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be data addressed to the base station or data addressed to a terminal among a plurality of terminals communicating with the base station. At this time, such data may include control information.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be data addressed to the base station or data addressed to a terminal among a plurality of terminals communicating with the base station. At this time, such data may include control information.

For example, stream 2-1 data symbol (1) 3501-1, stream 2-1 data symbol (2) 3501-2, and stream 2-1 data symbol (3) 3501-3 in FIG. 35 may be data addressed to the base station or data addressed to a terminal among a plurality of terminals communicating with the base station. At this time, such data may include control information.

Note that in FIG. 35, stream 1-1 data symbol NC 2501-1-M, stream 1-1 data symbol (M+1) 2501-1-(M+1), stream 1-1 data symbol (M+2) 2501-1-(M+2), and stream 1-2 data symbol (N) 3101-N, stream 1-2 data symbol (N+1) 3101-(N+1), stream 1-2 data symbol (N+2) 3101-(N+2), stream 2-1 data symbol (1) 3501-1, stream 2-1 data symbol (2) 3501-2, and stream 2-1 data symbol (3) 3501-3 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 3

In a time period in which the base station transmits #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are transmitted as shown in the frame configuration in FIG. 9, the base station may transmit another symbol group using a transmission beam different from "a transmission beam for #1 symbol group 901-1 for stream 1, a transmission beam for #2 symbol group 901-2 for stream 1, a transmission beam for #3 symbol group 901-3 for stream 1, a transmission beam for #1 symbol group 902-1 for stream 2, a transmission beam for #2 symbol group 902-2 for stream 2, and a transmission beam for #3 symbol group 902-3 for stream 2".

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Further, in a time period in which the base station transmits #1 symbol group 1401-1 for modulated signal 1, #2 symbol group 1401-2 for modulated signal 1, #3 symbol group 1401-3 for modulated signal 1, #1 symbol group 1402-1 for modulated signal 2, #2 symbol group 1402-2 for modulated signal 2, and #3 symbol group 1402-3 for modulated signal 2 as shown in the frame configuration in FIG. 14, the base station may transmit another symbol group using a transmission beam different from "a transmission beam for #1 symbol group 1401-1 for modulated signal 1, a transmission beam for #2 symbol group 1401-2 for modulated signal 1, a transmission beam for #3 symbol group 1401-3 for modulated signal 1, a transmission beam for #1 symbol group 1402-1 for modulated signal 2, a transmission beam for #2 symbol group 1402-2 for modulated signal 2, and a transmission beam for #3 symbol group 1402-3 for modulated signal 2".

At this time, the "other symbol group" may be a symbol group which includes a data symbol addressed to a certain terminal, may be a symbol group which includes a control information symbol group, or may be a symbol group which includes another data symbol for multicasting, as described in other portions of the present disclosure.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301", Supplementary Note 4

In time periods in which a base station transmits stream 1-1 data symbol (1) 2501-1-1, stream 1-1 data symbol (2) 2501-1-2, and stream 1-1 data symbol (3) 2501-1-3 as shown in the frame configuration in FIG. 25, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

Note that the same also applies to the case where the horizontal axis indicates frequency in FIG. 25, and in time periods in which the base station transmits stream 1-1 data symbol (1) 2501-1-1, stream 1-1 data symbol (2) 2501-1-2, and stream 1-1 data symbol (3) 2501-1-3, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

In time periods in which the base station transmits stream 1-1 data symbol (M) 2501-1-M, stream 1-1 data symbol (M+1) 2501-1-(M+1), and stream 1-1 data symbol (M+2) 2501-1-(M+2) as shown in the frame configuration in FIGS. 31 and 32, the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

Note that the same also applies to the case where the horizontal axis indicates frequency in FIGS. 31 and 32, and in time periods in which the base station transmits stream 1-1 data symbol (M) 2501-1-M, stream 1-1 data symbol (M+1) 2501-1-(M+1), and stream 1-1 data symbol (M+2) 2501-1-(M+2), the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

In time periods in which the base station transmits stream 1-2 data symbol (1) 3101-1, stream 1-2 data symbol (2) 3101-2, and stream 1-2 data symbol (3) 3101-3 as shown in the frame configuration in FIGS. 31 and 32, the base station may transmit another symbol group using a transmission beam different from "transmission beams for transmitting stream 1-2 data symbol (1) 3101-1, stream 1-2 data symbol (2) 3101-2, and stream 1-2 data symbol (3) 3101-3".

Note that in FIGS. 31 and 32, the same also applies to the case where the horizontal axis indicates frequency in FIGS. 31 and 32, and in time periods in which the base station transmits stream 1-2 data symbol (1) 3101-1, stream. 1-2 data symbol (2) 3101-2, and stream 1-2 data symbol (3) 3101-3, the base station may transmit another symbol group using a transmission beam different from transmission beams for transmitting "stream 1-2 data symbol (1) 3101-1, stream 1-2 data symbol (2) 3101-2, and stream 1-2 data symbol (3) 3101-3".

In time periods in which the base station transmits stream 1-1 data symbol (M) 2501-1-M, stream 1-1 data symbol (M+1) 2501-(M+1), and stream 1-1 data symbol (M+2) 2501-1-(M+2) as shown in the frame configuration in FIG. 35, the base station may transmit another symbol group using a transmission beam different from transmission beams for transmitting "stream 1-1 data symbol (M) 2501-1-M, stream 1-1 data symbol (M+1) 2501-(M+1), and stream 1-1 data symbol (M+2) 2501-1-(M+2)".

Note that in FIG. 35, the same also applies to the case where the horizontal axis indicates frequency, and in time periods in which the base station transmits stream 1-1 data symbol (M) 2501-1-M, stream 1-1 data symbol (M+1) 2501-(M+1), and stream 1-1 data symbol (M+2) 2501-(M+2), the base station may transmit another symbol group using a transmission beam different from "transmission beams for transmitting stream 1-1 data symbol (M) 2501-1-M, stream 1-1 data symbol (M+1) 2501-(M+1), and stream 1-1 data symbol (M+2) 2501-(M+2)".

In time periods in which the base station transmits stream 1-2 data symbol (N) 3101-N, stream 1-2 data symbol (N+1) 3101-(N+1), and stream 1-2 data symbol (N+2) 3101-(N+2) as shown in the frame configuration in FIG. 35, the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

Note that the same also applies to the case where the horizontal axis indicates frequency in FIG. 35, and in time periods in which the base station transmits stream 1-2 data symbol (N) 3101-N, stream 1-2 data symbol (N+1) 3101-(N+1), and stream 1-2 data symbol (N+2) 3101-(N+2), the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(M+2)".

In time periods in which the base station transmits stream 2-1 data symbol (1) 3501-1, stream 2-1 data symbol (2) 3501-2, and stream 2-1 data symbol (3) 3501-3 as shown in the frame configuration in FIG. 35, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

Note that the same also applies to the case where the horizontal axis indicates frequency in FIG. 35, and in time periods in which the base station transmits stream 2-1 data symbol (1) 3501-1, stream 2-1 data symbol (2) 3501-2, and stream 2-1 data symbol (3) 3501-3, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

In the above, the "other symbol group" may be a symbol group which includes a data symbol addressed to a certain terminal, or may be a symbol group which includes a control information symbol or a symbol group which includes another data symbol for multicasting, as described in other portions of the specification.

At this time, the base station in FIG. 1 may generate a transmission beam for the above "other symbol group" through signal processing by signal processor 102, or may generate a transmission beam for the above "other symbol group" by selecting antennas from antenna unit 106-1 to antenna unit 106-M.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Then, unicast transmitting intervals 2503-1 and 2503-2 as illustrated in FIGS. 25, 31, and 32 may not be set.

Supplementary Note 5

A description with regard to FIGS. 31 and 32 includes the statement as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

A terminal can obtain "data of stream 1" by obtaining "data symbols for stream 1-1". Furthermore, a terminal can obtain "data of stream 1" by obtaining "data symbols for stream 1-2".

A description with regard to FIG. 35 includes the following statement.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols to transmit "stream 1".

A terminal can obtain "data of stream 1" by obtaining "data symbols for stream 1-1". Furthermore, a terminal can obtain "data of stream 1" by obtaining "data symbols for stream 1-2".

The following gives a supplementary description with regard to the above. For example, in FIG. 35, the above can be achieved using <method 1-1>, <method 1-2>, <method 2-1>, or <method 2-2> as below, <Method 1-1>

Stream 1-1 data symbol (M) 2501-1-M and stream 1-2 data symbol (N) 3101-N include the same data.

Then, stream 1-1 data symbol (M+1) 2501-1-(M+1) and stream 1-2 data symbol (N+1) 3101-(N+1) include the same data.

Stream 1-1 data symbol (M+2) 2501-1-(M+2) and stream 1-2 data symbol (N+2) 3101-(M+2) include the same data.

<Method 1-2>

Stream 1-2 data symbol (L) 3101-L which includes the same data as the data included in stream 1-1 data symbol (K) 2501-1-K is present. Note that K and L are integers.

<Method 2-1>

Stream 1-1 data symbol (M) 2501-1-M and stream 1-2 data symbol (N) 3101-N include the same data in part.

Then, stream 1-1 data symbol (M+1) 2501-1-(M+1) and stream 1-2 data symbol (N+1) 3101-(N+1) include the same data in part.

Stream 1-1 data symbol (M+2) 2501-1-(M+2) and stream 1-2 data symbol (N+2) 3101-(N+2) include the same data in part.

<Method 2-2>

Stream 1-2 data symbol (L) 3101-L which includes a part of data included in stream 1-1 data symbol (K) 2501-1-K is present. Note that K and L are integers.

Specifically, a first base station or a first transmission system generates a first packet group which includes data of a first stream, and a second packet group which includes data of the first stream, transmits a packet included in the first packet group in a first period using a first transmission beam, and transmits a packet included in the second packet group in a second period using a second transmission beam different from the first transmission beam. The first period and the second period do not overlap.

Here, the second packet group may include a second packet which includes data same as data included in a first packet included in the first packet group. As a configuration different from the above, the second packet group may include a third packet which includes data same as a part of the data included in the first packet included in the first packet group.

The first transmission beam and the second transmission beam may be transmission beams transmitted using the same antenna unit and having different directivities, or may be transmission beams transmitted using different antenna units.

In addition to the configuration of the first base station or the first transmission system, a second base station or a second transmission system further generates a third packet group which includes data of the first stream, and transmits a packet included in the third packet group in a third period using a third transmission beam different from the first transmission beam and the second transmission beam. The third period does not overlap the first period and the second period.

Here, the second base station or the second transmission system may repeatedly set the first period, the second period, and the third period in a predetermined order.

Further, in addition to the configuration of the first base station or the first transmission system, the third base station or the third transmission system further generates a third packet group which includes data of the first stream, and transmits a packet included in the third packet group in the third period using the third transmission beam different from the first transmission beam and the second transmission beam. At least a portion of the third period overlaps the first period.

Here, the third base station or the third transmission system may repeatedly set the first period, the second period, and the third period, the third periods repeatedly set may each at least partially overlap the first period, or at least one of the third periods repeatedly set may not overlap the first period(s).

Further, in addition to the configuration of the first base station or the first transmission system, a fourth base station or a fourth transmission system further generates a fourth packet which includes data of a second stream, and transmits the fourth packet in a fourth period using a fourth transmission beam different from the first transmission beam. At least a portion of the fourth period overlaps the first period.

Note that the first period and the second period do not overlap in the above description, yet the first period and the second period may partially overlap, the entire first period may overlap the second period, or the entire first period may overlap the entire second period.

A fifth base station or a fifth transmission system may generate one or more packet groups each of which includes data of the first stream, transmit the one or more packet groups using a different transmission beam for each packet group, and increase or decrease the number of packet groups to be generated, based on a signal transmitted from a terminal.

Note that the above describes "streams", yet as described in other portions of the specification, "stream 1-1 data symbol (M) 2501-1-M, stream 1-1 data symbol (M+1) 2501-1-(M+1), stream 1-1 data symbol (M+2) 2501-1-(M+ 2), stream 1-2 data symbol (1) 3101-1, stream 1-2 data symbol (2) 3101-2, and stream 1-2 data symbol (3) 3101-3" in FIGS. 31 and 32, and "stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+ 2)" in FIG. 35 may be symbols which include data symbols addressed to a certain terminal, symbols which include a control information symbol, or symbols which include a data symbol for multicasting.

Embodiment 4

The present embodiment is to describe specific examples of the communication system described in Embodiments 1 to 3.

The communication system according to the present embodiment includes a base station (or a plurality of base stations) and a plurality of terminals. For example, consider a communication system which includes, for instance, base station 700 as illustrated in, for instance, FIGS. 7, 12, 17, 19, 20, 26, and 29 and terminals 704-1 and 704-2.

Figure 37:
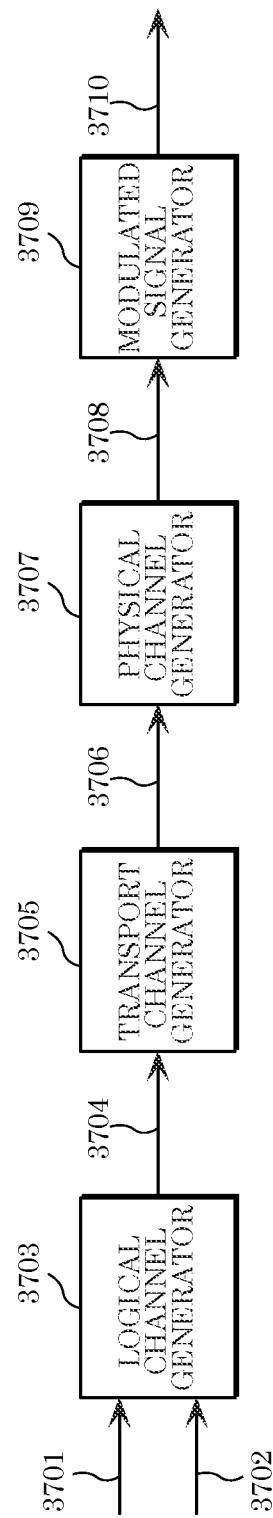
FIG. 37 illustrates an example of a configuration of the base station.

FIG. 37 illustrates an example of a configuration of a base station (700).

Logical channel generator 3703 receives inputs of data 3701 and control data 3702, and outputs logical channel signal 3704. For example, the channel for logical channel signal 3704 is constituted by at least one of "a broadcast control channel (BCCH), a paging control channel (PCCH), a common control channel (CCM), a multicast control channel (MCCH), and a dedicated control channel (DCCII)" which are logical channels for control, and "a dedicated traffic channel (DTCH) and a multicast traffic channel (MTCH)" which are logical channels for data.

Note that "a BCCH is a downlink channel for informing system control information", "a PCCH is a downlink channel for paging information", "a CCCH is a downlink common control channel used when radio resource control (RRC) connection is not present", "an MCCH is a point-to-multipoint downlink control channel for multicast channel scheduling for multimedia broadcast multicast service (MBMS)", "a DCCII is a downlink dedicated control channel used by a terminal with RRC connection", "a DTCH is a downlink dedicated traffic channel of a user equipment (UF) terminal or a downlink user-data dedicated channel", and "an MTCH is a point-to-multipoint downlink channel for MBMS user data".

Transport channel generator 3705 receives inputs of logical channel signal 3704, and generates and outputs transport channel signal 3706. The channel for transport channel signal 3706 is constituted by, for example, at least one of a broadcast channel (BCH), a downlink shared channel (DL-SCH), a paging channel (PCH), and a multicast channel (MCH), for instance.

Note that "a BCH is a channel for system information notified throughout the entire cell", "a DL-SCH is a channel for which user data, control information, and system information are used", "a PCH is a channel for paging information notified throughout the entire cell.", and "an MCH is a control channel for MBMS traffic notified throughout the entire cell".

Physical channel generator 3707 receives inputs of transport channel signal 3706, and generates and outputs physical channel signal 3708. The channel for physical channel signal 3708 is constituted by, for example, at least one of a physical broadcast channel (PBCH), a physical multicast channel (PMCH), a physical downlink shared channel (PDSCH), and a physical downlink control channel (PDCCH), for instance.

Note that "a PBCH is for BCH transport channel transmission", "a PMCH is for MCH transport channel transmission", "a PDSCH is for DL-SCH and transport channel transmission", and "a PDCCH is for transmission of downlink Layer 1 (L1)/Layer 2 (L2) control signal".

Modulated signal generator 3709 receives inputs of physical channel signal 3708, and generates and outputs modulated signal 3710 based on physical channel signal 3708. Then, base station 700 transmits modulated signal 3710 as a radio wave.

First, consider the case where the base station performs unicast communication with the plurality of terminals, or in other words, communicates separately with the plurality of terminals.

At this time, for example, the channels for symbol group #1 for stream 1 indicated by 901-1, symbol group #2 for stream 1 indicated by 901-2, and symbol group #3 for stream 1 indicated by 901-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Here, broadcast channels are to be described. A broadcast channel corresponds to a "PBCH", a "PMCH", or "a portion of a PD-SCH" among physical channels (for physical channel signal 3708).

A broadcast channel corresponds to a "BCH", "a portion of a DL-SCH", "a PCH", or "a MCII" among transport channels (for transport channel signal 3706).

A broadcast channel corresponds to "a BCCH", "a CCCH", "an MCCH", "a portion of a DTCH", or "an MTCH" among logical channels (for logical channel signal 3704).

Similarly, for example, the channels for symbol group #1 for stream 2 indicated by 902-1, symbol group #2 for stream 2 indicated by 902-2, and symbol group #3 for stream 2 indicated by 902-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among physical channels (for physical channel signal 3708).

Further, a broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

At this time, features of symbol group #1 for stream 1 indicated by 901-1, symbol group #2 for stream 1 indicated by 901-2, and symbol group #3 for stream 1 indicated by 901-3 in FIG. 9 are as described in the above embodiments, and furthermore, features of symbol group #1 for stream 2 indicated by 902-1, symbol group #2 for stream 2 indicated by 902-2, and symbol group #3 for stream 2 indicated by 902-3 in FIG. 9 are as described in the above embodiments.

Note that stream 2 may not be transmitted since symbol group #1 for stream 2 (902-1), symbol group #2 for stream 2 (902-2), and symbol group #3 for stream 2 (902-3) in FIG. 9 are not transmitted. In particular, when a signal having a broadcast channel is transmitted, the base station may not transmit a symbol group for stream 2 (at this time, base station 701 does not transmit 703-1, 703-2, and 703-3 in FIG. 7, for example).

For example, symbol group #1 for modulated signal 1 indicated by 1401-1, symbol group #2 for modulated signal 1 indicated by 1401-2, and symbol group #3 for modulated signal 1 indicated by 1401-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

A broadcast channel corresponds to "a BCH", "a portion of a DL-SCH", "a PCH", or "an MCH" among transport channels (for transport channel signal 3706).

A broadcast channel corresponds to "a BCCH" "a CCM", "an MCCH", "a portion of a DTCH", or "an MTCH" among the logical channels (for logical channel signal 3704).

For example, symbol group #1 for modulated signal 2 indicated by 1402-1, symbol group #2 for modulated signal 2 indicated by 1402-2, and symbol group #3 for modulated signal 2 indicated by 1402-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PPCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of symbol group #1 for modulated signal 1 indicated by 1401-1, symbol group #2 for modulated signal 1 indicated by 1401-2, and symbol group #3 for modulated signal 1 indicated by 1401-3 in FIG. 14 are as described in the above embodiments, and symbol group #1 for modulated signal 2 indicated by 1402-1, symbol group #2 for modulated signal 2 indicated by 1402-2, and symbol group #3 for modulated signal 2 indicated by 1402-3 in FIG. 14 are as described in the above embodiments.

For example, stream 1-1 data symbol (1) indicated by 2501-1-1, stream 1-1 data symbol (2) indicated by 2501-1-2, and stream 1-1 data symbol (3) indicated by 2501-1-3 in FIG. 25 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PATCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a ITCH", or "an MTCH" among the logical channels (for logical channel signal 3704).

Note that features of stream 1-1 data symbol (1) indicated by 2501-1-1, stream 1-1 data symbol (2) indicated by 2501-1-2, and stream 1-1 data symbol (3) indicated by 2501-1-3 in FIG. 25 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channels corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCH", "a portion of a DTCH", or "an MTCH" among the logical channels (for logical channel signal 3704).

For example, stream 2-1 data symbol (1) indicated by 3501-1, stream 2-1 data symbol (2) indicated by 3501-2, and stream 2-1 data symbol (3) indicated by 3501-3 in FIG. 35 may be broadcast channels (that is, control information which the base station transmits to the plurality of terminals by broadcasting in order to perform data communication with the plurality of terminals). Note that control information is to be used to, for example, establish data communication tween the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an PMCH", "a portion of a DTCH", or "an MTCH" among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 are as described in the above embodiments, and features of stream 2-1 data symbol (1) indicated by 3501-1, stream 2-1 data symbol (2) indicated by 3501-2, and stream 2-1 data symbol (3) indicated by 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Note that the symbol groups for stream 1 in FIG. 9 may include data to be transmitted to a single terminal (unicast data) (or one or more symbols). Similarly, the symbol groups for stream 2 in FIG. 9 may include data to be transmitted to a single terminal (unicast data) (or one or more symbols).

Note that the symbol groups for stream 1 in FIG. 14 may include data to be transmitted to a single terminal (unicast data) (or one or more symbols). Similarly, the symbol groups for stream 2 in FIG. 14 may include data to be transmitted to a single terminal (unicast data) (or one or more symbols).

Note that the symbols for stream 1-1 in FIG. 25 may include data to be transmitted to a single terminal (unicast data) (or one or more symbols). The symbols for stream 1-1 and stream 1-2 in FIGS. 31 and 32 may include data to be transmitted to a single terminal. (unicast data) (or one or more symbols).

A PBCH may have a configuration of "being used to transmit minimum information (including a system bandwidth, a system frame number, and the number of transmission antennas) which a UE is to read first after cell searching", for example.

A PMCH may have a configuration of "being used to utilize a multicast-broadcast single-frequency network (MBSFN), for example".

A PDSCH may have a configuration of "being, for example, a shared downlink data channel for transmitting user data and for collectively transmitting all data, irrespective of C-plane (control plane) and U-plane (user plane)".

A PDCCH may have a configuration of "being used to notify, for example, a user selected by eNodeB (gNodeB) (base station) through scheduling of information indicating allocation of radio resources".

Through the above implementation, in multicast anal broadcast data transmission, the base station transmits data symbols and control information symbols using a plurality of transmission beams, and a terminal selectively receives a transmission beam with good quality among the plurality of transmission beams and receives data symbols based on the received transmission beam, thus achieving advantageous effects that the terminal can achieve high data receiving quality.

Embodiment 5

The present embodiment gives a supplemental description of configurations of the symbol groups for stream 1 and the symbol groups for stream 2 in FIG. 9 which a base station (700) transmits.

Figure 38:
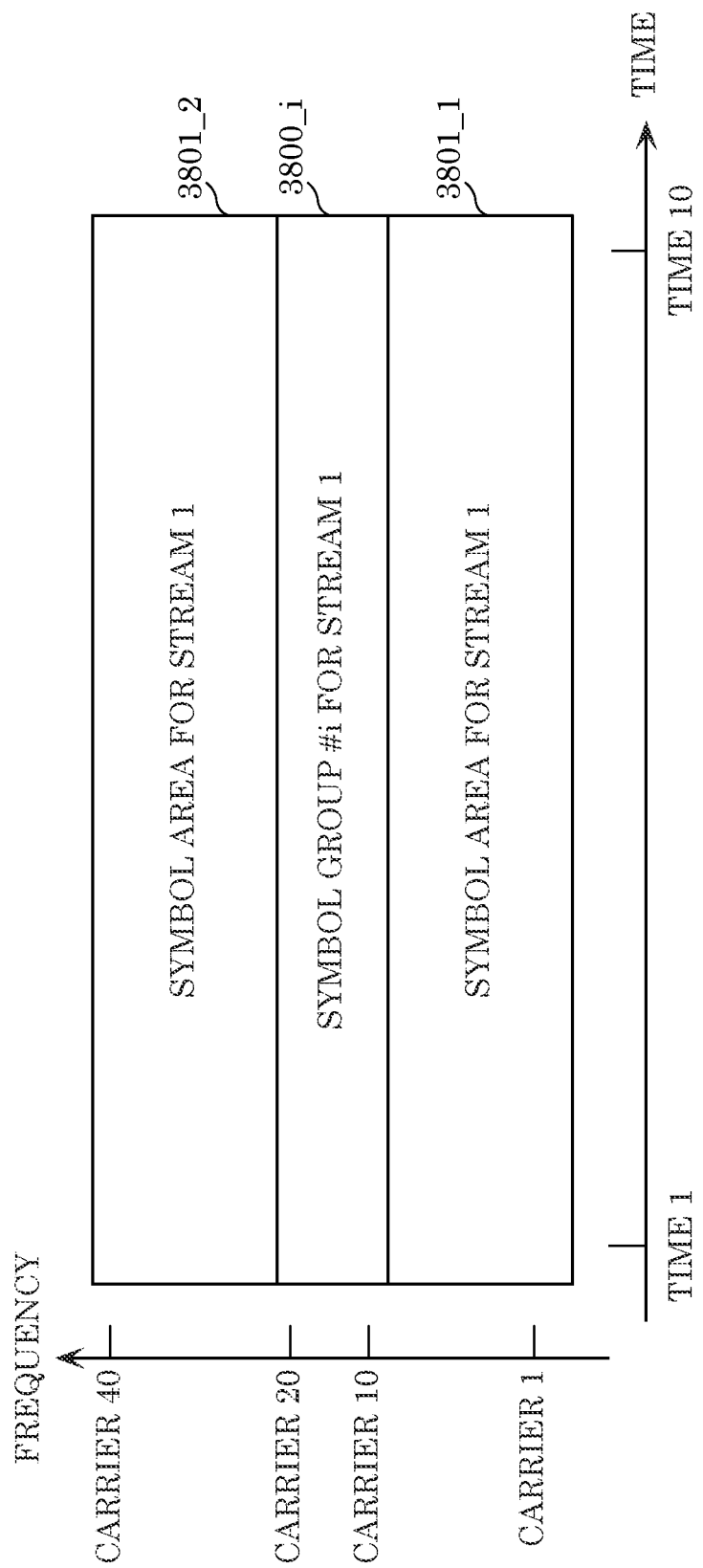
FIG. 38 illustrates an example of a frame configuration.

FIG. 38 illustrates an example of a frame configuration for stream 1 which the base station (700) transmits, the horizontal axis indicates time and the vertical axis indicates frequency in the frame configuration in FIG. 38, and the frame configuration from time 1 to time 10 and carrier 1 to carrier 40 is illustrated. Accordingly, FIG. 38 illustrates a frame configuration according to a multi-carrier transmission method such as the orthogonal frequency division multiplexing (OFDM) method.

Symbol area 3801_1 for stream 1 in FIG. 38 is present from time 1 to time 10 and from carrier 1 to carrier 9.

Symbol group #i (3800_i) for stream 1 is present from time 1 to time 10 and from carrier 10 to carrier 20. Note that symbol group #i (3800_i) for stream 1 corresponds to symbol group #i (901-i) for stream 1 in FIG. 9.

Symbol area 3801_2 for stream 1 is present from time 1 to time 10 and from carrier 21 to carrier 40.

At this time, for example, as described in Embodiment 4, for instance, when the base station transmits (unicasts), to one or more terminals, data therefor, symbol areas 3801_1 and 3801_2 for stream 1 in FIG. 38 can be used.

Symbol group #i (3800_i) for stream 1 in FIG. 38 is to be used by the base station to transmit data for multicasting, as described in, for instance, Embodiments 1 and 4.

Figure 39:
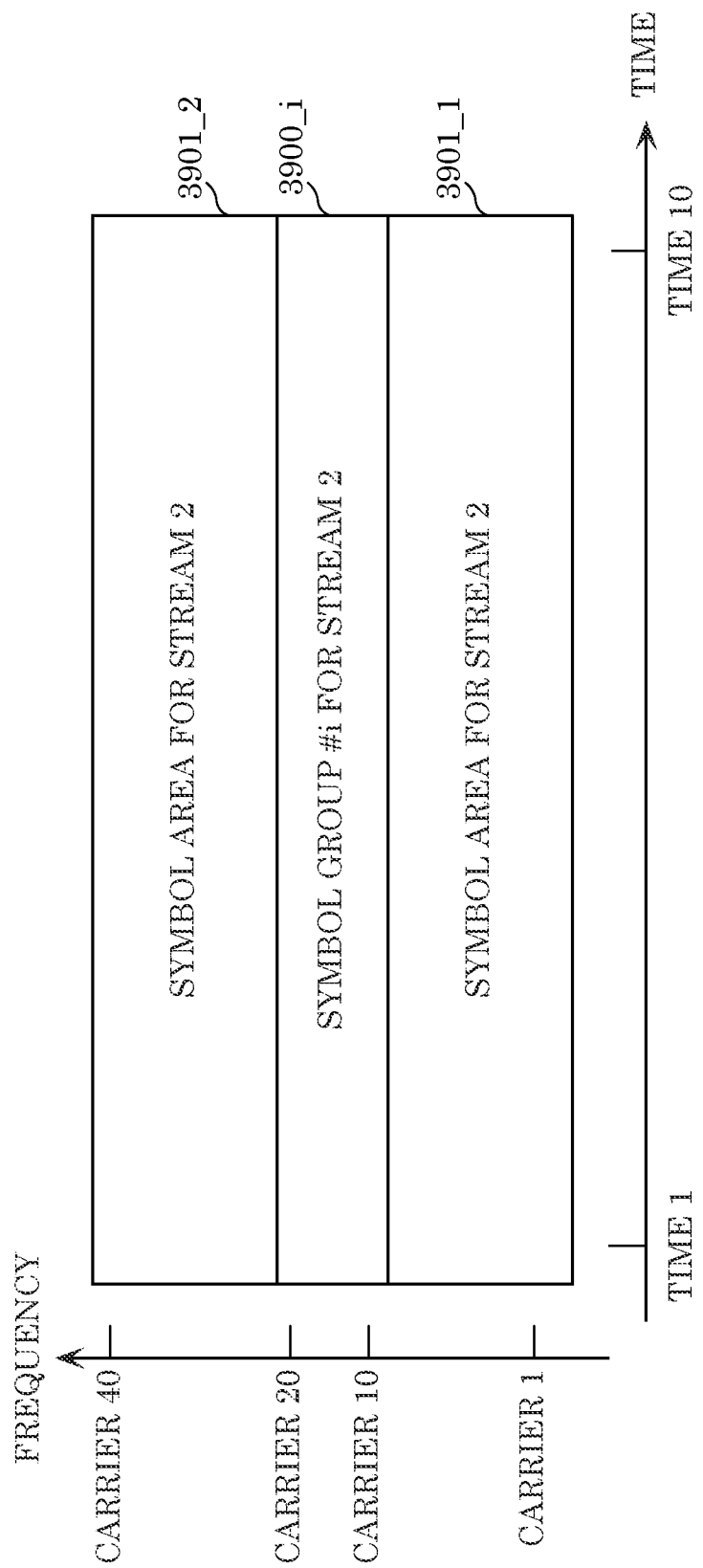
FIG. 39 illustrates an example of a frame configuration.

FIG. 39 illustrates an example of a frame configuration for stream 2 which the base station (700) transmits, the horizontal axis indicates time and the vertical axis indicates frequency in the frame configuration in FIG. 39, and the frame configuration from time 1 to time 10 and carrier 1 to carrier 40 is illustrated. Accordingly, FIG. 39 illustrates a frame according to a multi-carrier transmission method such as the OFDM method.

Symbol area 3901_1 for stream 2 in FIG. 39 is present from time 1 to time 10 and from carrier 1 to carrier 9.

Symbol group #i (3900_i) for stream 2 is present from time 1 to time 10 and from carrier 10 to carrier 20. Note that symbol group #i (3900_i) for stream 2 corresponds to symbol group #1 (902-*i*) for stream 2 in FIG. 9.

Symbol area 3901_2 for stream 2 is present from time 1 to time 10 and from carrier 21 to carrier 40.

At this time, for example, as described in Embodiment 4, for instance, when the base station transmits (unicasts), to one or more terminals, data therefor, symbol areas 3901_1 and 3901_2 for stream 2 in FIG. 39 can be used.

Symbol group #i (3900_i) for stream 2 in FIG. 39 is to be used by the base station to transmit data for multicasting, as described in Embodiments 1 and 4, for instance.

Note that the base station transmits, using the same frequency at the same time, a symbol at time X (in the case of FIG. 38, X is an integer in a range from 1 to 10) and carrier Y (in the case of FIG. 38, Y is an integer in a range from 1 to 40) in FIG. 38, and a symbol at time X and carrier Y in FIG. 39.

Features of symbol group #1 for stream 1 indicated by 901-1, symbol group #2 for stream 1 indicated by 901-2, and symbol group #3 for stream 1 indicated by 901-3 in FIG. 9 are as described in the above embodiments. Thus, the features of symbol group #1 for stream 1 in FIG. 38 are the same as the features of the symbol groups for stream 1 in FIG. 9, and are as described in the above embodiments.

Further, features of symbol group #1 for stream 2 indicated by 902-1, symbol group #2 for stream 2 indicated by 902-2, and symbol group #3 for stream 2 indicated by 902-3 in FIG. 9 are as described in the above embodiments. Specifically, the features of symbol group #i for stream 2 in FIG. 39 are the same as the features of the symbol groups for stream 2 in FIG. 9, and are as described in the above embodiments.

Note that if symbols are present after time 11 from carrier 10 to carrier 20 in the frame configuration in FIGS. 38 and 39, the symbols may be used for multicast transmission or dedicated data transmission (unicast transmission).

If the base station transmits a frame as in FIG. 9 using the frame configuration in FIG. 38 or 39, implementation described in Embodiments 1 and 4 may be performed similarly.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 6

The present embodiment gives a supplemental description of the configurations of the symbol groups for modulated signal 1 and the symbol groups for modulated signal 2 in FIG. 14 that a base station (700) transmits.

Figure 40:
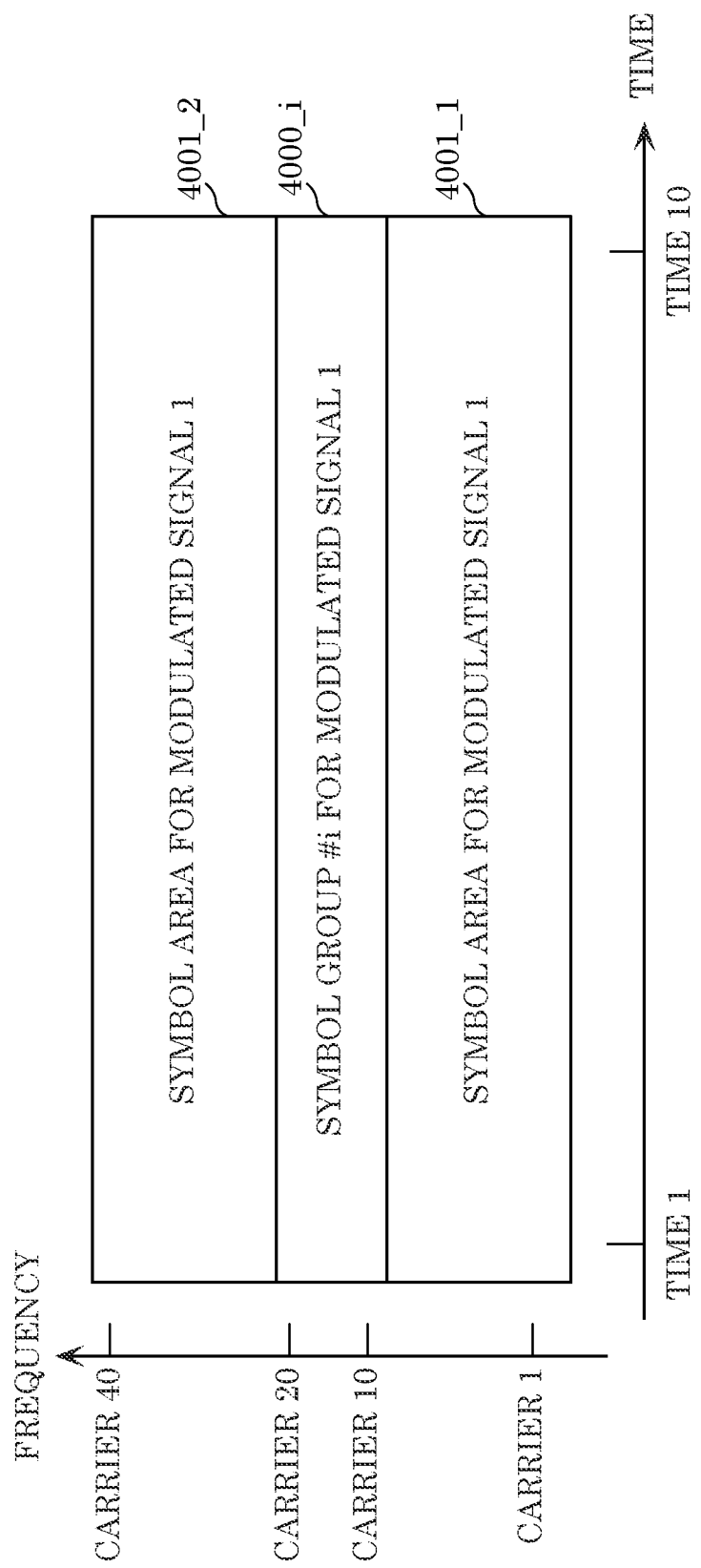
FIG. 40 illustrates an example of a frame configuration.

FIG. 40 illustrates an example of a frame configuration for modulated signal 1 which the base station (700) transmits, the horizontal axis indicates time and the vertical axis indicates frequency in the frame configuration in FIG. 40, and the frame configuration from time 1 to time 10 and carrier 1 to carrier 40 is illustrated. Accordingly, FIG. 40 illustrates a frame configuration according to a multi-carrier transmission method such as the orthogonal frequency division multiplexing (OFDM) method.

Symbol area 4001_1 for modulated signal 1 in FIG. 40 is present from time 1 to time 10 and from carrier 1 to carrier 9.

Symbol group #i (4000_i) for modulated signal 1 is present from time 1 to time 10 and from carrier 10 to carrier 20. Note that symbol group #1 (4000_i) for modulated signal 1 corresponds to symbol group #i (1401-*i*) for modulated signal 1 in FIG. 14.

Symbol area 4001_2 for modulated signal 1 is present from time 1 to time 10 and from carrier 21 to carrier 40.

At this time, for example, as described in Embodiment 4, for instance, when the base station transmits (unicasts), to one or more terminals, data therefor, symbol areas 4001_1 and 4001_2 for stream 1 in FIG. 40 can be used.

Then, symbol group #i (4001_i) for modulated signal 1 in FIG. 40 is to be used by the base station to transmit data for multicasting, as described in Embodiments 1 and 4, for instance.

Figure 41:
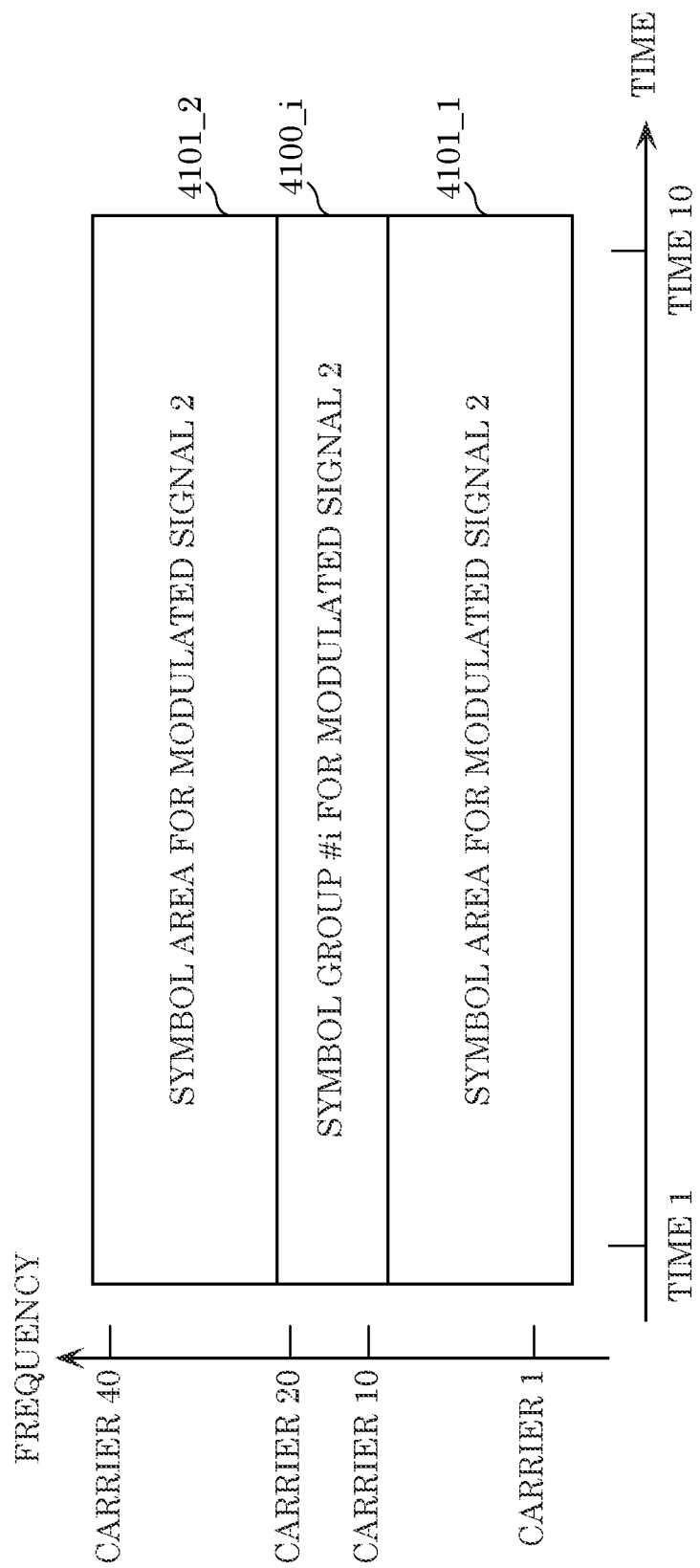
FIG. 41 illustrates an example of a frame configuration.

FIG. 41 illustrates an example of a frame configuration for modulated signal 2 which the base station (700) transmits, the horizontal axis indicates time and the vertical axis indicates frequency in the frame configuration in FIG. 41, and the frame configuration from time 1 to time 10 and carrier 1 to carrier 40 is illustrated. Accordingly, FIG. 41 illustrates a frame according to a multi-carrier transmission method such as the OFDM system.

Symbol area 4101_1 for modulated signal 2 in FIG. 41 is present from time 1 to time 10 and from carrier 1 to carrier 9.

Symbol group #1 (4100_i) for modulated signal 2 is present from time 1 to time 10 and from carrier 10 to carrier 20. Note that symbol group #i (4100_i) for modulated signal 2 corresponds to symbol group #i (1402-*i*) for modulated signal 2 in FIG. 14.

Symbol area 4101_2 for modulated signal 2 is present from time 1 to time 10 and from carrier 21 to carrier 40.

At this time, for example, as described in Embodiment 4, for instance, when the base station transmits (unicasts), to one or more terminals, data therefor, symbol areas 4101_1 and 4101_2 for modulated signal 2 in FIG. 41 can be used.

Then, symbol group #i (4100_i) for modulated signal 2 in FIG. 41 is to be used by the base station to transmit data for multicasting, as described in Embodiments 1 and 4, for instance.

Note that the base station transmits, using the same frequency at the same time, a symbol at time X (in the case of FIG. 40, X is an integer in a range from 1 to 10) and carrier Y (in the case of FIG. 40, Y is an integer in a range from 1 to 40) in FIG. 40, and a symbol at time X and carrier Y in FIG. 41.

Then, features of symbol group #1 for stream 1 indicated by 1401_1, symbol group #2 for modulated signal 1 indicated by 1401_2, and symbol group #3 for modulated signal 1 indicated by 1401_3 in FIG. 14 are as described in the above embodiments. Specifically, the features of symbol group #i for modulated signal 1 in FIG. 40 are the same as the features of the symbol groups for modulated signal 1 in FIG. 14, and are as described in the above embodiments.

Symbol group #1 for modulated signal 2 indicated by 1402_1, symbol group #2 for modulated signal 2 indicated by 1402_2, and symbol group #3 for modulated signal 2 indicated by 1402_3 in FIG. 14 are as described in the above embodiments. Specifically, the features of symbol group #i for modulated signal 2 in FIG. 41 are the same as the features of the symbol groups for modulated signal 2 in FIG. 14, and are as described in the above embodiments.

Note that if symbols are present after time 11 from carrier 10 to carrier 20 in the frame configuration in FIGS. 40 and 41, the symbols may be used for multicast transmission or dedicated data transmission (unicast transmission).

When the base station transmits a frame as in FIG. 14 using the frame configuration in FIG. 40 or 41, data transmission described in Embodiments 1 and 4 may be similarly carried out.

Examples of use of symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for mod dated signal 2 in FIG. 41 in the above description are to be described.

Figure 42:
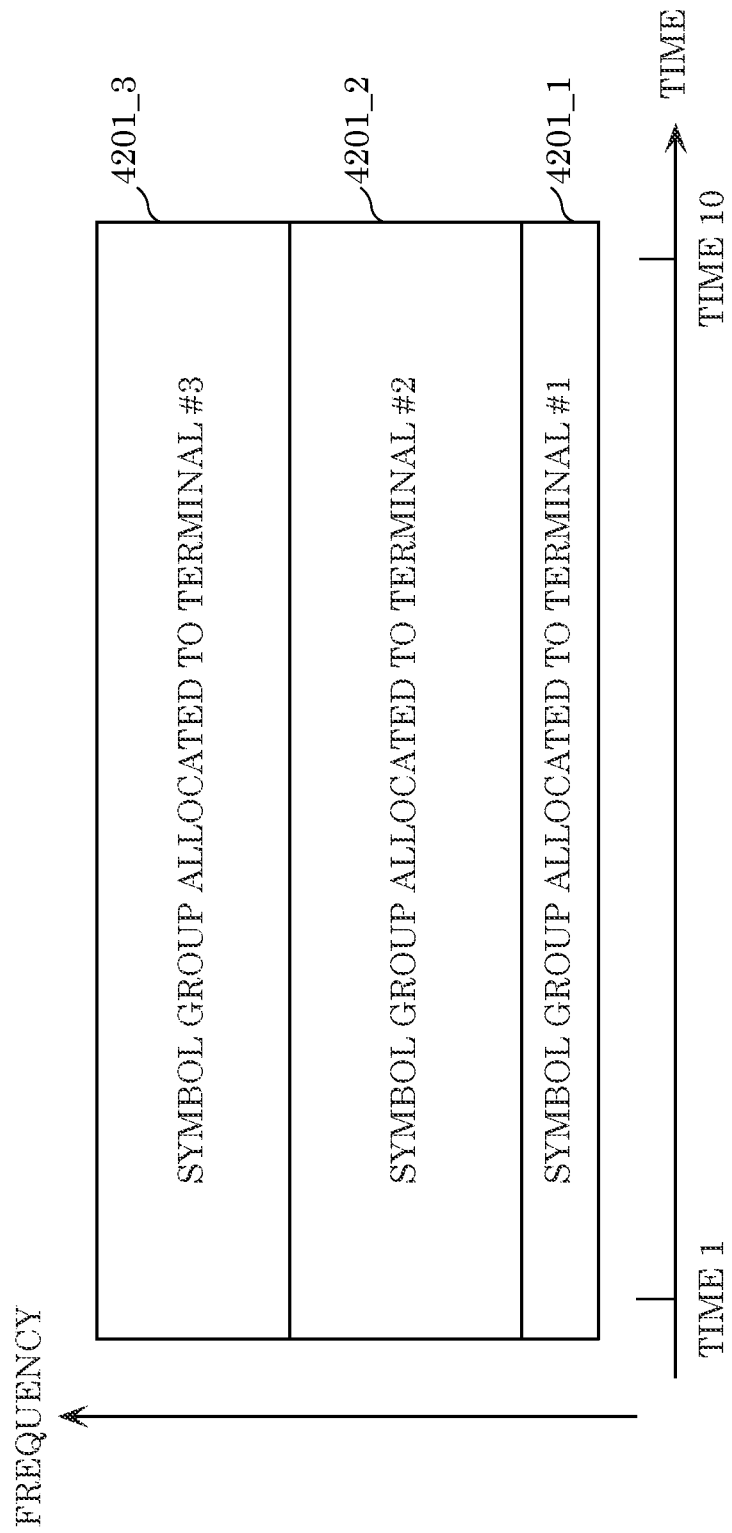
FIG. 42 illustrates an example of allocation of symbol areas to terminals.

FIG. 42 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_—2 for modulated signal 1 in FIG. 40, and symbol areas 4101_1 and 4102_2 for modulated signal 2 in FIG. 41" to terminals. Note that in FIG. 42, the horizontal axis indicates time, and the vertical axis indicates frequency (carrier).

As illustrated in FIG. 42, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to frequency division, and allocated to the terminals 4201_1 is a symbol group allocated to terminal #1, 4201_2 is a symbol group allocated to terminal #2, and 4201_3 is a symbol group allocated to terminal #3.

For example, the base station (700) communicates with terminal #1, terminal #2, and terminal #3, and when the base station transmits data to terminal #1, the base station transmits data to terminal #1, using "symbol group 4201_1 allocated to terminal #1" in FIG. 42. When the base station transmits data to terminal #2, the base station transmits data to terminal #2 using "symbol group 4201_2 allocated to terminal #2" in FIG. 42. When the base station transmits data to terminal #3, the base station transmits data to terminal #3 using "symbol group 4201_3 allocated to terminal #3" in FIG. 42.

Note that the method of allocating symbol groups to terminals is not limited to the method in FIG. 42, and thus the frequency band (the carrier number) may be changed with time or may be set in any manner. Furthermore, the method of allocating symbol groups to terminals may be changed with time.

Figure 43:
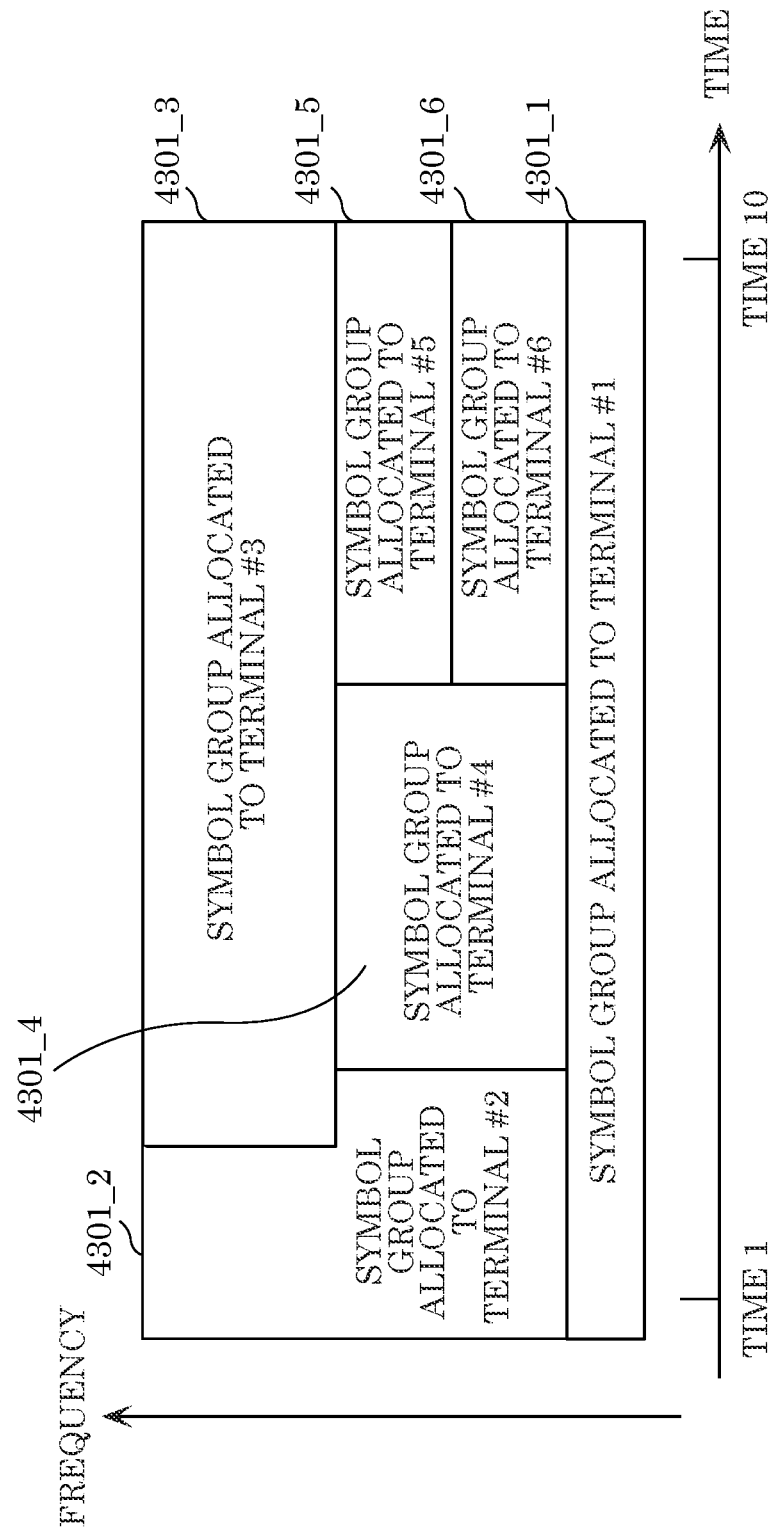
FIG. 43 illustrates an example of allocation of symbol areas to terminals.

FIG. 43 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals, which is different from the allocation in FIG. 42. Note that in FIG. 43, the horizontal axis indicates time, and the vertical axis indicates frequency (carrier).

As illustrated in FIG. 43, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to time and frequency division, and allocated to the terminals. Then, 4301_1 is a symbol group allocated to terminal #1, 4301_2 is a symbol group allocated to terminal #2, 4301_3 is a symbol group allocated to terminal #3, 4301_4 is a symbol group allocated to terminal #4, 4301_5 is a symbol group allocated to terminal #5, and 4301_6 is a symbol group allocated to terminal #6.

For example, the base station (700) communicates with terminal #1, terminal #2, terminal. #3, terminal #4, terminal. #5, and terminal #6, and when the base station transmits data to terminal #1, the base station transmits data to terminal #1, using symbol group 4301_1 allocated to terminal #1" in FIG. 43. Then, when the base station transmits data to terminal #2, the base station transmits data to terminal #2 using "symbol group 4301_2 allocated to terminal #2" in FIG. 43. When the base station transmits data to terminal #3, the base station transmits data to terminal #3 using "symbol group 4301_3 allocated to terminal #3" in FIG. 43. When the base station transmits data to terminal #4, the base station transmits data to terminal #4 using "symbol group 4301_4 allocated to terminal #4" in FIG. 43. When the base station transmits data to terminal #5, the base station transmits data to terminal #5 using "symbol group 4301_5 allocated to terminal #5" in FIG. 43. When the base station transmits data to terminal #6, the base station transmits data to terminal #6 using "symbol group 4301_6 allocated to terminal #6" in FIG. 43.

Note that the method of allocating symbol groups to terminals is not limited to the method in FIG. 43, and thus the frequency band (the carrier number) and the time width may be changed or may be set in any manner. Furthermore, the method of allocating symbol groups to terminals may be changed with time.

Figure 44:
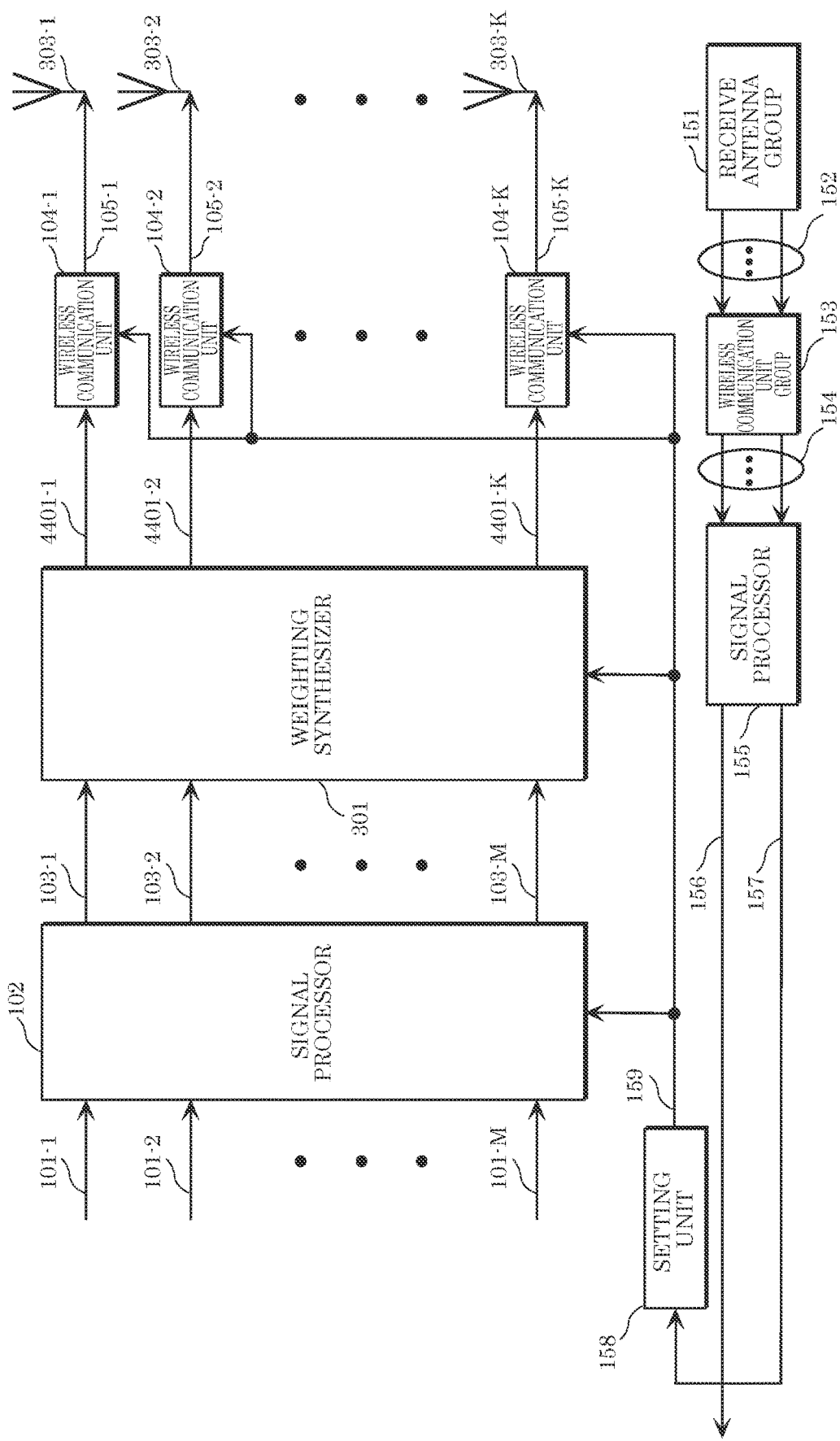
FIG. 44 illustrates an example of a configuration of the base station.

Further, different weighting synthesis may be performed for each carrier in the symbol areas for stream 1, the symbol areas for stream 2, the symbol areas for modulated signal 1, the symbol areas for modulated signal 2 in FIGS. 38, 39, 40, and 41, respectively, and a weighting-synthesis method may be determined for a unit of a plurality of carriers. As illustrated in FIGS. 43 and 44, a weighting synthesis parameter may be set for each allocated terminal. Setting of the weighting synthesis method for carriers is not limited to these examples.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 7

In this specification, the configurations of base stations 700 in FIGS. 7, 12, 17, 18, 19, 20, and 22 and the configurations of the base stations described in other embodiments may each be a configuration as illustrated in FIG. 44.

The following describes operation of the base station in FIG. 44. Elements which operate in the same manner as those in FIGS. 1 and 3 are assigned the same reference numerals in FIG. 44, and a description thereof is omitted.

Weighting synthesizer 301 receives inputs of signals 103_1, 103_2, ..., and 103_M obtained as a result of signal processing, and control signal 159, performs weighting synthesis on the signals based on control signal 159, and outputs weighting-synthesis signals 4401_1, 4401_2, ..., and 4401_K. Note that M is an integer of 2 or more, and K is an integer of 2 or more.

For example, if signal 103_i obtained as a result of the signal processing (i is an integer of 1 or more and M or less) is represented by ui(t) (t is time) and signal 4401_g (g is an integer of 1 or more and K or less) obtained as a result of the weighting synthesis is represented by vg(t), vg (t) can be represented by the following expression.

[Math. 7]

$$v_g(t) = Q_{g1} \times u_1(t) + Q_{g2} \times u_2(t) + \ldots + Q_{gM} \times u_M(t) \quad \text{Expression (7)}$$
$$= \sum_{j=1}^{M} Q_{gi} \times u_j(t)$$

Wireless communication unit 104_g receives inputs of signal 4401_g obtained as a result of the weighting synthesis and control signal 159, performs predetermined processing on the signal based on control signal 159, and generates and outputs transmission signal 105_g. Then, transmission signal 105_g is transmitted from antenna 303_1.

Note that the transmission method which the base station supports may be a multi-carrier method such as OFDM or a single carrier method. Furthermore, the base station may support both the multi-carrier method and the single carrier method. At this time, there are methods for generating modulated signals to be transmitted according to the single carrier method, and signals generated according to any of the methods can be transmitted Examples of the single carrier method include "discrete Fourier transform (DFT)-spread orthogonal frequency division multiplexing (OFDM)", "trajectory constrained DFT-spread OFDM", "OFDM based single carrier (SC)", "single carrier (SC)-frequency division multiple access (FIDMA)", and "guard interval DFT-spread OFDM".

Expression (7) is indicated by the function of time, yet Expression (7) may be a function of frequency in addition to time in the case of a multi-carrier method such as the OFDM method.

For example, according to the OFDM method, different weighting synthesis may be performed for each carrier, and a weighting-synthesis method may be determined for a unit of a plurality of carriers. Setting of the weighting synthesis method for carriers is not limited to these examples.

Supplementary Note 6

As a matter of course, the present disclosure may be carried out by combining a plurality of the exemplary embodiments and other contents such as supplementary notes described herein.

As the configuration of the base station, the examples of the configuration are not limited to those in FIGS. 1 and 3, and as long as the base station includes a plurality of transmission antennas and generates and transmits a plurality of transmission beams (transmission directivity beams), the present disclosure can be carried out with such a base station.

Moreover, the exemplary embodiments are mere examples. For example, while a "modulating method, an error correction coding method (an error correction code, a code length, a coding rate and the like to be used), control information and the like" are exemplified, it is possible to carry out the present disclosure with the same configuration even when other types of "a modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, APSK (such as 16APSK, 64APSK, 128APSK, 256APSK, 1024APSK, and 409GAPSK), PAM (such as 4PAM, 8PAM, 16PAM, 64PAM, 128PAM, 256PAM, 1024PAM and 4096PAM), PSK (such as BPSK, QPSK, 8PSK, 16PSK, 64PSK, 128PSK, 25GPSK, 1024PSK and 4096PSK), and QAM (such as 4QAM, 8QAM, 64QAM, 128QAM, 256QAM, 1024QAM and 4096QAM) may be applied, or in each modulating method, uniform mapping or non-uniform mapping may be performed. Moreover, a method for arranging signal points, such as 2 signal points, 4 signal points, 8 signal points, 16 signal points, 64 signal points, 128 signal points, 256 signal points, and 1024 signal points on an I-Q plane (a modulating method having signal points such as 2 signal points, 4 signal points, 8 signal points, 16 signal points, 64 signal points, 128 signal points, 256 signal points, and 1024 signal points) is not limited to a signal point arranging method of the modulating methods described herein.

Herein, it can be considered that communication/broadcast apparatuses, such as a broadcast station, a base station, an access point, a terminal, and a mobile phone, each include the transmitting device. In this case, it can be considered that communication apparatuses, such as a television, a radio, a terminal, a personal computer, a mobile phone, an access point, and a base station, each include the receiving device. Moreover, it can be also considered that each of the transmitting device and the receiving device according to the present disclosure is an apparatus having communication functions and has a form connectable via any interface to devices for running applications such as a television, a radio, a personal computer, and a mobile phone. Moreover, in the present exemplary embodiment, symbols other than data symbols, for example, pilot symbols (such as preambles, unique words, postambles, and reference symbols), and control information symbols may be arranged in frames in any way. Then, these symbols are named a pilot symbol and a control information symbol here, but may be named in any way, and a function itself is important.

Moreover, the pilot symbol only needs to be a known symbol modulated by using PSK modulation in a transmitting device and a receiving device. The receiving device performs frequency synchronization, time synchronization, channel estimation of each modulated signal (estimation of CSI (Channel State Information)), signal detection, and the like by using this symbol. Alternatively, the pilot symbol may allow the receiving device to learn a symbol transmitted by the transmitting device by establishing synchronization.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to the exemplary embodiments, and can be carried out with various modifications. For example, the case where the present disclosure is performed as a communication device is described in the exemplary embodiments. However, the present disclosure is not limited to this case, and this communication method can also be used as software.

Note that a program for executing the above-described communication method may be stored in a ROM in advance, and a CPU may be caused to operate this program.

Moreover, the program for executing the communication method may be stored in a computer-readable storage medium, the program stored in the recording medium may be recorded in a RAM of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated. Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Various frame configurations have been described herein. For example, the base station (AP) which includes the transmitting device in FIG. 1 transmits a modulated signal having a frame configuration described herein, using a multi-carrier method such as an OFDM method. At this time, it is conceivable to apply a method in which when a terminal (user) communicating with the base station (AP) transmits a modulated signal, the modulated signal may be transmitted by the terminal according to a single carrier method (the base station (AP) can simultaneously transmit data symbol groups to a plurality of terminals using the OFDM method, and the terminal can reduce power consumption by using a single carrier method).

A time division duplex (TDD) method in which a terminal transmits a modulation signal, using a portion of a frequency band used for a modulated signal transmitted by the base station (AP) may be applied.

The configuration of antenna units 106-1, 106-2, . . . , and 106-M in FIG. 1 is not limited to the configurations described in the embodiments. For example, antenna units 106-1, 106-2, and 106-M may not each include a plurality of antennas, and may not receive an input of signal 159.

The configuration of antenna units 401-1, 401-2, and 401-N in FIG. 4 is not limited to the configuration described in the embodiments. For example, antenna units 401-1, 401-2, and 401-N may not each include a plurality of antennas, and may not receive an input of signal 410.

Note that the transmission method which the base station and the terminals support may be a multi-carrier method such as OFDM or a single carrier method. Furthermore, the base station may support both the multi-carrier method and the single carrier method. At this time, there are methods for generating modulated signals according to the single carrier method, and signals generated according to any of the methods can be transmitted. Examples of the single carrier system include "discrete Fourier transform (DFT)-spread orthogonal frequency division multiplexing (OFDM)", "trajectory constrained DFT-spread OFDM", "OFDM based single carrier (SC)", and "single carrier (SC)-frequency division multiple access (FDMA)", and "guard interval DFT-spread OFDM".

Furthermore, at least multicast (broadcast) data is included in information #1 (101_1), information #2 (101_2), . . . , and information #M (101_M) in FIGS. 1, 3, and 44. For example, in FIG. 1, if information #1 (101_1) is data for multicasting, a plurality of streams or modulated signals that include such data are generated by signal processor 102, and output from an antenna.

In FIG. 3, if information #1 (101_1) is data for multicasting, a plurality of streams or modulated signals that include such data are generated by signal processor 102 and/or weighting synthesizer 301, and output from an antenna.

In FIG. 44, if information #1 (101_1) is data for multicasting, a plurality of streams or modulated signals that include such data are generated by signal processor 102 and/or weighting synthesizer 301, and output from an antenna.

Note that the states of the streams and modulated signals are as described with reference to FIGS. 7, 9, 12, 14, 17, 18, and 19.

Furthermore, information #1 (101_1), information #2 (101_2), . . . , and information #M (101_1) in FIGS. 1, 3, and 44 may include data addressed to individual terminals. With regard to this point, a description is as given in the embodiments in the specification.

Note that a configuration may be adopted in which at least one of a field programmable gate array (FPGA) and a central processing unit (CPU) can download the entirety of or a portion of software necessary to achieve the communication method described in the present disclosure by wireless communication or wire communication. Furthermore, the configuration may allow downloading the entirety of or a portion of software for update by wireless communication or wire communication. Then, the downloaded software may be stored into a storage, and at least one of an FPGA and a CPU may be operated based on the stored software, so that the digital signal processing described in the present disclosure may be performed.

At this time, a device that includes at least one of an FPGA and a CPU may be connected with a communication modem in a wireless or wired manner, and this device and the communication modem may achieve the communication method described in the present disclosure.

For example, the base station, an access point, and communication devices such as terminals described in this specification may each include at least one of an FPGA and a CPU, and the communication devices may each include an interface for receiving, from the outside, software for operating at least one of the FPGA and the CPU. Furthermore, the communication devices may include a storage for storing the software obtained from the outside, and cause the FPGA and the CPU to operate based on the stored software, thus achieving signal processing described in the present disclosure.

Hereinafter, an example of a communication system to which the wireless communication method that uses a plurality of antennas that is described in Embodiments 1 through 7 can be applied will be given. Each of the wireless communication methods that uses a plurality of antennas described in Embodiments 1 through 7 is merely one example of a wireless communication method that is applicable to the communication system to be described below. In other words, the wireless communication method used in the communication system to be described below may be one of the wireless communication methods described in Embodiments 1 through 7, and may be some other wireless communication method that uses a plurality of antennas. The wireless communication method used by the communication system to be described below may be a wireless communication method that uses a single antenna, and may be a communication method that performs communication using a device other than an antenna, such as an optical communication device, for example. Moreover, the transmitting device may employ a method in which one or more modulated signals are transmitted at the same frequency and time, and may employ a method in which one or more streams of a modulated signal are transmitted at the same frequency and time.

Embodiment 8

In the present embodiment, an example of a case in which data held by communication device #A is transmitted to a plurality of communication devices will be given.

Figure 45:
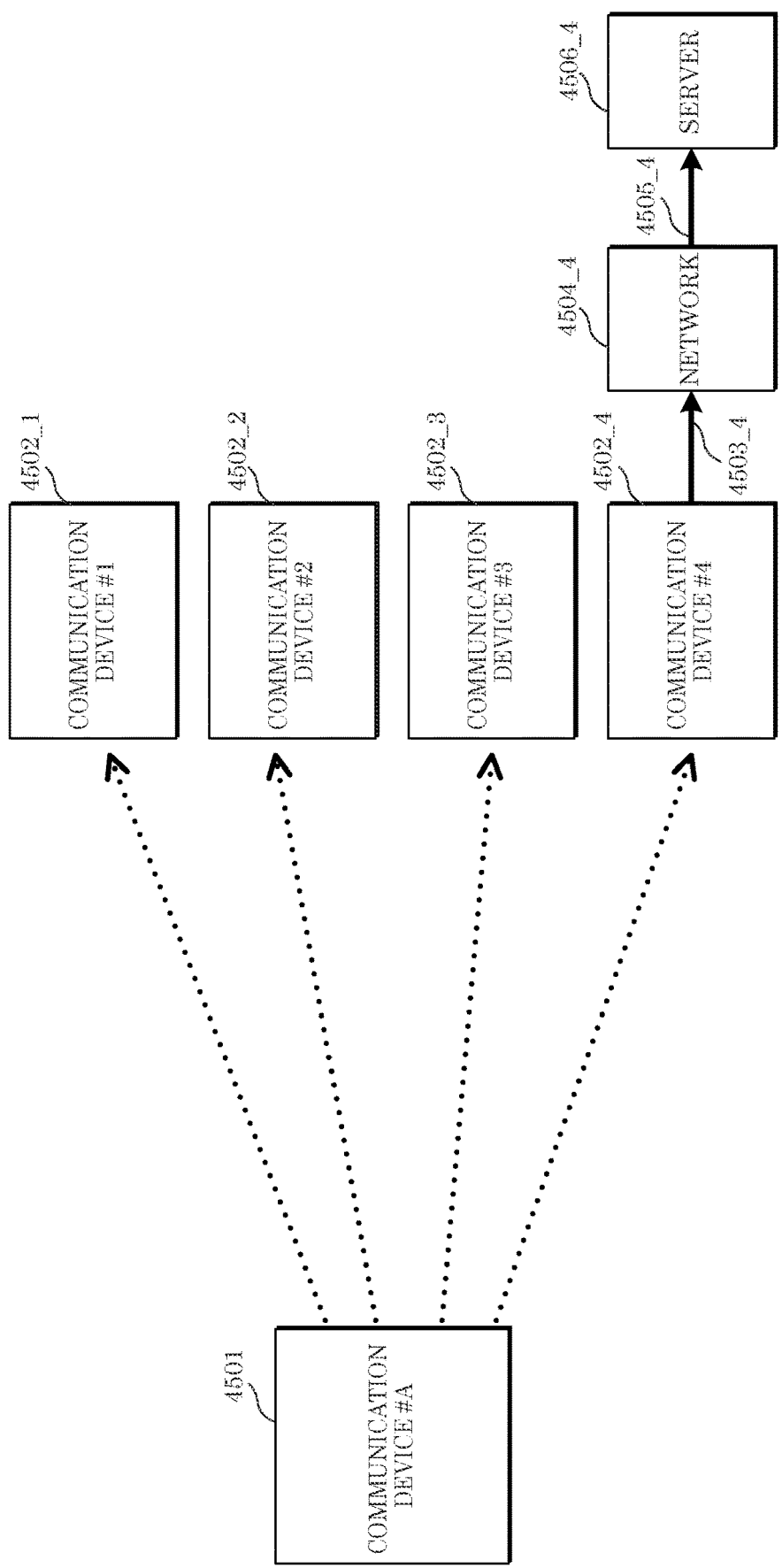
FIG. 45 illustrates an example of a case in which data held by a communication device is transmitted to a plurality of communication devices.

FIG. 45 illustrates an example of a case in which data held by communication device #A is transmitted to a plurality of communication devices. Communication device #A labeled as 4501, for example, accumulates a first file configured of first data in an accumulation unit, and communication device #A labeled as 4501 transmits the first data to communication device #1 labeled as 4502_1, communication device #2 labeled as 4502_2, communication device #3 labeled as 4502_3, and communication device #4 labeled as 4502_4.

Communication device #4 labeled as 4502_4 transmits the first data obtained from communication device #A labeled as 4501 to server 45064 via network 4503.

Next, operations performed by communication device #A labeled as 4501, communication device #1 labeled as 4502_1, communication device #2 labeled as 4502_2, communication device #3 labeled as 4502_3, and communication device #4 labeled as 4502_4 in FIG. 45 will be described in detail.

For example, communication device #A labeled as 4501 has the configuration illustrated in FIG. 1 (or FIG. 3 or FIG. 44). Communication device #1 labeled as 4502_1, communication device #2 labeled as 4502_2, communication device #3 labeled as 4502_3, and communication device #4 labeled as 4502A have, for example, the configuration illustrated in FIG. 4. Note that as operations performed by each element illustrated in FIG. 1 (FIG. 3, FIG. 44) and operations performed by each element illustrated in FIG. 4 have already been described, repeated description thereof will be omitted.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 4502_2, a signal obtained as a result of signal processing to be transmitted to communication device #3 labeled as 4502_3, and a signal obtained as a result of signal processing to be transmitted to communication device #4 labeled as 4502_4. In one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502_4 is labeled as 103-4.

Signal 103-1 obtained as a result of signal processing to be transmitted to communication device #1 labeled as 4502_1 is transmitted from antenna unit 106-1 as transmission signal 105-1 via wireless communication unit 104-1. Similarly, signal 103-2 obtained as a result of signal processing to be transmitted to communication device #2 labeled as 4502_2 is transmitted from antenna unit 106-2 as transmission signal 105-2 via wireless communication unit 104-2, signal 103-3 obtained as a result of signal processing to be transmitted to communication device #3 labeled as 4502_3 is transmitted from antenna unit 106-3 as transmission signal 105-3 via wireless communication unit 104-3, and signal 103-4 obtained as a result of signal processing to be transmitted to communication device #4 labeled as 45024 is transmitted from antenna unit 106-4 as transmission signal 105-4 via wireless communication unit 104-4.

Next, a method for setting the frequencies of transmission signals 105-1, 105-2, 105-3, and 105-4 at this time will be described with reference to FIG. 46.

Figure 46:
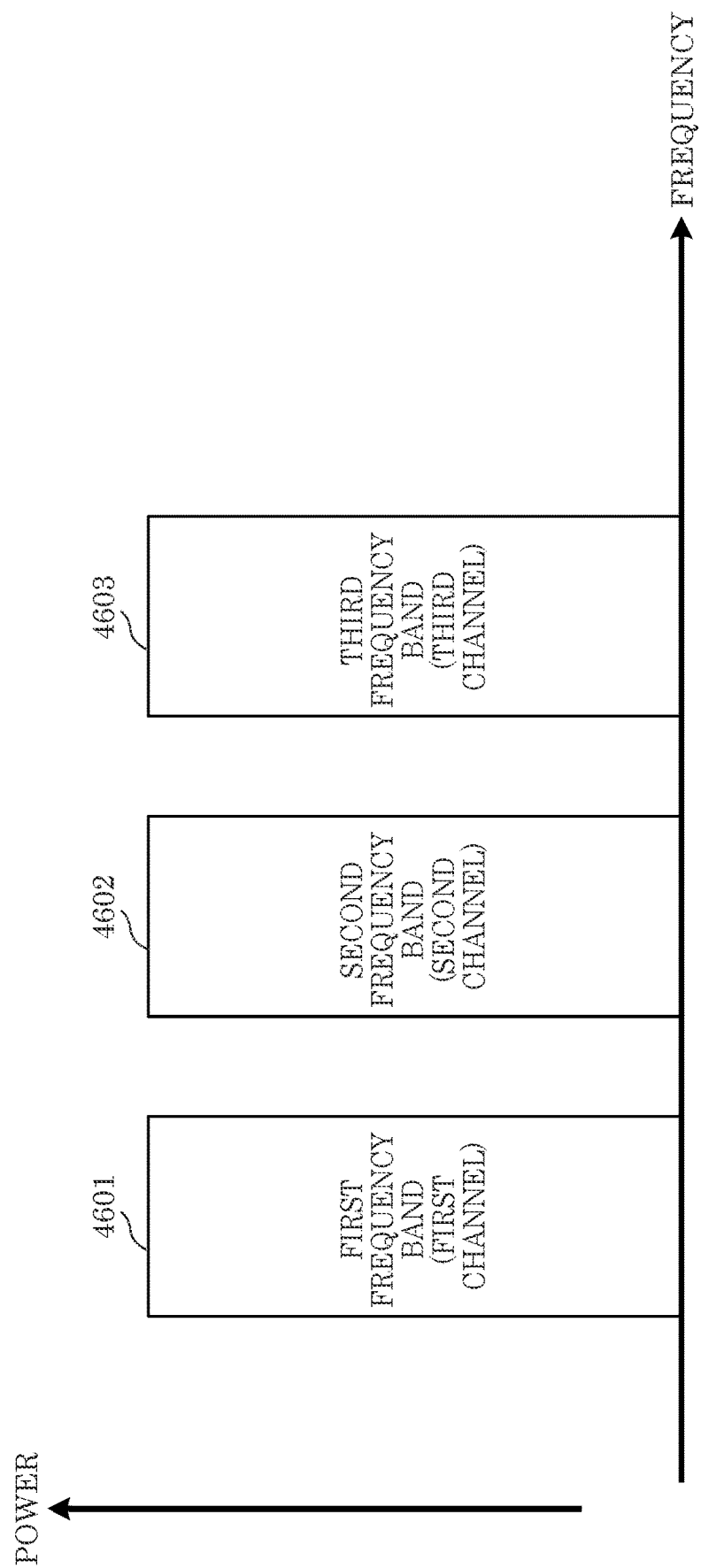
FIG. 46 illustrates one example of spectrums.

In FIG. 46, frequency is represented on the horizontal axis, and power is represented on the vertical axis. Transmission signals 105-1, 105-2, 105-3, and 105-4 are signals having any one of a spectrum including spectrum 4601 in a first frequency band (first channel), a spectrum including spectrum 4602 in a second frequency band (second channel), and a spectrum including spectrum 4603 in a third frequency band (third channel).

Specific examples will be given with reference to FIG. 47, FIG. 48, 49, and FIG. 50.

Figure 47:
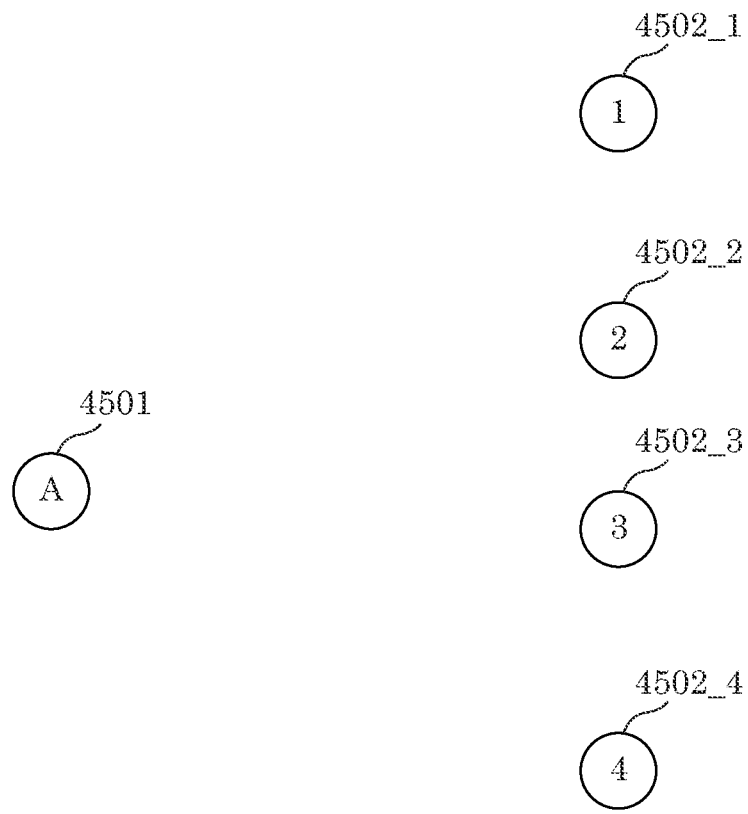
FIG. 47 illustrates one example of a positional relationship between communication devices.

FIG. 47 illustrates a positional relationship between communication device #A labeled as 4501, communication device #1 labeled as 4502 communication device #2 labeled as 4502_2, communication device #3 labeled as 45023, and communication device #4 labeled as 45024 illustrated in FIG. 45. Accordingly, the reference signs used in FIG. 45 are also used in FIG. 47.

With the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46. In this way, the frequency band used by the transmission signal to be transmitted to communication device #1 labeled as 4502_1, the frequency band used by the transmission signal to be transmitted to communication device #2 labeled as 4502_2, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

Figure 51:
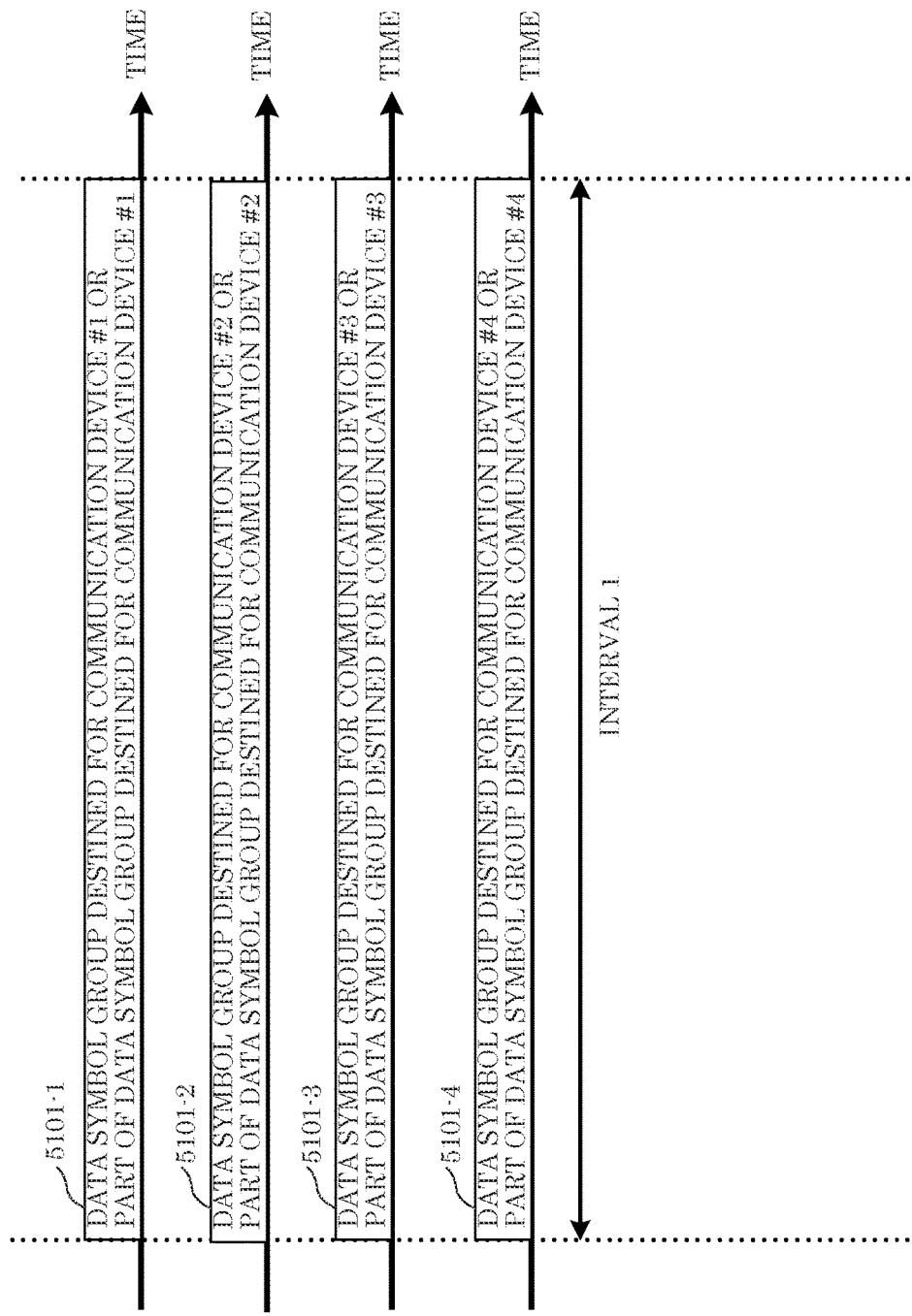
FIG. 51 illustrates one example of a frame configuration of a modulated signal transmitted by a communication device.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 45024.

Each of "data symbol group destined for communication device #1 labeled as 4502_—1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Figure 48:
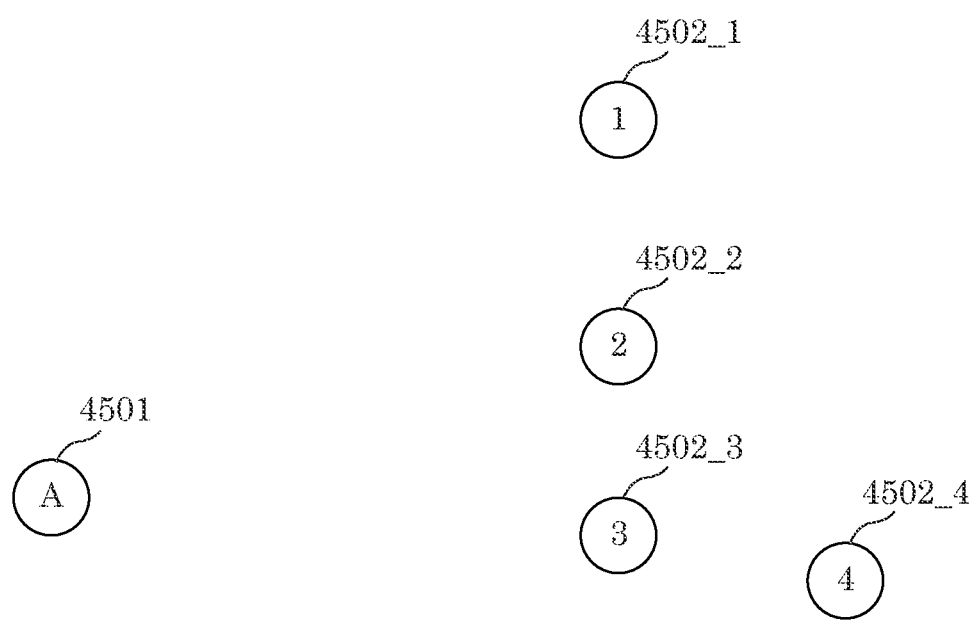
FIG. 48 illustrates another example of a positional relationship between communication devices.

FIG. 48 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4601 having the first frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4602 having the second frequency band that is illustrated in FIG. 46. At this time, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In 51, 5101-1 indicates a data symbol group destined for communication device #1 labeled as 4502_1 or part of a data symbol group destined for communication device #1 labeled as 45021, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 45023 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4602 having the second frequency band that is illustrated in FIG. 46.

Figure 49:
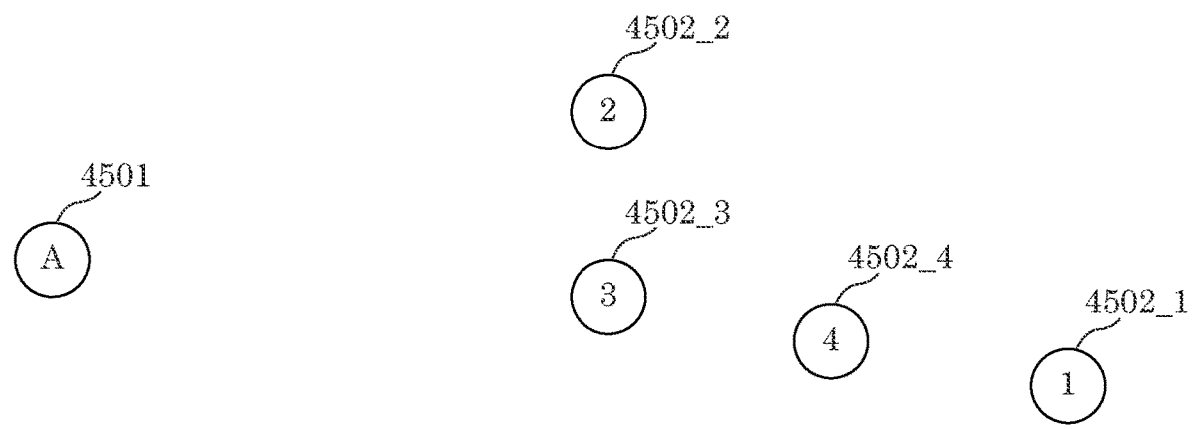
FIG. 49 illustrates another example of a positional relationship between communication devices.

FIG. 49 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502A, spectrum 4603 having the third frequency band that is illustrated in FIG. 46. At this time, the reason why the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 the same, communication device #1 labeled as 4502_1, communication device #3 labeled as 4502_3, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 45024 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4603 having the third frequency band that is illustrated in FIG. 46.

Figure 50:
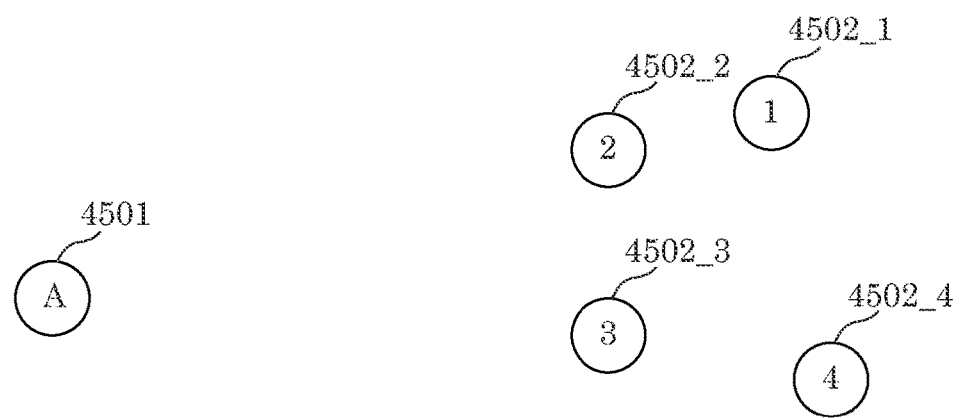
FIG. 50 illustrates another example of a positional relationship between communication devices.

FIG. 50 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. 45 are also used in FIG. 50.

With the example illustrated in FIG. 50, communication device #A labeled as 4501 uses, as the spectrum to be used by transmission signal 105-1 to be transmitted to communication device #1 labeled as 4502 spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4601 having the first frequency band that is illustrated in FIG. 46.

At this time, the reason why the frequency band used by transmission signal 105-1 to be transmitted to communication device #1 labeled as 4502_1 and the frequency band used by transmission signal 105-2 to be transmitted to communication device #2 labeled as 4502_2 are different is because when transmitting device #A labeled as 4501 tries to make the frequency band used by transmission signal 105-1 to be transmitted to communication device #1 labeled as 4502_1 and the frequency band used by transmission signal 105-2 to be transmitted to communication device #2 labeled as 4502_2 the same, communication device #1 labeled as 4502_1 and communication device #2 labeled as 4502_2 have difficulty in splitting the beam whereby interference increases, which results in a reduction in data reception quality.

Similarly, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 45024 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_—2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46.

Moreover, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Furthermore, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Note that communication device #1 labeled as 4502_1, communication device #2 labeled as 4502_2, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

As described above, when transmitting the same data to a plurality of communication devices, by employing any one of: (1) using a plurality of beams and a plurality of frequency bands; (2) using a plurality of beams and a specific frequency band; (3) using a specific beam and a plurality of frequency bands, it is possible to achieve high data reception quality and achieve the advantageous effect that a high frequency usage efficiency can be achieved.

Next, a case in which communication device #A labeled as 4501 has, for example, the configuration illustrated in FIG. 3, and communication device #1 labeled as 4502_1, communication device #2 labeled as 4502_2, communication device #3 labeled as 4502_3, and communication device #4 labeled as 4502_4 have, for example, the configuration illustrated in FIG. 4 will be described.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method. (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 4502_2, a signal obtained as a result of signal processing to be transmitted to communication device #3 labeled as 4502_3, and a signal obtained as a result of signal processing to be transmitted to communication device #4 labeled as 4502_4, in one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502_4 is labeled as 103-4.

Wireless communication unit 104-1 receives an input of signal 103-1 obtained as a result of signal processing to be transmitted to communication device #1 labeled as 4502_1, and outputs transmission signal 105-1. Similarly, wireless communication unit 104-2 receives an input of signal 103-2 obtained as a result of signal processing to be transmitted to communication device #2 labeled as 4502_2, and outputs transmission signal 105-2. Wireless communication unit 104-3 receives an input of signal 103-3 obtained as a result of signal processing to be transmitted to communication device #3 labeled as 4502_3, and outputs transmission signal 105-3. Wireless communication unit 104-4 receives an input of signal 103-4 obtained as a result of signal processing to be transmitted to communication device #4 labeled as 4502_4, and outputs transmission signal 105-4.

Weighting synthesizer 301 receives inputs of at least transmission signal 105-1, transmission signal 105-2, transmission signal 105-3, and transmission signal 105-4, performs weighting synthesis calculation, and outputs signals 302-1, 302-2, . . . , and 302-K obtained as a result of the weighting synthesis, and signals 302-1, 302-2, . . . , and 302-K obtained as a result of the weighting synthesis are then output as radio waves from antennas 303-1, 303-2, . . . , and 303-K. Accordingly, transmission signal 105-1 is transmitted using one or more antennas from among antennas 303-1, 303-2, and 303-K. Similarly, transmission signal 105-2 is transmitted using one or more antennas from among antennas 303-1, 303-2, . . . , and 303-K, transmission signal 105-3 is transmitted using one or more antennas from among antennas 303-1, 303-2, . . . , and 303-K, and transmission signal 105-4 is transmitted using one or more antennas from among antennas 303-1, 303-2, and 303-K.

Note that each of antennas 303-1, 303-2, . . . , and 303-K may have the configuration illustrated in FIG. 2.

Next, the method of setting the frequencies of transmission signals 105-1, 105-2, 105-3, and 105-4 at this time will be described with reference to FIG. 46.

In FIG. 46, frequency is represented on the horizontal axis, and power is represented on the vertical axis. Transmission signals 105-1, 105-2, 105-3, and 105-4 are signals having any one of a spectrum including spectrum 4601 in a first frequency band (first channel), a spectrum including spectrum 4602 in a second frequency band (second channel), and a spectrum including spectrum 4603 in a third frequency band (third channel).

Specific examples will be given with reference to FIG. 47, FIG. 43, 49, and FIG. 50.

FIG. 47 illustrates a positional relationship between communication device #A labeled as 4501, communication device #1 labeled as 4502 communication device #2 labeled as 4502_2, communication device #3 labeled as 45023, and communication device #4 labeled as 4502_4 illustrated in FIG. 45. Accordingly, the reference signs used in FIG. 45 are also used in FIG. 47.

With the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46. In this way, the frequency band used by the transmission signal to be transmitted to communication device #1 labeled as 4502_1, the frequency band used by the transmission signal to be transmitted to communication device #2 labeled as 4502_—2, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 45024.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

FIG. 48 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4601 having the first frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4602 having the second frequency band that is illustrated in FIG. 46. At this time, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting time beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4601 having the first frequency band that is illustrated in FIG. 46, can use, as the spectrum to be used by transmission signal 105-3 to be transmitted to communication device #3 labeled as 4502_3, spectrum 4601 having the first frequency band that is illustrated in FIG. 46, and can use, as the spectrum to be used by transmission signal 105-4 to be transmitted to communication device #4 labeled as 4502_4, spectrum 4602 having the second frequency band that is illustrated in FIG. 46.

FIG. 49 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46. At this time, the reason why the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-1 to be transmitted to communication device #1 labeled as 4502_1, the frequency band used by transmission signal 105-3 to be transmitted to communication device #3 labeled as 4502_3 and the frequency band used by transmission signal 105-4 to be transmitted to communication device #4 labeled as 4502_4 the same, communication device #1 labeled as 4502_1, communication device #3 labeled as 4502_3, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 1502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502_1, spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4603 having the third frequency band that is illustrated in FIG. 46.

FIG. 50 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. 45 are also used in FIG. 50.

With the example illustrated in FIG. 50, communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4601 having the first frequency band that is illustrated in FIG. 46.

At this time, the reason why the frequency band used by transmission signal 105-1 to be transmitted to communication device #1 labeled as 4502_1 and the frequency band used by transmission signal 105-2 to be transmitted to communication device #2 labeled as 4502_2 are different is because when transmitting device #A labeled as 4501 tries to make the frequency band used by transmission signal 105-1 to be transmitted to communication device #1 labeled as 4502_1 and the frequency band used by transmission signal 105-2 to be transmitted to communication device #2 labeled as 45022 the same, communication device #1 labeled as 4502_1 and communication device #2 labeled as 4502_2 have difficulty in splitting the beam whereby interference increases, which results in a reduction in data reception quality.

Similarly, the reason why the frequency band used by transmission signal 105-3 to be transmitted to communication device #3 labeled as 4502_3 and the frequency band used by transmission signal 105-4 to be transmitted to communication device #4 labeled as 4502_4 are different is because when transmitting device #A labeled as 4501 tries to make the frequency band used by transmission signal 105-3 to be transmitted to communication device #3 labeled as 4502_3 and the frequency band used by transmission signal 105-4 to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of transmission signal 105-1 to be transmitted to communication device #1 labeled as 4502_1, transmission signal 105-2 to be transmitted to communication device #2 labeled as 4502_2, transmission signal 105-3 to be transmitted to communication device #3 labeled as 4502_3, and transmission signal 105-4 to be transmitted to communication device #4 labeled as 45024 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even in the example illustrated in FIG. 47, communication device #A labeled as 4501 can use, as the spectrum to be used by transmission signal 105-1 to be transmitted to communication device #1 labeled as 4502 spectrum 4601 having the first frequency band that is illustrated in FIG. 46, can use, as the spectrum to be used by transmission signal 105-2 to be transmitted to communication device #2 labeled as 4502_2, spectrum 4602 having the second frequency band that is illustrated in FIG. 46, can use, as the spectrum to be used by transmission signal 105-3 to be transmitted to communication device #3 labeled as 4502_3, spectrum 4602 having the second frequency band that is illustrated in FIG. 46, and can use, as the spectrum to be used by transmission signal 105-4 to be transmitted to communication device #4 labeled as 4502_4, spectrum 4601 having the first frequency band that is illustrated in FIG. 46.

Moreover, with the example illustrated in FIG. 50, even when communication device #A labeled as 4501 uses, as the spectrum to be used by transmission signal 105-1 to be transmitted to communication device #1 labeled as 4502-1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that, is illustrated in FIG. 46, uses, as the spectrum to be used by transmission signal 105-3 to be transmitted to communication device #3 labeled as 4502_3, spectrum 4602 having the second frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Furthermore, with the example illustrated in FIG. 50, even when communication device #A labeled as 4501 uses, as the spectrum to be used by transmission signal 105-1 to be transmitted to communication device #1 labeled as 4502_1, spectrum 4601 having the first frequency band that is illustrated in FIG. 46, uses, as the spectrum to be used by transmission signal 105-2 to be transmitted to communication device #2 labeled as 4502_2, spectrum 4602 having the second frequency band that is illustrated in FIG. 46, uses, as the spectrum to be used by transmission signal 105-3 to be transmitted to communication device #3 labeled as 4502_3, spectrum 4601 having the first frequency band that is illustrated in FIG. 46, and uses, as the spectrum to be used by transmission signal 105-4 to be transmitted to communication device #4 labeled as 4502_4, spectrum 4603 having the third frequency band that is illustrated in FIG. 46, the advantageous effect that the frequency usage efficiency can be improved while ensuring high data reception quality can be achieved.

Note that communication device #1 labeled as 4502_1, communication device #2 labeled as 4502_2, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

Next, a case in which communication device #A labeled as 4501 has, for example, the configuration illustrated in FIG. 4, and communication device #1 labeled as 4502_1, communication device #2 labeled as 4502_2, communication device #3 labeled as 4502_3, and communication device #4 labeled as 4502_4 have, for example, the configuration illustrated in FIG. 44 will be described.

Signal processor 102 included in communication device #A labeled as 4501 receives inputs of information 101-1 including first data, and control signal 159, and signal processing is performed based on "information on a method of error correction coding (a coding rate, a code length (block length))", "information on a modulation method", and "a transmitting method (multiplexing method)", etc., that are included in control signal 159.

At this time, signal processor 102 generates, based on information 101-1 including first data, a signal obtained as a result of signal processing to be transmitted to communication device #1 labeled as 4502_1, a signal obtained as a result of signal processing to be transmitted to communication device #2 labeled as 4502_2, a signal obtained as a result of signal processing to be transmitted to communication device #3 labeled as 4502_3, and a signal obtained as a result of signal processing to be transmitted to communication device #4 labeled as 4502_4. In one example, the signal obtained as a result of signal processing to be transmitted to communication device #1 labeled as 4502_1 is labeled as 103-1, the signal obtained as a result of signal processing to be transmitted to communication device #2 labeled as 4502_2 is labeled as 103-2, the signal obtained as a result of signal processing to be transmitted to communication device #3 labeled as 4502_3 is labeled as 103-3, and the signal obtained as a result of signal processing to be transmitted to communication device #4 labeled as 4502A is labeled as 103-4.

Weighting synthesizer 301 receives inputs of at least signal 103-1 obtained as a result of signal processing, signal 103-2 obtained as a result of signal processing, signal 103-3 obtained as a result of signal processing, and signal 103-4 obtained as a result of signal processing, performs weighting synthesis calculation, and outputs signals 4402-1, 4402-2, and 4402-K obtained as a result of the weighting synthesis. Accordingly, signal 103-1 obtained as a result of signal processing is transmitted using one or more antennas from among antennas 303-1, 303-2, . . . , and 303-K. Similarly, signal 103-2 obtained as a result of signal processing is transmitted using one or more antennas from among antennas 303-1, 303-2, . . . , and 303-K, signal 103-3 obtained as a result of signal processing is transmitted using one or more antennas from among antennas 303-1, 303-2, . . . , and 303-K, and signal 103-4 obtained as a result of signal processing is transmitted using one or more antennas from among antennas 303-1, 303-2, . . . , and 303-K.

Note that each of antennas 303-1, 303-2, and 303-K may have the configuration illustrated in FIG. 2.

Next, the method of setting the frequencies of signals 103-1, 103-2, 103-3, and 103-4 obtained as a result of signal processing at this time will be described with reference to FIG. 46.

In FIG. 46, frequency is represented on the horizontal axis, and power is represented on the vertical axis. Signals 103-1, 103-2, 103-3, and 103-4 obtained as a result of signal processing are, after frequency conversion, signals having any one of a spectrum including spectrum 4601 in a first frequency band (first channel), a spectrum including spectrum 4602 in a second frequency band (second channel), and a spectrum including spectrum 4603 in a third frequency band (third channel).

Note that, for example, when a transmitting device having the configuration in FIG. 1 or FIG. 3 generates a modulated signal of first frequency band 4601, a modulated signal of second frequency band 4602, and a modulated signal of third frequency band 4603, in the antenna units in FIG. 1 and the weighting synthesizer in FIG. 3 and FIG. 44, settings may be configured so that the directivity of the modulated signal of first frequency band 4601 and the directivity of the modulated signal of second frequency band 4602 are different. Similarly, in the antenna units in FIG. 1 and the weighting synthesizer in FIG. 3 and FIG. 44, settings may be configured so that the directivity of the modulated signal of first frequency band 4601 and the directivity of the modulated signal of third frequency band 4603 are different. Moreover, in the antenna units in FIG. 1 and the weighting synthesizer in FIG. 3 and FIG. 44, settings may be configured so that the directivity of the modulated signal of second frequency band 4602 and the directivity of the modulated signal of third frequency band 4603 are different.

Specific examples will be given with reference to FIG. 47, FIG. 48, FIG. 49, and FIG. 50.

FIG. 47 illustrates a positional relationship between communication device #A labeled as 4501, communication device #1 labeled as 4502_1, communication device #2 labeled as 45022, communication device #3 labeled as 4502_3, and communication device #4 labeled as 4502_4 illustrated in FIG. 45. Accordingly, the reference signs used in FIG. 45 are also used in FIG. 47.

With the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4601 of the first frequency band illustrated in FIG. 46 as the spectrum to be used, after frequency conversion, by signal 1032 obtained as a result of signal processing that is to be transmitted to communication device #2 labeled as 4502_2, can use spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and can use spectrum 4601 of the first frequency band illustrated in FIG. 46 as the spectrum to be used, after frequency conversion, by signal 103-4 obtained as a result of signal processing that is to be transmitted to communication device #4 labeled as 4502_4. In this way, the frequency band used by the transmission signal to be transmitted to communication device #1 labeled as 4502_1, the frequency band used by the transmission signal to be transmitted to communication device #2 labeled as 4502_2, the frequency band used by the transmission signal to be transmitted to communication device #3 labeled as 4502_3, and the frequency band used by the transmission signal to be transmitted to communication device #4 labeled as 4502_4 can be set to the same frequency band. This achieves the advantageous effect that the frequency usage efficiency can be improved.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_—2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

FIG. 48 illustrates a positional relationship between communication device #A labeled as 4501, communication device #1 labeled as 4502_1, communication device #2 labeled as 4502_2, communication device #3 labeled as 4502_3, and communication device #4 labeled as 4502_4 illustrated in FIG. 45 that differs from the example illustrated in FIG. 47. Accordingly, the reference signs used in FIG. 45 are also used in FIG. 48.

With the example illustrated in FIG. 48, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4601 of the first frequency band illustrated in FIG. 46 as the spectrum to be used, after frequency conversion, by signal 103-2 obtained as a result of signal processing that is to be transmitted to communication device #2 labeled as 4502_2, uses spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and uses spectrum 4602 of the second frequency band illustrated in FIG. 46 as the spectrum to be used, after frequency conversion, by signal 103-4 obtained as a result of signal processing that is to be transmitted to communication device #4 labeled as 4502_4. At this time, the reason why the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4601 of the first frequency band illustrated in FIG. 46 as the spectrum to be used, after frequency conversion, by signal 103-2 obtained as a result of signal processing that is to be transmitted to communication device #2 labeled as 4502_2 can use spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and can use spectrum 4602 of the second frequency band illustrated in FIG. 46 as the spectrum to be used, after frequency conversion, by signal 103-4 obtained as a result of signal processing that is to be transmitted to communication device #4 labeled as 4502_4.

FIG. 49 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47 and FIG. 48. Accordingly, the reference signs used in FIG. 45 are also used in FIG. 49.

With the example illustrated in FIG. 49, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4. At this time, the reason why the frequency band used by signal 103-1 obtained as a result of signal processing that is to be transmitted to communication device #1 labeled as 4502_1, the frequency band used, after frequency conversion, by transmission signal 105-3 that is to be transmitted to communication device #3 labeled as 4502_3, and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-1 obtained as a result of signal processing that is to be transmitted to communication device #1 labeled as 4502_1, the frequency band used, after frequency conversion, by signal 103-3 obtained as a result of signal processing that is to be transmitted to communication device #3 labeled as 4502_3, and the frequency band used, after frequency conversion, by signal 103-4 obtained as a result of signal processing that is to be transmitted to communication device #4 labeled as 4502_4 the same, communication device #1 labeled as 4502_1, communication device #3 labeled as 4502_3, and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 4502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4602 of the second frequency band illustrated in FIG. 46 as the spectrum to be used, after frequency conversion, by signal 103-2 obtained as a result of signal processing that is to be transmitted to communication device #2 labeled as 4502_2, can use spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and can use spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

FIG. 50 illustrates a positional relationship of communication device #A labeled as 4501, communication device #1 labeled as 4502_1, communication device #2 labeled as 4502_2, communication device #3 labeled as 4502_3, and communication device #4 labeled as 4502_4 that are illustrated in FIG. 45, that differs from the examples illustrated in FIG. 47, FIG. 48, and FIG. 49. Accordingly, the reference signs used in FIG. 45 are also used in FIG. 50.

With the example illustrated in FIG. 50, communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4601 of the first frequency band illustrated in FIG. 46 as the spectrum to be used, after frequency conversion, by signal 103-4 obtained as a result of signal processing that is to be transmitted to communication device #4 labeled as 4502_4.

At this time, the reason why the frequency band used, after frequency conversion, by signal 103-1 obtained as a result of signal processing that is to be transmitted to communication device #1 labeled as 4502_1 and the frequency band used, after frequency conversion, by signal 103-2 obtained as a result of signal processing that is to be transmitted to communication device #2 labeled as 4502_2 are different is because when transmitting device #A labeled as 4501 tries to make the frequency band used, after frequency conversion, by signal 103-1 obtained as a result of signal processing that is to be transmitted to communication device #1 labeled as 4502_1 and the frequency band used, after frequency conversion, by signal 103-2 obtained as a result of signal processing that is to be transmitted to communication device #2 labeled as 4502_2 the same, communication device #1 labeled as 4502_1 and communication device #2 labeled as 4502_2 have difficulty in splitting the beam whereby interference increases, which results in a reduction in data reception quality.

Similarly, the reason why the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that is to be transmitted to communication device #4 labeled as 4502_4 are different is because when transmitting device #A labeled as 4501 tries to make the frequency band used, after frequency conversion, by signal 103-3 obtained as a result of signal processing that is to be transmitted to communication device #3 labeled as 4502_3 and the frequency band used, after frequency conversion, by signal 103-4 obtained as a result of signal processing that, is to be transmitted to communication device #4 labeled as 4502_4 the same, communication device #3 labeled as 4502_3 and communication device #4 labeled as 4502_4 have difficulty in splitting the beam whereby interference increases, which results in a reduction in data reception quality.

This achieves the advantageous effect that the frequency usage efficiency can be improved while ensuring high data reception quality.

Next, the temporal presence of signal 103-1 obtained as a result of signal processing that is to be transmitted to communication device #1 labeled as 4502_1, signal 103-2 obtained as a result of signal processing that is to be transmitted to communication device #2 labeled as 4502_2, signal 103-3 obtained as a result of signal processing that is to be transmitted to communication device #3 labeled as 4502_3, and signal 103-4 obtained as a result of signal processing that is to be transmitted to communication device #4 labeled as 4502_4 will be described.

FIG. 51 illustrates one example of a frame configuration of a modulated signal transmitted by communication device A labeled as 4501, and is an example of symbol arrangement on the horizontal axis indicating time. In FIG. 51, 5101-1 indicates a data symbol group destined for communication device #1 labeled as 4502_1 or part of a data symbol group destined for communication device #1 labeled as 4502_1, 5101-2 indicates a data symbol group destined for communication device #2 labeled as 4502_2 or part of a data symbol group destined for communication device #2 labeled as 4502_2, 5101-3 indicates a data symbol group destined for communication device #3 labeled as 4502_3 or part of a data symbol group destined for communication device #3 labeled as 4502_3, and 5101-4 indicates a data symbol group destined for communication device #4 labeled as 4502_4 or part of a data symbol group destined for communication device #4 labeled as 4502_4.

Each of "data symbol group destined for communication device #1 labeled as 4502_1 or part of a data symbol group destined for communication device #1 labeled as 4502_1" 5101_1, "data symbol group destined for communication device #2 labeled as 4502_2 or part of a data symbol group destined for communication device #2 labeled as 4502_2" 5101-2, "data symbol group destined for communication device #3 labeled as 4502_3 or part of a data symbol group destined for communication device #3 labeled as 1502_3" 5101_3, and "data symbol group destined for communication device #4 labeled as 4502_4 or part of a data symbol group destined for communication device #4 labeled as 4502_4" 5101_4 is present in time interval 1.

Note that even with the example illustrated in FIG. 47, communication device #A labeled as 4501 can use spectrum 4601 of the first frequency band illustrated in FIG. 46 as the spectrum to be used, after frequency conversion, by signal 103-1 obtained as a result of signal processing that is to be transmitted to communication device #1 labeled as 4502_1, can use spectrum 4602 of the second frequency band illustrated in FIG. 46 as the spectrum to be used, after frequency conversion, by signal 103-2 obtained as a result of signal processing that is to be transmitted to communication device #2 labeled as 4502_2, can use spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and can use spectrum 4601 of the first frequency band illustrated in FIG. 46 as the spectrum to be used, after frequency conversion, by signal 103-4 obtained as a result of signal processing that is to be transmitted to communication device #4 labeled as 4502_4.

Moreover, with the example illustrated in FIG. 50, even when communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4602 of the second frequency band illustrated in FIG. 46 as the spectrum to be used, after frequency conversion, by signal 103-3 obtained as a result of signal processing that is to be transmitted to communication device #3 labeled as 4502_3, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

Furthermore, with the example illustrated in FIG. 50, even when communication device #A labeled as 4501 uses spectrum 4601 of the first frequency band illustrated in FIG. 46 as the spectrum to be used, after frequency conversion, by signal 103-1 obtained as a result of signal processing that is to be transmitted to communication device #1 labeled as 4502_1, uses spectrum 4602 of the second frequency band illustrated in FIG. 46 as the spectrum to be used, after frequency conversion, by signal 103-2 obtained as a result of signal processing that is to be transmitted to communication device #2 labeled as 4502_2, uses spectrum 4601 of the first frequency band illustrated in FIG. 46 as the spectrum to be used, after frequency conversion, by signal 103-3 obtained as a result of signal processing that is to be transmitted to communication device #3 labeled as 4502_3, and uses spectrum 4603 of the third frequency band illustrated in FIG. 46 as the spectrum to be used, after frequency conversion, by signal 103-4 obtained as a result of signal processing that is to be transmitted to communication device #4 labeled as 4502_4.

Note that communication device #1 labeled as 4502_1, communication device #2 labeled as 4502_2, communication device #3 labeled as 4502_3, and communication device #4 labeled as 4502_4 have, for example, the configuration illustrated in FIG. 4, receive a desired signal, and obtain desired data by causing the reception part in FIG. 4 to operate.

In the present embodiment, when the modulation method and the error correction coding method for generating "data symbol group destined for communication device #1 labeled as 4502_1 or part of a data symbol group destined for communication device #1 labeled as 4502_1." 5101_1, the modulation method and the error correction coding method for generating "data symbol group destined for communication device #2 labeled as 4502_2 or part of a data symbol group destined for communication device #2 labeled as 4502_2" 5101-2, the modulation method and the error correction coding method for generating "data symbol group destined for communication device #3 labeled as 4502_3 or part of a data symbol group destined for communication device #3 labeled as 4502_3" 5101_3, and the modulation method and the error correction coding method for generating "data symbol group destined for communication device #4 labeled as 4502_4 or part of a data symbol group destined for communication device #4 labeled as 4502_4" 5101_4 in FIG. 51 are the same modulation method and error correction coding method, and the frequency band used for each channel is the same, it is possible to achieve the advantageous effect that the time it takes to transmit these data symbol groups can be shortened. Moreover, it is possible to achieve the advantageous effect that these data symbol groups can be transmitted in synchronization (the transmission start time and transmission end time of these data symbol groups can be made to be the same). Note that it is possible to use different modulation methods or error correction coding methods for the data symbol groups.

Moreover, the present embodiment describes a case in which communication device #A labeled as 4501 transmits modulated signals including first data to communication device #1 labeled as 4502_1, communication device #2 labeled as 4502_2, communication device #3 labeled as 4502_3, and communication device #4 labeled as 4502_4, but communication device #A labeled as 4501 may transmit a modulated signal including first data to a single communication device.

Figure 52:
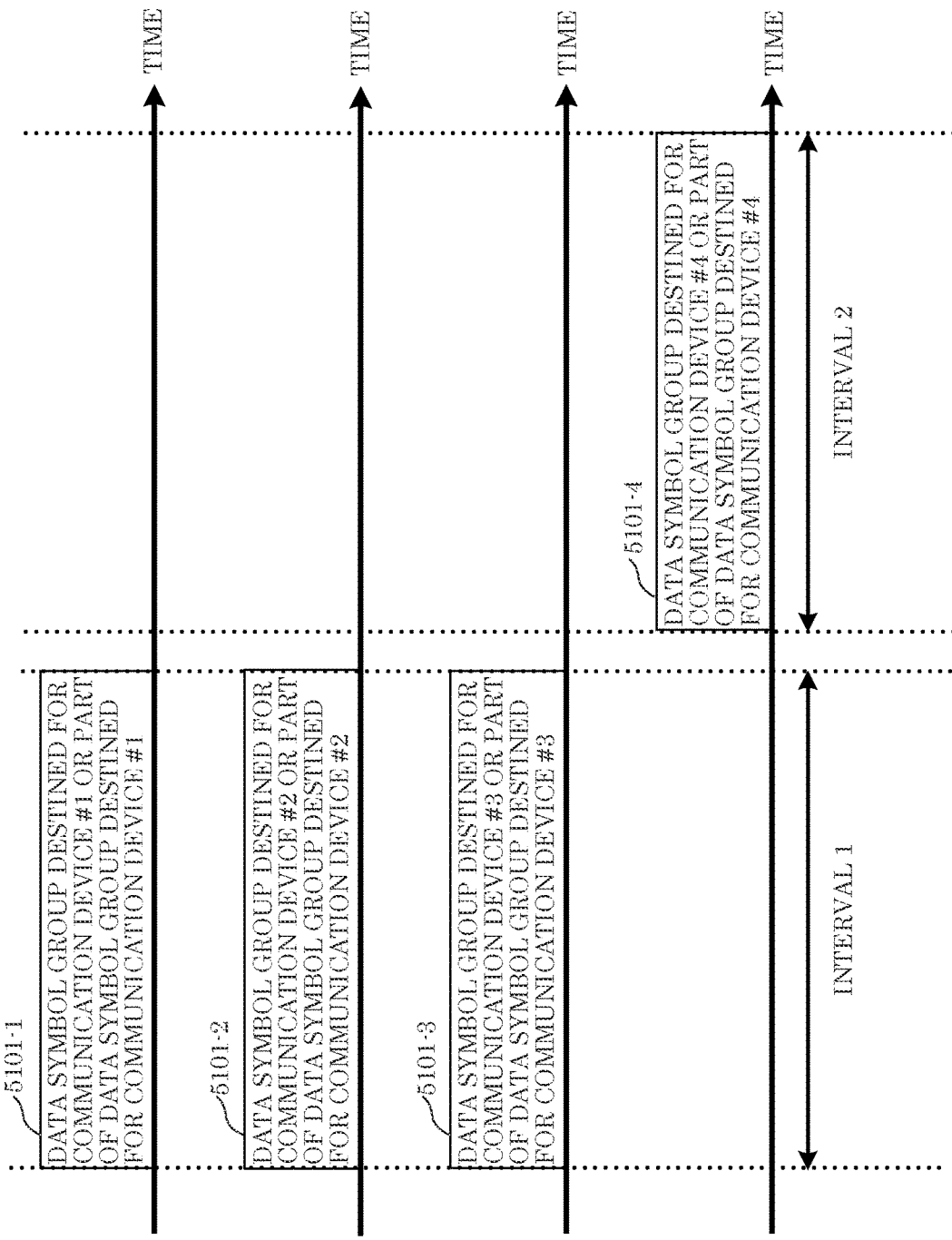
FIG. 52 illustrates another example of a frame configuration of a modulated signal transmitted by a communication device.

For example, time sharing may be used, like in FIG. 52. Note that in FIG. 52, elements that are the same as those in FIG. 51 share like reference signs, and time is represented on the horizontal axis. As illustrated in FIG. 52, 5101-1 indicating a data symbol group destined for communication device #1 or part of a data symbol group destined for communication device #1, 5101-2 indicating a data symbol group destined for communication device #2 or part of a data symbol group destined for communication device #2, and 5101-3 indicating a data symbol group destined for communication device #3 or part of a data symbol group destined for communication device #3 are transmitted by communication device #A labeled as 4501 using interval 1, and 5101-4 indicating a data symbol group destined for communication device #4 or part of a data symbol group destined for communication device #4 is transmitted by communication device #A labeled as 4501 using interval 2.

When, for example, communication device #A labeled as 4501, communication device #1 labeled as 4502_1, communication device #2 labeled as 4502_2, communication device #3 labeled as 4502_3, and communication device #4 labeled as 4502_4 have a positional relationship like that illustrated in FIG. 49, upon communication device #A labeled as 4501 transmitting a data symbol to communication device #4 labeled as 4502_4, the data symbol is transmitted using interval 2 like illustrated in FIG. 52, and upon communication device #A labeled as 4501 transmitting a data symbol to communication device #1 labeled as 4502_1, communication device #2 labeled as 4502_2, and communication device #3 labeled as 4502_3, the data symbol is transmitted using interval 1 like illustrated in FIG. 52. Note that the method of using a frequency band upon transmitting the data symbol group or part of the data symbol group for communication device #1 labeled as 4502_1, the data symbol group or part of the data symbol group for communication device #2 labeled as 4502_2, and the data symbol group or part of the data symbol group for communication device #3 labeled as 4502_3 may be the same as performed in the description made with reference to FIG. 49.

In this way, it is possible to achieve the above-described advantageous effect even when data symbols are transmitted using time sharing.

Note that in the present embodiment, a device is referred to as "server" (4506_4), but even if this device is a communication device rather than a server, the present embodiment can still be carried out in the same manner.

Moreover, the wireless communication between communication device #labeled as 4501 and communication device #1 labeled as 4502_1, the wireless communication between communication device #A labeled as 4501 and communication device #2 labeled as 4502_2, the wireless communication between communication device #A labeled as 4501 and communication device #3 labeled as 4502_3, and the wireless communication between communication device #A labeled as 4501 communication device #4 labeled as 4502_4 described in the present embodiment may be carried out via MIMO transmission like described in other embodiments, that is to say, a plurality of transmit antennas and a plurality of receive antennas (a single receive antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Embodiment 9

In the present embodiment, a specific example of communication between communication device #A labeled as 4501 and communication device #4 labeled as 4502_4 illustrated in FIG. 45 described in Embodiment 8 will be given.

As illustrated in FIG. 45, communication device #4 labeled as 4502_4 can communicate over a wired connection to a network.

For example, assume the maximum data transmission speed when communication device #A labeled as 4501 transfers data to communication device #4 labeled as 4502_4 via wireless communication is faster than the maximum data transmission speed via communication over the wired connection of communication device #4 labeled as 4502_4 (however, the present embodiment can be partially carried out even when this condition is not satisfied).

Figure 53:
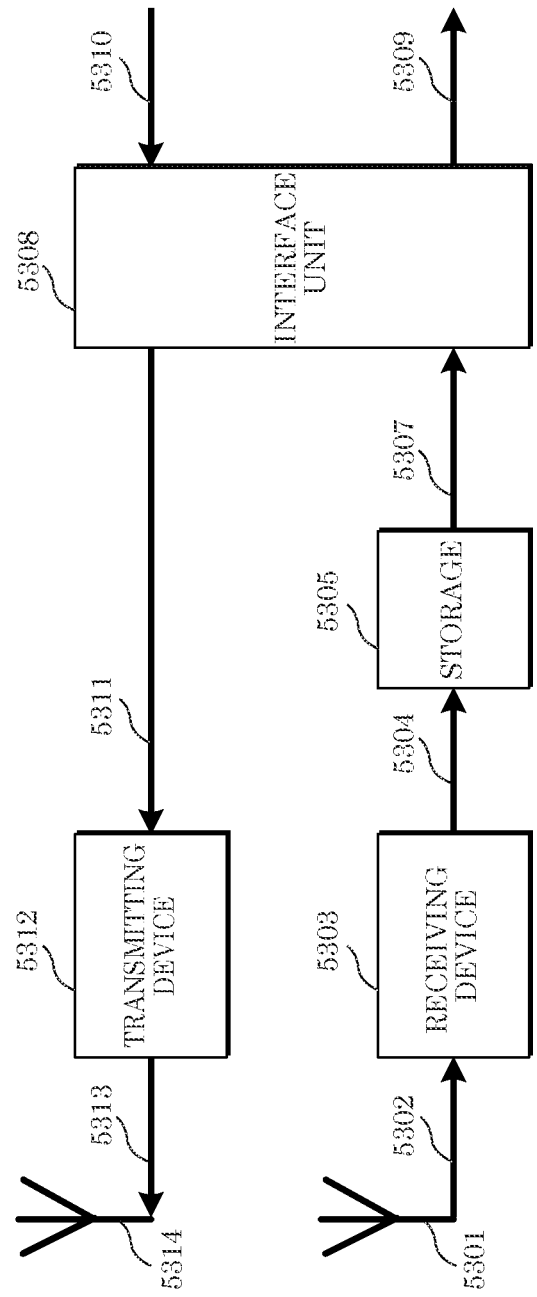
FIG. 53 illustrates an example of a configuration of a communication device.

An example of a configuration of communication device #4 labeled as 4502_4 in this case is illustrated in FIG. 53. In FIG. 53, receiving device 5303 receives an input of received signal 5302 received by antenna 5301, performs processing such as demodulation and error correction decoding, and outputs reception data 5304. For example, in the case of FIG. 45, receiving device 5303 receives modulated signal including data transmitted by communication device #A labeled as 4501, performs processing such as demodulation, and obtains reception data 5304.

Note that in FIG. 53, antenna 5301 is exemplified as including a single antenna, but the device may include a plurality of reception antennas and may receive and demodulate a plurality of modulated signals.

Storage 5305 receives an input of reception data 5304 and temporarily stores the reception data. This is because the maximum data transmission speed when communication device #A labeled as 4501 transfers data to communication device #4 labeled as 45024 via wireless communication is faster than the maximum data transmission speed via communication over the wired connection of communication device #4 labeled as 4502_4, so if storage 5305 is not included, there is a possibility that part of reception data 5304 be lost.

Interface unit 5308 receives an input of data 5307 output from the storage, and this becomes data 5309 for wired communication after passing through interface unit 5308.

Data 5310 for wired communication generates data 5311 via interface unit 5308, and transmitting device 5312 receives an input of data 5311, performs processing such as error correction coding, mapping, and frequency conversion, and generates and outputs transmission signal 5313. Transmission signal 5313 is output from antenna 5314 as radio waves, whereby data is transmitted to a communication partner.

Next, FIG. 54 will be described. As described in Embodiment 8 with reference to FIG. 45, communication device #4 labeled as 4502_4 obtains data from communication device #A 4501. In addition, communication device #4 labeled as 4502_4, like a base station or access point, performs communication with a terminal other than communication device #A 4501 and provides information to, for example, a server, via a network, or, alternatively, receives information from a server and provides information to a terminal other than communication device #A 4501, FIG. 54 illustrates a state in which communication device #4 labeled as 4502_4 is communicating with terminals other than communication device #A 4501, i.e., communication device #B labeled as 5401 and communication device #C labeled as 5402.

Figure 54:
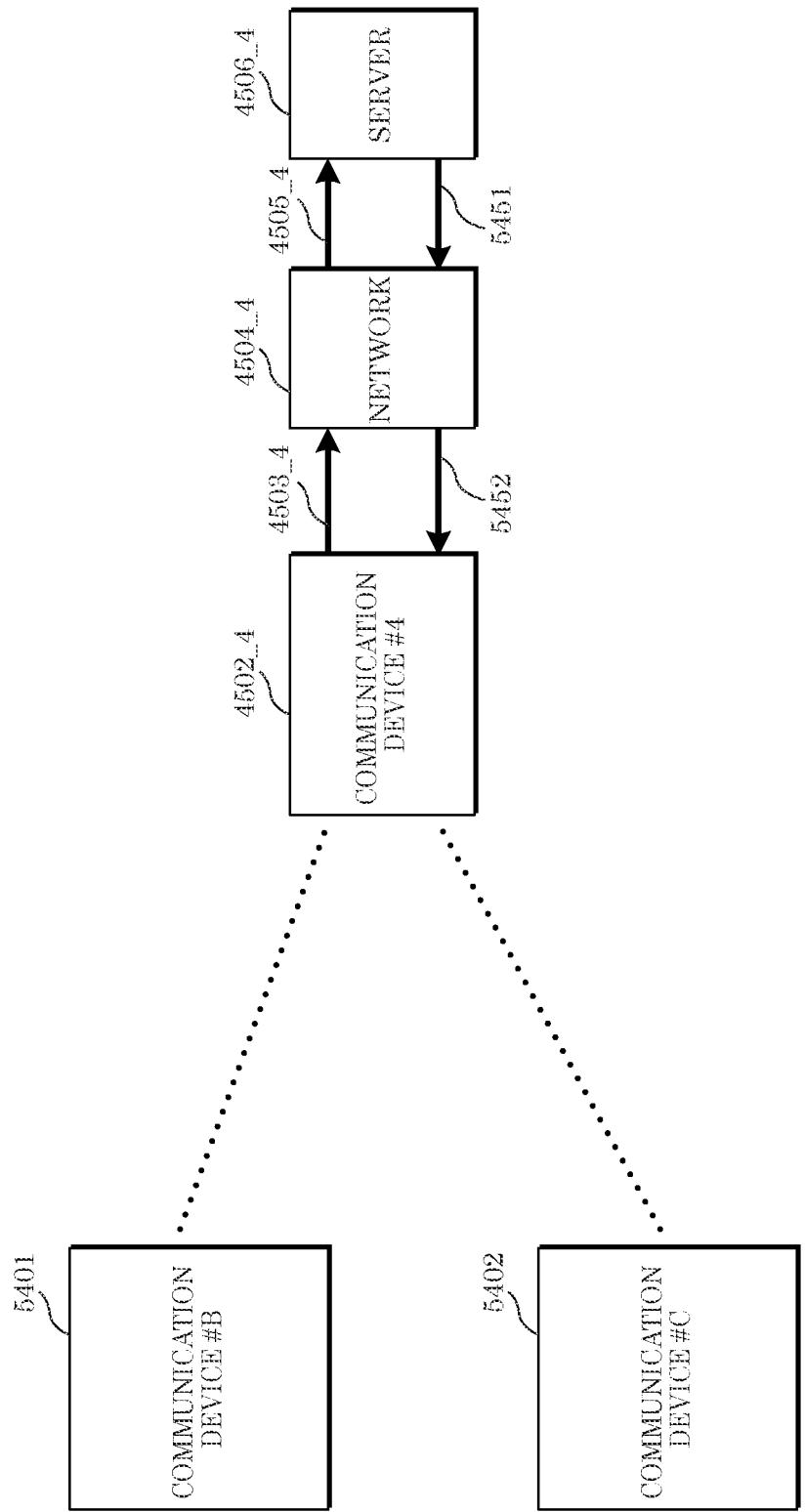
FIG. 54 illustrates one example of communication between communication devices.

As illustrated in FIG. 54, for example, communication device #B labeled as 5401 transmits a modulated signal, and communication device #4 labeled as 4502_4 receives the modulated signal. Communication device #4 labeled as 4502_4 then demodulates the modulated signal and obtains and outputs reception data 4503_4. Moreover, reception data 4503_4 is transmitted to, for example, server 4506_4 via network 4504_4.

As illustrated in FIG. 54, data 5451 output by server 4506_4 is input into communication device #4 labeled as 4502_4 via network 4504_4, and communication device #4 labeled as 4502_4 performs processing such as error correction coding and modulation to generate a modulated signal, and transmits the modulated signal to communication device #B labeled as 5401.

Similarly, for example, communication device #C labeled as 5402 transmits a modulated signal, and communication device #4 labeled as 4502_4 receives the modulated signal. Communication device #4 libeled as 4502_4 then demodulates the modulated signal and obtains and outputs reception data 4503_4. Moreover, reception data 4503_4 is transmitted to, for example, server 4506_4 via network 4504_4.

As illustrated in FIG. 54, data 5451 output by server 4506_4 is input into communication device #4 labeled as 4502_4 via network 4504_4, and communication device #4 labeled as 4502_4 performs processing such as error correction coding and modulation to generate a modulated signal, and transmits the modulated signal to communication device #C labeled as 5402.

Figure 55:
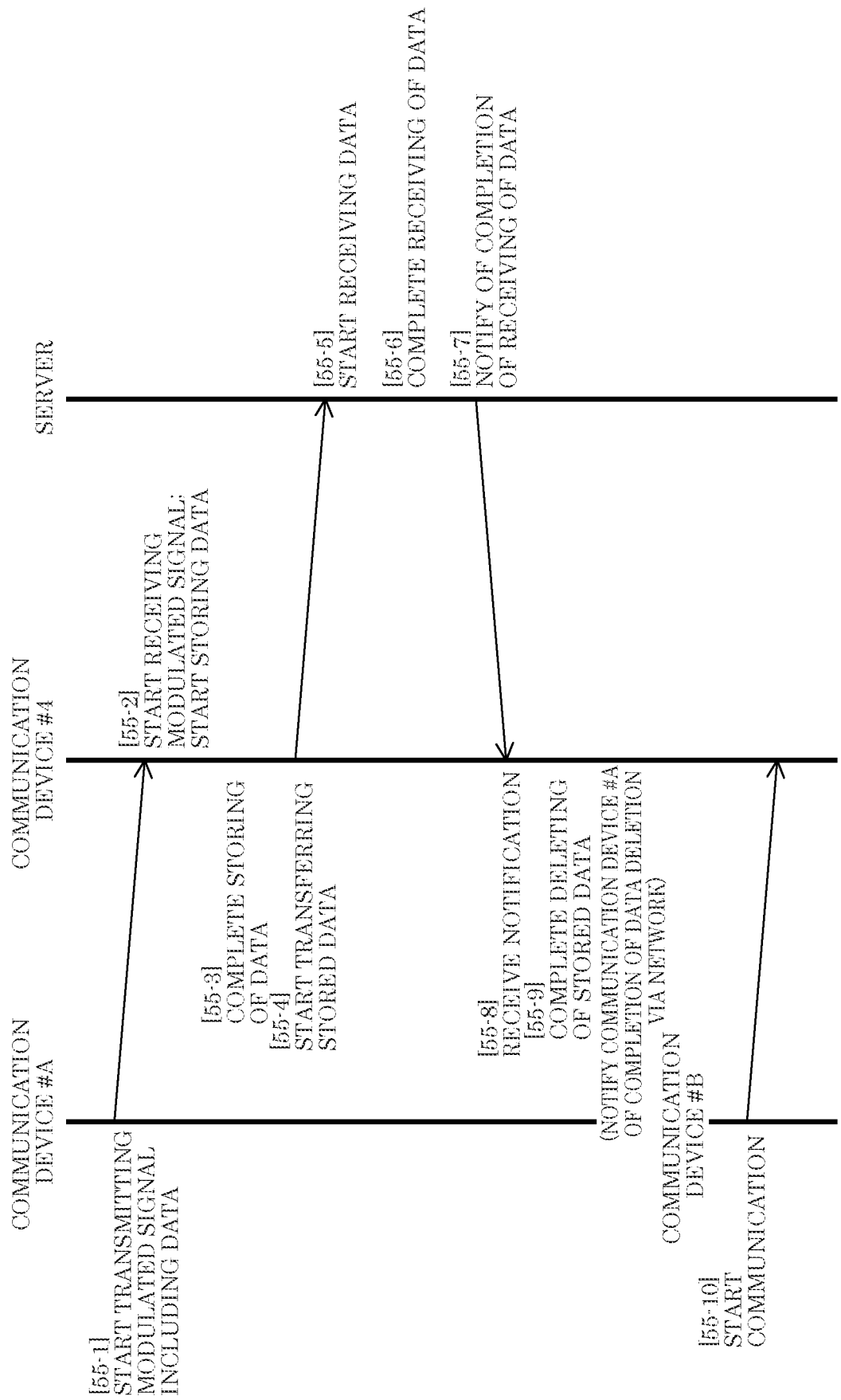
FIG. 55 illustrates one example of a procedure for communication performed by each communication device.

FIG. 55 illustrates an example of communication between (i) communication device #4 labeled as 4502_4 and (ii) communication device #A labeled as 4501 and communication device #B labeled as 5401.

First, as indicated by [55-1], communication device #A labeled as 4501 starts transmitting a modulated signal including data to communication device #4 labeled as 4502_4.

As indicated by [55-2], communication device #4 labeled as 4502_4 starts receiving the modulated signal transmitted by communication device #A labeled as 4501. Storage 5305 included in communication device #4 labeled as 4502_4 then starts storing the data obtained as a result of the reception.

As indicated by [55-3], communication device #4 labeled as 4502_24 completes communication with communication device #A labeled as 4501 and completes the storing of the data.

As indicated by [55-4], communication device #4 labeled as 4502_4 starts transferring the data obtained from communication device #A labeled as 4501 and held in storage 5305 to server 4506_4.

Note that the transferring of data may be started before the completion of the storing of the data in [55-3].

As indicated by [55-5], server 4506_4 starts receiving the data transferred by communication device #4 labeled as 4502_4 (that was obtained from communication device #A labeled as 4501).

As indicated by [55-6], server 4506_4 completes receiving the data transferred by communication device #4 labeled as 4502_4 (that was obtained from communication device #A labeled as 4501).

As indicated by [55-1], server 4506_4 notifies communication device #4 labeled as 4502_4 of the completion of reception of the data transferred by communication device #4 labeled as 4502_4 (that was obtained from communication device #A labeled as 4501).

[55-8] Communication device #4 labeled as 4502_4 receives the notification from server 4502_4 of the completion of the reception of the data.

[55-9] Communication device #4 labeled as 4502_4 deletes the data obtained from communication device #A labeled as 4501 and held in storage 5305.

Note that communication device #A may be notified of the deletion of this data.

[55-10] Communication device #B labeled as 5401 starts communicating with communication device #A labeled as 4501.

In FIG. 55, the function whereby communication device #4 labeled as 4502_4 deletes the data obtained from communication device #A labeled as 4501 and held in storage 5305 is important. This makes it possible to achieve the advantageous effect that the probability that the data from communication device #A labeled as 4501 will be stolen by another communication device can be reduced.

Figure 56:
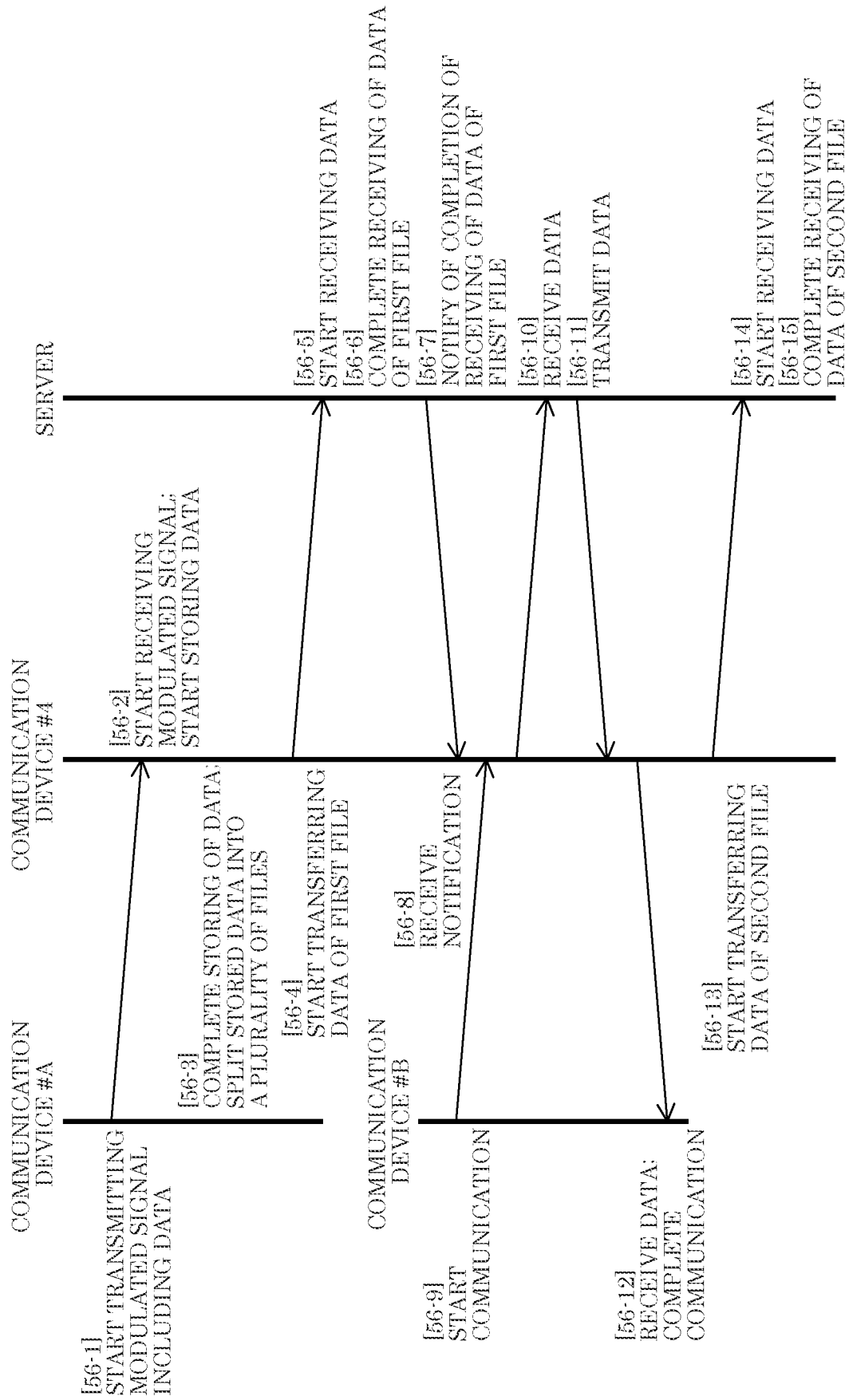
FIG. 56 illustrates another example of a procedure for communication performed by each communication device.

FIG. 56 illustrates an example of communication between (i) communication device #4 labeled as 4502_4 and (ii) communication device #A labeled as 4501 and communication device #B labeled as 5401 that differs from the example given in FIG. 55.

First, as indicated by [56-1], communication device #A labeled as 4501 starts transmitting a modulated signal including data to communication device #4 labeled as 4502_4.

As indicated by [56-2], communication device #4 labeled as 4502_4 starts receiving the modulated signal transmitted by communication device #A labeled as 4501. Storage 5305 included in communication device #4 labeled as 4502_4 then starts storing the data obtained as a result of the reception.

As indicated by [56-3], the communication device labeled as 4502_4 completes communication with communication device #A labeled as 4501 and completes the storing of the data. The stored data is split into a plurality of files. In this example, N files are created. N is an integer that is greater than or equal to 1 or an integer that is greater than or equal to 2 (hereinafter, these files will be named first file, second file, . . . , and N-thy file).

As indicated by [56-4], communication device #4 labeled as 4502_4 starts transferring, from among the data obtained from communication device #A labeled as 4501 and held in storage 5305, the data of a first file, to 4506_4.

Note that the transferring of data may be started before the completion of the storing of the data in [56-3].

As indicated by [56-5], server 4506_4 starts receiving the data of the first file from among the data transferred by communication device #4 labeled as 4502_4 (that was obtained from communication device #A labeled as 4501).

As indicated by [56-6], server 4506_4 starts receiving the data of the first file transferred by communication device #4 labeled as 4502_4.

As indicated by [56-7], server 4506_4 notifies communication device #4 labeled as 4502_4 of the completion of the reception of the data of the first file transferred by communication device #4 labeled as 4502_4.

[56-8] Communication device #4 labeled as 4502_4 receives the notification from server 4506_4 of the completion of the reception of the data of the first file.

[56-9] Communication device #B labeled as 5401 starts communication with communication device #A labeled as 4501.

[56-10] Server 4506A receives the data transmitted by communication device #B labeled as 5401, via communication device #4 labeled as 4502_4.

[56-11] In response to this, for example, server 4506_4 transmits the data.

As indicated by [56-12], communication device #B labeled as 5401 receives the data transmitted by server 4506_4, via communication device #4 labeled as 4502_4.

As indicated by [56-13], communication device #4 labeled as 4502_4 starts transferring, from among the data obtained from communication device #A labeled as 4501 and held in storage 5305, the data of a second file, to 4506_4.

As indicated by [56-14], server 4506_4 starts receiving the data of the second file from among the data transmitted by communication device #4 labeled as 45024 (that was obtained from communication device #A labeled as 4501).

As indicated by [56-15], server 4506_4 completes the reception of the data of the second file transferred by communication device #4 labeled as 4502_4.

In FIG. 56, the function whereby communication device #4 labeled as 4502_4 deletes the data obtained from communication device #A labeled as 4501 and held in storage 5305 is important. This makes it possible to achieve the advantageous effect that the probability that the data from communication device #A labeled as 4501 will be stolen by another communication device can be reduced can ensure security).

With respect to the above, the following two methods are applicable.

First Method:

In [56-8] in FIG. 56, communication device #4 labeled as 4502_4 that received the notification transmitted by the server of the completion of reception of the data of the first file deletes the data of the first file at this point in time (accordingly, communication device #4 labeled as 4502_4 receives the notification transmitted by the server of the completion of reception of data of the X-th file, and deletes the data of the X-th file (note there here, X is an integer that is greater than or equal to 1 and less than or equal to N)).

As an example of a variation of the first method, communication device #4 labeled as 4512_4 may delete the data of the X-th file along with the completion of the transmission of the data of the X-th file to the server.

Second Method:

Communication device #4 labeled as 4502_4 completes transmission of the data of the first file through the N-th file, receives notification that reception of the data of files is complete from the server, and thereafter deletes the data of the first file through the N-th file.

As an example of a variation of the second method, communication device #4 labeled as 4502_4 may delete the data of the first file through the N-th file along with the completion of the transmission of the data of the first file through the N-th file to the server.

As described above, when the maximum data transmission speed when a first communication device transfers data to a second communication device via wireless communication is faster than the maximum data transmission speed via communication over the wired connection of the second communication device, the second communication device that received the data transmitted by the first communication device stores the data in a storage, and after the second communication device transmits the stored data to another communication device, the second communication device deletes the stored data, which achieves the advantageous effect that data security can be ensured.

Next, the maximum data transmission speed when a first communication device transfers data to a second communication device via wireless communication being faster than the maximum data transmission speed via communication over the wired connection of the second communication device will be described.

For example, assume the first communication device uses frequency band A [Hz] when transferring data to the second communication device via wireless communication. Here, for example, the transmission speed when one stream is transmitted using BPSK without using error correction code is approximately A [bits per second (bps)], the transmission speed when one stream is transmitted using QPSK without using error correction code is approximately 2×A [bits per second (bps)], the transmission speed when one stream is transmitted using 16QAM without using error correction code is approximately 4×A [bits per second (bps)], and the transmission speed when one stream is transmitted using 64QAM without using error correction code is approximately 6×A [bits per second (bps)]. Furthermore, the transmission speed when two streams are transmitted (for example, via MIMO transmission) using BPSK is approximately 2×A [bits per second (bps)], the transmission speed when two streams are transmitted using QPSK is approximately 4×A [bits per second (bps)], the transmission speed when two streams are transmitted using 16QAM without using error correction code is approximately 8×A [bits per second (bps)], and the transmission speed when two streams are transmitted using 64QAM without using error correction code is approximately 12×A [bits per second (bps)].

Here, the maximum data transmission speed via communication over the wired connection of the second communication device is B [bps].

Here, when A≥B, with the majority of configurations of communication parameters, the condition "the maximum data transmission speed when a first communication device transfers data to a second communication device via wireless communication is faster than the maximum data transmission speed via communication over the wired connection of the second communication device" is satisfied, (however, even if this condition is not satisfied, the present embodiment can be partially carried out).

Accordingly, even when A≥B is satisfied, the second communication device that received the data transmitted by the first communication device stores the data in a storage, and the second communication device deletes the stored data after the second communication device transmits the stored data to another communication device, the advantageous effect that data security can be ensured can be achieved.

Note that in the present embodiment, a device is referred to as "server" (4506_4), but even if this device is a communication device rather than a server, the present embodiment can still be carried out in the same manner.

Moreover, network 4504_4 may be a network based on wireless communication. In such cases, the maximum data transmission speed when a first communication device transfers data to a second communication device via first wireless communication being faster than the maximum data transmission speed via second wireless communication, which is different from the first wireless communication, of the second communication device is important. Furthermore, when the maximum data transmission speed via the second wireless communication of the second communication device is expressed as B [bps], satisfying the condition A≥B is important (however, even if this condition is not satisfied, the present embodiment can be partially carried out).

Moreover, the wireless communication between communication device #A labeled as 4501 and communication device #1 labeled as 4502_1, the wireless communication between communication device #A labeled as 4501 and communication device #2 labeled as 4502_2, the wireless communication between communication device #A labeled as 4501 and communication device #3 labeled as 4502_3, the wireless communication between communication device #A labeled as 4501 communication device #4 labeled as 4502_4, the wireless communication between communication device #B labeled as 5401 and communication device #4 labeled as 4502_4, and the communication between communication device #C labeled as 5402 and communication device #4 labeled as 4502_4 described in the present embodiment may be carried out via MIMO transmission like described in other embodiments, that is to say, a plurality of transmit antennas and a plurality of receive antennas (a single receive antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Embodiment 10

In the present embodiment, a variation of Embodiment 9 will be described.

Figure 57:
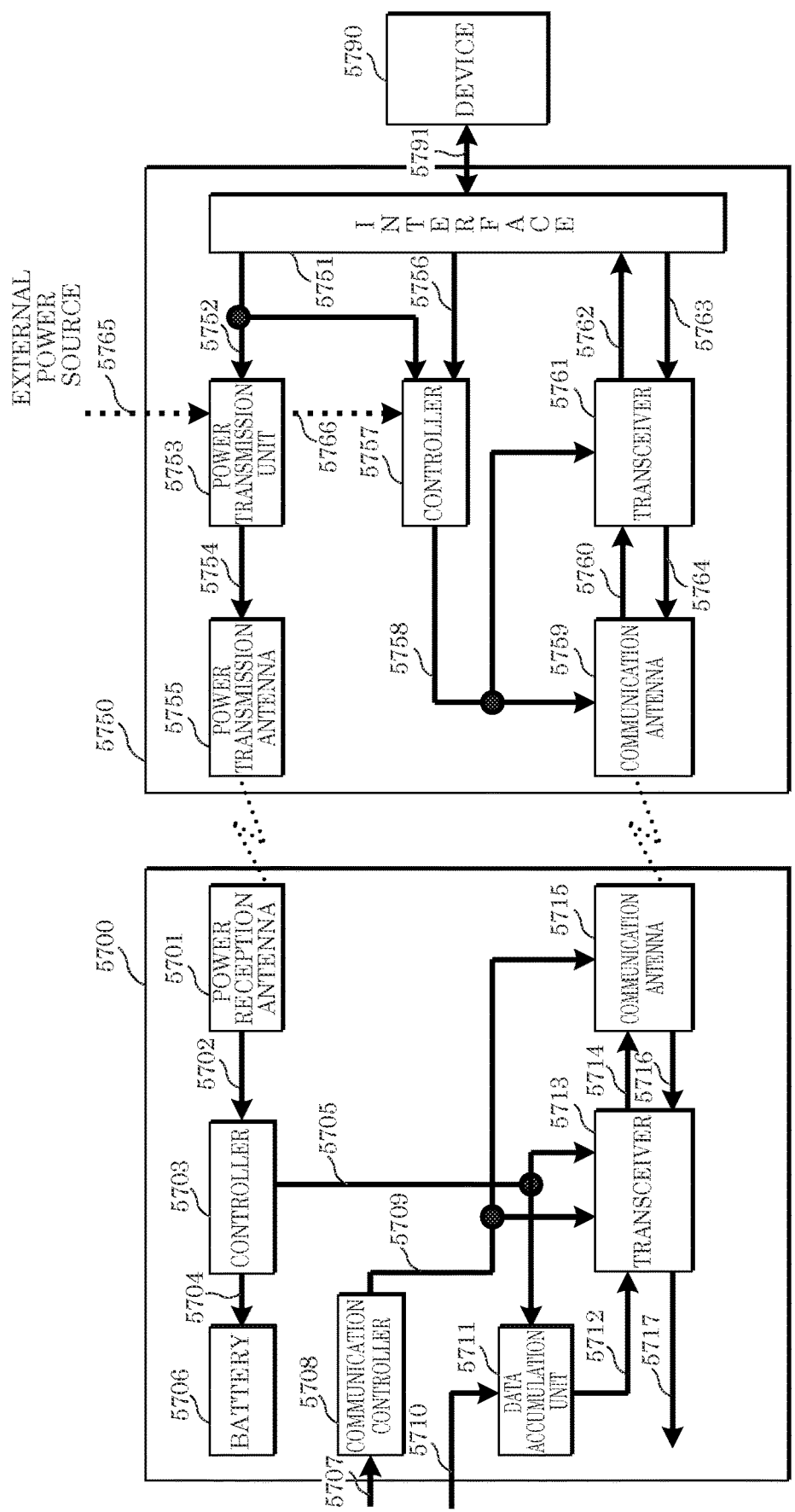
FIG. 57 illustrates an example of a configuration of a communication device and a power transmission device.
Figure 58:
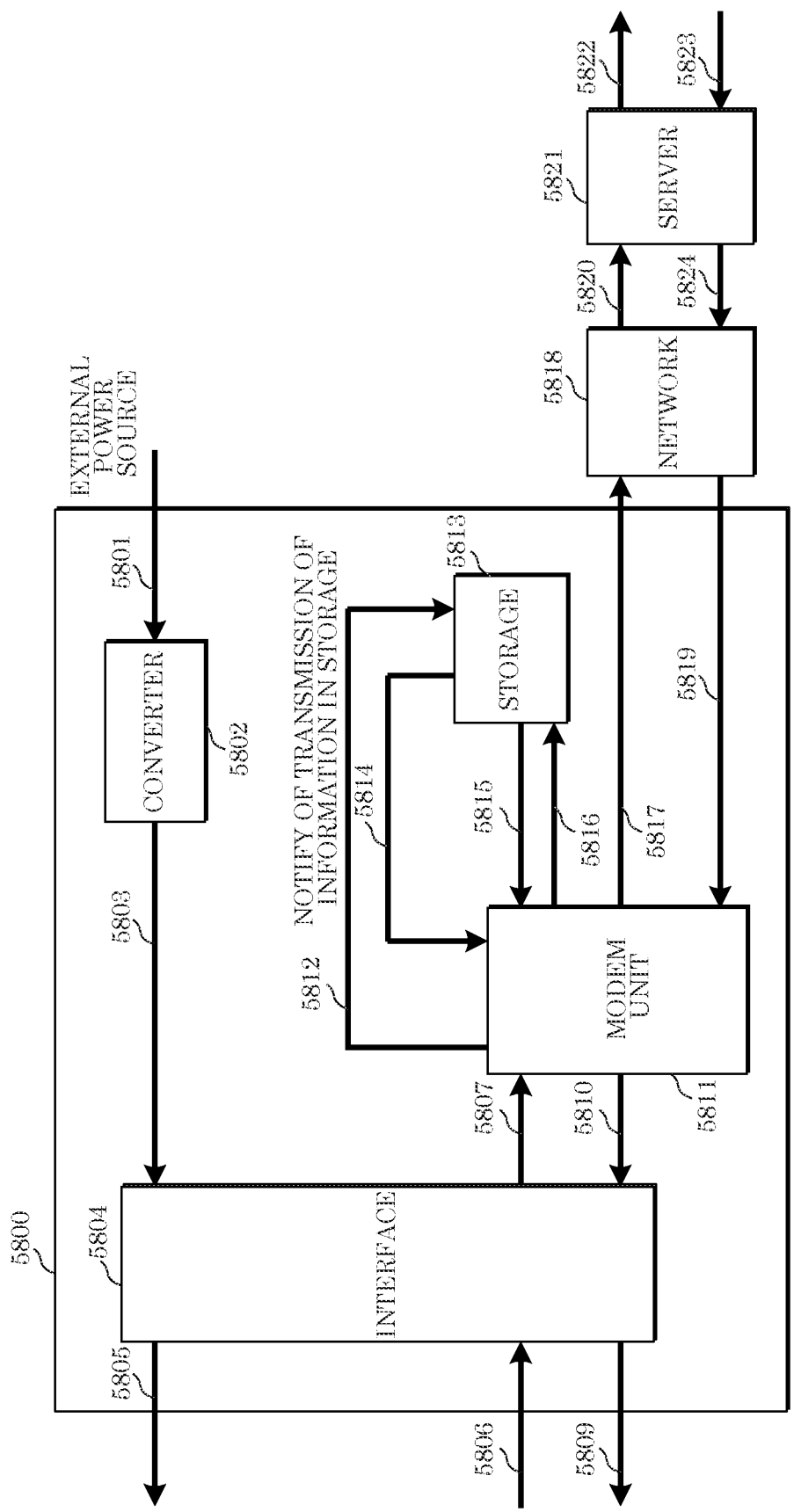
FIG. 58 illustrates an example of a configuration of a device.

In FIG. 57, 5700 indicates a communication device, 5750 indicates a power transmission device, and 5790 indicates a device. In FIG. 58, 5800 indicates the device labeled as 5790 in FIGS. 57, and 5821 indicates a server.

In this example, communication device 5700 and power transmission device 5750 illustrated in FIG. 57 communicate wirelessly, for example.

Moreover, power transmission device 5750 illustrated in FIG. 57 transmits power, communication device 5700 receives power and charges a battery.

Power transmission device 5750 illustrated in FIG. 57 and device 5790 communicate with one another (for example, over a wired connection; however, note that the communication may be wireless).

Moreover, as illustrated in FIG. 58, device 5800 (in other words, device 5790 in FIG. 57 communicates with server 5821 via network 5817.

In this example, the maximum data transmission speed when communication device 5700 transfers data to power transmission device 5750 via wireless communication is faster than the maximum data transmission speed via communication over the wired connection (or via the wireless communication) of device 5800 (in other words, device 5790 in FIG. 57) (however, even if this condition is not satisfied, the present embodiment can be partially carried out).

Stated differently, when the frequency band used when communication device 5700 transfers data to power transmission device 5750 via wireless communication is expressed as A [Hz] and the maximum transmission speed via communication over the wired connection (or via the wireless communication) of device 5800 (in other words, device 5790 in FIG. 57) is expressed as B [bps], A≤B is satisfied (however, even if this condition is not satisfied, the present embodiment can be partially carried out).

Next, the detailed operation example in FIG. 57 will be described. Power transmission unit 5753 included in power transmission device 5750 receives input(s) of a supply of power 5752 from interface 5751 and/or a supply of power 5765 from external power source, outputs power transmission signal 5754, and power transmission signal 5754 is transmitted wirelessly from power transmission antenna 5755.

Controller 5703 included in communication device 5700 receives an input of received signal 5702 received by power reception antenna 5701.

In the description above, the terminology "power transmission antenna" 5755 is written, but this may be referred to as a power transmission coil. Moreover, the terminology "power reception antenna" 5701 is used, but this may be referred to as a power reception coil.

Controller 5703 outputs power supply signal 5704 and control signal 5705. Battery 5706 is charged in response to input of power supply signal 5704.

Based on the voltage and/or current, for example, controller 5703 knows whether power is currently being received, and outputs control signal 5705 including information on whether power is currently being received or not. Note that the element related to power reception may include a communication function, controller 5703 may know whether power is currently being received or not via communication, and may output control signal 5705 including information on whether power is currently being received or not. Moreover, control signal 5705 may include control information other than the above-described information.

Data accumulation unit 5711 receives an input of data 5710, and accumulates data. Note that data 5710 may be data generated by communication device 5700.

Data accumulation unit 5711 receives an input of control signal 5705, and based on control signal 5705, outputs data 5712 accumulated in data accumulation unit 711.

Communication controller 5708 receives an input of control information 5707, and outputs communication control signal 5709.

Transceiver 5713 receives inputs of data 5712, control signal 5705, and communication control signal 5709, and based on control signal 5705 and communication control signal 5709, determines, for example, the transmitting method to be used, generates a modulated signal including data 5712, and outputs transmission signal 5714 from communication antenna 5715 as, for example, radio waves.

Moreover, transceiver 5713 receives an input of received signal 5716 received by communication antenna 5715, performs processing such as demodulation and error correction decoding, and outputs reception data 5717.

Controller 5757 included in power transmission device 5750 receives inputs of a supply of power 5752 and information 5756 from device 5790, and outputs communication control signal 5758.

Communication antenna 5759 receives the transmission signal transmitted by the communication partner (communication device 5700). Transceiver 5761 receives inputs of received signal 5760 received by communication antenna 5759, and communication control signal 5758, performs processing such as demodulation and error correction decoding, and outputs reception data 5762.

Moreover, transceiver 5761 receives inputs of data 5763 and communication control signal 5758, and based on communication control signal 5758, determines, for example, the modulation method and transmitting method to be used, generates a modulated signal, and outputs transmission signal 5764. Transmission signal 5764 is output from communication antenna 5759 as radio waves.

Signal 5791 is input into and output from power transmission device 5750. Signal 5791 is also input into and output from device 5790.

Signal 5791 includes supply of power 5752, information 5756, reception 5762, and data 5763. Interface 5751 is an interface for (i) signal 5791 and (ii) supply of power 5752, information 5756, reception 5762, and data 5763.

FIG. 58 illustrates a configuration of device 5790 illustrated in FIG. 57 (device 5800), and network 5817 and server 5821 which are connected to device 5800.

Converter 5802 receives an input of, for example, a supply of alternating current (AC) power 5801 from an external power source, performs AC to direct current (DC) conversion, and outputs a supply of DC power 5803. The supply of DC power 5803 becomes 5805 after passing through interface 5804.

Storage 5813 outputs notification signal 5814 for notifying that device 5800 includes a storage. Modem unit 5811 receives an input of notification signal 5814, and outputs data (or modulated signal) 5810 including information indicating that device 5800 includes a storage, in order to notify power transmission device 5750 illustrated in FIG. 57 that device 5800 includes a storage. Data (or modulated signal) 5810 becomes 5809 after passing through interface 5804.

Modem unit 5811 receives, via interface 5804, as 5807, an input of data 5806 obtained from power transmission device 5750 illustrated in FIG. 57. Modem unit 5811 determines whether to store the data in storage 5813. When it is determined to store the data in storage 5813, control signal 5812 includes notification information indicating "store the data in the storage". Moreover, modem unit 5811 outputs the obtained data 5807 as 5816.

Storage 5813 then stores data 5816.

Moreover, there are instances in which modem unit 5811 transmits data to server 5821 via network 5818. For example, there are instances in which modem unit 5811 transmits data stored in storage 5813 to server 5821. Modem unit 5811 outputs, to storage 5813, control signal 5812 including information on a notification to transmit data included in storage 5813 to server 5821.

Then, storage 5813 receives the information on the notification to transmit data included in storage 5813 to server 5821 that is included in control signal 5812, and outputs the stored data 5815.

Modem unit 5811 receives an input of the stored data 5815, and outputs data 5816 (or a modulated signal including data) that corresponds to this data. Data (or modulated signal) 5816 (5820) arrives at server 5821 via network 5818. If necessary, server 5821 transmits the data to another device (5822).

Server 5821 receives an input of data 5823 from another device, which arrives at modem unit 5811 via a network. If necessary, modem unit 5811 transmits the data obtained from server 5821 (or a modulated signal including the data) to power transmission device 5750 illustrated in FIG. 57.

Note that "the maximum data transmission speed when communication device 5700 transfers data to power transmission device 5750 via wireless communication" is faster than the maximum data transmission speeds of 5816 and 5819 in FIG. 58 (however, even if this condition is not satisfied, the present embodiment can be partially carried out).

Stated differently, when the frequency band used when communication device 5700 transfers data to power transmission device 5750 via wireless communication is expressed as A [Hz] and the maximum transmission speed of 5816 and 5819 in FIG. 58 is expressed as B [bps], A≥B is satisfied (however, even if this condition is not satisfied, the present embodiment can be partially carried out).

Moreover, data transfers 5806 and 5809 in FIG. 58 are capable of ensuring sufficient data transmission speeds.

Next, a detailed example of communication between communication device 5700 in FIG. 57, power transmission device 5750 in FIG. 57, device 5790 in FIG. 57 (corresponding to device 5800 in FIG. 58), and server 5821 in FIG. 58 will be given with reference to FIG. 59 and FIG. 60.

Figure 59:
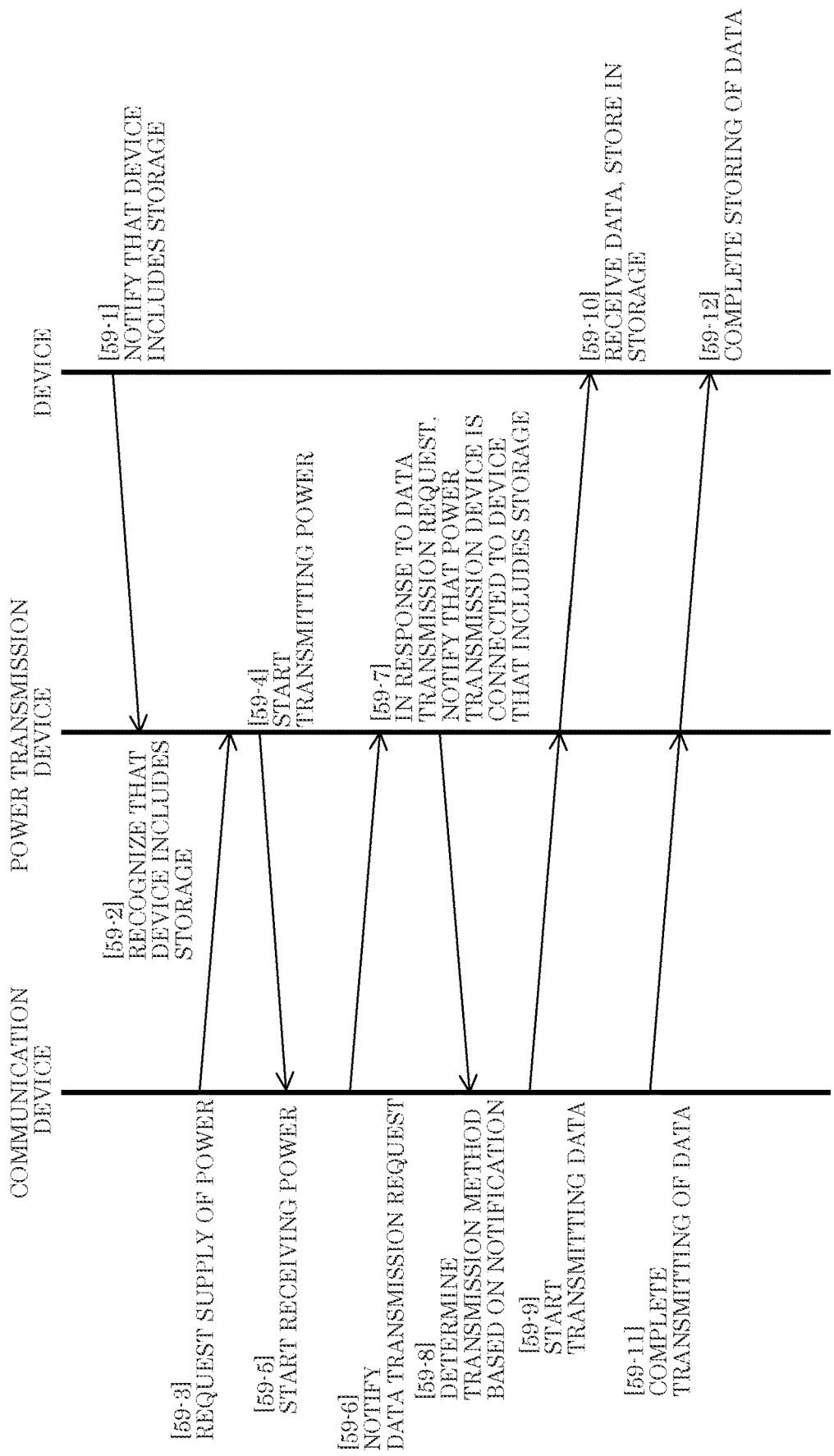
FIG. 59 illustrates one example of a procedure for communication performed by each device.

As illustrated in FIG. 59, [59-1] first, device 5790 in FIG. 57, that is to say, device 5800 in FIG. 58 notifies power transmission device 5750 in FIG. 57 that it includes storage 5813.

[59-2.] Power transmission device 5750 receives the notification, and recognizes that device 5790 in FIG. 57, that is to say, device 5800 in FIG. 58 includes storage 5813.

[59-3] Communication device 5700 in FIG. 57 makes a request to power transmission device 5750 in FIG. 57 for a supply of power.

[59-4] Power transmission device 5750 in FIG. 57 receives the request, and starts transmitting power to communication device 5700 in FIG. 57.

[59-5] Accordingly, communication device 5700 in FIG. 57 starts receiving power, that is to say, the battery included in communication device 5700 in FIG. 57 starts charging.

[59-6] In accordance with starting to receive power, communication device 5700 in FIG. 57 notifies power transmission device 5750 in FIG. 57 with a data transmission request.

By the communication device in FIG. 57 requesting power transmission device 5750 to transmit data in accordance with the communication device in FIG. 57 receiving the power, it is possible to achieve the advantageous effect that high data transmission speeds can be achieved. Since it is possible to receive power, this means that the communication distance for the data transmission is extremely short, which in turn means that there is a high probability of a favorable communication environment. Accordingly, the communication device in FIG. 57 can select a modulation method and an error correction coding method that allow of high data transmission speeds when transmitting the modulation method.

[59-1] Power transmission device 5750 in FIG. 57 receives the data transmission request from communication device 5700 in FIG. 57, and notifies the communication device in FIG. 57 that power transmission device 5750 is connected to device 5800 that includes storage 5813.

[59-8] Communication device 5700 in FIG. 57 receives this notification and determines a transmission method (transmitting method) to be used. At this time, a transmission method is selected by communication device 5700 that satisfies the condition "the maximum data transmission speed when communication device 5700 transmits data to power transmission device 5750 via wireless communication is faster than the maximum data transmission speed of 5816 and 5819 in FIG. 58". Stated differently, a transmission method is selected by communication device 5700 that satisfies the condition "when the frequency band used when communication device 5700 transmits data to power transmission device 5750 via wireless communication is expressed as A and the maximum transmission speed of 5816 and 5819 in FIG. 58 is expressed as B [bps], A≥B".

As described in Embodiment 9, even when such a selection is made, it is possible to reduce the probability that part of the data will be lost during communication.

[59-9] Communication device 5700 in FIG. 57 starts transmitting the data (wirelessly).

In [59-10] and [59-9], power transmission device 5750 receives the data transmitted by communication device 5700 in FIG. 57, and transmits the data to device 5790 in FIG. 57, that is to say, device 5800 in FIG. 58. Device 5790 in FIG. 57, that is to say, device 5800 in FIG. 58 receives the data and stores the received data in storage 5813 in FIG. 58.

[59-11] Communication device 5700 in FIG. 57 completes the transmitting of the data (wirelessly).

[59-12] In accordance with the completion of the transmitting of data in [59-11], device 5790 in FIG. 57, that is to say, device 5800 in FIG. 58 completes the storing of the received data into storage 5813.

Figure 60:
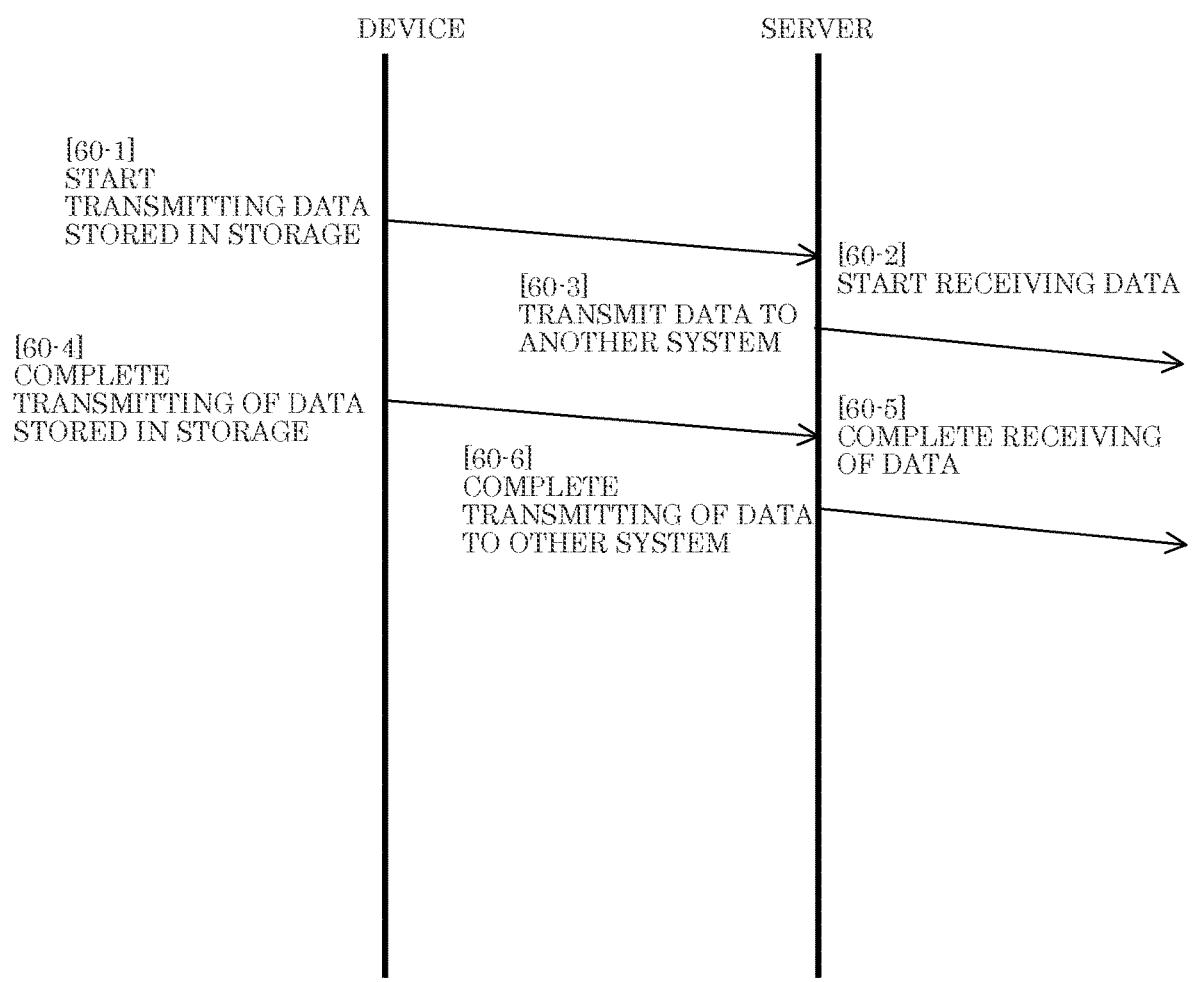
FIG. 60 illustrates one example of a procedure for communication between a device and a server.

In accordance with the completion of the storing in [59-12] in FIG. 59, processing can proceed to the operations in FIG. 60. FIG. 60 illustrates an example of communication between device 5790 in FIG. 57, that, is to say, device 5800 in FIG. 58, and server 5821 in FIG. 58.

[60-1] Device 5790 in FIG. 57, that is to say, device 5800 in FIG. 58 starts transmitting data stored in storage 5813 to server 5821 via network 5818.

[60-2] Server 5821 in FIG. 58 starts receiving the data.

[60-3] For example, server 5821 in FIG. 58 transmits the received data to another system.

[60-4] Device 5790 in FIG. 57, that is to say, device 5800 in FIG. 58 completes the transmission of the data stored in storage 5813.

[60-5] Server 5821 in FIG. 58 completes the reception of the data.

[60-6] For example, server 5821 in FIG. 58 completes the transmission of the received data to another system.

Figure 67:
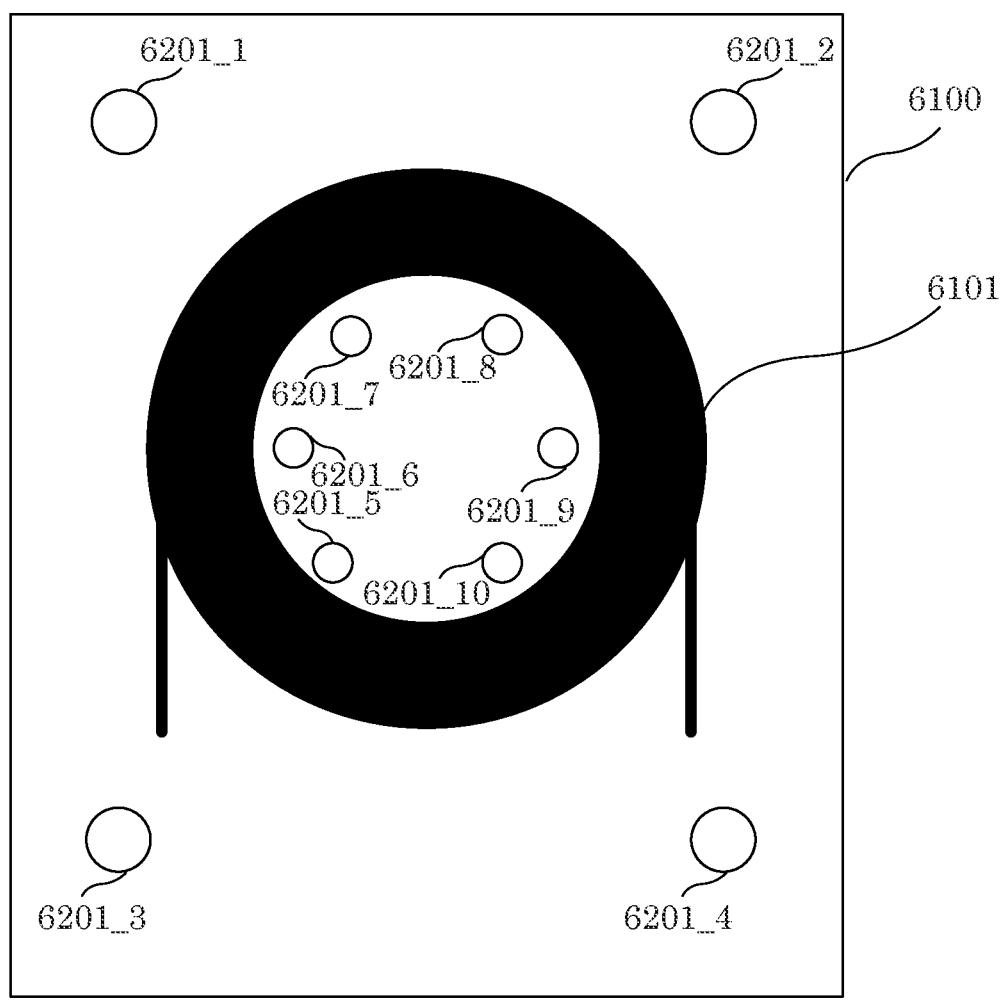
FIG. 67 illustrates another example of an arrangement of communication antennas.

As described above, communication device 5700 in FIG. 57 recognizes that the power transmission device labeled as 5750 in FIG. 57, which is the communication partner of communication device 5700 in FIG. 67, is connected to a device that includes a storage, and selects a communication method based on this. As a result, it is possible to achieve the advantageous effect that the probability of loss of data resulting from transmitting data to another system can be reduced.

Note that in the above description, the wireless communication between communication device 5700 and power transmission device 5750 illustrated in FIG. 57 may be carried out via MIMO transmission like described in other embodiments, that is to say, a plurality of transmit antennas and a plurality of receive antennas (a single receive antenna is acceptable) may be provided and the transmitting device may transmit a plurality of modulated signals from a plurality of antennas at the same frequency and at the same time. Moreover, the wireless communication may be carried out using a method by which a single modulated signal is transmitted. Note that an example of a configuration of the transmitting device and receiving device in such cases is as described in other embodiments.

Moreover, communication device 5700 in FIG. 57 may be included in a mobile phone terminal, and an example in which communication device 5700 in FIG. 57 is included in a conveyance such as a car is conceivable. Moreover, an example in which device 5790 is included in a base station, access point, computer, or server, for example, is conceivable.

Next, problems related to communication antenna arrangement in power transmission device 5750 illustrated in FIG. 57 will be described with reference to FIG. 61.

Figure 61:
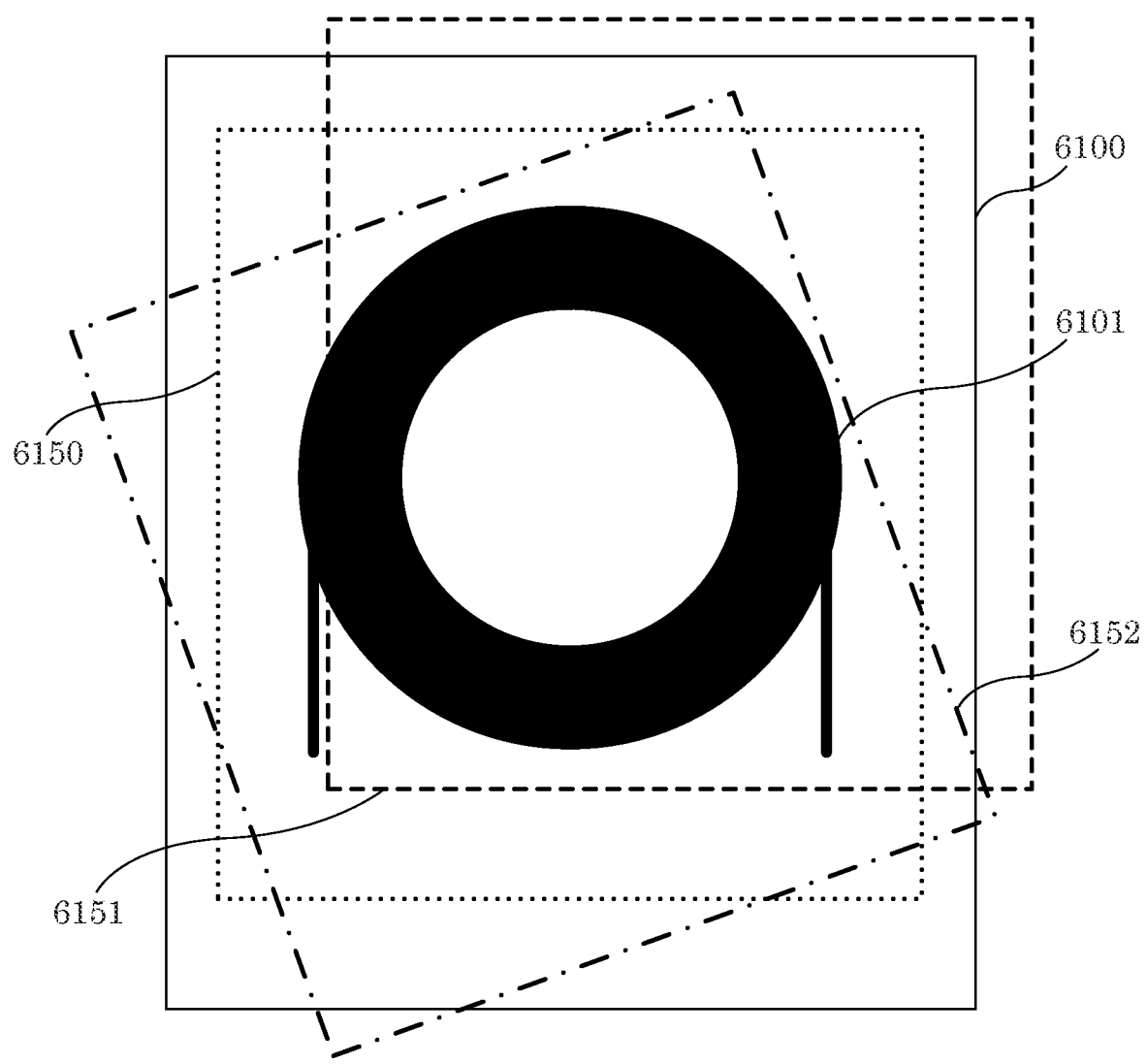
FIG. 61 illustrates a problem related to the arrangement of communication antennas.

In FIG. 61, 6100 indicates the contour of the power transmission device in FIG. 57. 6101 indicates power transmission coil 5755. Note that in FIG. 57, "power transmission coil" is phrased as "power transmission antenna".

In this example, communication device 5700 in FIG. 57 includes a power reception coil as power reception antenna 5701.

6150, 6151, and 6152 indicate the contour of communication device 5700 in FIG. 57. As illustrated in FIG. 61, when the user of communication device 5700 in FIG. 57 causes communication device 5700 to receive power, there are a variety of ways in which the user may arrange communication device 5700, such as the arrangement indicated by 6150, the arrangement indicated by 6151, and the arrangement indicated by 6152.

When wireless communication is performed between communication device 5700 and power transmission device 5750 in such arrangements, there is a desire for a communication method to be selected that achieves fast data transmission speeds and yields high data reception quality, in other words, this desire is a problem to be overcome.

Regarding communication device 5700 that communicates with power transmission device 5750, since communication devices vary from user to user, for example, the arrangement and such of communication antenna 5715 may differ from communication device to communication device. Even under such conditions, when communication device 5700 and power transmission device 5750 wirelessly communicate, there is a desire for a communication method to be selected that achieves fast data transmission speeds and yields high data reception quality, in other words, this desire is a problem to be overcome.

The present embodiment will describe a configuration of power transmission device 5750 illustrated in FIG. 57 for overcoming this problem.

Figure 62:
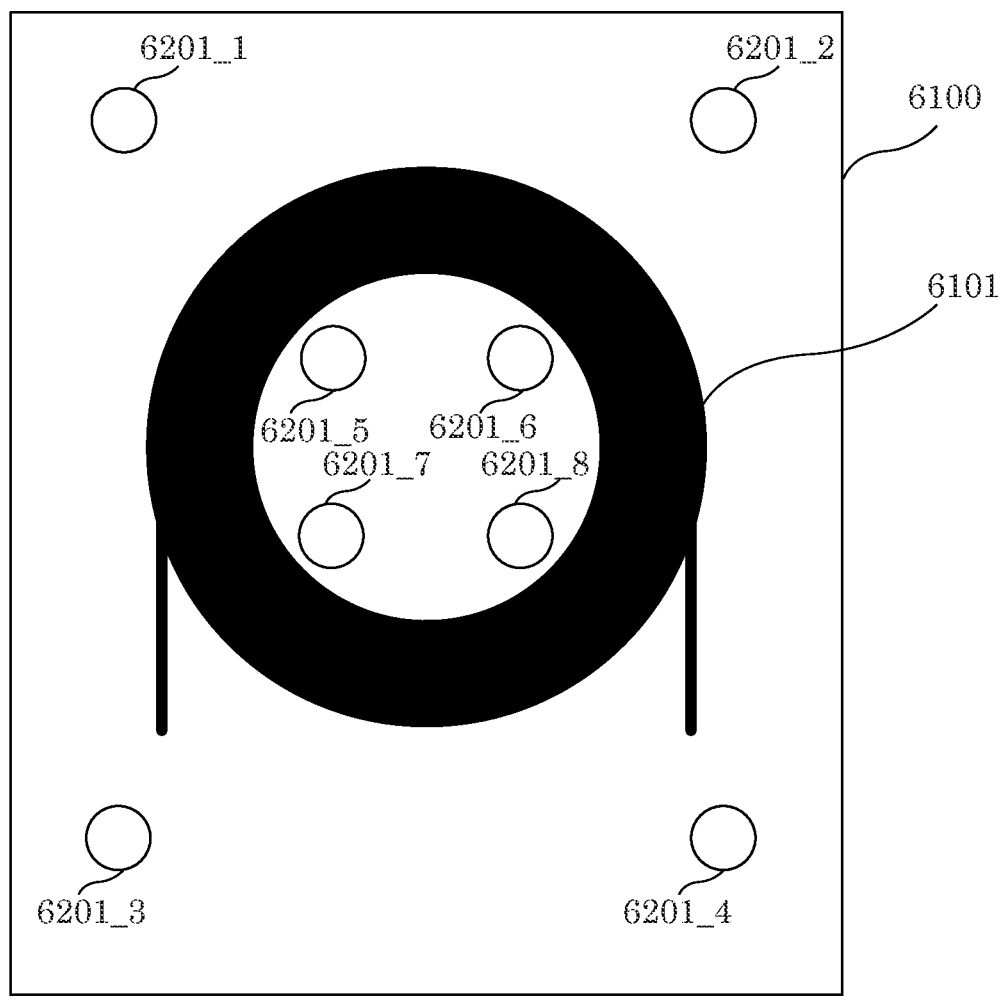
FIG. 62 illustrates one example of an arrangement of communication antennas.

FIG. 62 illustrates an example of a favorable arrangement of communication antenna 5759 and power transmission coil 5755 in power transmission device 5750 illustrated in FIG. 57. Note that in FIG. 62, elements which operate in the same manner as those in FIG. 61 are assigned the same reference numerals, and repeated description thereof is omitted.

In FIGS. 62, 6201_1, 6201_2, 6201_3, 6201_4, 6201_5, 6201_6, 6201_7, and 6201_8 are communication antennas of power transmission device 5750.

As illustrated in FIG. 62, since power transmission device 5750 needs to transmit power to power reception coil 5701 included in communication device 5700, power transmission coil 6101 (corresponding to power transmission coil 5755 in FIG. 57) is disposed, for example, in the central region, like illustrated in FIG. 62.

In this example, power transmission coil 5755 is arranged in a circular shape (so as to form a closed loop). This aspect corresponds to the black portion of 6101 in FIG. 62. Accordingly, this circular shape defines a space inside the circle and a space outside the circle.

In this example, communication antennas of power transmission device 5750 are arranged inside of the circular coil and outside of the circular coil. In the example illustrated in FIG. 62, communication antennas 6201_5, 6201_6, 6201_7, and 6201_8 are arranged inside the circular coil, and communication antennas 6201_1, 6201_2, 6201_3, and 6201_4 are arranged outside the circular coil.

When the communication antennas of power transmission device 5750 are arranged in this manner, communication antennas are densely arranged with respect to plane 6100, so no matter how communication device 5700 is arranged with respect to plane 6100, in communication device 5700 and power transmission device 5750, the probability that modulated signal reception electric field strength can be ensured is increased. This makes it possible to achieve the advantageous effect that it is possible to select a communication method that achieves a high data transmission speed and ensure high data reception quality. Moreover, when the communication antennas of power transmission device 5750 are arranged in this manner, no matter how the communication antennas are arranged and included in communication device 5700, communication antennas are densely arranged with respect to plane 6100, so in communication device 5700 and power transmission device 5750, the probability that modulated signal reception electric field strength can be ensured is increased.

Figure 63:
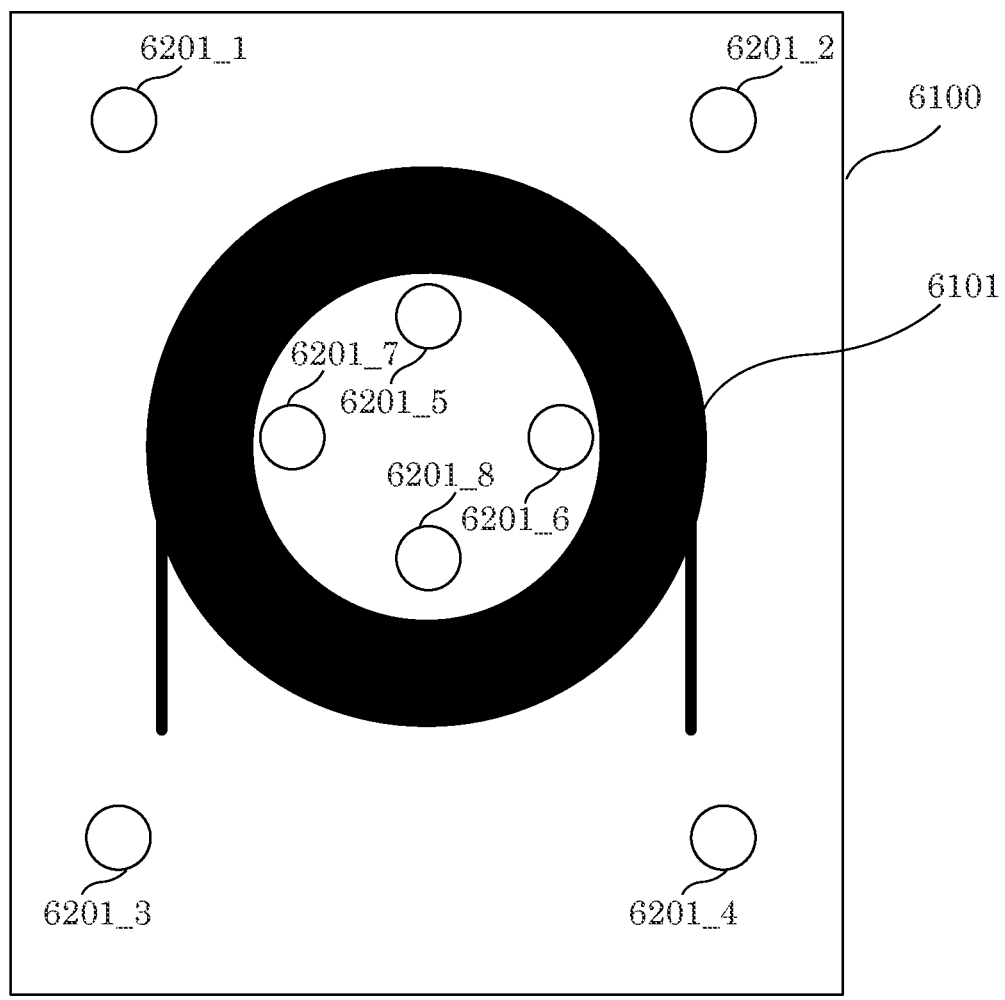
FIG. 63 illustrates another example of an arrangement of communication antennas.
Figure 64:
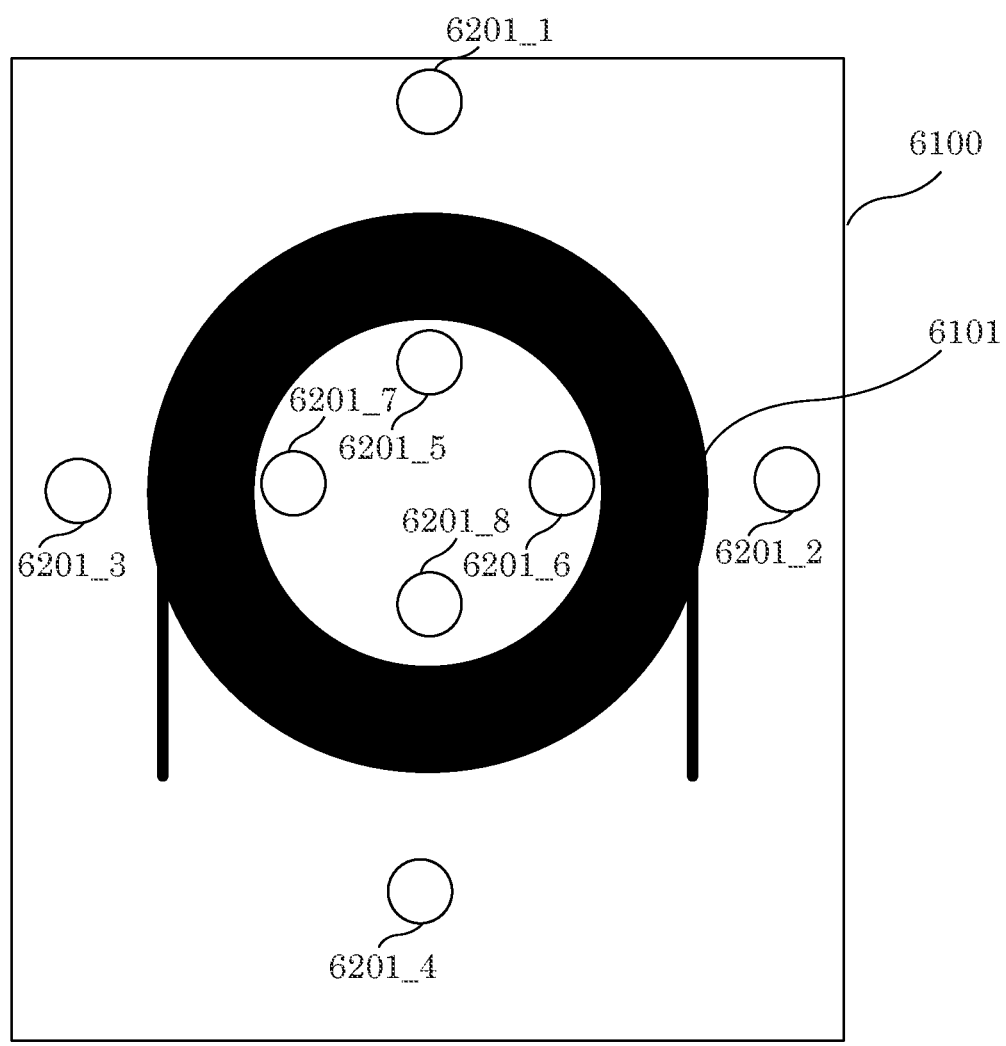
FIG. 64 illustrates another example of an arrangement of communication antennas.

Note that the arrangement of the communication antennas of power transmission device 5750 is not limited to an arrangement like that of FIG. 61. For example, the communication antennas of power transmission device 5750 may be arranged like in FIG. 62, FIG. 63, or FIG. 64. Note that in FIG. 62, FIG. 63, and FIG. 64, elements which operate in the same manner as those in FIG. 61 are assigned the same reference numerals, and repeated description thereof is omitted. Here, the characterizing point is the formation of a quadrangular shape by communication antennas 6201_5, 6201_6, 6201_7, and 6201_8.

A configuration other than a configuration in which four communication antennas are arranged inside the circular coil and four communication antennas are arranged outside the circular coil is also acceptable.

For example, even when one or two or more of the communication antennas of power transmission device 5750 are arranged inside the circular coil and one or two or more of the communication antennas of power transmission device 5750 are arranged outside the circular coil, the advantageous effects described above can be achieved.

Moreover, when N (N is an integer that is greater than or equal to 1 or greater than or equal to 2) communication antennas of power transmission device 5750 are arranged inside the circular coil and M is an integer that is greater than or equal to 1 or greater than or equal to 2) communication antennas of power transmission device 5750 are arranged outside the circular coil, N=M may be satisfied, and, alternatively, N≠M may be satisfied. Moreover, when M is greater than N, it is possible to more densely arrange the antennas.

Figure 65:
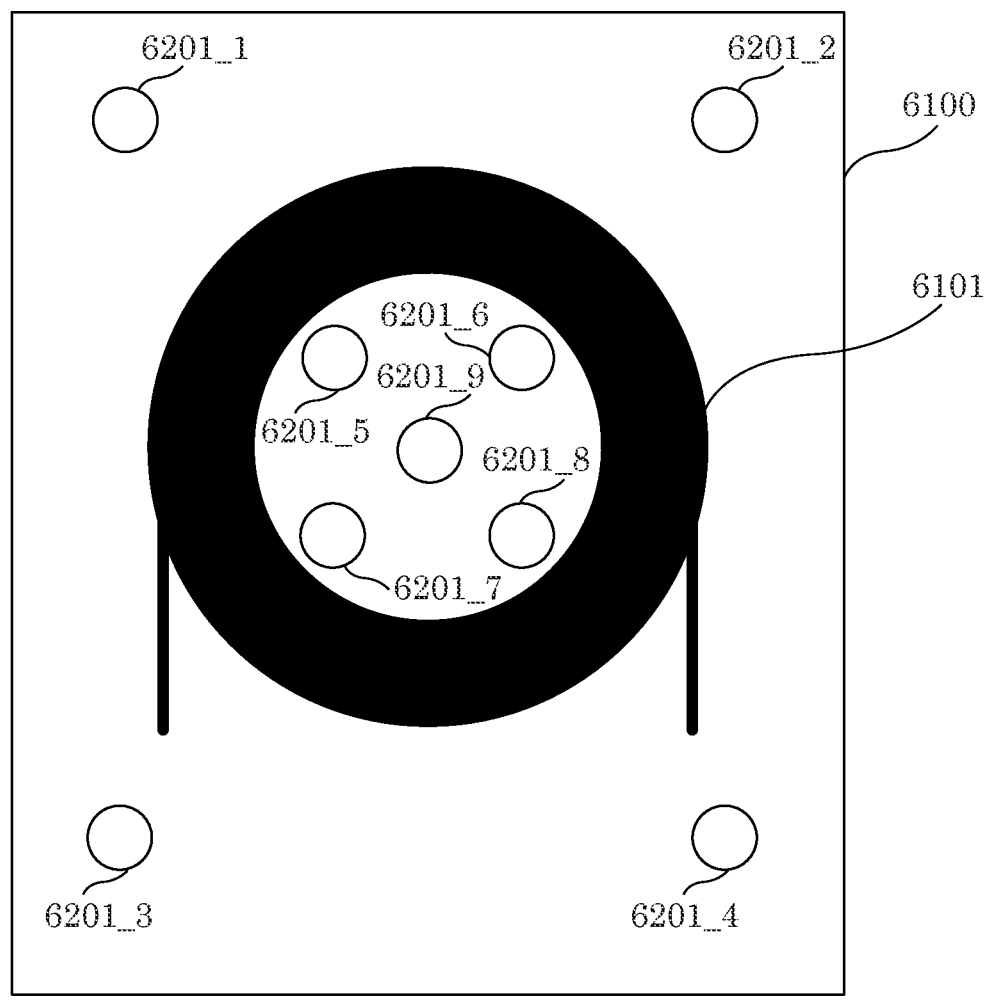
FIG. 65 illustrates another example of an arrangement of communication antennas.
Figure 66:
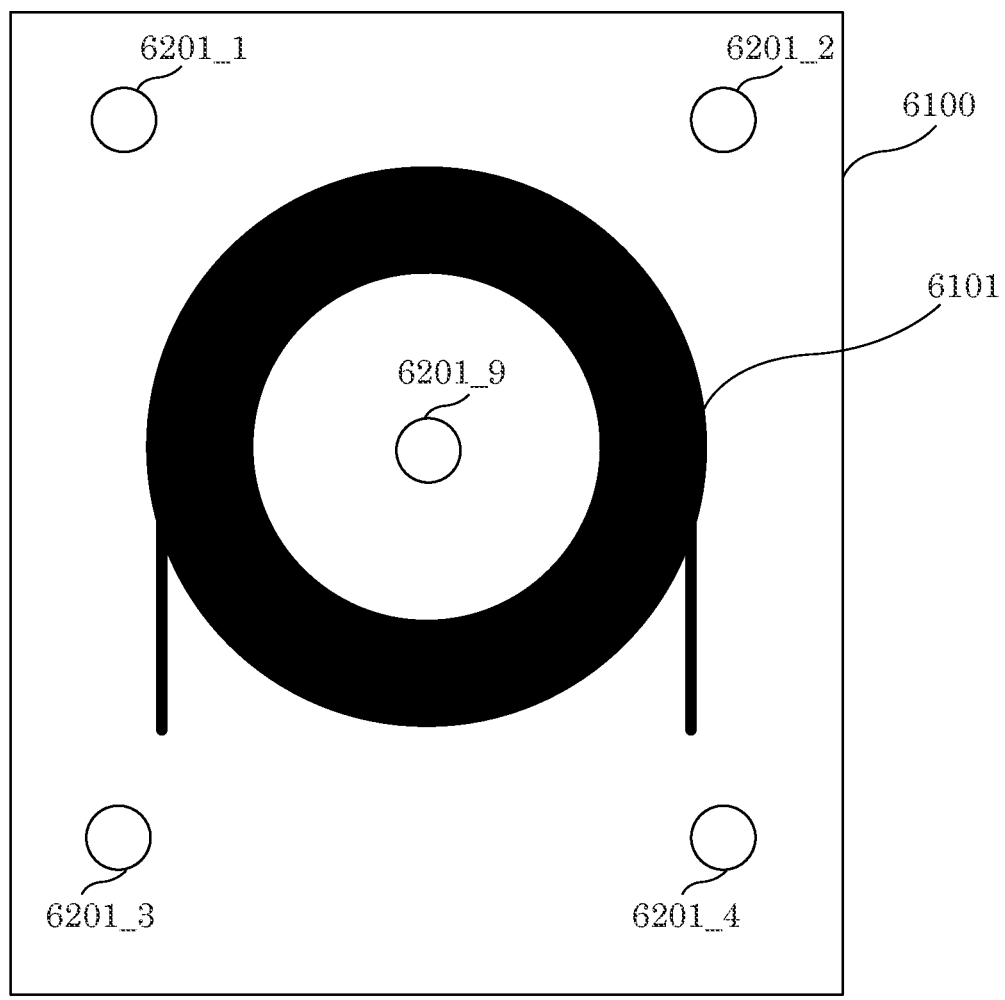
FIG. 66 illustrates another example of an arrangement of communication antennas.

FIG. 65 and FIG. 66 each illustrate an example of an arrangement of communication antennas where N≠M. Note that in FIG. 65 and FIG. 66, elements which operate in the same manner as those in FIG. 61 and FIG. 62 are assigned the same reference numerals. In FIG. 65 and FIGS. 66, 6201_1, 6201_2, 6201_3, 6201_4, 6201_5, 6201_6, 6201_7, 6201_8, and 6201_9 are communication antennas of power transmission device 5750.

Figure 68:
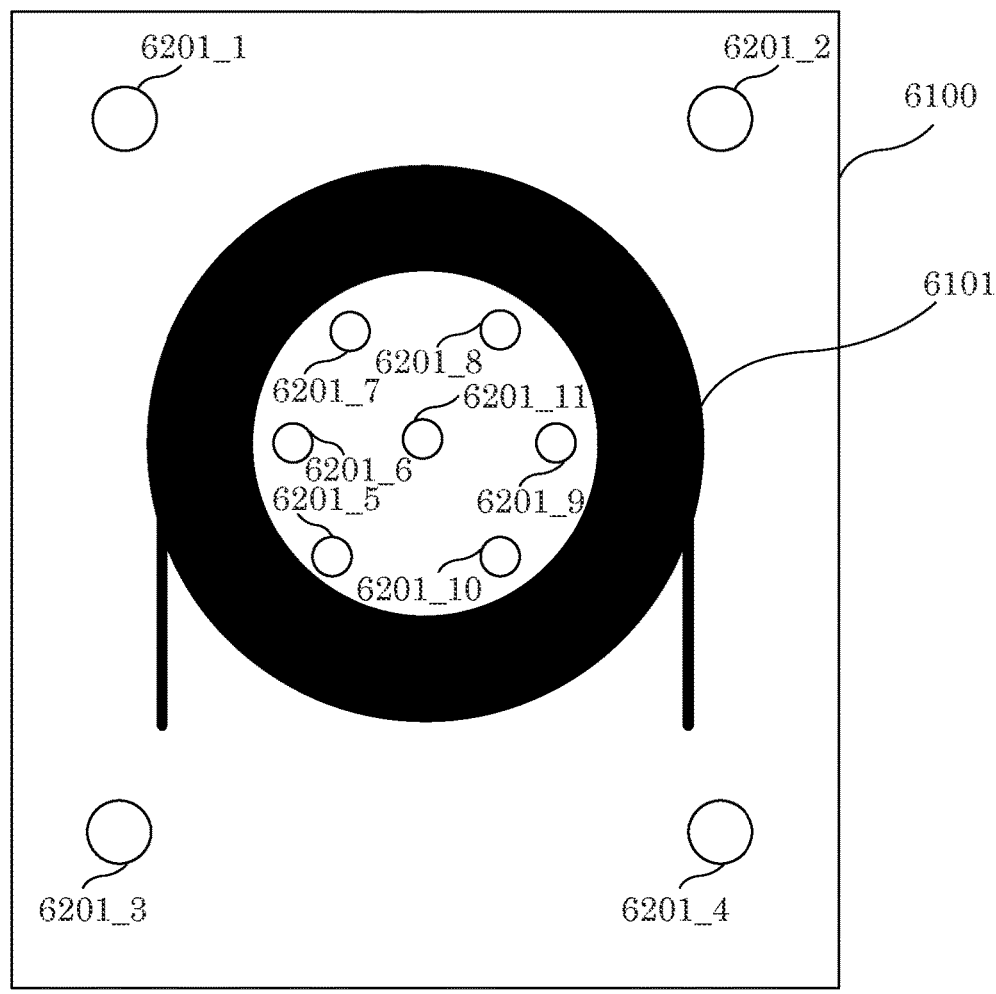
FIG. 68 illustrates another example of an arrangement of communication antennas.

Moreover, focusing on the inside of the circular coil, when the communication antennas of power transmission device 5750 are arranged like in FIG. 67 and FIG. 68, it is possible to more densely arrange the communication antennas. Note that in FIG. 67 and FIG. 68, elements which operate in the same manner as those in FIG. 61 and FIG. 62 are assigned the same reference numerals 6201_1, 6201_2, 6201_3, 6201_4, 6201_5, 6201_6, 6201_7, 6201_8, 6201_9, 6201_10, and 6201_11 are communication antennas of power transmission device 5750. Here, the characterizing point is the formation of a hexagonal shape by communication antennas 6201_5, 6201_6, 6201_7, 6201_8, 6201_9, and 6201_10.

In, for example, FIG. 62, FIG. 63, FIG. 64, FIG. 65, FIG. 66, FIG. 67, and FIG. 68, power transmission coil 5755 of power transmission device 5750 need not be circular in shape. For example, power transmission coil 5755 may be configured as a closed loop that defines a space inside the loop and a space outside the loop, and the communication antennas of power transmission device 5750 may be arranged both inside and outside of the closed loop. Here, the number of communication antennas arranged inside the closed loop and the number of communication antennas arranged outside the closed loop may be the same as when communication antennas are arranged inside the circle and communication antennas are arranged outside the circle.

Hereinbefore, methods of arranging the communication antennas of power transmission device 5750 have been described, but when the communication antennas of communication device 5700 are arranged in accordance with the same method of arranging the communication antennas of power transmission device 5750, the same advantageous effects can be achieved.

For example, in FIG. 62, FIG. 63, FIG. 64, FIG. 65, FIG. 66, FIG. 67, and FIG. 68, if 6100 is considered to indicate the contour of communication device 5700, 6101 is considered to indicate the power reception coil 5701 of communication device 5700, and 6201_1, 6201_2, 6201_3, 6201_1, 6201_5, 6201_6, 6201_7, 6201_8, 6201_9, 6201_10, 6201_11 are considered to indicate communication antennas of communication device 5700, if such an embodiment is carried out such that the configuration requirements described above are satisfied, the advantageous effects described above can be achieved.

Note that when controller 5757 of power transmission device in FIG. 57 recognizes that it is not connected to device 5790 from signals 5752, 5756, and 5763 from interface 5751, controller 5757 may instruct, via 5758, transceiver 5761 and communication antenna 5759 to stop the communication function.

Moreover, power transmission device 5750 may include a function for recognizing a required current (or power) for power transmission and a required current (or power) for communication via controller 5757, and notifying that current (or power) is insufficient in the supply of power 5752 from interface 5751 (for example, by causing a lamp such as a light emitting diode (LED) to emit light).

Embodiment 11

In the present embodiment, a specific example of operations performed by the communication device and the power transmission device described in Embodiment 10 will be given.

Figure 69:
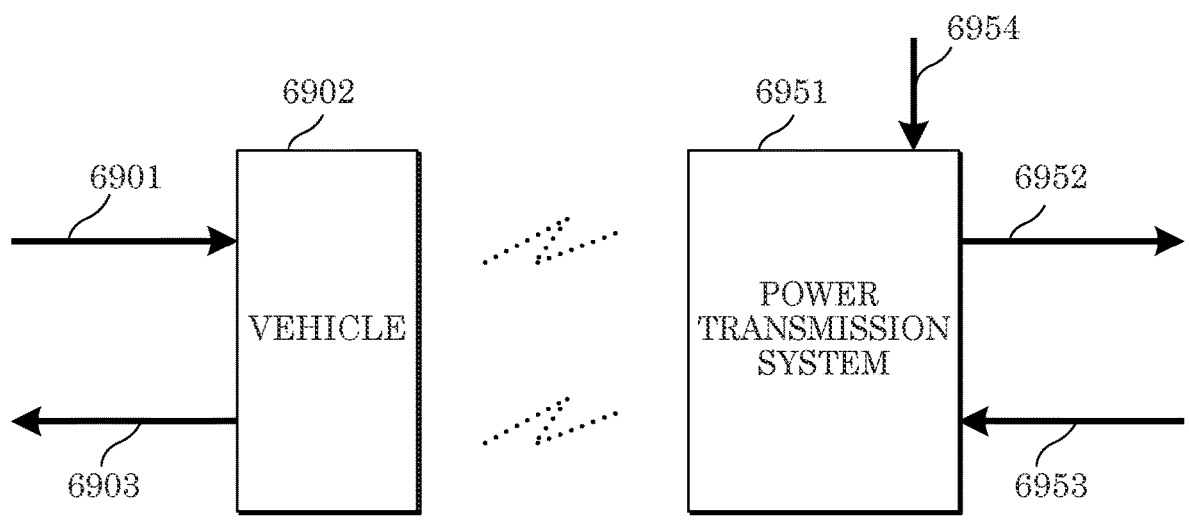
FIG. 69 illustrates a schematic of a system.

FIG. 69 illustrates a schematic of a system according to the present embodiment. In FIG. 69, a vehicle labeled as 6902 is equipped with a communication device like the one described in Embodiment 10. In other words, the vehicle is capable of receiving power wirelessly and capable of communicating wirelessly.

Vehicle 6902 that includes the communication device receives radio waves from power transmission system 6951 via a power reception antenna, and charges a battery. Vehicle 6902 including the communication device receives an input of data 6901, performs processing such as error correction coding and modulation, generates a modulated signal, and outputs the modulated signal as, for example, radio waves.

Power transmission system 6951 receives the modulated signal transmitted by vehicle 6902 that includes the communication device, implements processing such as demodulation and error correction decoding, obtains data, and outputs data 6952 generated based on the obtained data, or signal 6952 including the data generated based on the obtained data.

Power transmission system 6951 receives an input of data 6953 or signal 6953 including the data, implements processing such as error correction coding and modulation on data obtained from this data, generates a modulated signal, and outputs the modulated signal as, for example, radio waves.

Vehicle 6902 including the communication device receives the modulated signal transmitted by power transmission system 6951, implements processing such as demodulation and error correction decoding, obtains data, and outputs data 6903 generated based on the obtained data, or signal 6903 including the data generated based on the obtained data.

Figure 70:
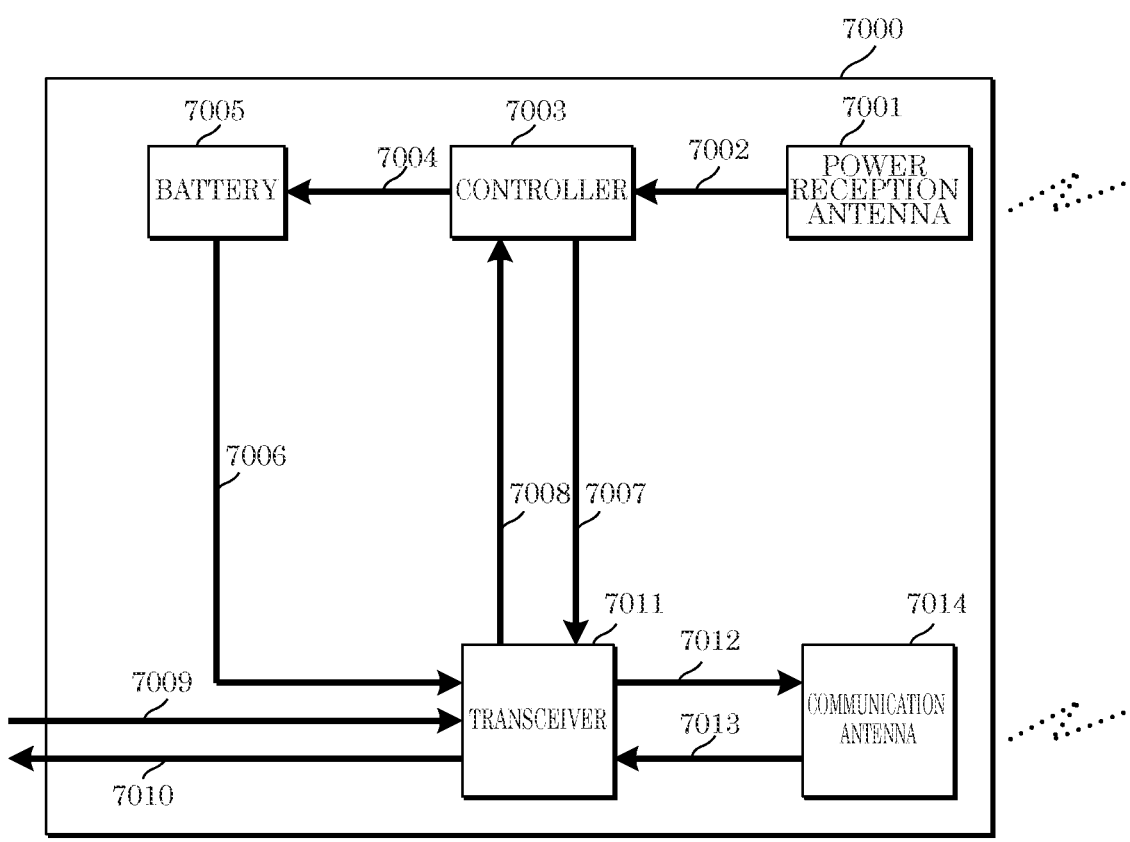
FIG. 70 illustrates an example of a configuration of a communication device.

7000 in FIG. 70 is an example of a configuration of communication device 6902 illustrated in FIG. 69. Controller 7003 receives an input of received signal 7002 received by power reception antenna 7001, and second control signal 7008, performs power reception control, and outputs power supply signal 7004 and first control signal 7007.

Battery 7005 receives an input of power supply signal 7004, charges the battery, and outputs signal 7006.

Transceiver 7011 receives an input of first data 7009, signal 7006, and first control signal 7007, implements processing such as error correction coding and modulation, generates a modulated signal including first data 7009, and outputs the modulated signal as transmission signal 7012. Transmission signal 7012 is output from communication antenna 7014 as, for example, radio waves.

Moreover, transceiver 7010 receives an input of received signal 7013 received by receive antenna 7014, implements processing such as demodulation and error correction decoding, and outputs second data 7010 and second control signal 7008.

Figure 71:
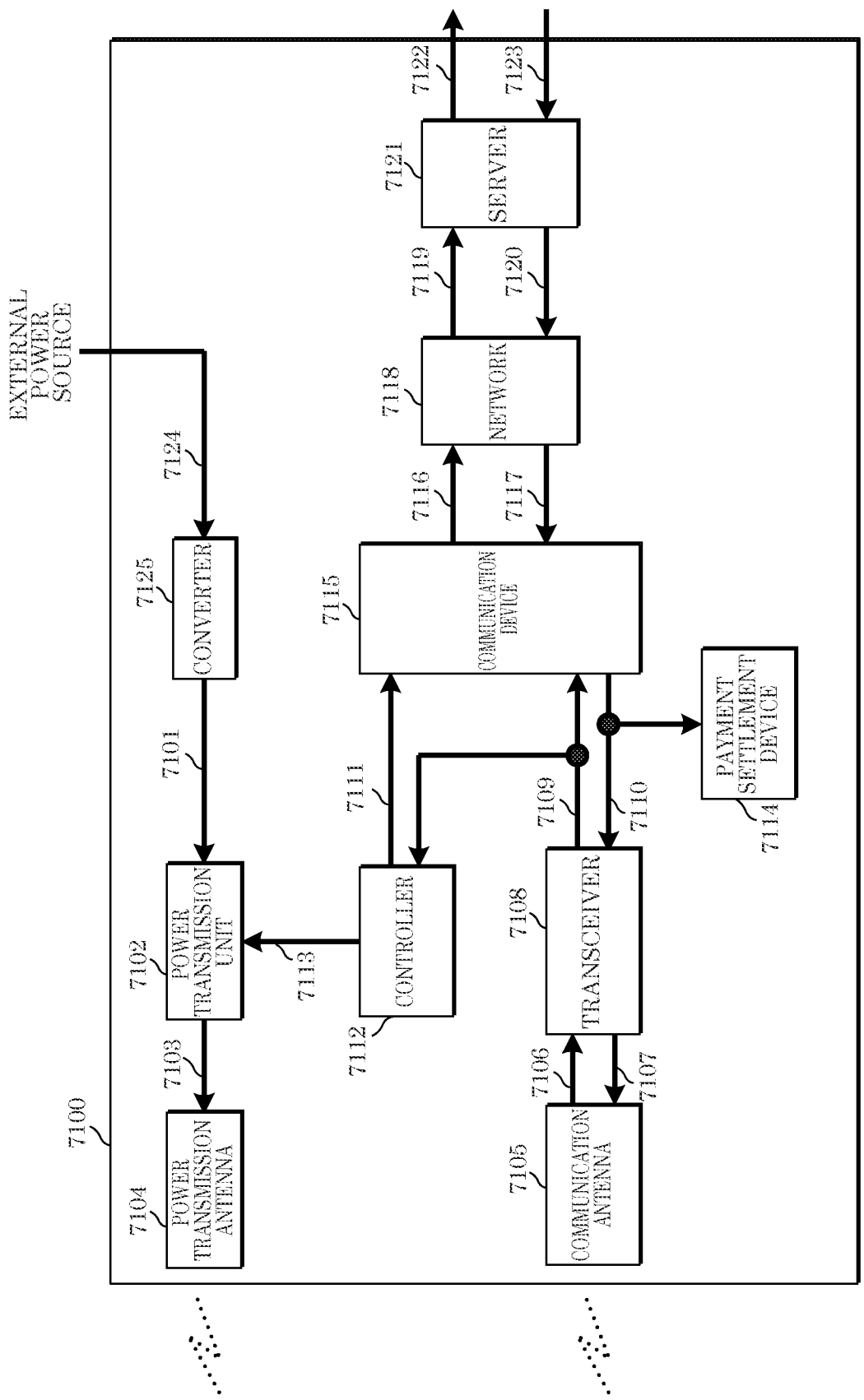
FIG. 71 illustrates an example of a configuration of a power transmission system.

7100 in FIG. 71 indicates an example of a configuration of power transmission system 6951 illustrated in FIG. 69. Converter 7125 receives an input of a supply of AC power 7124 obtained from an external power source, performs AC-DC conversion, and outputs a supply of DC power 7101.

Power transmission unit 7102 receives inputs of a supply of DC power 7101 and fourth control signal 7113, and generates and outputs power transmission signal 7103 based on fourth control signal 7113. Power transmission signal 7103 is then output from power transmission antenna 7104. At this time, upon receipt of this signal, the communication device illustrated in FIG. 70 receives power.

Server 7121 receives an input of third data 7123, and outputs data or modulated signal 7120 including the third data. The data or modulated signal 7120 including the third data is input into communication device 7115 via network 7118.

Communication device 7115 receives inputs of third control signal 7111 and data or modulated signal 7117 including the third data, and generates and outputs fifth data 7110.

Transceiver device 7108 receives an input of fifth data 7110, implements processing such as error correction coding and modulation, generates a modulated signal, and outputs the modulated signal as transmission signal 7107. Transmission signal 7107 is then output from communication antenna 7105 as, for example, radio waves, and, for example, communication device 7000 illustrated in FIG. 70 receives this signal.

Moreover, transceiver 7108 receives an input of received signal 7106 output from communication antenna 7105, performs processing such as demodulation and error correction decoding, and outputs sixth data 7109.

Communication device 7115 receives inputs of third control signal 7111 and sixth data 7109, and generates and outputs data or modulated signal 7116 including the data included in the received third control signal 7111 and sixth data 7109.

This signal 7116 is input into server 7121 via network 7118. Server 7121 then obtains and outputs fourth data 7122 from signal 7116.

Payment settlement device 7114 receives an input of fifth data 7110, whereby payment can be settled. However, power transmission system 7100 need not include payment settlement device 7114.

Controller 7112 receives an input of sixth data 7109, and outputs third control signal 7111 and fourth control signal 7113.

Note that specific operations performed by the elements included in communication device 7000 in FIG. 70 and power transmission system 7100 will be described in the descriptions of FIG. 72, FIG. 73, FIG. 74, FIG. 75, FIG. 76, and FIG. 76.

Figure 72:
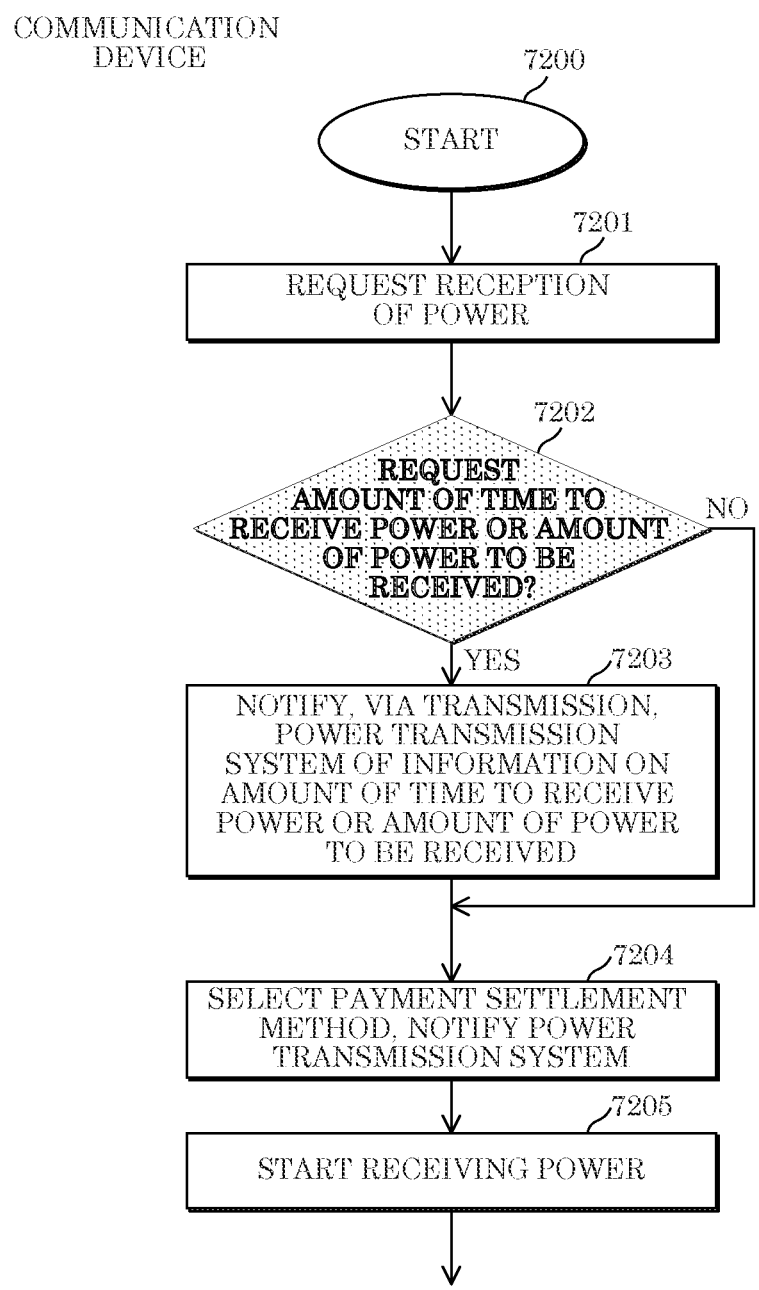
FIG. 72 illustrates one example of processing operations performed by a communication device.

First, communication device 7000 accesses power transmission system 7100. Then, a procedure screen is displayed on the display included in communication device 7000 (note that the display is not illustrated in FIG. 70), and, for example, first, operations such as those in FIG. 72 are performed. Next, FIG. 72 will be described.

The following procedures start at "start" labeled 7200.

As illustrated in FIG. 72 communication device 7000 requests the reception of power (7201) from power transmission system 7100. For example, controller 7003 in FIG. 70 outputs information indicating a request for the reception of power (7201) using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may request the reception of power (7201) via an external input.

Next, communication device 7000 determines whether to request an amount of time to receive power or an amount of power to be received from power transmission system 7100 (7202).

When communication device 7000 does not request an amount of time to receive power or an amount of power to be received, processing proceeds to 7204. When communication device 7000 does request an amount of time to receive power or an amount of power to be received, communication device 7000 notifies (7203) the power transmission system (7100) of information on the amount of time to receive power or the amount of power to be received. For example, controller 7003 in FIG. 70 outputs information indicating the notifying of the power transmission system (7100) of information on the amount of time to receive power or the amount of power to be received, using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may obtain the information on the amount of time to receive power or the amount of power to be received via an external input.

Next, communication device 7000 selects a payment settlement method and notifies the power transmission system of the selected payment settlement method (7204). For example, controller 7003 in FIG. 70 outputs information indicating the selection of a payment settlement method and the notification of the power transmission system of the selected payment settlement method (7204), using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may obtain the payment settlement method information via an external input.

With this, communication device 7000 starts receiving power (7205).

Figure 73:
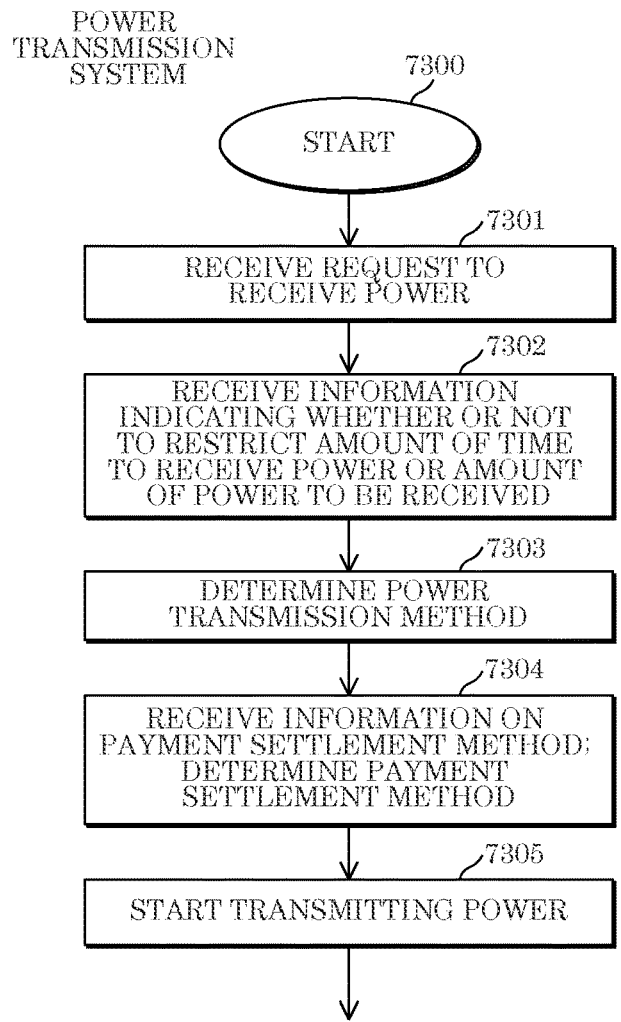
FIG. 73 illustrates one example of processing operations performed by a power transmission system.

FIG. 73 illustrates operations performed by power transmission system 7100 in response to the operations of communication device 7000 in FIG. 72. Power transmission system 7100 receives a request to receive power (7301) from communication device 7000. For example, transceiver 7108 in power transmission system 7100 receives an input of received signal 7106 received from communication antenna 7105, and obtains the request to receive power (7301) included in received signal 7106.

Power transmission system 7100 then receives, from communication device 7000, information on whether or not to restrict the amount of time to receive power or the amount of power to be received (7302). For example, transceiver 7108 in power transmission system 7100 receives an input of received signal 7106 received from communication antenna 7105, and obtains information on whether or not to restrict the amount of time to receive power or the amount of power to be received (7302) that is included in received signal 7106.

Next, power transmission system 7100 determines a power transmission method (7303). For example, if power transmission system 7100 is to restrict the amount of time that (communication device 7000) is to receive the power or the amount of power to be received (by communication device 7000) the amount of time that power transmission system 7100 is to transmit the power or the amount of power that power transmission system 7100 is to transmit), power transmission system 7100 determines the restriction method. Moreover, if power transmission system 7100 is not to restrict the amount time that (communication device 7000) is to receive the power or the amount of power to be received (by communication device 7000) (i.e., the amount time that; power transmission system 7100 is to transmit the power or the amount of power that power transmission system 7100 is to transmit), power transmission system 7100 determines to not restrict the above. For example, transceiver 7108 in power transmission system 7100 receives an input of received signal 7106 received from communication antenna 7105, obtains information on whether or not to restrict the amount of time to receive power or the amount of power to be received (7302) that is included in received signal 7106, and controller 7112 determines a power transmission method from this information, and outputs fourth control signal 7113 including information on the determined power transmission method.

Next, power transmission system 7100 receives information on the payment settlement method from communication device 7000 and determines the payment settlement method (7304). For example, transceiver 7108 in power transmission system 7100 receives an input of received signal 7106 received from communication antenna 7105, obtains the information on the payment settlement method included in received signal 7106, and controller 7112 determines the payment settlement method from this information. Communication device 7115 then obtains this information, and passes the information on the payment settlement method to server 7121 and passes the information on the determined payment settlement method to payment; settlement device 7114, and payment settlement device 7114 thus knows the payment settlement method.

This sequence of operations ends, and power transmission system 7110 starts transmitting power (7305) to communication device 7000.

Figure 74:
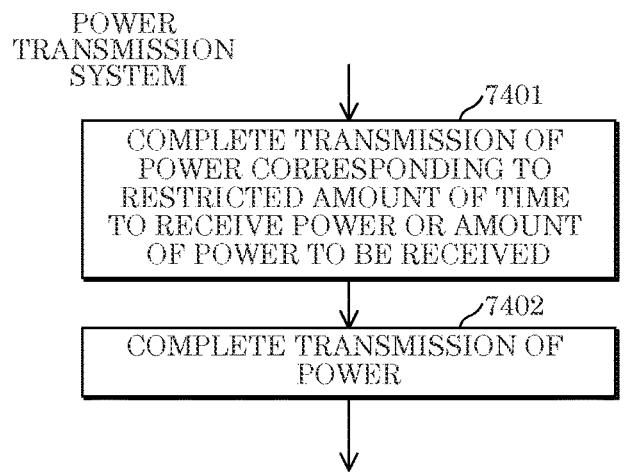
FIG. 74 illustrates another example of processing operations performed by a power transmission system.

FIG. 74 illustrates operations performed by power transmission system 7110 after the operations illustrated in FIG.

72 and FIG. 73. Since communication device 7000 has transmitted information related to power reception, i.e., the information on the restriction of the amount of time to receive power or the amount of power to be received, power transmission system 7110 completes the transmission of power (7402) at the point in time that the restricted amount of time to receive power is reached or the transmission of the restricted amount of power to be received is complete (7401).

Moreover, when, unlike the case illustrated in FIG. 74, power transmission system 7110 does not receive, from communication device 7000, a restriction of the amount of time to receive power or the amount of power to be received, or receives a restriction of the amount of time to transmit power or the amount of power to be received but the restriction has not yet been reached, and then receives a request to end the reception of power (the transceiver included in communication device 7000 transmits this information and the transceiver included in the power transmission system receives this information), power transmission system 7110 ends the transmission of power.

Figure 75:
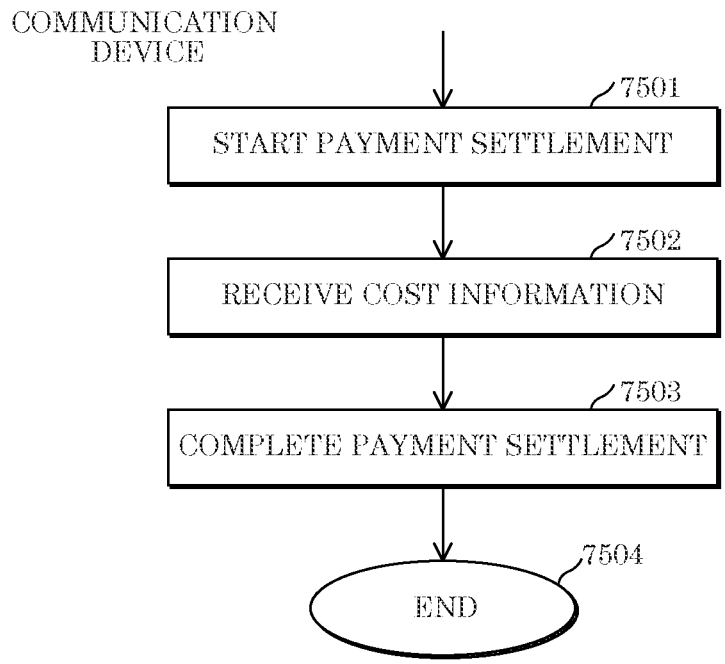
FIG. 75 illustrates another example of processing operations performed by a communication device.

With this, as illustrated in FIG. 75, communication device 7000 starts the payment settlement (7501). Accordingly, communication device 7000 uses transceiver 7011 to convey to power transmission system 7110 that communication device 7000 will start the payment settlement.

Consequently, communication device 7000 receives cost information from power transmission system 7110 (7502). Thus, power transmission system 7110 generates, in transceiver 7108, a modulated signal including the cost information, and transmits the modulated signal. Communication device 7000 receives the modulated signal including this information via transceiver 7011, and thus obtains the cost information.

Communication device 7000 then completes the payment settlement (7503), and ends the processing (7504).

Figure 76:
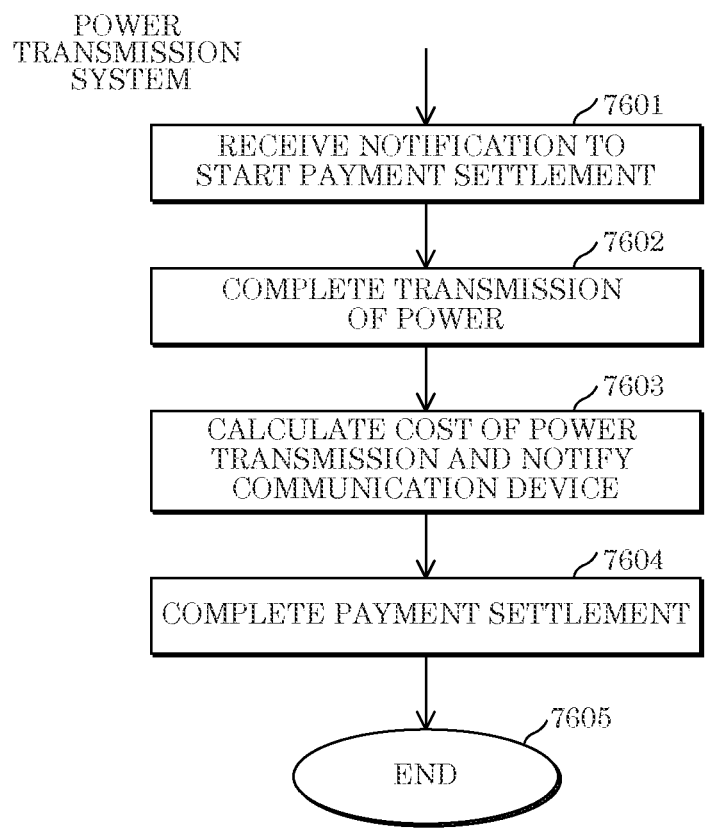
FIG. 76 illustrates yet another example of processing operations performed by a power transmission system.

At this time, as illustrated in FIG. 76, power transmission system 7100 receives, from communication device 7000, a notification to start payment settlement (7601). Consequently, power transmission system 7100 ends the transmission of power (7602).

Power transmission system 7100 then calculates the cost for the transmission of power, and notifies communication device 7000 of the cost (7603).

In accordance with the settlement of payment by communication device 7000, power transmission system 7100 ends payment settlement procedure (7604), and then ends the procedure (7605).

As a result of communication device 7000 and power transmission system 7100 operating in the manner described above, it is possible to achieve an advantageous effect whereby the amount of power to be transmitted the amount of power to be received can be restricted, and a payment settlement system based on the restricted amount of power to be transmitted/the amount of power to be received can be provided.

Note that the communication between communication device 7000 and power transmission system 7100 in the present embodiment may be wireless communication via radio waves, and, alternatively, may be optical communication via visible light.

Embodiment 12

In the present embodiment, a specific example of operations performed by the communication device and the power transmission device described in Embodiment 10 and Embodiment 11 will be given.

Figure 77:
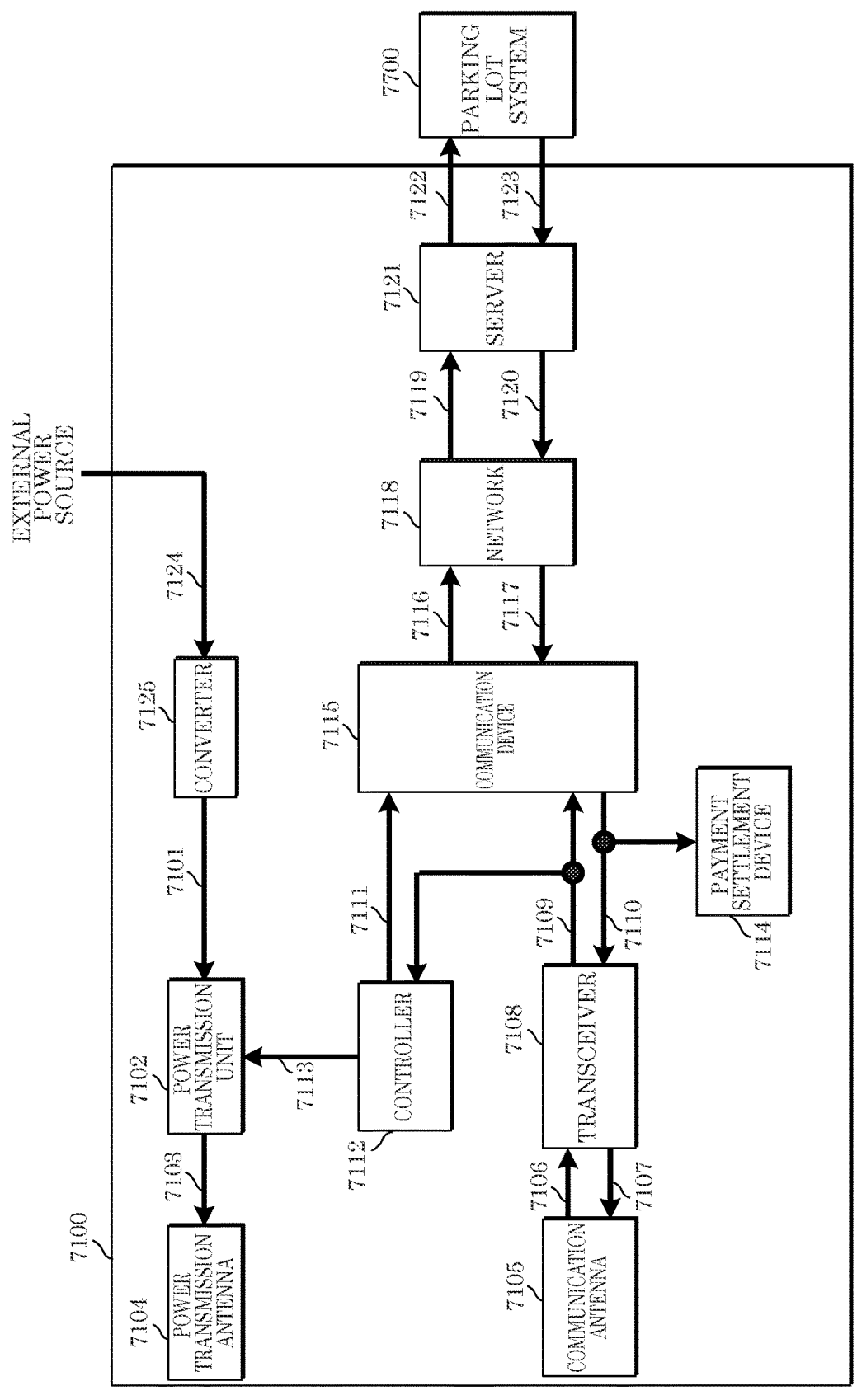
FIG. 77 illustrates an example of a configuration of a power transmission system.

Note that 7100 in FIG. 77 indicates an example of a configuration of power transmission system 6951 illustrated in FIG. 69, and elements in FIG. 77 which operate in the same manner as those in FIG. 71 are assigned the same reference numerals, and repeated description thereof is omitted.

Parking lot system 7700 in FIG. 77 communicates with, for example, server 7121 of power transmission system 7100.

For example, server 7121 transmits data 7122 including a request for payment of a parking fee.

Then, parking lot system 7700 transmits, to server 7121, data 7123 including information on the parking fee.

Note that parking lot system 7700 is a system that, for example, manages the amount of time that a vehicle is parked, manages parking fees commensurate with the amount of time that a vehicle is parked, and manages the entering and exiting of vehicles.

Figure 78:
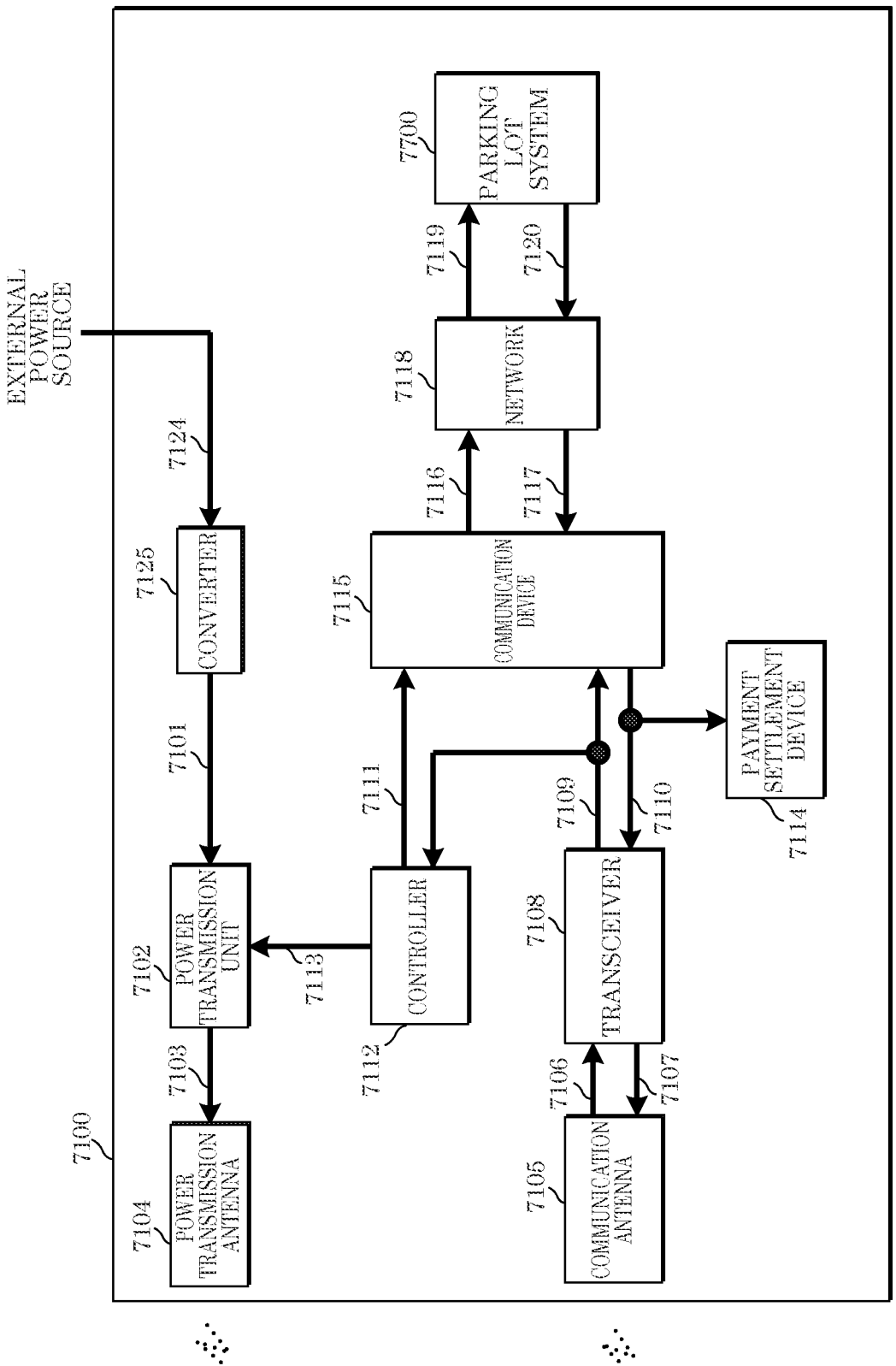
FIG. 78 illustrates an example of a configuration of a power transmission system.

7100 in FIG. 78 indicates an example of a configuration of power transmission system 6951 illustrated in FIG. 69, and differs from FIG. 77 in that power transmission system 7100 includes parking lot system 7700.

For example, parking lot system 7700 in FIG. 78 communicates with communication device 7115 via network 7118.

For example, communication device 7115 transmits data 7116 including a request for payment of a parking fee.

Then, parking lot system 7700 transmits, via network 7118, data 7120 including information on the parking fee.

Note that as the configuration of, for example, the communication device included in vehicle 6902 that communicates with power transmission system 6951 for example, FIG. 77 and FIG. 78) in FIG. 69, has already been described in another embodiment, repeated description rill be omitted.

Figure 79:
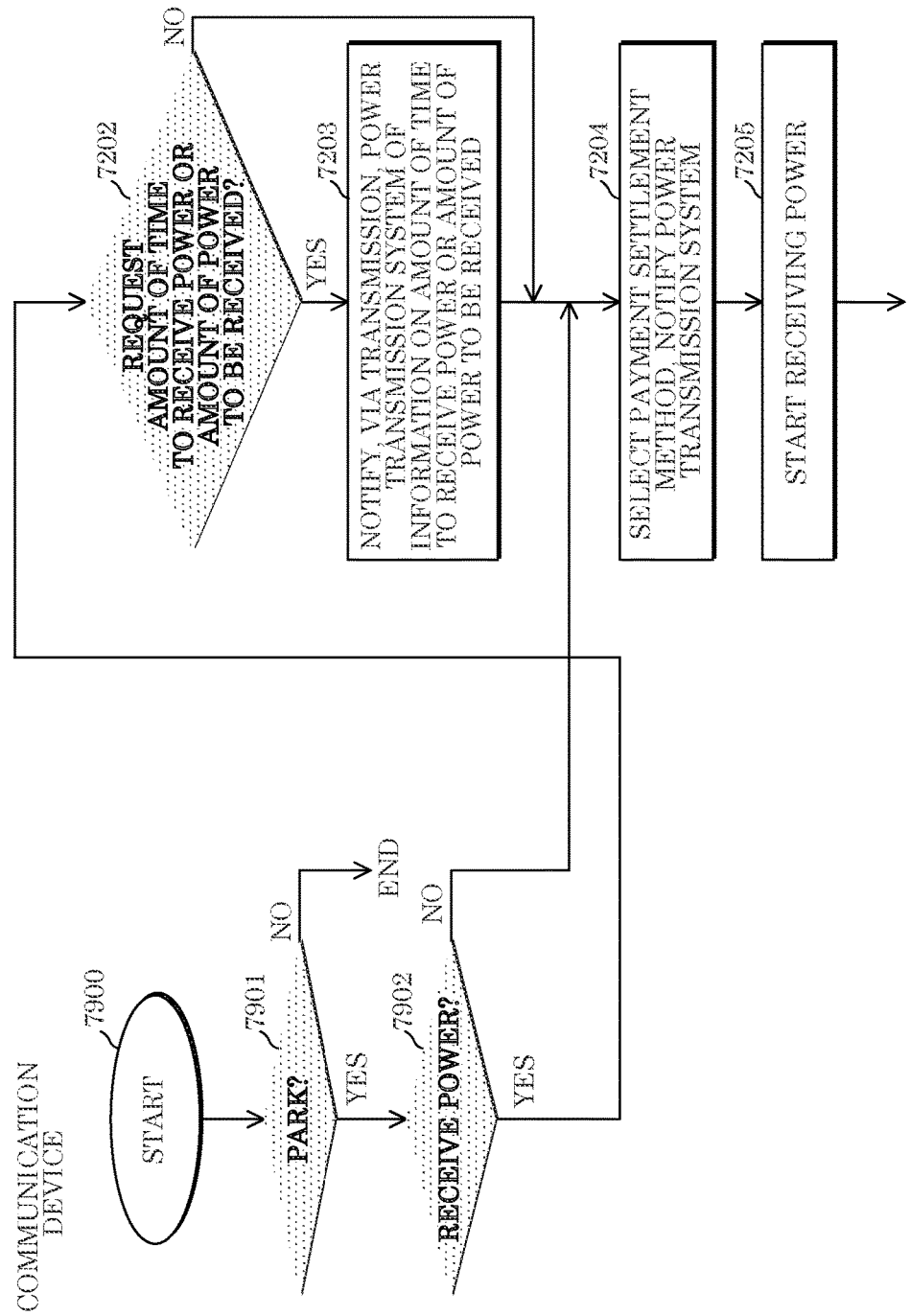
FIG. 79 relates to operations performed by a communication device included in a vehicle.

FIG. 79 relates to operations performed by the communication device included in vehicle 6902 illustrated in FIG. 69.

The communication device included in vehicle 6902 illustrated in FIG. 69 first, for example, accesses power transmission system 7100 illustrated in FIG. 77 and FIG. 78. Then, a procedure screen is displayed on the display included in the communication device included in vehicle 6902 illustrated in FIG. 69, and the operations illustrated in FIG. 79 are performed. Next, FIG. 79 will be described.

Upon start (7900), the following procedure starts.

As illustrated in FIG. 79, the communication device included in vehicle 6902 illustrated in FIG. 69 tells power transmission system 7100 whether vehicle 6902 will park in the parking lot or not (7901). For example, when the communication device included in vehicle 6902 has the configuration illustrated in FIG. 70, transceiver 7011 generates and outputs transmission signal 7012 including information on whether vehicle 6902 will park or not, and outputs transmission signal 7012 as radio waves from communication antenna 7014. Power transmission system 7100 then receives this signal.

When vehicle 6902 will not park in the parking lot, that is to say, when the answer is NO to 7901, the procedure ends. On the other band, when vehicle 6902 will park in the parking lot, that is to say, when the answer is YES to 7901, the procedure proceeds to 7902.

The communication device included in vehicle 6902 illustrated in FIG. 69 tells power transmission system 7100 whether vehicle 6902 will receive power or not (7902). For example, when the communication device included in vehicle 6902 has the configuration illustrated in FIG. 70, controller 7003 outputs information indicating whether to receive power or not (7902) using first control signal 7007, transceiver 7011 generates and outputs transmission signal 7012 including this information, and outputs transmission signal 7012 from communication antenna 7014 as radio waves. Power transmission system 7100 then receives this signal. Note that controller 7003 in FIG. 70 may request the reception of power (7201) via an external input.

When vehicle 6902 will not receive power, that is to say, when the answer is NO to 7902, the procedure proceeds to 7204. On the other band, when vehicle 6902 will receive power, that is to say, when the answer is YES to 7902, the procedure proceeds to step 7202.

The communication device included in vehicle 6902 illustrated in FIG. 69 requests to receive power (7201) from power transmission system 7100. Then, the communication device included in vehicle 6902 illustrated in FIG. 69 determines whether to request an amount of time to receive power or an amount of power to be received (7202).

When the communication device included in vehicle 6902 illustrated in FIG. 69 does not request an amount of time to receive power or an amount of power to be received, processing proceeds to 7204. When the communication device included in vehicle 6902 illustrated in FIG. 69 does request an amount of time to receive power or an amount of power to be received, communication device 7000 notifies (7203) the power transmission system (7100) of information on the amount of time to receive power or the amount of power to be received. For example, when communication device included in vehicle 6902 has the configuration illustrated in FIG. 70, controller 7003 in FIG. 70 outputs information indicating the notifying of the power transmission system (7100) of information on the amount of time to receive power or the amount of power to be received, using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may obtain the information on the amount of time to receive power or the amount of power to be received via an external input.

Next, the communication device included in vehicle 6902 illustrated in FIG. 69 selects a payment settlement method and notifies the power transmission system of the selected payment settlement method (7204). For example, when the communication device included in vehicle 6902 has the configuration illustrated in FIG. 70, controller 7003 in FIG. 70 outputs information indicating the selection of a payment settlement method and the notification of the power transmission system of the selected payment settlement method (7204), using first control signal 7007, and transceiver 7011 generates transmission signal 7012 including this information, and outputs transmission signal 7012 from communication antenna 7014 as radio waves. Power transmission system 7100 then receives this signal. Note that controller 7003 in FIG. 70 may obtain the payment settlement method information via an external input.

With this, communication device 7000 starts receiving power (7205).

Figure 80:
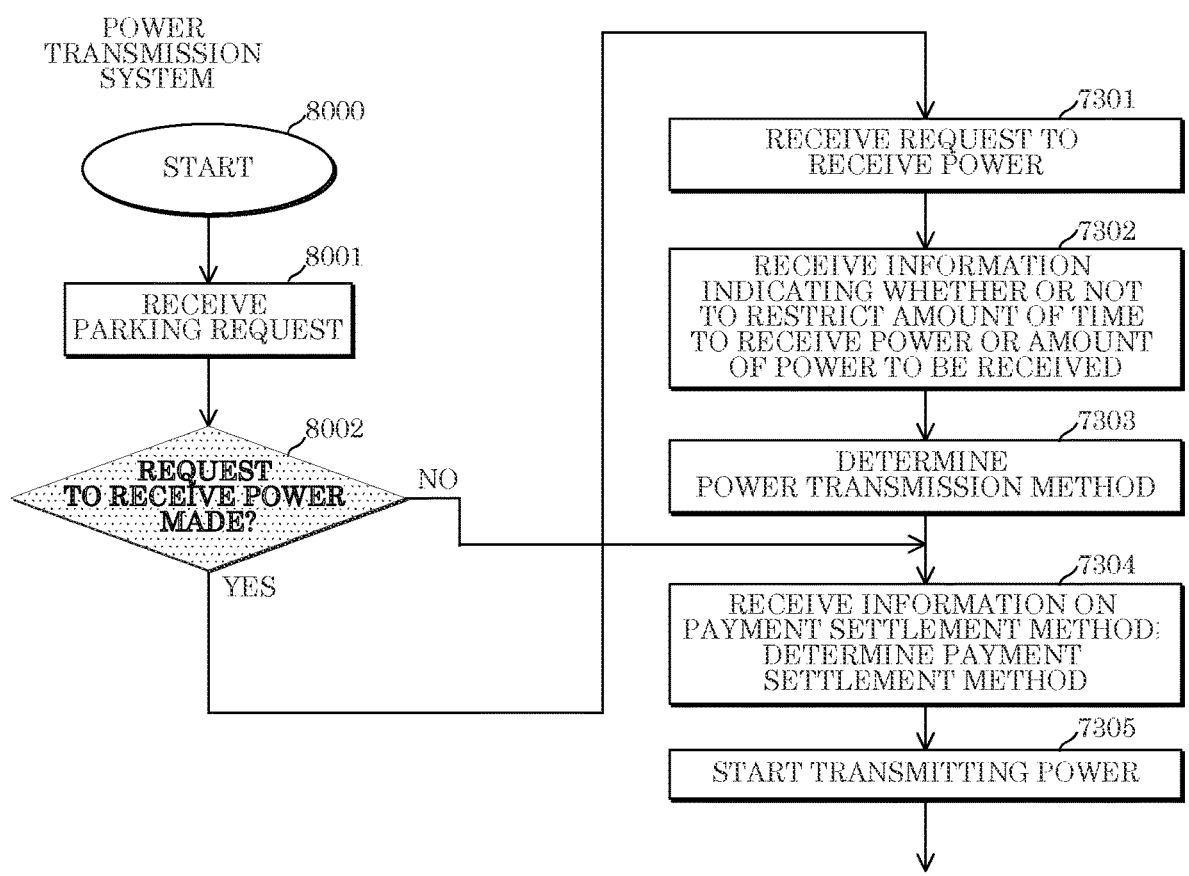
FIG. 80 relates to operations performed by a power transmission system.

FIG. 80 relates to operations performed by power transmission system 6951 illustrated in FIG. 69, that is to say, for example, power transmission system 7100 illustrated in FIG. 77 and FIG. 78.

Power transmission system 7100 receives a request to park (8001) from the communication device included in vehicle 6902 illustrated in FIG. 69.

Next, power transmission system 7100 receives "request to receive power made? (8002)" from the communication device included in vehicle 6902 illustrated in FIG. 69.

For example, transceiver 7108 in power transmission system 7100 receives an input of received signal 7106 received from communication antenna 7105, and obtains information on "request to receive power made? (8002)" included in received signal 7106.

When a request to receive power is not obtained, that is to say, when the answer is NO to 8002, the procedure proceeds to 7304. On the other band, when a request to receive power is obtained, that is to say, when the answer is YES to 8002, the procedure proceeds to step 7301.

Power transmission system 7100 then receives, from the communication device included in vehicle 6902 illustrated in FIG. 69, information on whether or not to restrict the amount of time to receive power or the amount of power to be received (7302). For example, transceiver 7108 in power transmission system 7100 receives an input of received signal 7106 received from communication antenna 7105, and obtains information on whether or not to restrict the amount of time to receive power or the amount of power to be received (7302) that is included in received signal 7106.

Next, power transmission system 7100 determines a power transmission method (7303). For example, if power transmission system 7100 is to restrict the amount of time that (the communication device included in vehicle 6902 illustrated in FIG. 69) is to receive the power or the amount of power to be received (by communication device included in vehicle 6902 illustrated in FIG. 69) (i.e., the amount time that power transmission system 7100 is to transmit the power or the amount of power that power transmission system 7100 is to transmit), power transmission system 7100 determines the restriction method. Moreover, if power transmission system 7100 is not to restrict the amount time that (communication device included in vehicle 6902 illustrated in FIG. 69) is to receive the power or the amount of power to be received (by communication device included in vehicle 6902 illustrated in FIG. 69) (i.e., the amount time that power transmission system 7100 is to transmit the power or the amount of power that power transmission system 7100 is to transmit), power transmission system 7100 determines to not restrict the above. For example, transceiver 7108 in power transmission system 7100 receives an input of received signal 7106 received from communication antenna 7105, obtains information on whether or not to restrict the amount of time to receive power or the amount of power to be received (7302) that is included in received signal 7106, and controller 7112 determines a power transmission method from this information, and outputs fourth control signal 7113 including information on the determined power transmission method.

Next, power transmission system 7100 receives information on the payment settlement method from the communication device included in vehicle 6902 illustrated in FIG. 69 and determines the payment settlement method (7304). For example, transceiver 7108 in power transmission system 7100 receives an input of received signal 7106 received from communication antenna 7105, obtains the information on the payment settlement method included in received signal 7106, and controller 7112 determines the payment settlement method from this information. Communication device 7115 then obtains this information, and passes the information on the payment settlement method to server 7121 and passes the information on the determined payment settlement method to payment settlement device 7114, and payment settlement device 7114 thus knows the payment settlement method.

This sequence of operations ends, and power transmission system 7110 starts transmitting power (7305) to vehicle 6902 illustrated in FIG. 69.

FIG. 74 illustrates operations performed by power transmission system 7110 after the operations illustrated in FIG. 79 and FIG. 80. Since the communication device included in vehicle 6902 illustrated in FIG. 69 has transmitted information related to power reception, i.e., the information on the restriction of the amount of time to receive power or an amount of power to be received, power transmission system 7110 completes the transmission of power (7402) at the point in time that the restricted amount of time to receive power is reached or the transmission of the restricted amount of power to be received is complete (7401).

Moreover, when, unlike the case illustrated in FIG. 74, power transmission system 7110 does not receive, from the communication device included in vehicle 6902 illustrated in FIG. 69, a restriction of the amount of time to receive power or the amount of power to be received, or receives a restriction of the amount of time to receive power or the amount of power to be received but the restriction has not yet been reached, and then receives a request to end the reception of power (the transceiver included in the communication device included in vehicle 6902 illustrated in FIG. 69 transmits this information and the transceiver included in the power transmission system receives this information), power transmission system 7110 ends the transmission of power.

With this, the communication device included in vehicle 6902 illustrated in FIG. 69 starts the payment settlement (7501). Accordingly, the communication device included in vehicle 6902 illustrated in FIG. 39 uses transceiver 7011 to convey to power transmission system 7110 that the communication device will start the payment settlement.

Consequently, communication device 7000 receives cost information from power transmission system 7110 (7502).

Here, the cost includes either a parking fee or both a parking fee and a power reception fee.

Thus, power transmission system 7110 generates, in transceiver 7108, a modulated signal including the cost information, and transmits the modulated signal. The communication device included in vehicle 6902 illustrated in FIG. 69 receives the modulated signal including this information via transceiver 7011, and thus obtains the cost information.

The communication device included in vehicle 6902 illustrated in FIG. 69 then completes the payment settlement (7503), and ends the processing (7504).

At this time, power transmission system 7100 receives, from the communication device included in vehicle 6902 illustrated in FIG. 69, a notification to start payment settlement (7601). Consequently, power transmission system 7100 ends the transmission of power (7602).

Power transmission system 7100 then calculates the cost for the transmission of power and the cost related to parking, and notifies communication device 7000 of the costs (7603).

In accordance with the settlement of payment by the communication device included in vehicle 6902 illustrated in FIG. 69, power transmission system 7100 ends payment settlement procedure (7604), and then ends the procedure (7605).

As a result of the communication device included in vehicle 6902 illustrated in FIG. 69 and power transmission system 7100 operating in the manner described above, it is possible to achieve an advantageous effect whereby the amount of power to be transmitted the amount of power to be received can be restricted, and a system which simultaneously achieves payment settlement based on the restricted amount of power to be transmitted/the amount of power to be received and payment settlement related to parking can be provided.

Note that the communication between the communication device included in vehicle 6902 illustrated in FIG. 69 and power transmission system 7100 in the present embodiment may be wireless communication via radio waves, and, alternatively, may be optical communication via visible light.

Embodiment 13

In the present embodiment, a specific example of operations performed by the communication device and the power transmission device described in Embodiment 10 and Embodiment 11 will be given.

Figure 81:
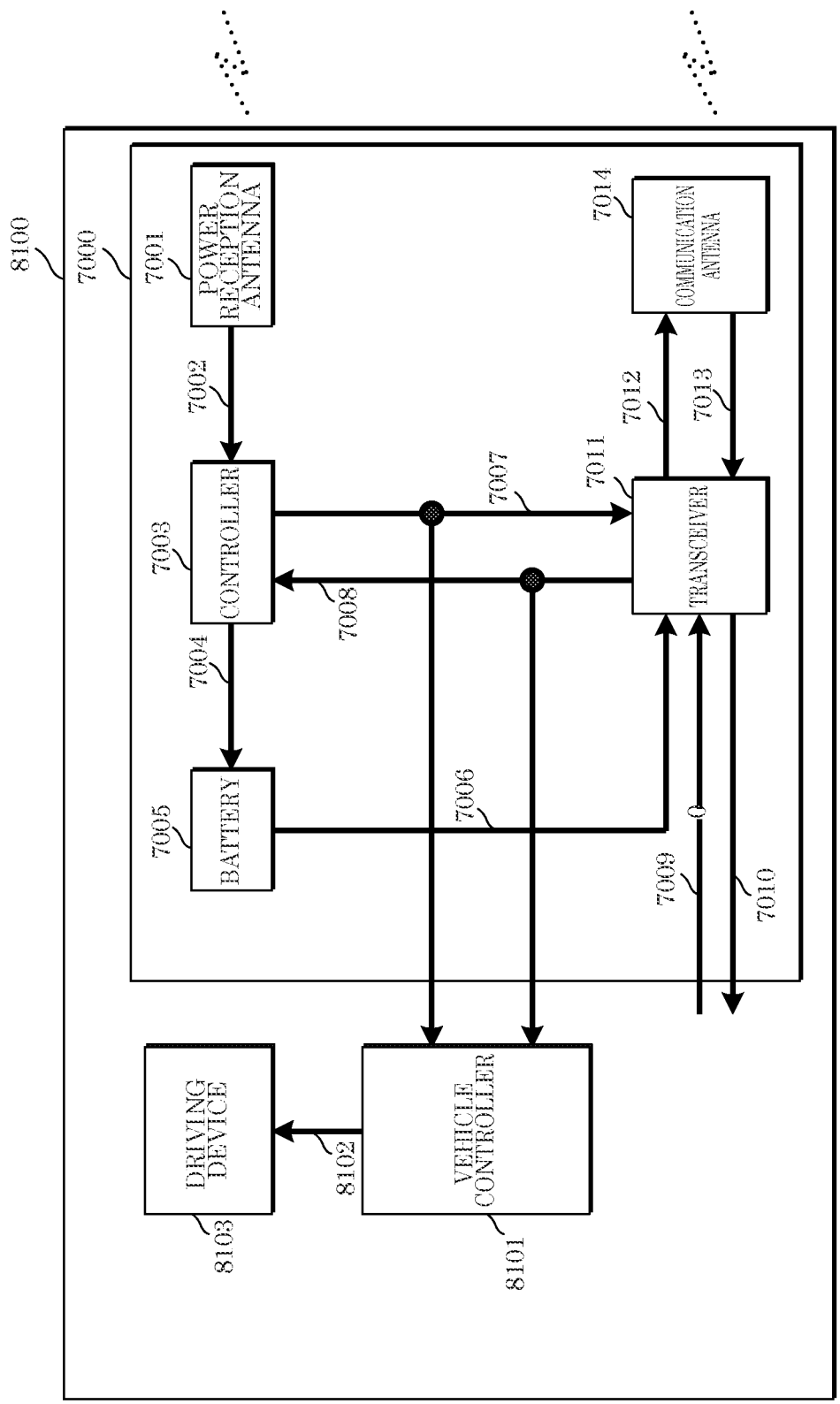
FIG. 81 illustrates an example of a configuration of a vehicle.

FIG. 81 illustrates a configuration corresponding to vehicle 6902, among vehicle 6902 and power transmission system 6951 illustrated in FIG. 69.

Note that in FIG. 81, elements which operate in the same manner as those in FIG. 70 are assigned the same reference numerals, and repeated description thereof is omitted. In FIG. 81, 8100 is a vehicle. Vehicle controller 8101 receives inputs of first control signal 7007 and second control signal 7008, determines a control method for the vehicle based on information included in first control signal 7007 and information included in second control signal 7008, and outputs vehicle control signal 8102.

Driving device 8103 receives an input of vehicle control signal 8102, and based on vehicle control signal 8102, controls the motor, driving system, steering wheel, steering—which are all powered—whereby the vehicle moves to a desired location.

Since the configuration of the system that corresponds to power transmission system 6951 illustrated in FIG. 69 is as shown in FIG. 71, FIG. 77, and FIG. 78, and thus has already been described, repeated description will be omitted. Power transmission system 6951 may have a configuration that includes a function for power supply payment settlement (power transmission payment settlement), and, alternatively, may have a configuration that includes a function for power supply payment settlement and parking payment settlement, and may have a configuration that includes neither.

Figure 82:
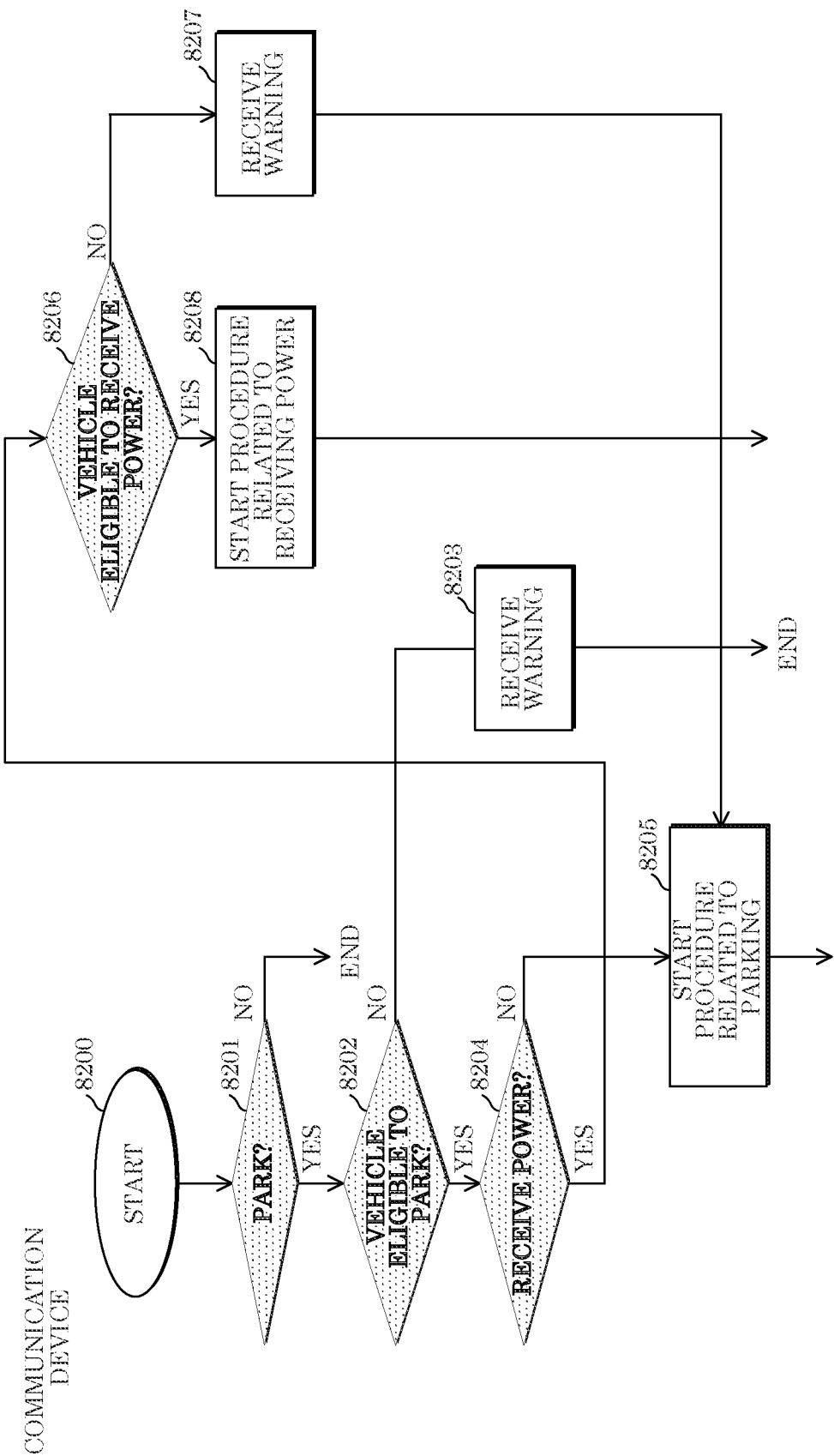
FIG. 82 relates to operations related to a communication device included in a vehicle.

FIG. 82 relates to operations related to the communication device included in vehicle 6902 illustrated in FIG. 69 (vehicle 8100 illustrated in FIG. 81).

Vehicle 8100 illustrated in FIG. 81 first accesses power transmission system 7100 illustrated in FIG. 71, FIG. 77 and FIG. 78. Then, a procedure screen is displayed on the display included 8100 illustrated in FIG. 81, whereby the operations illustrated in FIG. 82 are performed. Next, FIG. 82 will be described.

Upon start (8200), the following procedure starts.

As illustrated in FIG. 82, vehicle 8100 illustrated in FIG. 81 tells power transmission system 7100 whether vehicle 8100 will park in the parking lot or not (8201). For example, when the communication device included in vehicle 8100 has the configuration illustrated in FIG. 81, transceiver 7011 generates and outputs transmission signal 7012 including information on whether vehicle 8100 will park or not, and outputs transmission signal 7012 as radio waves from communication antenna 7014. Power transmission system 7100 then receives this signal.

When vehicle 8100 will not park in the parking lot, that is to say, when the answer is NO to 8201, the procedure ends. On the other band, when vehicle 8100 will park in the parking lot, that is to say, when the answer is YES to 8201, the procedure proceeds to the next step.

Next, determination for determining whether vehicle 8100 is a type of vehicle that may park in the parking lot is performed, that is to say, vehicle 8100 communicates with power transmission system 7100, and determines whether it is eligible to park or not (8202).

For example, when the communication device included in vehicle 8100 has the configuration illustrated in FIG. 81, transceiver 7011 generates and outputs transmission signal 7012 including information on the type of vehicle that vehicle 8100 is (for example, a truck, bus, or standard-sized automobile) and/or the model of vehicle that vehicle 8100 is, and outputs transmission signal 7012 as radio waves from communication antenna 7014.

Power transmission system 7100 receives this signal via communication antenna 7105, and transceiver 7108 included in the power transmission system obtains information on the type of vehicle that vehicle 8100 is (for example, a truck, bus, or standard-sized automobile) and/or the model of vehicle that vehicle 8100 is, determines whether vehicle 8100 is a type of vehicle that may park in the parking lot, generates and outputs modulated signal 7107 including information on the result of the determination, and outputs modulated signal 7107 from communication antenna 7105 as radio waves.

Vehicle 8100 receives this signal via communication antenna 7014, and transceiver 7011 obtains the determination result.

Note that the above operations will be described in even further detail later on.

When the result of the determination of whether the vehicle is eligible to park or not (8202) is that the vehicle is not eligible to park, that is to say, when the answer to 8202 is NO, vehicle 8100 receives a warning (8203), for example. In other words, vehicle 8100 knows that it is not eligible to park in the parking lot.

On the other band, when the result of the determination of whether the vehicle is eligible to park or not (8202) is that the vehicle is eligible to park, that is to say, when the answer to 8202 is YES, the procedure proceeds to the next step.

The communication device included in vehicle 8100 tells power transmission system 7100 whether vehicle 8100 will receive power or not (8204). For example, when the communication device included in vehicle 8100 has the configuration illustrated in FIG. 81, controller 7003 outputs information indicating whether to receive power or not (7902) using first control signal 7007, transceiver 7011 generates and outputs transmission signal 7012 including this information, and outputs transmission signal 7012 from communication antenna 7014 as radio waves. Power transmission system 7100 then receives this signal. Note that controller 7003 in FIG. 81 may request the reception of power (7201) via an external input.

When vehicle 8100 will not receive power, that is to say, when the answer is NO to 8204, the procedure proceeds to 8205. Vehicle 8100 then starts the procedure related to parking (8205).

Note that one conceivable example of the procedure related to parking 8205 is a procedure like that in Embodiment 12, but the method used for the procedure related to parking 8205 is not limited to this example.

On the other band, when vehicle 8100 will receive power, that is to say, when the answer is YES to 8204, the procedure proceeds to step 8206.

Then, vehicle 8100 determines whether it is eligible to receive power (8206) by communicating with power transmission system 7100.

For example, when the communication device included in vehicle 8100 has the configuration illustrated in FIG. 81, transceiver 7011 generates and outputs transmission signal 7012 including information on the type of vehicle that vehicle 8100 is (for example, a truck, bus, or standard-sized automobile) and/or the model of vehicle that vehicle 8100 is, and outputs transmission signal 7012 as radio waves from communication antenna 7014.

Power transmission system 7100 receives this signal via communication antenna 7105, and transceiver 7108 included in the power transmission system obtains information on the type of vehicle that vehicle 8100 is (for example, a truck, bus, or standard-sized automobile) and/or the model of vehicle that vehicle 8100 is, determines whether vehicle 8100 is a vehicle that is eligible to receive power, generates and outputs modulated signal 7107 including information on the result of the determination, and outputs modulated signal 7107 from communication antenna 7105 as radio waves.

Vehicle 8100 receives this signal via communication antenna 7014, and transceiver 7011 obtains the determination result.

When the result of the determination of whether the vehicle is eligible to receive power or not (8206) is that the vehicle is not eligible to receive power, that is to say, when the answer to 8206 is NO, vehicle 8100 receives a warning (8207), for example. In other words, vehicle 8100 knows that it is not eligible to receive power. Vehicle 8100 then starts the procedure related to parking (8205).

On the other band, when the result of the determination of whether the vehicle is eligible to receive power or not (8206) is that the vehicle is eligible to receive power, that is to say, when the answer to 8206 is YES, the procedure proceeds to the next step. Vehicle 8100 then starts the procedure related to receiving power (8208).

Note that one conceivable example of the procedure related to receiving power 8208 is a procedure like those in Embodiment 11 and Embodiment 12, but the method used for the procedure related to receiving power 8208 is not limited to these examples.

Figure 83:
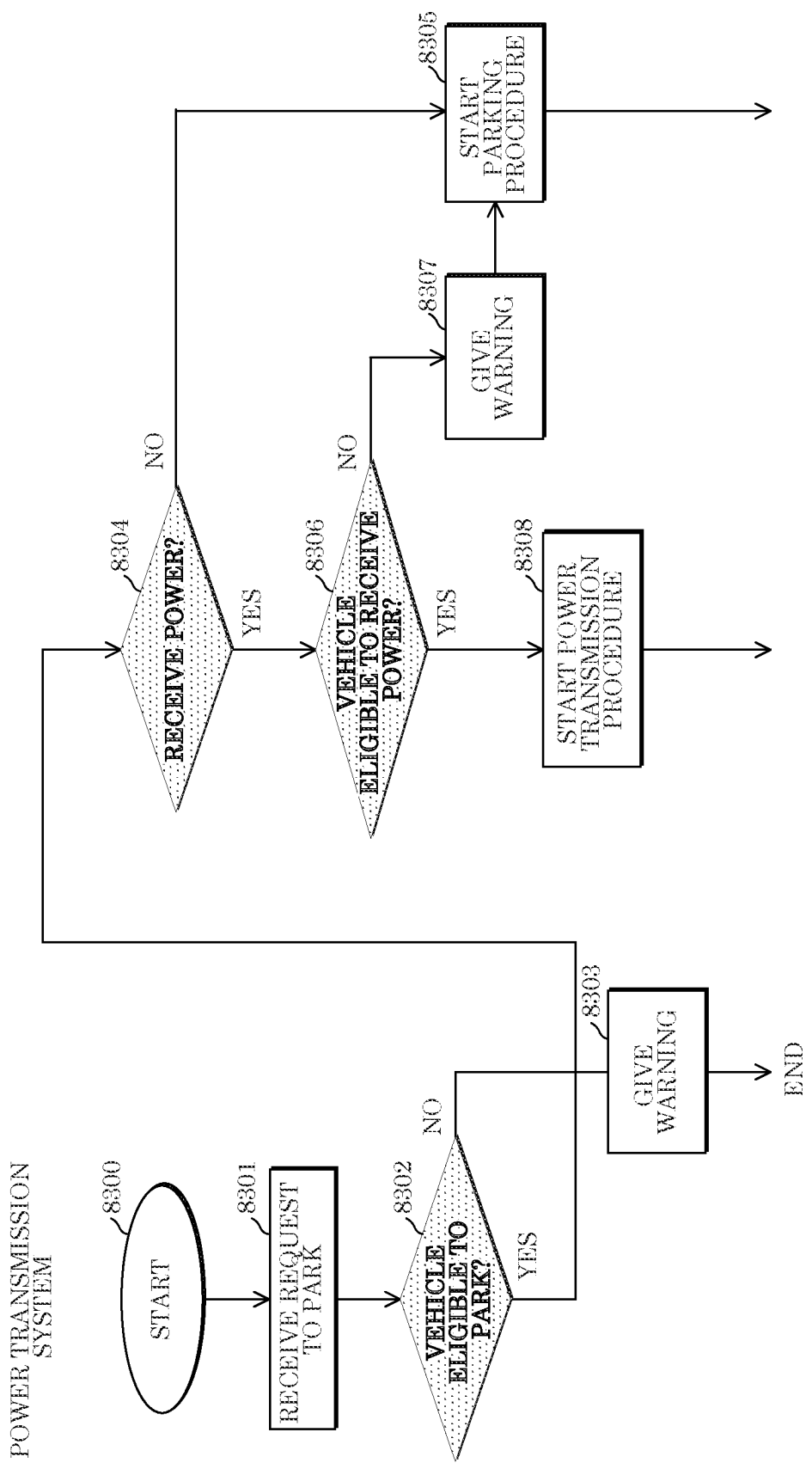
FIG. 83 relates to operations performed by a power transmission system.

FIG. 83 relates to operations performed by power transmission system 7100.

Power transmission system 7100 receives a request to park (8301) from the communication device included in vehicle 8100.

Next, power transmission system 7100 communicates with vehicle 8100 as described in FIG. 82 to determine whether vehicle 8100 is a vehicle that is eligible to park or not (8302). Note that details regarding this process are as described with reference to FIG. 82.

Power transmission system 7100 determines whether vehicle 8100 is eligible to park or not (8302), and when power transmission system 7100 determines that vehicle 8100 is not eligible to park, that is to say, determines that the answer to 8302 is NO, power transmission system 7100 transmits a modulated signal including warning information (8303).

Power transmission system 7100 determines whether vehicle 8100 is eligible to park or not (8302), and when power transmission system 7100 determines that vehicle 8100 is eligible to park, that is to say, determines that the answer to 8302 is YES, power transmission system 7100 transmits a modulated signal including information indicating that vehicle 8100 is eligible to park.

Power transmission system 7100 then receives, from vehicle 8100, information on whether vehicle 8100 will receive power or not (8304).

When the information on whether vehicle 8100 will receive power or not (8304) indicates that vehicle 8100 will not receive power, that is to say, when the answer to 8304 is NO, the procedure proceeds to 8305. Power transmission system 7100 then notifies vehicle 8100 of the start of the procedure related to parking (8305).

Note that one conceivable example of the procedure related to parking 8305 is a procedure like that in Embodiment 12, but the method used for the procedure related to parking 8305 is not limited to this example.

When the information on whether vehicle 8100 will receive power or not (8304) indicates that vehicle 8100 will receive power, that is to say, when the answer to 8304 is YES, the procedure proceeds to 8306. Then, power transmission system 7100 determines whether vehicle 8100 is a vehicle that is eligible to receive power or not (8306).

When power transmission system 7100 determines that vehicle 8100 is not eligible to receive power, that is to say, when the answer to 8306 is NO, power transmission system 7100 warns (8307) vehicle 8100, and notifies vehicle 8100 of the start of the procedure for parking (8305).

On the other band, when power transmission system 7100 determines that vehicle 8100 is eligible to receive power, that is to say, when the answer to 8306 is YES, power transmission system 7100 notifies vehicle 8100 of the start of the procedure for transmitting power (8308).

Note that one conceivable example of the procedure related to receiving power 8308 is a procedure like those in Embodiment 11 and Embodiment 12, but the method used for the procedure related to receiving power 8308 is not limited to these examples.

As described above, by implementing a warning related to parking eligibility and a warning related to power reception eligibility, it is possible to achieve the advantageous effect that it is possible to accurately provide services to vehicles that are eligible to park and vehicles that are eligible to receive power.

Next, operations illustrated in FIG. 84, which differ from those in FIG. 82, and operations illustrated in FIG. 85, which differ from those in FIG. 83, will be described.

Figure 84:
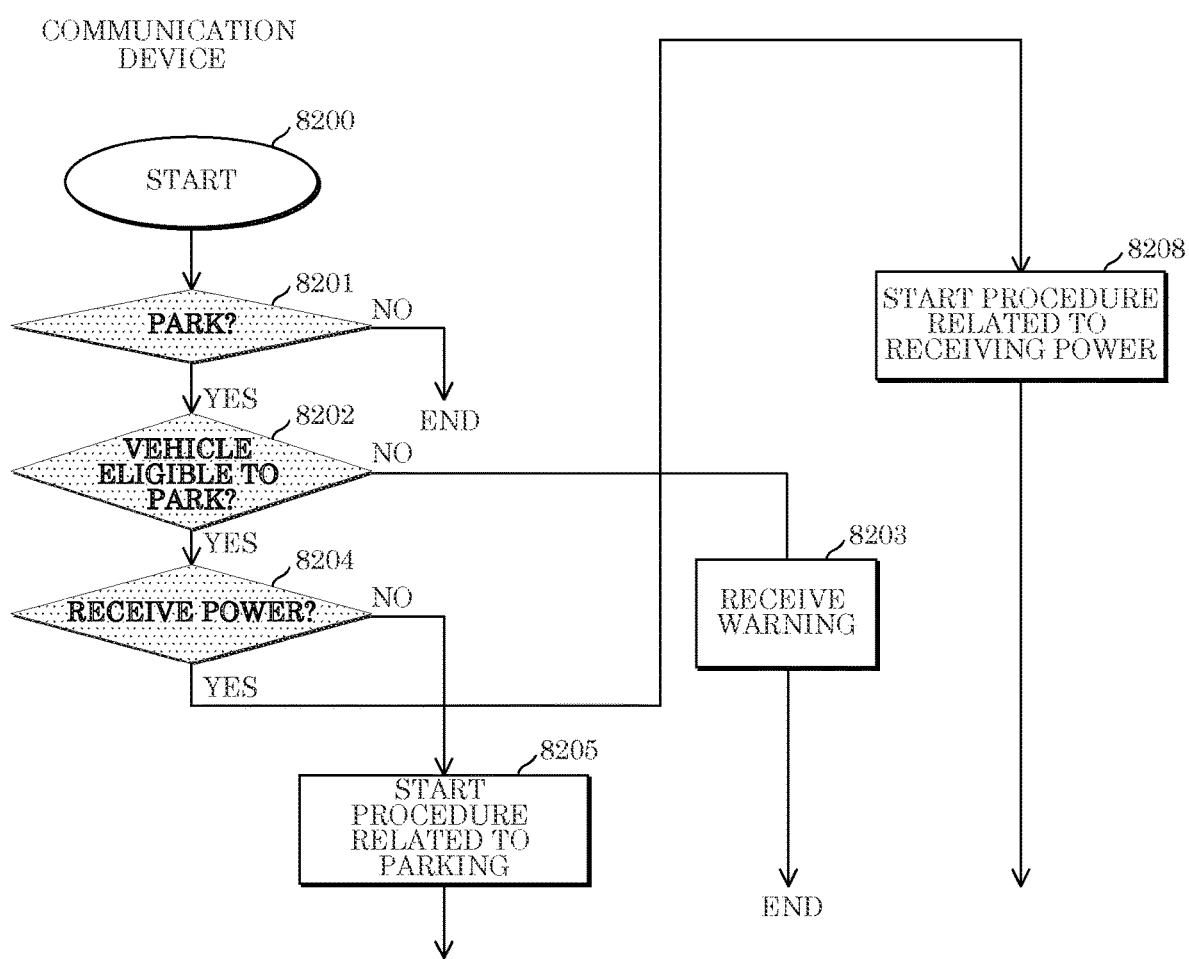
FIG. 84 relates to operations related to a communication device included in a vehicle.

FIG. 84 differs from FIG. 82 in that it relates to operations related to the communication device included in vehicle 6902 illustrated in FIG. 69 (vehicle 8100 illustrated in FIG. 81). Note that in FIG. 84, elements which operate in the same manner as those in FIG. 82 are assigned the same reference numerals.

Vehicle 8100 illustrated in FIG. 81 first accesses power transmission system 7100 illustrated in FIG. 71, FIG. 77 and FIG. 78. Then, a procedure screen is displayed on the display included 8100 illustrated in FIG. 81 whereby the operations illustrated in FIG. 84 are performed. Next, FIG. 84 will be described.

Upon start (8200), the following procedure starts.

As illustrated in FIG. 82, vehicle 8100 illustrated in FIG. 81 tells power transmission system 7100 whether vehicle 8100 will park in the parking lot or not (8201). For example, when the communication device included in vehicle 8100 has the configuration illustrated in FIG. 81, transceiver 7011 generates and outputs transmission signal 7012 including information on whether vehicle 8100 will park or not, and outputs transmission signal 7012 as radio waves from communication antenna 7014. Power transmission system 7100 then receives this signal.

When vehicle 8100 will not park in the parking lot, that is to say, when the answer is NO to 8201, the procedure ends. On the other band, when vehicle 8100 will park in the parking lot, that is to say, when the answer is YES to 8201, the procedure proceeds to the next step.

Next, determination for determining whether vehicle 8100 is a type of vehicle that may park in the parking lot is performed, that is to say, vehicle 8100 communicates with power transmission system 7100, and determines whether it is eligible to park or not (8202).

For example, when the communication device included in vehicle 8100 has the configuration illustrated in FIG. 81, transceiver 7011 generates and outputs transmission signal 7012 including information on the type of vehicle that vehicle 8100 is (for example, a truck, bus, or standard-sized automobile) and/or the model of vehicle that vehicle 8100 is, and outputs transmission signal 7012 as radio waves from communication antenna 7014.

Power transmission system 7100 receives this signal via communication antenna 7105, and transceiver 7108 included in the power transmission system obtains information on the type of vehicle that vehicle 8100 is (for example, a truck, bus, or standard-sized automobile) and/or the model of vehicle that vehicle 8100 is, determines whether vehicle 8100 is a type of vehicle that may park in the parking lot, generates and outputs modulated signal 7107 including information on the result of the determination, and outputs modulated signal 7107 from communication antenna 7105 as radio waves.

Vehicle 8100 receives this signal via communication antenna 7014, and transceiver 7011 obtains the determination result.

Note that the above operations will be described in even further detail later on.

When the result of the determination of whether the vehicle is eligible to park or not (8202) is that the vehicle is not eligible to park, that is to say, when the answer to 8202 is NO, vehicle 8100 receives a warning (8203), for example. In other words, vehicle 8100 knows that it is not eligible to park in the parking lot.

On the other band, when the result of the determination of whether the vehicle is eligible to park or not (8202) is that the vehicle is eligible to park, that is to say, when the answer to 8202 is YES, the procedure proceeds to the next step.

The communication device included in vehicle 8100 tells power transmission system 7100 whether vehicle 8100 will receive power or not (8204). For example, when the communication device included in vehicle 8100 has the configuration illustrated in FIG. 81, controller 7003 outputs information indicating whether to receive power or not (7902) using first control signal 7007, transceiver 7011 generates and outputs transmission signal 7012 including this information, and outputs transmission signal 7012 from communication antenna 7014 as radio waves. Power transmission system 7100 then receives this signal. Note that controller 7003 in FIG. 81 may request the reception of power (7201) via an external input.

When vehicle 8100 will not receive power, that is to say, when the answer is NO to 8204, the procedure proceeds to 8205. Vehicle 8100 then starts the procedure related to parking (8205).

Note that one conceivable example of the procedure related to parking 8205 is a procedure like that in Embodiment 12, but the method used for the procedure related to parking 8205 is not limited to this example.

On the other hand, when vehicle 8100 will receive power, that is to say, when the answer is YES to 8204, the procedure proceeds to step 8208.

Vehicle 8100 then starts the procedure related to receiving power (8208).

Note that one conceivable example of the procedure related to receiving power 8208 is a procedure like those in Embodiment 11 and Embodiment 12, but the method used for the procedure related to receiving power 8208 is not limited to these examples.

Figure 85:
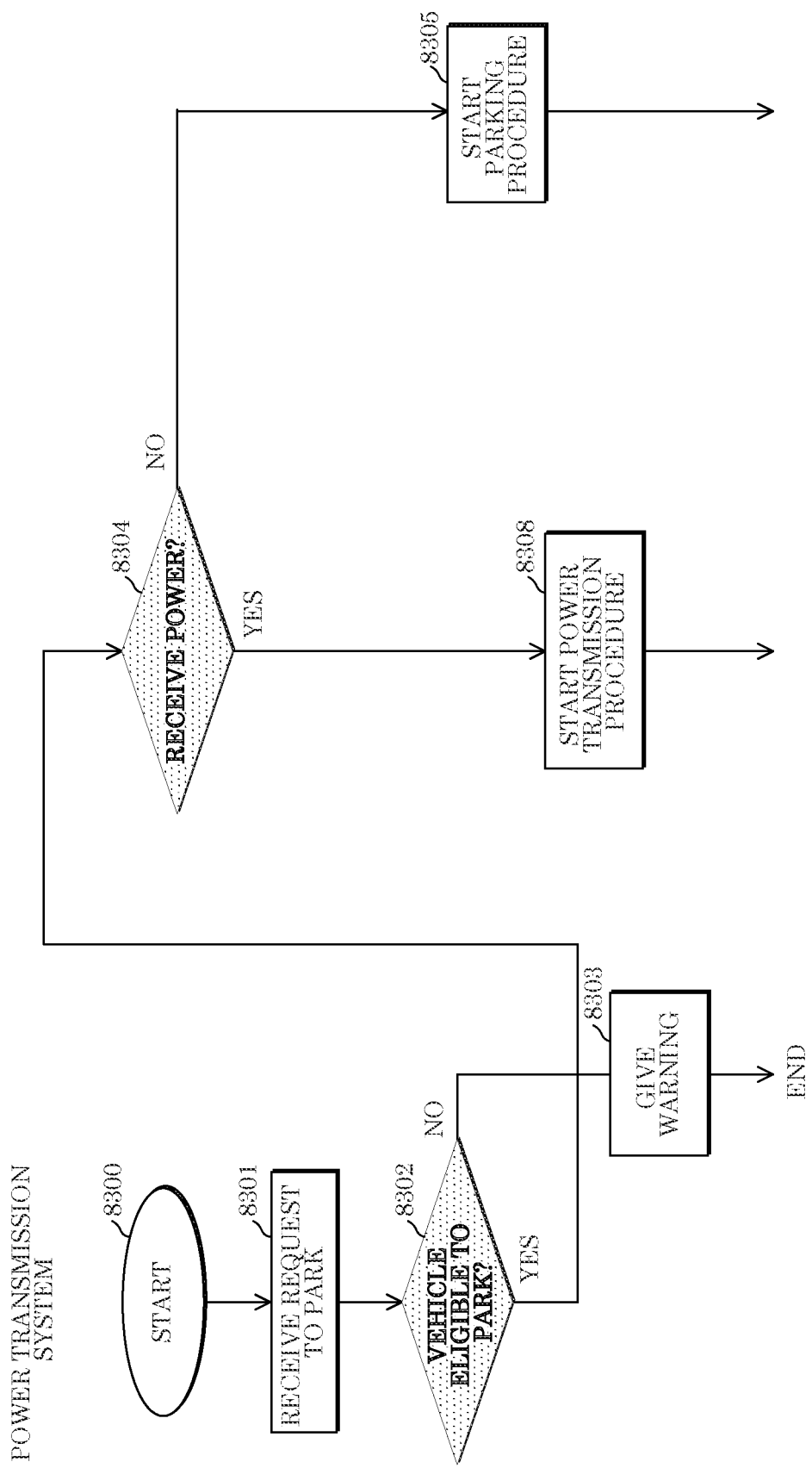
FIG. 85 relates to operations performed by a power transmission system.

FIG. 85 relates to operations performed by power transmission system 7100.

Power transmission system 7100 receives a request to park (8301) from the communication device included in vehicle 8100.

Next, power transmission system 7100 communicates with vehicle 8100 as described in FIG. 84 to determine whether vehicle 8100 is a vehicle that is eligible to park or not (8302). Note that details regarding this process are as described with reference to FIG. 84.

Power transmission system 7100 determines whether vehicle 8100 is eligible to park or not (8302), and when power transmission system 7100 determines that vehicle 8100 is not eligible to park, that is to say, determines that the answer to 8302 is NO, power transmission system 7100 transmits a modulated signal including warning information (8303).

Power transmission system 7100 determines whether vehicle 8100 is eligible to park or not (8302), and when power transmission system 7100 determines that vehicle 8100 is eligible to park, that is to say, determines that the answer to 8302 is YES, power transmission system 7100 transmits a modulated signal including information indicating that vehicle 8100 is eligible to park.

Power transmission system 7100 then receives, from vehicle 8100, information on whether vehicle 8100 will receive power or not (8304).

When the information on whether vehicle 8100 will receive power or not (8304) indicates that vehicle 8100 will not receive power, that is to say, when the answer to 8304 is NC), the procedure proceeds to 8305. Power transmission system 7100 then notifies vehicle 8100 of the start of the procedure related to parking (8305).

Note that one conceivable example of the procedure related to parking 8305 is a procedure like that in Embodiment 12, but the method used for the procedure related to parking 8305 is not limited to this example.

When the information on whether vehicle 8100 will receive power or not (8304) indicates that vehicle 8100 will receive power, that is to say, when the answer to 8304 is YES, the procedure proceeds to 8308. Power transmission system 7100 then notifies vehicle 8100 of the start of the procedure for transmitting power (8308).

Note that one conceivable example of the procedure related to receiving power 8308 is a procedure like those in Embodiment 11 and Embodiment 12, but the method used for the procedure related to receiving power 8308 is not limited to these examples.

As described above, by implementing a warning related to parking eligibility, it is possible to achieve the advantageous effect that it is possible to accurately provide services to vehicles that are eligible to park.

Next, a specific example of the determination for whether the vehicle is a vehicle that is eligible to park or not (8202) in FIG. 82 and FIG. 84 will be given.

Figure 86:
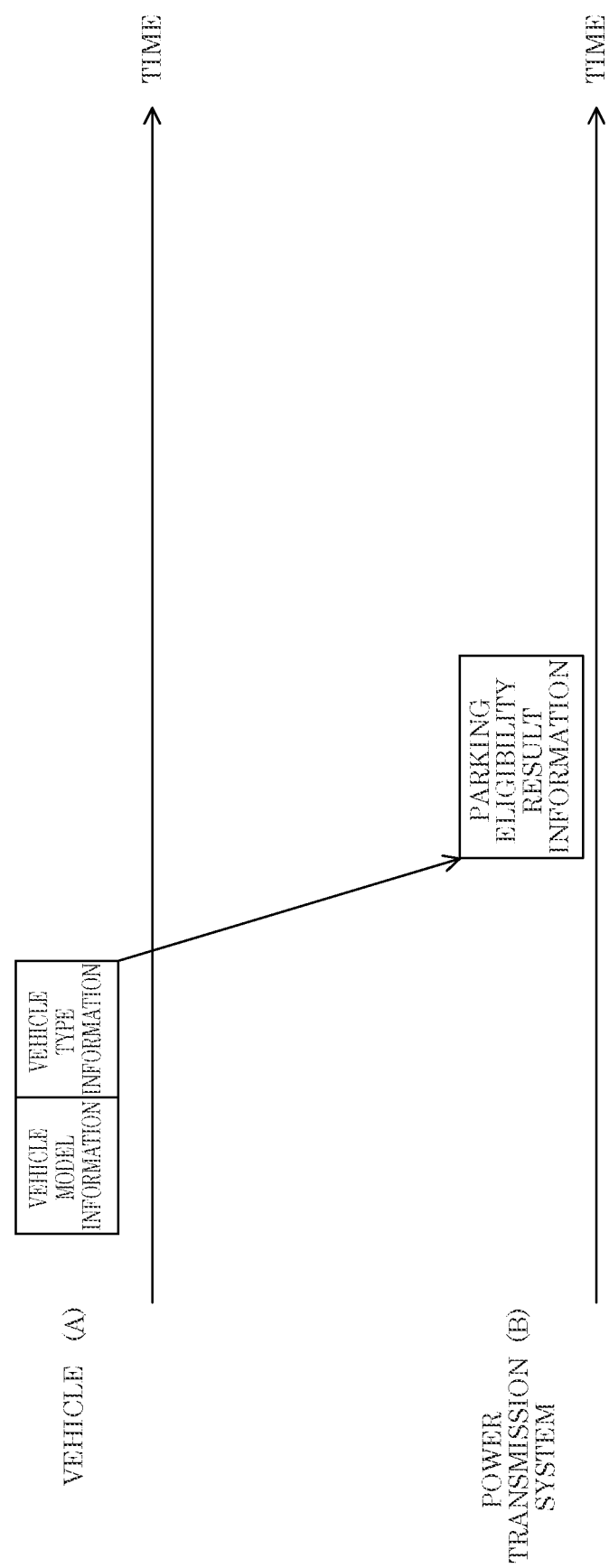
FIG. 86 illustrates an example of the flow of data between a vehicle and a power transmission system.

FIG. 86 illustrates one example of the flow of data between the vehicle and the power transmission system upon the communication device included in the power transmission system determining whether the vehicle is eligible to park or not (8202).

In FIG. 86, which illustrates a first example, the communication device included in the vehicle transmits a modulated signal including vehicle model information and vehicle type information. Note that the vehicle model information and the vehicle type information are the same as described above.

The communication device included in the power transmission system that received the modulated signal determines whether the vehicle that transmitted the modulated signal is eligible to park or not based on one or more of the vehicle model information and the vehicle type information included in the modulated signal, and transmits, to the communication device included in the vehicle, a modulated signal including parking eligibility result information. Note that details regarding these operations are as described above.

Figure 87:
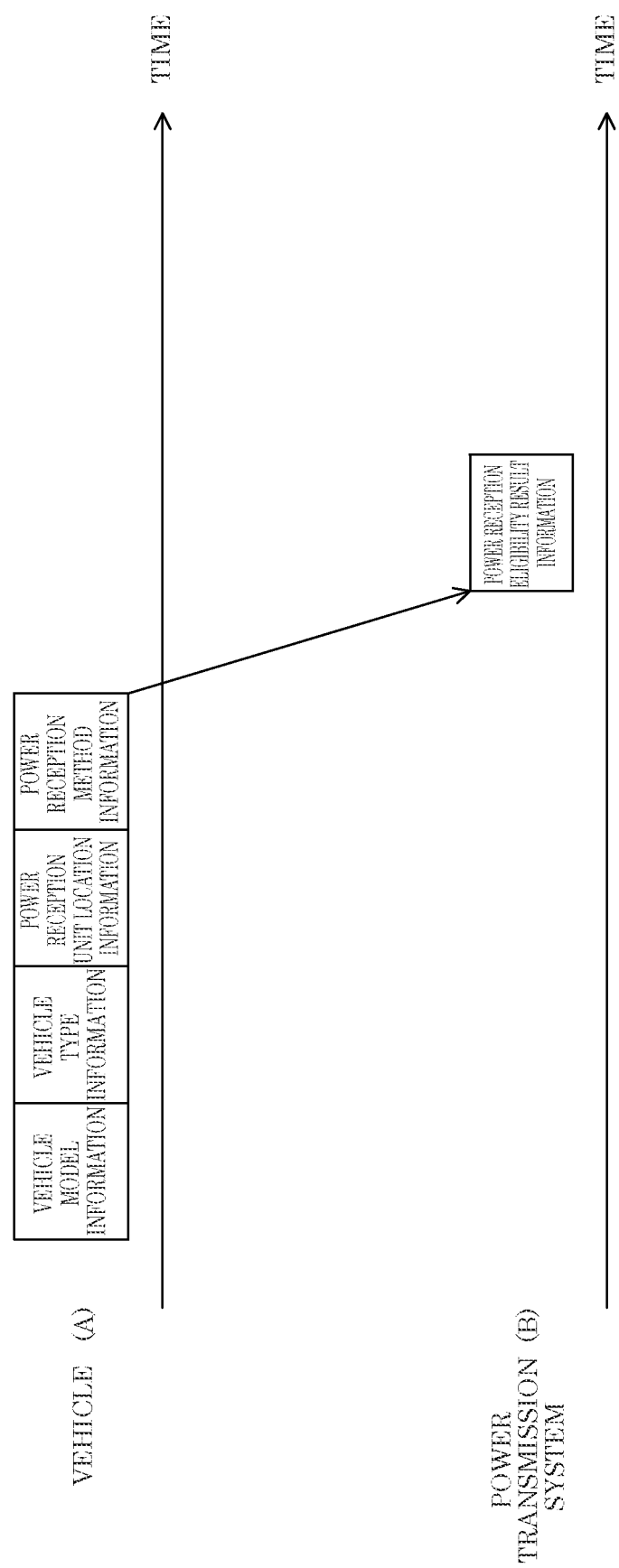
FIG. 87 illustrates an example of the flow of data between a vehicle and a power transmission system.

FIG. 87 illustrates an example, which differs from the example in FIG. 86, of the flow of data between the vehicle and the power transmission system upon the communication device included in the power transmission system determining whether the vehicle is eligible to park or not (8202).

In FIG. 87, which illustrates a second example, the communication device included in the vehicle transmits a modulated signal including vehicle model information, vehicle type information, power reception unit location information, and power reception method information. Note that the vehicle model information and the vehicle type information are the same as described above.

For example, when the power reception unit is located at the front of the vehicle, the power reception unit location information indicates that the power reception unit is located at the front of the vehicle.

In another example, when the power reception unit is located on the right-band side at the hack of the vehicle, the power reception unit location information indicates that the power reception unit is located on the right-band side at the back of the vehicle.

Moreover, the information may include specific numerical values. For example, the power reception unit location information may indicate that the power reception unit is located 80 cm from the front of the vehicle and 50 cm from the right of the vehicle.

Moreover, for example, when the power reception method used by the vehicle supports wireless power reception, the power reception method information may indicate that the vehicle supports wireless power reception. On the other band, when the power reception method used by the vehicle does not support wireless power reception, the power reception method information may indicate that the vehicle does not support wireless power reception.

The communication device included in the power transmission system that received the modulated signal determines whether the vehicle that transmitted the modulated signal is eligible to park or not based on one or more of the vehicle model information, the vehicle type information, the power reception unit location information, and the power reception method information included in the modulated signal, and transmits, to the communication device included in the vehicle, a modulated signal including parking eligibility result information. Note that an example of these operations has already been given above.

Hereinafter a different example will be given.

For example, when the communication device included in the power transmission system obtains the power reception method information illustrated in FIG. 87 and the power reception method information indicates that the vehicle does not support wireless power reception, the communication device included in the power transmission system generates, as power reception eligibility result information, information indicating that the vehicle is not eligible to receive power, and transmits this information to the communication device included in the vehicle.

As the next example, an example of operations performed when the power reception method information illustrated in FIG. 87 indicates that the vehicle supports wireless power reception will be given.

Figure 88:
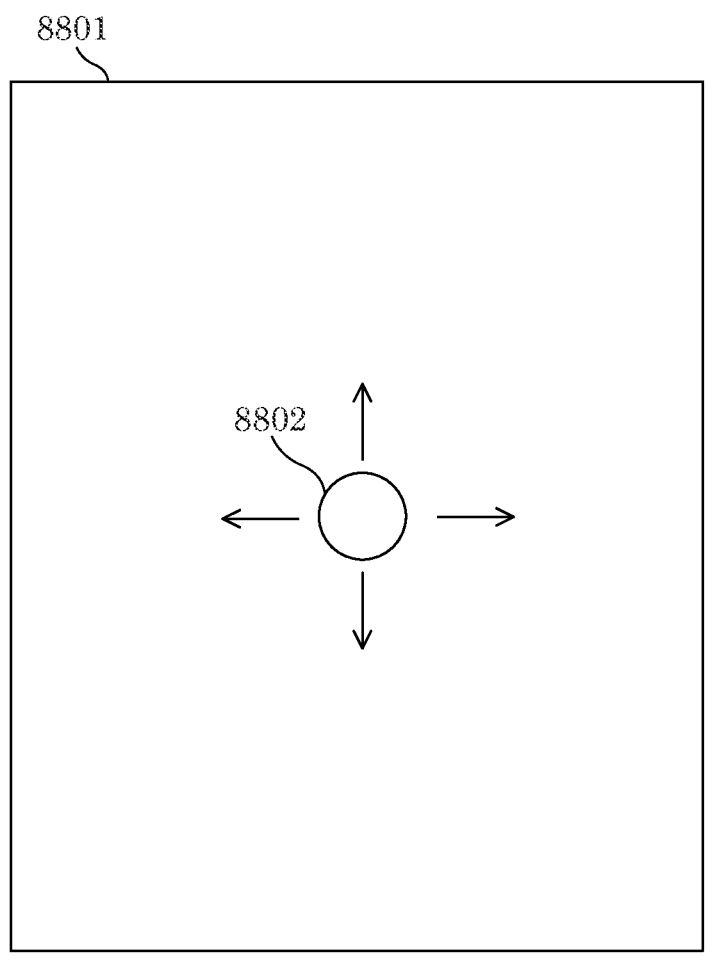
FIG. 88 illustrates one example of a vehicle parking space and a power transmission antenna in a parking lot.

8801 in FIG. 88 indicates a vehicle parking space in a parking lot 8802 indicates a power transmission antenna included in the power transmission system. Note that in FIG. 88, in the power transmission system disposed at the parking space, the power transmission antenna portion is, except in rare cases, capable of moving up, down, left, and right at a given position.

As illustrated in FIG. 87, the communication device included in the vehicle transmits, to the communication device included in the power transmission system, vehicle model information, vehicle type information, power reception unit location information, and power reception method information. Note that in this example, as described above, the power reception method information indicates that the vehicle supports wireless power reception.

The power transmission system can then determine the following.

The power transmission system determines whether sufficient power can be transmitted to the vehicle or not based on the vehicle model information and the vehicle type information. For example, it is possible for the power transmission system to determine that sufficient power cannot be transmitted to the vehicle due to the power capacity of the power transmission system being insufficient. In such cases, the communication device included in the power transmission system notifies the vehicle with power reception eligibility result information indicating the vehicle is not eligible.

The power transmission system can move power transmission antenna unit 8802 in FIG. 88, based on the power reception unit location information. For example, moving power transmission antenna unit 8802 close to the location of the power reception antenna included in the vehicle has the advantage that vehicle charging efficiency can be improved. In cases in which the location of the power reception antenna varies from vehicle to vehicle, this gives the power transmission system the advantageous effect that more vehicles can be charged.

When, upon performing the above-described determination and control, the power transmission system determines that the vehicle can be charged, the communication device included in the power transmission system determines that the vehicle is eligible to receive power, and transmits this determination result, as power reception eligibility result information, to the communication device included in the vehicle.

Figure 89:
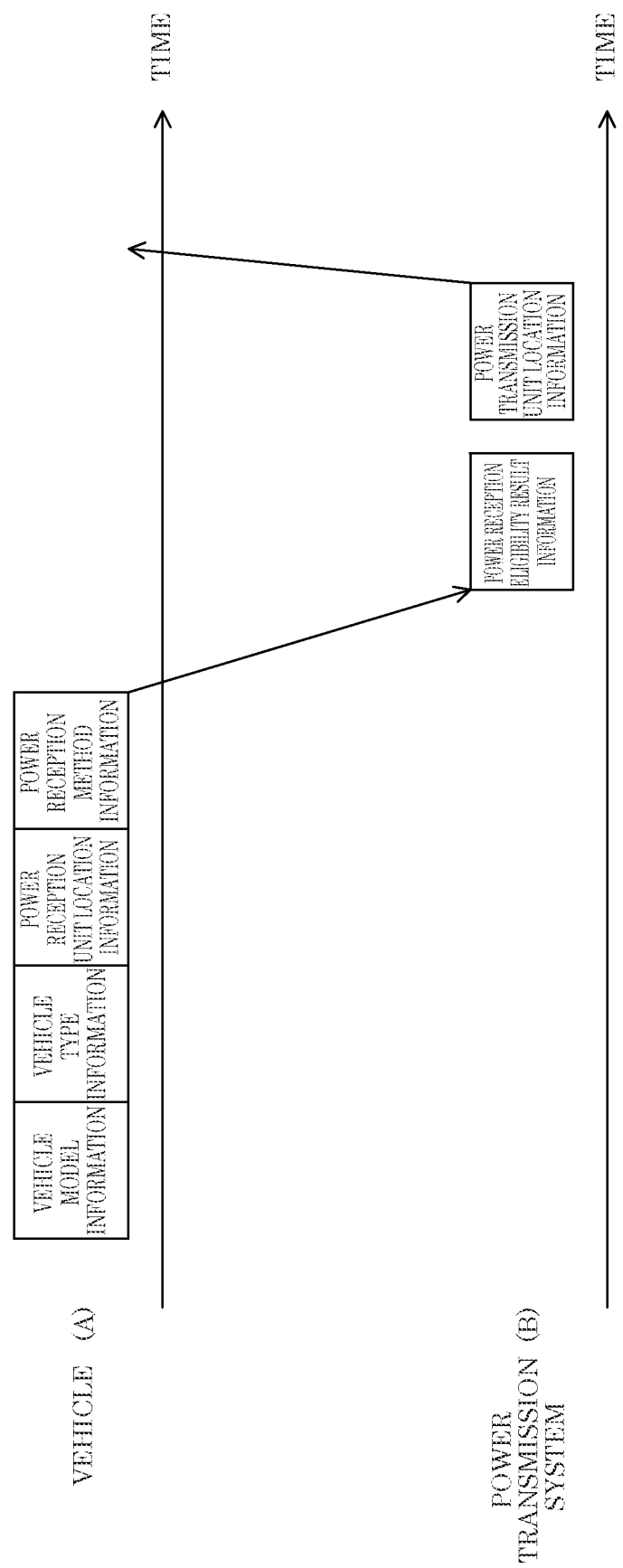
FIG. 89 illustrates an example of the flow of data between a vehicle and a power transmission system.

As another example, consider a case like that illustrated in FIG. 89.

For example, like in FIG. 89, the communication device included in the vehicle transmits a modulated signal including vehicle model information, vehicle type information, power reception unit location information, and power reception method information. Note that the vehicle model information and the vehicle type information are the same as described above.

For example, when the power reception unit is located at the front of the vehicle, the power reception unit location information indicates that the power reception unit is located at the front of the vehicle.

In another example, when the power reception unit is located on the right-hand side at the back of the vehicle, the power reception unit location information indicates that the power reception unit is located on the right-hand side at the back of the vehicle.

Moreover, the information may include specific numerical values. For example, the power reception unit location information may indicate that the power reception unit is located 80 cm from the front of the vehicle and 50 cm from the right of the vehicle.

Moreover, for example, when the power reception method used by the vehicle supports wireless power reception, the power reception method information may indicate that the vehicle supports wireless power reception. On the other hand, when the power reception method used by the vehicle does not support wireless power reception, the power reception method information may indicate that the vehicle does not support wireless power reception.

The communication device included in the power transmission system that received the modulated signal determines whether the vehicle that transmitted the modulated signal is eligible to park or not based on one or more of the vehicle model information, the vehicle type information, the power reception unit location information and the power reception method information included in the modulated signal, and transmits, to the communication device included in the vehicle, a modulated signal including parking eligibility result information. Note that an example of these operations has already been given above.

Furthermore, the communication device included in the power transmission system transmits, to the communication device included in the vehicle, power transmission unit location information.

For example, the power transmission unit location information is information indicating where, in the parking space illustrated in FIG. 88, power transmission antenna 8802 included in the power transmission system is located.

The vehicle having the configuration illustrated in FIG. 81 receives the power reception eligibility result information and the power transmission unit location information transmitted by the communication device included in the power transmission system in FIG. 89. The vehicle having the configuration illustrated in FIG. 81 knows whether power can be received in the parking space based on the power reception eligibility result information.

At this time, for example, the vehicle having the configuration illustrated in FIG. 81 knows that power can be received in the parking space, and based on the power transmission unit location information, the vehicle having the configuration illustrated in FIG. 81 controls vehicle controller 8101 to move itself so that the power reception antenna included in the vehicle is in a more favorable location that is closer to the location of the power transmission unit in the parking space.

Note that for the vehicle to move itself, the vehicle may use an image of the surrounding area to move the itself to a favorable location, may move itself to a favorable location while concurrently checking its location, and may move itself to a favorable location while concurrently monitoring the power/amount of power at the power reception antenna included in the vehicle. The vehicle may use any sort of information to move itself to a favorable location.

Note that while the vehicle is moving while in the process of parking, the communication device included in the vehicle may transmit, to the communication device included in the power transmission system, information such as the power reception unit location information, information on the amount of power received by the power reception unit, and information on estimated distance (positional relationship) between the power reception unit and the power transmission unit. Moreover, while the vehicle is moving while in the process of parking, the communication device included in the power transmission system may transmit, to the communication device included in the vehicle, information such as the power transmission unit location information, information on the amount of power transmitted by the power transmission unit, and information on estimated distance (positional relationship) between the power reception unit and the power transmission unit.

While the vehicle is moving to park in the parking spot, the power transmission system may move the location of the power transmission antenna included in the power transmission system to a favorable location.

As another example, after the vehicle has parked in the parking spot, the power transmission system may move the location of the power transmission antenna included in the power transmission system to a favorable location.

In yet another example, the power transmission system may first move the location of the power transmission antenna included in the power transmission system, and then the vehicle may move itself into the parking spot.

Here, one important point is that the communication device included in the vehicle transmits the power reception unit location information to the communication device included in the power transmission system, and the communication device included in the power transmission system transmits the power transmission unit location information to the communication device included in the vehicle, and control of the parking position of the vehicle and/or control of the location of the power transmission antenna included in the power transmission system is carried out.

Examples of methods used for the vehicle to autonomously park in a parking space include the following: the vehicle recognizes the parking space, takes control of the driving of the vehicle, and parks in the parking space; the communication device included in the vehicle and the communication device included in the power transmission system communicate, the communication device included in the vehicle and the communication device included in the power transmission system share information on the positional relationship between the power reception unit and the power transmission unit, and the communication device included in the vehicle and the communication device included in the power transmission system share information on the positional relationship between the vehicle and the parking space, whereby the vehicle can take control of the driving and park in the parking space.

In the above example, the power transmission system can move the location of the power transmission antenna included in the power transmission system, but this example is not limiting; the location of the power transmission antenna included in the power transmission system may be fixed relative to the parking space. In such cases, the vehicle can autonomously move itself into a favorable location so as to move the power reception antenna into a favorable location, to achieve high charging efficiency. At this time, in order to change the location to a favorable location, the communication device included in the vehicle may transmit the power reception unit location information to the communication device included in the power transmission system. Moreover, the communication device included in the power transmission system may transmit the power transmission unit location information. Note that the power transmission unit location information may indicate where in the parking space the power transmission unit is located (for example, at the front or right-hand side of the parking space), and may include specific numerical values, such as, in cases where there is a white line in the parking space, information indicating "3 meters behind the white line" or "2 meters from the right-hand side of the white line".

Note that the power transmission antenna included in the power transmission system may be configured of a plurality of antennas and perform transmission beamforming. In such cases, the power transmission system can perform favorable power transmission by switching the beamforming method by using the power reception unit location information that the vehicle transmits, which is shown in FIG. 88 and FIG. 89. Note that the location of the power transmission antenna may be changeable and, alternatively, may be fixed.

Moreover, the power reception antenna included in the vehicle may be configured of a plurality of antennas and perform reception beamforming. In such cases, the vehicle can perform favorable power reception by switching the beamforming method by using the power transmission unit location information transmitted by the power transmission system, which is shown in FIG. 89.

As described above, by implementing the present embodiment, it is possible to screen for vehicles that are eligible to park and allow them to park, which achieves the advantageous effect that the rate of operation of the power transmission system can be improved. Moreover, it is possible to achieve the advantageous effect of an improved charging efficiency, by favorably controlling the location(s) of the power transmission antenna and/or power reception antenna.

Note that the communication between the communication device included in the vehicle and the power transmission system in the present embodiment may be wireless communication via radio waves, and, alternatively, may be optical communication via visible light.

Supplemental Description

Hereinafter, supplemental description of the transmitting device, the receiving device, the transmitting method, and the receiving method according to the present disclosure will be given.

A transmitting device according to one aspect of the present disclosure includes a plurality of transmit antennas, and further includes: a signal processor configured to generate a first baseband signal by modulating data of a first stream and generate a second baseband signal by modulating data of a second stream; a transmission unit configured to generate, from the first baseband signal, a plurality of first transmission signals having mutually different directivities, generate, from the second baseband signal, a plurality of second transmission signals having mutually different directivities, and transmit the plurality of first transmission signals and the plurality of second transmission signals at the same time. When a request for transmission of the first stream is received from a terminal, the transmission unit is further configured to generate, from the first baseband signal, a plurality of third transmission signals having mutually different directivities and being different from the plurality of first transmission signals, and transmit the plurality of third transmission signals.

Each transmission signal of the plurality of first transmission signals and the plurality of second transmission signals may include a control signal for notifying which one of the data of the first stream and the data of the second stream the transmission signal is for transmitting.

Each of the plurality of first transmission signals and the plurality of second transmission signals may include a training signal for a receiving device to perform directivity control.

A receiving device according to one aspect of the present disclosure includes a plurality of receive antennas, and further includes: a reception unit configured to select at least one first signal and at least one second signal from among a plurality of first signals and a plurality of second signals that are transmitted at the same tune by a transmitting device, the plurality of first signals having mutually different directivities and transmit data of a first stream, and the plurality of second signals having mutually different directivities and transmit data of a second stream, and perform directivity control for reception of the selected plurality of signals and receive the signals; a signal processor configured to demodulate the received signals and output data of the first stream and data of the second stream; and a transmission unit configured to, when the at least one first signal is not received by the reception unit, request the transmitting device to transmit the first stream.

The reception unit may be configured to select, the at, least one first signal and the at least one second signal, based on a control signal included in each of a plurality of received signals, the control signal being for notifying which one of the data of the first stream and the data of the second stream the signal is for transmitting.

The reception unit may be configured to perform directivity control using a training signal included in each of the plurality of received signals.

A transmitting method according to one aspect of the present disclosure is executed by a transmitting device including a plurality of transmission antennas, and includes: (a) generating a first baseband signal by modulating data of a first stream and generating a second baseband signal by modulating data of a second stream; and 00 generating, from the first baseband signal, a plurality of first transmission signals having mutually different directivities, generating, from the second baseband signal, a plurality of second transmission signals having mutually different directivities, and transmitting the plurality of first transmission signals and the plurality of second transmission signals at the same time. When a request for transmission of the first stream is received from a terminal, (b) further includes generating, from the first baseband a plurality of third transmission signals having mutually different directivities and being different from the plurality of first transmission signals, and transmitting the plurality of third transmission signals.

A receiving method according to one aspect of the present disclosure is executed in a receiving device including a plurality of receive antennas, and includes: (a) selecting at least one first signal and at least one second signal from among a plurality of first signals and a plurality of second signals that are transmitted at the same time by a transmitting device, the plurality of first signals having mutually different directivities and transmit data of a first stream, and the plurality of second signals having mutually different directivities and transmit data of a second stream, and performing directivity control for reception of the selected plurality of signals and receiving the signals; (b) demodulating the received signals and outputting data of the first stream and data of the second stream; and, when the at least one first signal is not received in (a), (c) requesting the transmitting device to transmit the first stream.

Embodiment 14

Figure 90:
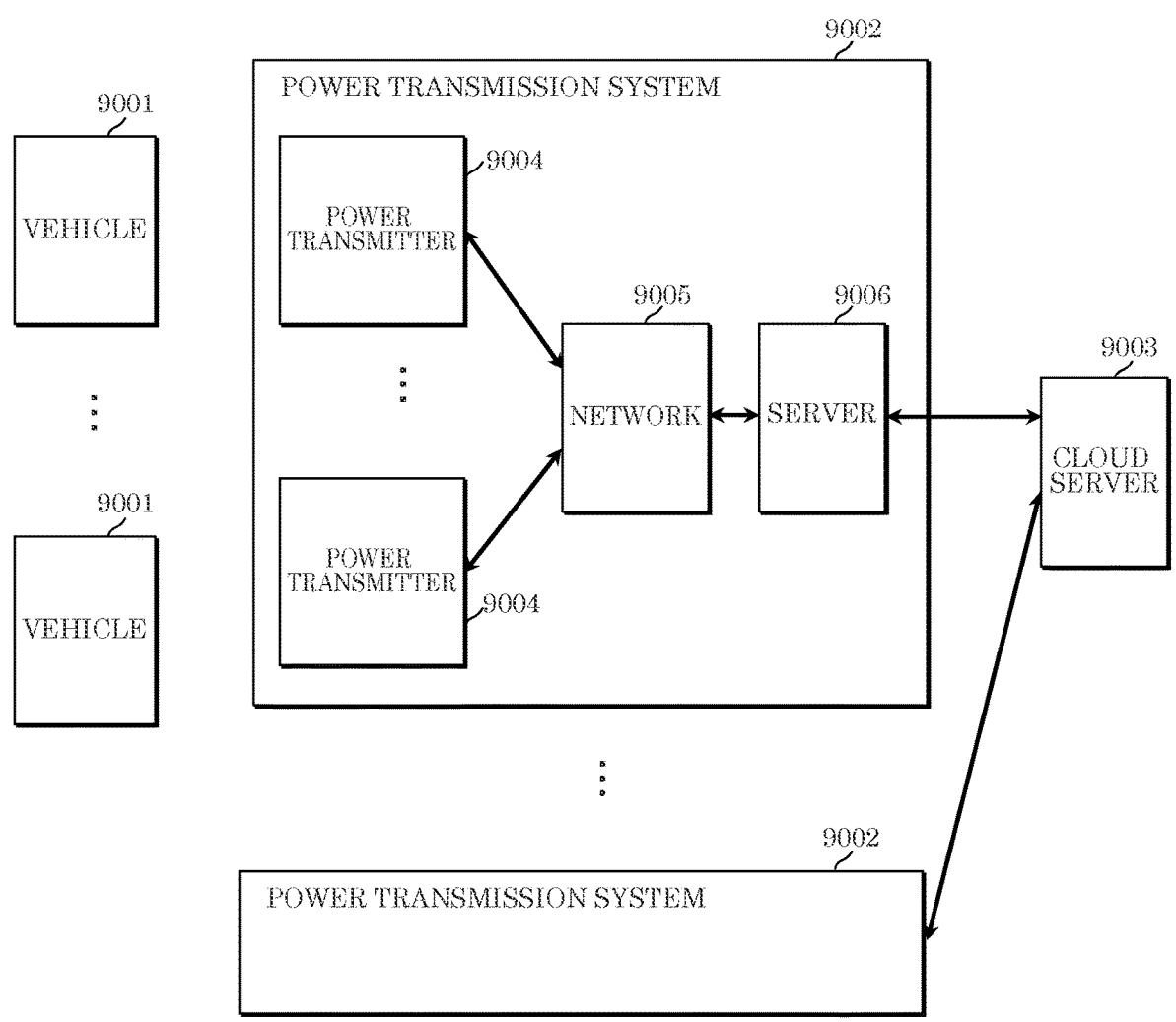
FIG. 90 illustrates an example of a configuration of a communication system.

FIG. 90 illustrates a configuration of a communication system according to the present embodiment. The communication system illustrated in FIG. 90 includes a plurality of vehicles 9001, a plurality of power transmission systems 9002, and a cloud server 9003. For example, the communication system is used in a vehicle sharing system that allocates time slots for usage of a vehicle and assigns a user of the vehicle to each time slot.

Moreover, each vehicle 9001 is, for example, an electric automobile, which is an automobile that drives using an electric motor whose a source of energy is electric, or a two-wheeled vehicle that drives using an electric motor whose a source of energy is electric, and, for example, has the same configuration as vehicle 8100 illustrated in, for example, FIG. 81 (a configuration of a vehicle from a different figure may be applied).

A power transmission system 9002 is provided in a parking lot in which the plurality of vehicles 9001 park. For example, one, or one or more power transmission systems 9002 may be provided in a single parking lot. Each power transmission system 9002 includes one or more or a plurality of power transmitters 9004, network 9005, and server 9006. Power transmitter 9004 transmits power to a vehicle 9001. Server 9006 is capable of communicating with the plurality of power transmitters 9004 via network 9005. Moreover, server 9006 is capable of communicating with cloud server 9003.

Cloud server 9003 is a server that is capable of communicating with one or more or a plurality of power transmission systems 9002.

Figure 91:
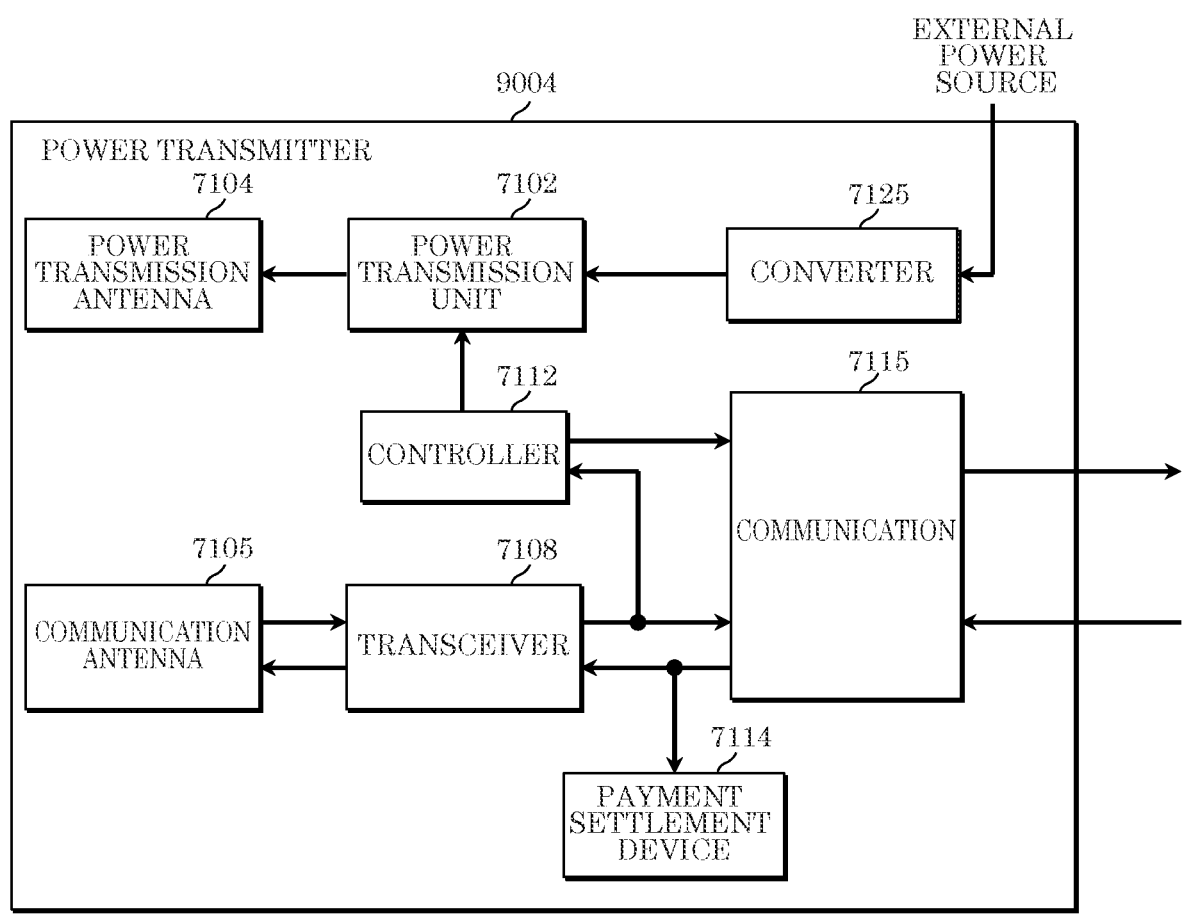
FIG. 91 illustrates an example of a configuration of a charger.

FIG. 91 is a block diagram illustrating an example of a configuration of power transmitter 9004. Note that in FIG. 91, elements which operate in the same manner as those in FIG. 77 are assigned the same reference numerals, and repeated description thereof is omitted.

Figure 92:
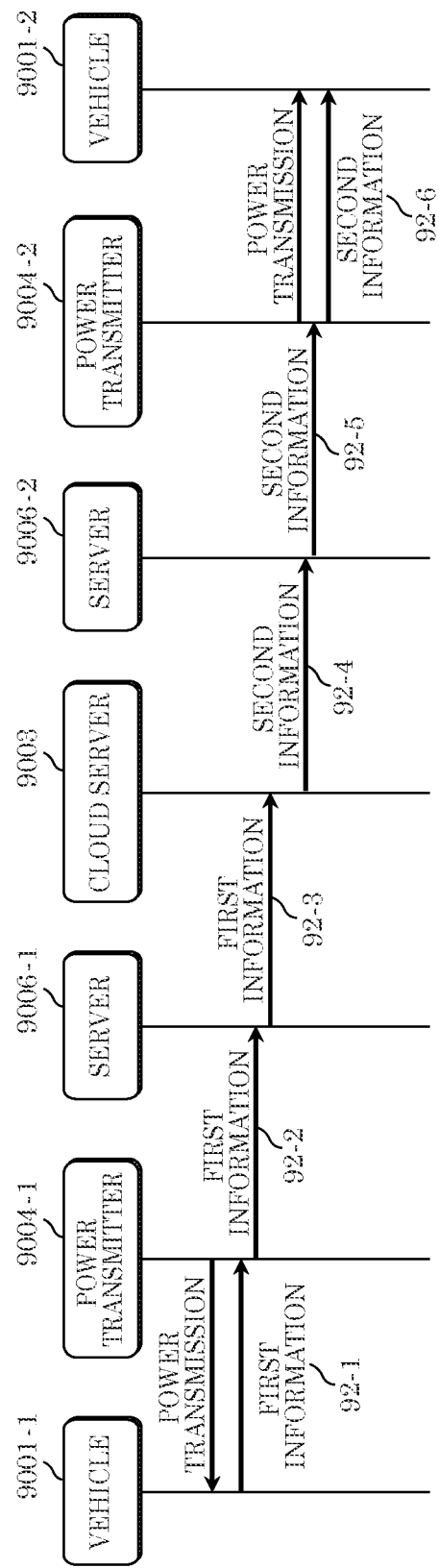
FIG. 92 illustrates one example of operations performed by a communication system.

In the present embodiment, information is obtained from vehicle 9001 and information is supplied to vehicle 9001 while vehicle 9001 is receiving power (is being supplied with power). FIG. 92 illustrates an outline of operations performed by a communication system according to the present embodiment.

Power transmitter 9004-1 obtains first information from vehicle 9001-1, while vehicle 9001-1 is receiving power (92-1). Note that the methods described in Embodiments 10 through 13 can be used to transmit power and obtain information from vehicle 9001-1. Note that the method used to transmit power is not limited to wireless power transmission; a wired power transmission method may be used.

Power transmitter 9004-1 transmits the obtained first information to server 9006-1 (92-2). Here, power transmitter 9004-1 and server 9006-1 are included in the same power transmission system 9002. Server 9006-1 transmits the received first information to cloud server 9003 (92-3). Note that when power transmission system 9002 does not include server 9006-1, power transmitter 9004-1 transmits the obtained first information to cloud server 9003.

Cloud server 9003 transmits second information based on the received first information to server 9006-2 (92-4). Server 9006-2 transmits the received second information to power transmitter 9004-2 (92-5). Here, power transmitter 9004-2 and server 9006-2 are included in the same power transmission system 9002. Note that when power transmission system 9002 does not include server 9006-1, cloud server 9003 transmits the second information to power transmitter 9004-2.

Power transmitter 9004-2 supplies the second information to vehicle 9001-2, while vehicle 9001-2 is receiving power (92-6).

Note that, for example, the second information may be information that is generated in cloud server 9003 based on the first information, may be information generated based on a plurality of items of information obtained from a plurality of vehicles, and may be information obtained from another vehicle. Moreover, the first information may be information processed by power transmitter 9004-1 or server 9006-1, and power transmitter 9004-1 or server 9006-1 may transmit this processed information to cloud server 9003. Moreover, part or all of the processing for generating the second information may be performed by power transmitter 9004-1, server 9006-1, server 9006-2, or server 9004-2.

Moreover, although FIG. 92 illustrates an example in which information is transmitted between different power transmission systems 9002 via cloud server 9003, the information may be transmitted between different power transmitters 9004 included in a given power transmission system 9002. In such cases, the processing performed by cloud server 9003 may be performed by server 9006. Moreover, the obtaining of the first information from vehicle 9001-1 and the supplying of the second information to vehicle 9001-2 may be performed using the same power transmitter 9004.

Moreover, although the obtaining of information from a vehicle and the supplying of information to a vehicle are exemplified as different processes in FIG. 92, upon obtaining information from a vehicle, already obtained information or already generated information may be supplied to that vehicle.

Moreover, the timing of the transmitting of the first information and the second information between power transmitter 9004, server 9006, and cloud server 9003 may be any given timing. For example, upon power transmitter 9004-2 transmitting power to vehicle 9001-2, power transmitter 9004-2 may transmit a request for obtainment of the second information to server 9006-2 or cloud server 9003, and server 9006-2 or cloud server 9003 may transmit the second information to power transmitter 9004-2 in accordance with the obtainment request.

Hereinafter, a specific example of the first information, the second information, and the information that the vehicle transmits will be given.

The first information and the information that the vehicle transmits includes information indicating a state of the vehicle or information obtained by the vehicle while the vehicle is driving. For example, the first information and the information that the vehicle transmits are information indicating a state of a battery included in the vehicle. More specifically, the first information and the information that the vehicle transmits are, for example, information indicating the voltage and current of the battery and information indicating a state of each of the plurality of cells constituting the battery (for example, whether the cell is operating properly or not). Moreover, the first information and the information that the vehicle transmits are information indicating a state of a sensor included in the vehicle (for example, whether the sensor is operating properly or not). Moreover, a sensor is, for example, an image sensor (for example, a complementary metal oxide semiconductor (CMOS) sensor, an organic CMOS sensor, or a charged coupled devices (CCD) image sensor), a radar, an acceleration sensor, a speed sensor, a temperature sensor, or an optical sensor. In an example in which the vehicle generates solar power, the first information and the information that the vehicle transmits may be information indicating a power generation state of a power generator (information on amount of power generated). Moreover, in an example in which the vehicle generates solar power, the first information and the information that the vehicle transmits may be information indicating whether the power generator is malfunctioning or not.

Note that the first information and the information that the vehicle transmits may be information obtained by a sensor included in another vehicle, by communicating with the other vehicle or another communication device. Moreover, the first information and the information that the vehicle transmits may be information obtained by another vehicle, by communicating with the other vehicle or another communication device (for example, traffic information, inter-vehicle distance information, emergency information, traffic congestion information, etc.). In such cases, the vehicle includes a communication device for communicating with the other vehicle or the other communication device.

Moreover, when this system is applied to a vehicle sharing system, the first information and the information that the vehicle transmits include information related to vehicle sharing. Moreover, the first information and the information that the vehicle transmits include information for the individual driving the vehicle (hereinafter referred to as "personal information"), and information that may be supplied to a plurality of users such as other users or information that is supplied from a plurality of users such as other users (hereinafter referred to as "shared information"). For example, the personal information is linked to, for example, user information that specifies the individual, and is managed by, for example, server 9006 or cloud server 9003. Moreover, the shared information obtained from a plurality of users is managed by server 9006 or cloud server 9003, and supplied to a plurality of users.

More specifically, the first information and the information that the vehicle transmits include information on the region in which the vehicle traveled in or new information. For example, the information may include traffic information (traffic congestion information and construction information, etc.), information on stores or new stores, event information, and information on parking facilities and payment. Note that whether the information is new information or not may be determined by vehicle 9001, and, alternatively, may be determined by power transmission system 9002 or cloud server 9003. Moreover, this information can be obtained by, for example, image recognition and sensing performed on information obtained by an image sensor included in the vehicle. Moreover, this information may be managed and shared as local shared information by server 9006 or cloud server 9003.

Moreover, the first information and the information that the vehicle transmits may include information indicating an abnormal action performed on the vehicle by a user that rented the vehicle. For example, the information indicating an abnormal action may include information indicating that a tire or the vehicle body collided with an obstruction. Note that the information may include information indicating the number of collisions, the time of the collision(s), and the severity of the collision(s). Moreover, the information indicating an abnormal action may include information indicating that the user suddenly braked. Note that the information may include information indicating the number of times the user suddenly braked, the time of each instance of the sudden braking, and the severity of each instance of the sudden braking. Moreover, the information indicating an abnormal action may include information indicating that the user drove the vehicle at a speed that is greater than or equal to a predetermined speed. Note that the information may include information indicating the time at which the user drove the vehicle at a speed that is greater than or equal to a predetermined speed, and the top speed reached by the user. Moreover, the first, information and the information that the vehicle transmits may include video information obtained by a drive recorder (a device that records video while the vehicle is driving) when the abnormal action occurred.

Moreover, the personal information included in the first information and the information that the vehicle transmits may be managed, in, for example, server 9006 or cloud server 9003, in association with the user, upon completion of the rental. Then, the second information may be generated based on the managed information, and the next time the user rents a vehicle, server 9006 or cloud server 9003 may supply the vehicle with this second information.

Moreover, regarding the shared information, the user that provides the information may configure a setting for whether they permit the information to be supplied or not. For example, this setting may be configured in advance, in association with the user information, or may be performed at the start or end of the rental of the vehicle. Moreover, the setting for whether the user permits the information to be supplied or not may be configured for each of types or levels of the shared information.

Moreover, when the user gives permission to share the information, some sort of benefit, may be awarded to the user. One example of such a benefit is a vehicle rental fee discount. Moreover, regarding the personal information, just as with the shared information, the user may configure a setting for whether they permit the information to be obtained or not.

The first information and the information that the vehicle transmits or the second information may include information on an insurance plan of the user that rented the vehicle.

Furthermore, the personal information may include information on a setting of the vehicle configured by the user of the vehicle, and information on a setting of a device in the vehicle configured by the user of the vehicle.

For example, assume the user configured the driver's seat position and height to settings that are preferable to the user information on these seat settings may be a part of the personal information.

Assume the user configured autonomous driving settings in the vehicle to settings that are preferable to the user. Information on these autonomous driving settings may be a part of the personal information.

Moreover, information on a communication partner the user connected to from the vehicle, and information obtained at that time may be a part of the personal information.

The personal information including such information may be managed, in, for example, server 9006 or cloud server 9003, in association with the user, upon completion of the rental. Then, the second information may be generated based on the managed information, and the next time the user rents a vehicle, server 9006 or cloud server 9003 may supply the vehicle with this second information.

This achieves the advantageous effect that user-friendliness can be improved since the user does not need to configure troublesome settings each time they rent a vehicle and preferable settings can be easily recalled for each user.

The communication device included in the vehicle then transmits, to server 9006 or cloud server 9003, during the time of reception of power by the vehicle or while the vehicle is parked in the parking lot, the first information and the information that the vehicle transmits. Note that while the vehicle is driving, the communication device included in the vehicle may transmit, to server 9006 or cloud server 9003, all or part of the first information and the information that the vehicle transmits.

Hereinafter, an example will be given pertaining to data synchronization between vehicle 9001 and cloud server 9003.

Server 9006 and cloud server 9003 illustrated in FIG. 90 are connected to first communication device via another first network.

Moreover, server 9006 and cloud server 9003 connect via a first communication device and a first network, using a second communication device possessed by the user.

Moreover, information indicating the access destination in server 9006 and cloud server 9003 for the personal information and the shared information stored via the vehicle is obtained by the second communication device possessed by the user, from server 9006 and cloud server 9003 via the first communication device and the first network.

With this, the user can access the personal information and the shared information in server 9006 and cloud server 9003, from the second communication device.

Then, when the user rides in a vehicle at some other time, in order to recall the personal information and the shared information, the user uses the second communication device to access server 9006 and cloud server 9003 and forward second information based on the personal information and the shared information to the vehicle to be used, whereby the vehicle to be used can configure vehicle settings based on the personal information and the shared information and can obtain information based on the personal information and the shared information.

Moreover, the user may access server 9006 and cloud server 9003 using the second communication device and may configure the shared information so as to be accessible by other users.

Furthermore, when the user rides in a vehicle at some other time, in addition to the personal information and the shared information, shared information provided by some other user may also be recalled. Accordingly, the user uses the second communication device to access server 9006 and cloud server 9003 and forward second information based on the personal information, the shared information, and the shared information provided by another user to the vehicle to be used, whereby the vehicle to be used can configure vehicle settings based on the personal information, the shared information, and the shared information provided by another user, and can obtain information based on the personal information, the shared information, and the shared information provided by another user.

This achieves the advantageous effect that user-friendliness can be improved since the user does not need to configure troublesome settings each time they rent a vehicle and preferable settings can be easily recalled for each user. Moreover, the advantageous effect whereby it is possible for the user to easily obtain beneficial information obtained in the past by the user theirself, and beneficial information obtained by another user.

As described above, the communication system according to the present embodiment includes one or more power transmitters 9004, and server 9006 or cloud server 9003 that is capable of communicating with the one or more power transmitters 9004. Server 9006 or cloud server 9003 obtains first information from first vehicle 9001-1 via first power transmitter 9004-1 included in the one or more power transmitters 9004, during charging of first vehicle 9001-1 by first power transmitter 9004-1 (92-1 to 92-3). Server 9006 or cloud server 9003 supplies second information based on the first information to second vehicle 9001-2 via second power transmitter 9004-2 included in the one or more power transmitters 9004, during charging of second vehicle 9001-2 by second power transmitter 9004-2.

Moreover, for example, as illustrated in FIG. 62 to FIG. 68, each of the one or more power transmitters 9004 includes: power transmission coil 6101 for transmitting power to vehicle 9001; first communication antennas 6201_5 through 6201_8 that are disposed inside power transmission coil 6101 and are for communicating with vehicle 9001; and second communication antennas 6201_1 through 6201_4 that are disposed outside power transmission coil 6101 and are for communicating with vehicle 9001.

In FIG. 90, vehicle 9001 may cause server 9006 in power transmission system 9002 to perform user authentication on the user of vehicle 9001. Alternatively, vehicle 9001 may cause cloud server 9003 to perform user authentication on the user of vehicle 9001, via power transmission system 9002. Moreover, upon performing the user authentication, information indicating a unique identifier of vehicle 9001 (vehicle unique identification (ID) information) may be transmitted from the communication device.

Upon completion of the authentication, server 9006 or cloud server 9003 utilizes the communication function of power transmission system 9002 to transmit, to vehicle 9001, information on the completion of the authentication. In response to the completion of the authentication, vehicle 9001 may activate in order to move and may become capable of moving.

Alternatively, upon completion of the authentication, server 9006 or cloud server 9003 may transmit information on the completion of the authentication to a communication device possessed by the user. Then, vehicle 9001 may activate in order to move and may become capable of moving, under information on the completion of the authentication by the user (for example, the information on the completion of the authentication includes a password and the user supplies the password information to vehicle 9001).

In this way, since, without separately setting the amount of time the vehicle is to receive power and the provision and supply time of data to the server, the provision and supply of data to the server is performed during the time that the vehicle receives power, it is possible to achieve the advantageous effect that the time during which the vehicle can be freely used can be increased. Moreover, since, without separately setting the "vehicle is parked" and the provision and share time of data to the server, the provision and supply of data to the server is performed while the vehicle is parked, it is possible to achieve the advantageous effect that the time during which the vehicle can be freely used can be increased.

Note that the usage of vehicle 9001 is not limited to usage for the purpose of moving vehicle 9001. According, the user may transmit, from the communication device included in vehicle 9001, to server 9006 or cloud server 9003, information indicating whether vehicle 9001 is to be moved or not, or information indicating that vehicle 9001 will not be moved. Then, when server 9006 or cloud server 9003 determines that vehicle 9001 will not be moved, server 9006 or cloud server 9003 may transmit, to vehicle 9001, information indicating not to activate in order to move.

Supplementary Note 7

In the present specification, an application related to processes associated with the receiving device may be provided by a server, and a terminal may install this application to implement the functions of the receiving device described in the present specification. Note that the application may be provided to the terminal by the communication device included in the transmitting device described in the present specification connecting to a server via a network, and the application may be provided to the terminal by the communication device having some other transmission function connecting to a server via a network.

Similarly, in the present specification, an application related to processes associated with the transmitting device may be provided by a server, and a communication device may install this application to implement the functions of the transmitting device described in the present specification. Note that a method whereby the application is provided to another communication device by the communication device connecting to a server via a network is conceivable.

In the present; specification, for example, the terminology "terminal", "repeater", "vehicle", "communication device", "car", and "transceiver device" are used, but the "terminal", "repeater", "vehicle", "communication device", "car", and "transceiver device" may each be a satellite, robot, household appliance (consumer electronic equipment), drone, vehicle such as a car, aircraft, (airborne) airship, access point (that is mobile), base station, ship, seafloor mobile device, bicycle, or two-wheeled vehicle (automobile).

Figure 93:
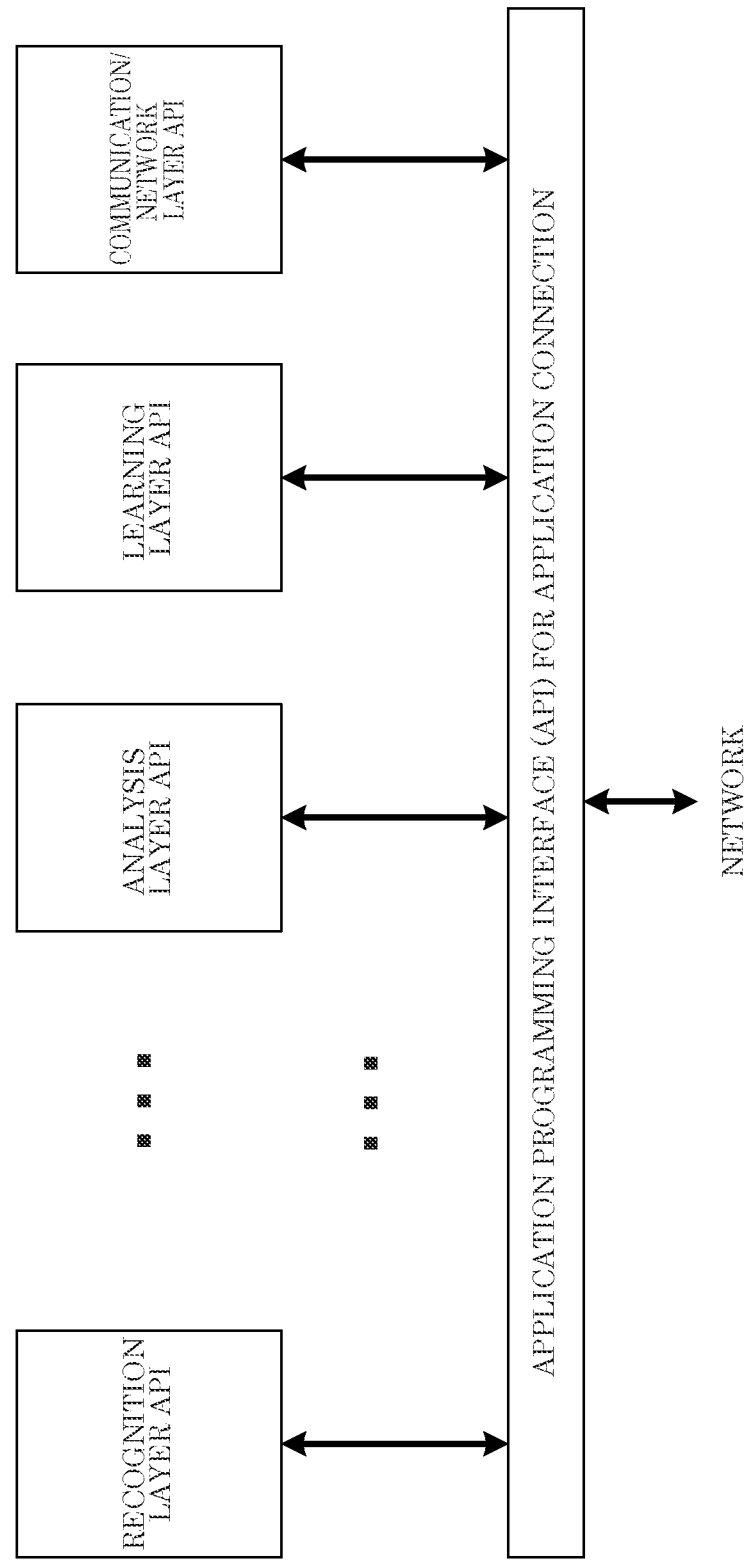
FIG. 93 illustrates one example of a configuration of a server.

In the present specification, the terminology "server" is used. One example of the configuration of this server will be given. One example of the configuration of the server is illustrated in FIG. 93. The server includes, as an application programming interface (API) for performing processes, a recognition layer API, an analysis layer API, a learning layer API, and a communication/network layer API, etc., and these APIs are connected to an API for application connection, and processes are performed in each API, such as determining instructions for operations in each device, and generating the second information described in Embodiment 14. The API for application connection is connected to a network, and outputs a result of the processing it performs.

It is possible for the present disclosure to facilitate, for example, improvement in the performance of a communication system and the provision of new services.

Embodiment 15

Each of the wireless communication methods using a plurality of antennas described in the above embodiments is one example of a wireless communication method that is applicable to a communication system. Here, as described above, the wireless communication method used by the communication system may be a communication method that performs communication using a device other than an antenna such as an optical communication device. In other words, in the present specification, when the communication device, the transmitting device, the receiving device and the like perform communication, optical communication using visible light, for example, may be used. Hereinafter, a specific example related to visible light communication will be given as an example of optical communication. First, a first visible light communication example which is one example of a visible light communication method applicable to each embodiment of the present disclosure will be given.

<Line Scan Sampling>

Smartphones and digital cameras, for example, are equipped with an image sensor such as a CMOS (Complementary Metal Oxide Semiconductor) sensor. For example, the entire scene in a single image captured by the CMOS sensor is not captured at a single instant, but rather, for example, captured line by line using a rolling shutter method, whereby the sensor reads out the amount of light received line by line. Accordingly, taking the readout time into account, the starting and stopping of the reception of light is controlled so that there is a time shift from line to line. In other words, images captured by the CMOS sensor are constructed from a plurality of lines captured with a slight time lag between each line.

Figure 94:
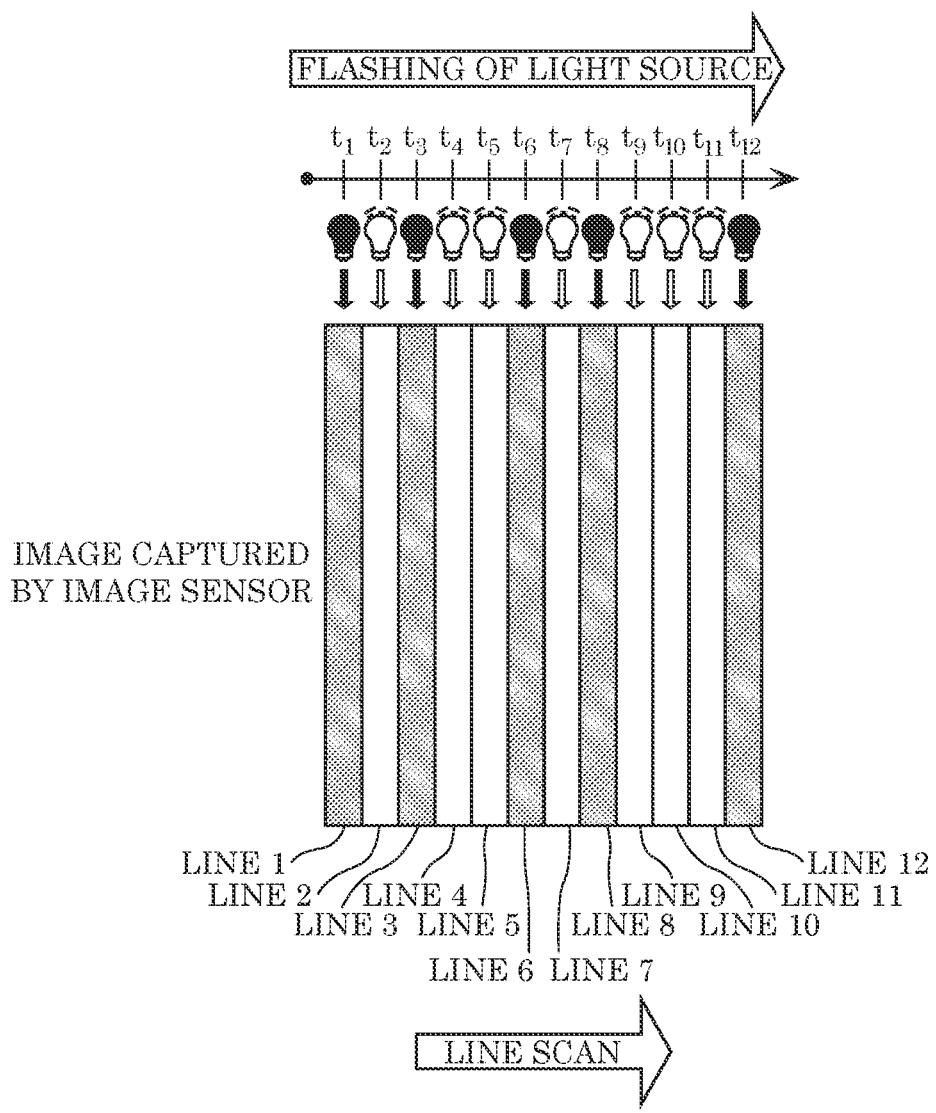
FIG. 94 illustrates the principle behind line scan sampling.

In the first example of a visible light communication method, high-speed reception of visible light signals is achieved based on a method that focuses on the characteristics of the CMOS sensor. In other words, in the first example of a visible light communication method, by utilizing the slight difference in exposure time between lines, the luminance and color of the light source at a plurality of points in time can be measured line by line, from a single image (image captured by the image sensor, i.e., "captured image"), making it possible to capture a modulated signal faster than the frame rate of the image sensor, as illustrated in FIG. 94.

Hereinafter, this sampling technique is referred to as "line scan sampling", and one line of pixels that are exposed at the same time is referred to as an "exposure line".

Note that line scan sampling can be implemented using the rolling shutter scheme of a CMOS sensor, but even when the rolling shutter scheme is implemented using a sensor other than a CMOS sensor, such as a charge-coupled device (CCD) sensor or an organic CMOS sensor, the line scan sampling can be implemented in the same manner.

Figure 95:
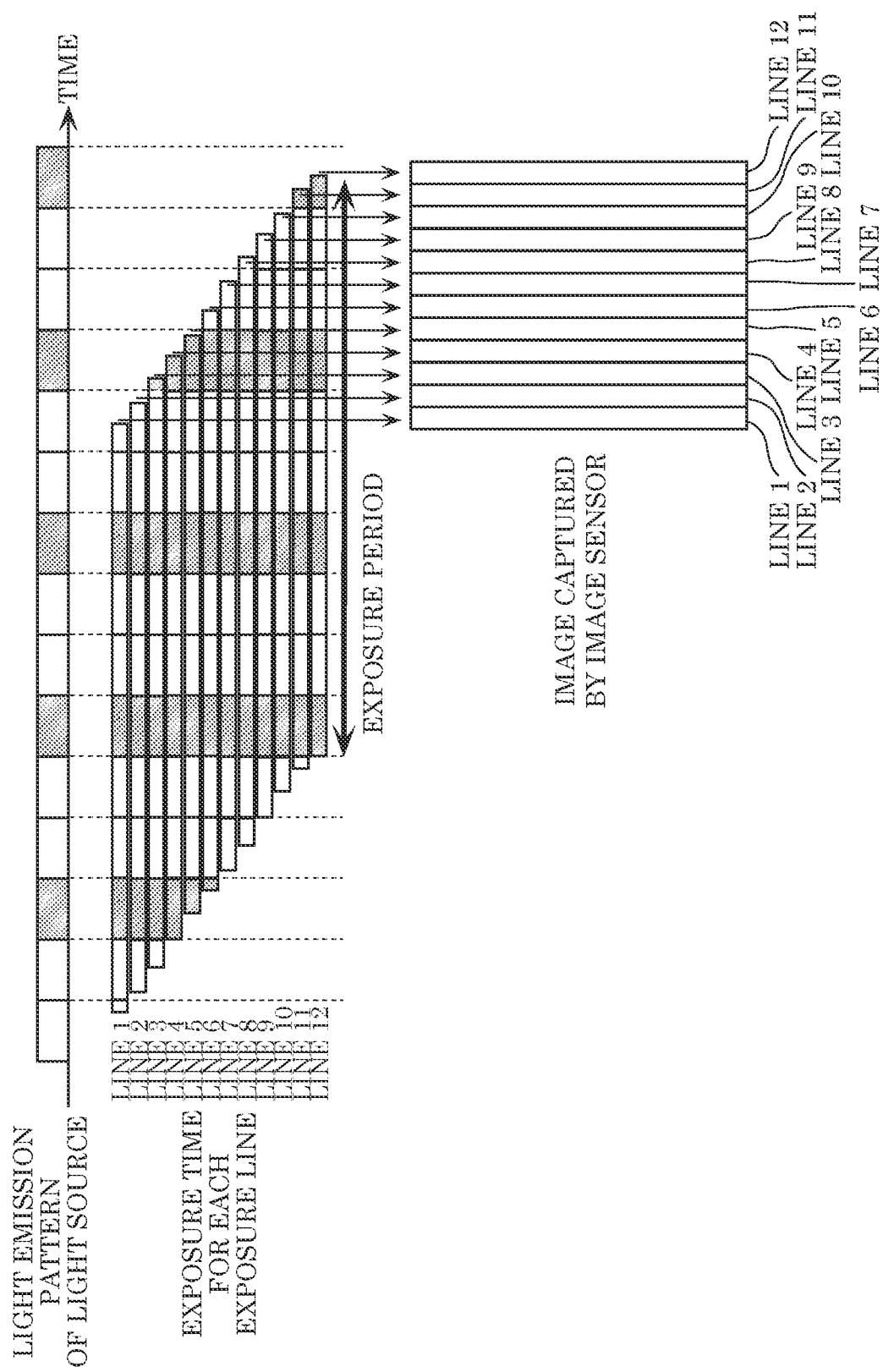
FIG. 95 illustrates one example of a captured image when exposure time is long.

However, when the photography setting for photographing an image using the camera function (the function for capturing a video or still image) is used, even if a rapidly flashing light source is captured, the flashing will not appear as a striped pattern extending along the exposure lines. This is because, with this setting, since the exposure time is sufficiently longer than the flash cycle, as illustrated in FIG. 95, the change in luminance resulting from the light source flashing (light-emission pattern) is uniform, whereby the variation in pixel values between exposure lines is small, resulting in a substantially uniform image.

Figure 96:
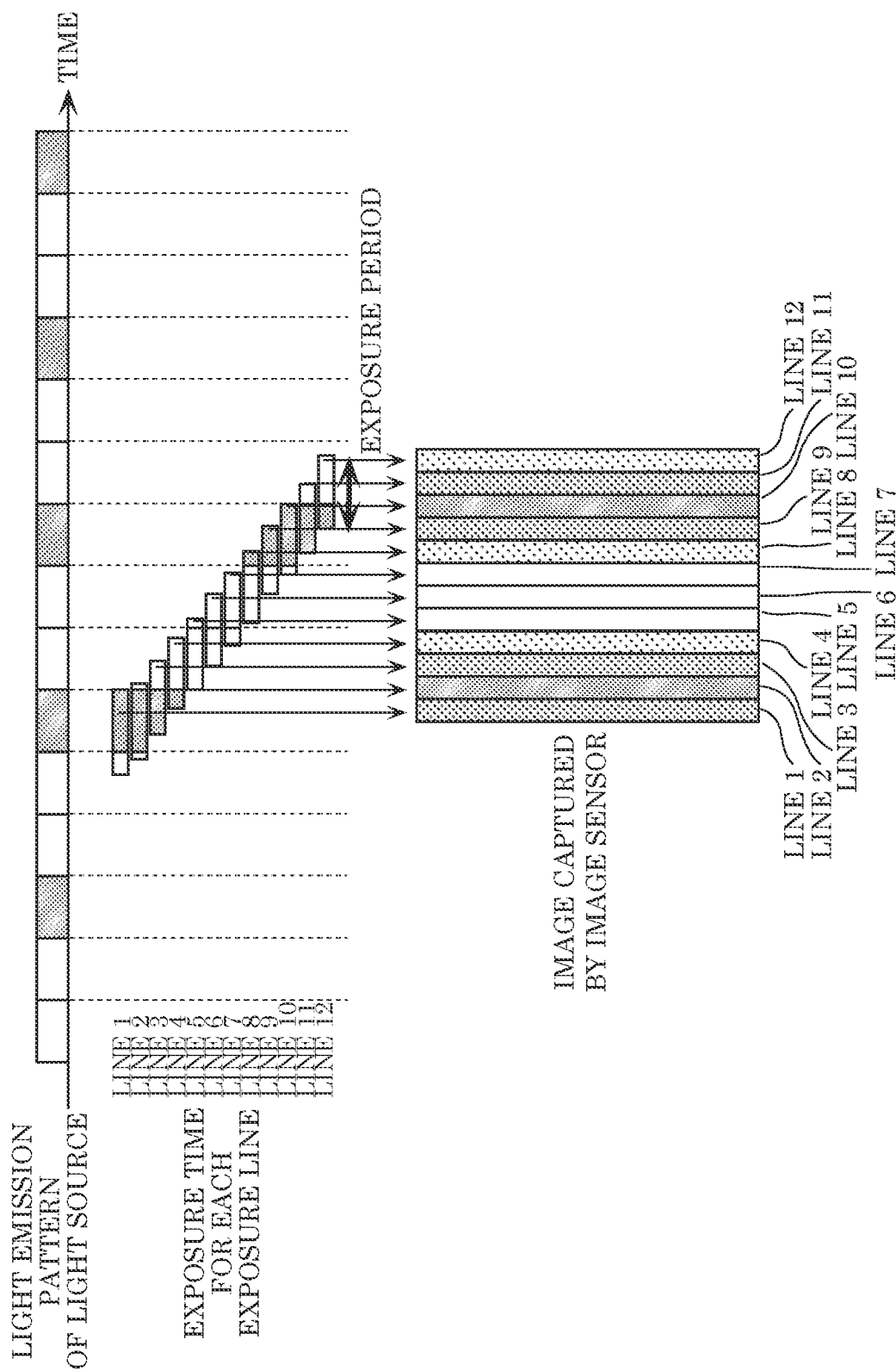
FIG. 96 illustrates one example of a captured image when exposure time is short.

In contrast, by setting the exposure time to the flash cycle of the light source as illustrated in FIG. 96, the state of the flashing of the light source (light-emission pattern) can be observed as a change in luminance between exposure lines. In FIG. 96, the length of the exposure period is set slightly longer than the length of the shortest period of a continuous light-emitting state, and the difference in start times of exposure periods between adjacent exposure lines is set longer than the shortest period of a continuous light-emitting state, but the exposure period setting in line scan sampling is not limited to this example. For example, the length of the exposure period may be set shorter than the shortest period of a continuous light-emitting state, and may be set to approximately double the length of the shortest period of a continuous light-emitting state. Moreover, in addition to a method in which the optical signal is expressed as, for example, a combination of square waves like illustrated in FIG. 97A, a method in which the optical signal continuously changes may be used as the optical communication method. In any case, with respect to the sampling rate required to receive and demodulate optical signals, a reception device that uses an optical communication method sets the difference between start times or end times between temporally neighboring exposure lines to be less than or equal to the sampling interval corresponding to the sampling rate. Moreover, the reception device having an optical communication method sets the length of the exposure period to be less than or equal to the length of the sampling interval. However, the reception device having an optical communication method may set the length of the exposure period to less than or equal to 1.5 times the sampling interval, and may set the exposure period to less than or equal to 2 times the sampling interval.

For example, exposure lines are designed so as to be parallel to the lengthwise direction of the image sensor. In such cases, in one example, assuming the frame rate is 30 fps (frames per second), at a resolution of 1920×1080, 32,400 or more samples are obtained each second, and at a resolution of 3840×2160, 64,800 or more samples are obtained each second.

Line Scan Sampling Application Example

Note that in the above description, line scan sampling in which a signal that indicates an amount of light received per line is read out is described, but the method of sampling optical signals using an image sensor such as a CMOS sensor is not limited to this line scan sampling example. A variety of methods that can obtain signals sampled at a sampling rate higher than the frame rate used in typical video capturing can be implemented as a sampling method used for optical signal reception. For example, a method of controlling the exposure time per pixel and reading out a signal or a method of controlling the exposure time per group of pixels arranged in a shape other than a line and reading out a signal may be used by utilizing a global shutter method that has a shutter function for each pixel. Moreover, a method may be used in which a signal is react out a plurality of times from the same pixel during a period corresponding to a single frame in the frame rate used in typical video capturing.

<Frame Sampling>

Furthermore, by employing a frame rate method that gives a shutter function to each pixel, it is possible to sample optical signals even in a method that speeds up the frame rate.

For example, the embodiments to be described hereinafter can be realized in any of the methods described above: "Line Scan Sampling", "Line Scan Sampling Application Example", and "Frame Sampling".

<Light Source and Modulation Scheme>

In visible light communication, for example, instead of an antenna, a light emitting element such as an LED (Light Emitting Diode) or organic electroluminescent (EL) element can be used as a transmitter. LEDs and organic EL elements are commonly used as light sources in display backlights, and are capable of rapidly flashing.

However, light sources that are used as visible light communication transmitters cannot be allowed to flash uncontrolled when performing visible light communication depending on the application of the light source. When a light source that provides a function that is not visible light communication, such as a lighting function, is used for visible light communication, if the changes in luminance made for visible light communication are recognizable to the human eye, the original functionality of a light source as a lamp will be lost. Accordingly, the transmission signal needs to be emitted at a desired brightness and needs to be imperceptible to the human eye.

Figure 97A:
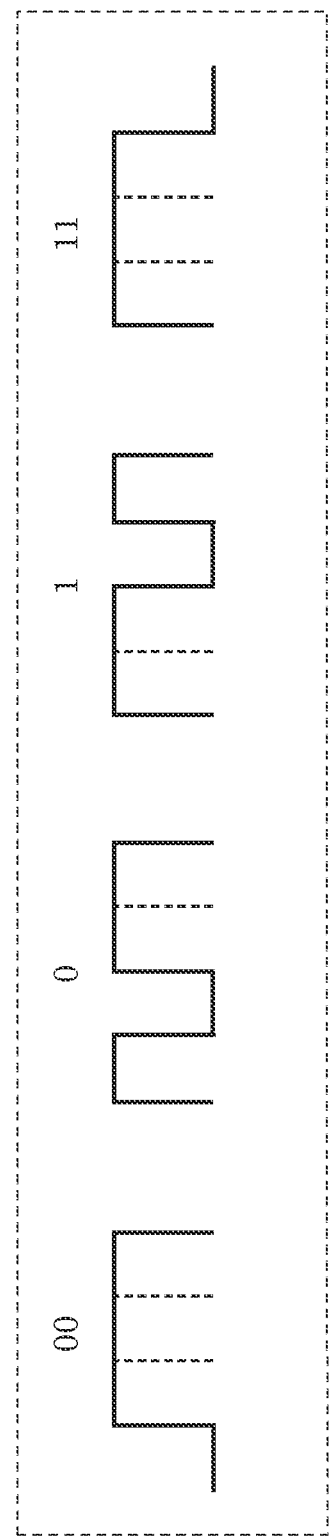
FIG. 97A is for illustrating a 4PPM modulation scheme.

One example of a modulation scheme that satisfies these conditions is 4PPM (4-Pulse Position Modulation). As illustrated in FIG. 97A, 4PPM is a scheme in which two bits are expressed by a group of four time slots each indicating either bright or dark light emitted by a light source. Moreover, as illustrated in FIG. 97A, in 4PPM, three of the four slots are bright and one of the slots is dark. Accordingly, regardless of the content of the signal, the average brightness (average luminance) is ¾=75%.

For comparison, one example of a similar scheme is Manchester encoding illustrated in FIG. 97B. In the Manchester coding scheme, one bit is expressed with two states, and the modulation efficiency is 50%, which is the same as 4PPM, but among the two states, one is bright and one is dark, so the average luminance is ½=50%. In other words, 4PPM is more suitable than Manchester encoding as a modulation scheme for visible light communication. However, since communication capability is not adversely affected by changes in luminance from visible light communication that are recognizable to the human eye, depending on the application, there may be no problem in using a method in which the changes in luminance are recognizable to the human eye. Accordingly, the transmitter (light source) may use, for example, an amplitude shift keying (ASK) method, a phase shift, keying (PSK) method, or a pulse amplitude modulation (PAM) method to generate the modulated signal and pulse the light source to emit light.

Example of Overall Configuration of Communication System

Figure 98:
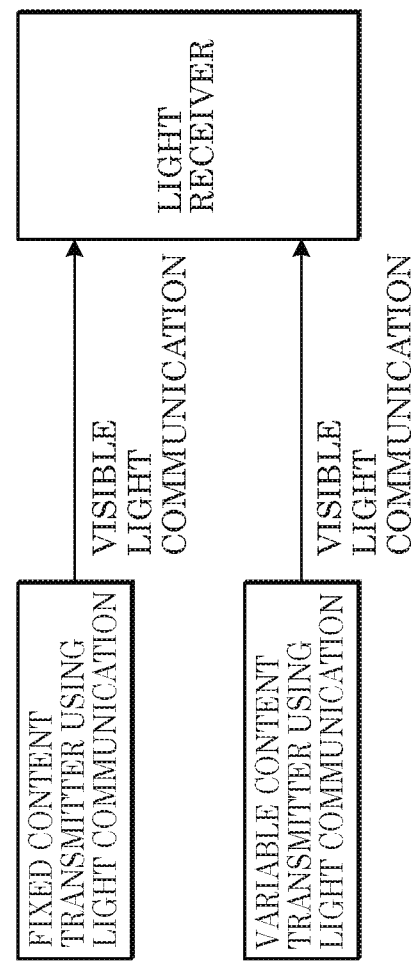
FIG. 98 illustrates an example of a configuration of a visible light communication system.

As illustrated in FIG. 98, the communication system that performs visible light communication includes at least a transmitter that transmits (emits) optical signals and a receiver that receives optical signals. For example, there are two types of transmitters: a variable content transmitter using light, communication that changes the transmission content depending on the image or content to be displayed or depending on time or depending on the communication partner; and a fixed content transmitter using light communication that continues transmitting fixed transmission content. However, even with a configuration including only either the variable content transmitter using light communication or the fixed content transmitter using light communication, a communication system that communicates via light can be realized.

The receiver can receive an optical signal from the transmitter, obtain, for example, relevant information associated with the optical signal, and provide it to the user.

As shown above, even when a transmitter that transmits optical signals and a receiver that receives optical signals are applied to each embodiment in the present specification, each embodiment can be carried out in the same manner.

This concludes the summary of the visible light communication method, but communication methods applicable to the light communication are not limited to this example. For example, the light emitter in the transmitter may transmit data using a plurality of light sources. Moreover, the light receiver in the reception device need not be an image sensor such as a CMOS sensor, and may employ a communication method that can use a device that is capable of converting an optical signal into an electrical signal, such as a photodiode. In such cases, since there is no need to perform sampling using the above-described line scan sampling, such a light receiver is applicable even to methods that require 32,400 or more samples per second. Moreover, depending on the application, for example, a wireless communication method that uses light in frequencies outside of the visible light range, such as infrared light or ultraviolet light, may be used.

Note that although the configuration illustrated in FIG. 98 is described as one example of a communication system that performs visible light communication, the configuration of the communication system that performs visible light communication is not limited to the configuration illustrated in FIG. 98. Hereinafter, a second visible light communication example which is one example of a visible light communication method applicable to each embodiment will be given.

Embodiment 16

In the present embodiment, a second example of visible light communication that differs from Embodiment 15 will be given.

Figure 99:
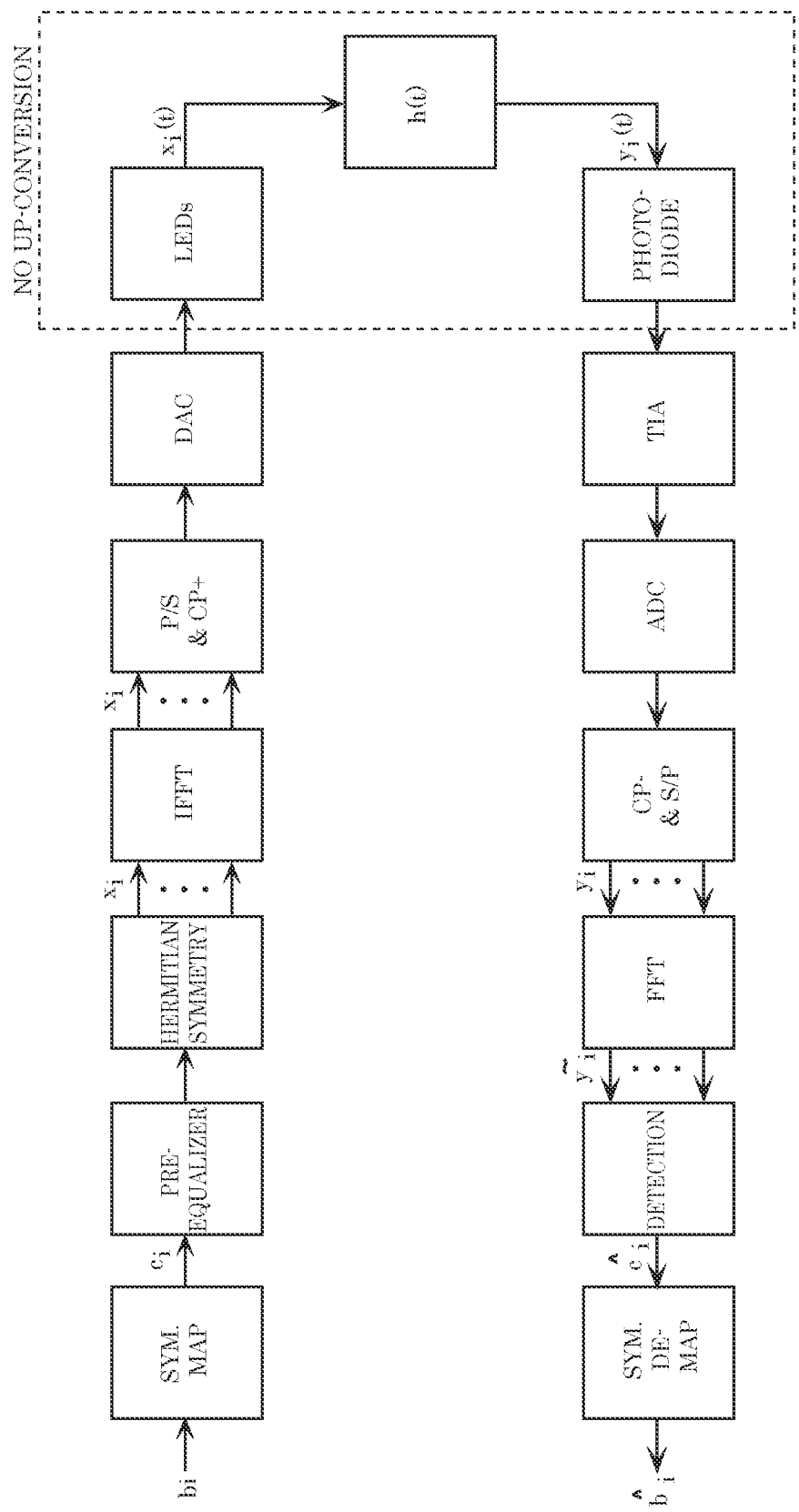
FIG. 99 illustrates an example of a configuration of another communication system that performs optical communication.

In the present embodiment, a supplemental description will be given regarding FIG. 99. The configuration of the communication system that performs visible light communication may be, for example, a configuration like that illustrated in FIG. 99 (see, for example, "IEEE 802.11-16/1499r1"). In FIG. 99, the transmission signal is transmitted as an optical signal in a baseband bandwidth without being up-converted. In other words, a device that transmits the optical signal according to the present embodiment (i.e., a device including a light source) may have the configuration illustrated on the transmission-side in FIG. 99 (a configuration including elements from "Sym. Map" to "LEDs"), and a terminal that receives the optical signal according to the present embodiment may have the configuration illustrated on the reception-side in FIG. 99 (a configuration including elements from "Photo-Diode" to "Sym. DE-MAP").

FIG. 99 will be described in more detail. The symbol mapper receives an input of transmission data, performs mapping based on a modulation scheme, and outputs a symbol sequence (ci).

The pre-equalizer receives an input of the symbol sequence, performs pre-equalizing processing on the symbol sequence to reduce the equalizing processes on the reception-side, and outputs a pre-equalized symbol sequence.

The Hermitian symmetry processor receives an input of the pre-equalized symbol sequence, allocates sub-carriers to the pre-equalized symbol sequence to secure Hermitian symmetry, and outputs parallel signals. The inverse (fast) Fourier transformer receives inputs of the parallel signals, applies an inverse (fast) Fourier transform to the parallel signals, and outputs inverse (fast) Fourier transformed signals.

The parallel serial and cyclic prefix adder receives an input of the inverse (fast, Fourier transformed signals, performs parallel conversion and adds cyclic prefix, and outputs the signal-processed signal.

The digital-to-analog converter receives an input of the signal-processed signal, performs digital-to-analog conversion, outputs an analog signal, and the analog signal is emitted as light from, for example, one or more LEDs.

Note that the pre-equalizer and the Hermitian symmetry processor need not be included. In other words, there may be instances in which the pre-equalizer and the Hermitian symmetry processor do not perform their respective signal processing.

The photodiode receives an input of light, and obtains a reception signal via a transimpedance amplifier (TIA).

The analog-to-digital converter performs an analog-to-digital conversion on the reception signal, and outputs a digital signal.

The cyclic prefix subtractor and serial parallel converter receives an input of the digital signal, subtracts the cyclic prefix, and then performs serial parallel conversion, and receives an input of parallel signals.

The (fast) Fourier transformer receives inputs of the parallel signals, applies a (fast) Fourier transform to the parallel signals, and outputs (fast) Fourier transformed signals.

The detector receives inputs of the (fast) Fourier transformed signals, performs detection, and outputs a series of reception symbols.

The symbol demapper receives an input of the series of reception symbols, performs demapping, and obtains a series of reception data.

Note that FIG. 99 is one non-limiting example; it goes without saying that the present embodiment can be carried out regardless of whether the transmitting device and receiving device support a multi-carrier method such as orthogonal frequency division multiplexing (OFDM) or support a single carrier scheme like described below. Accordingly, the configuration of the transmitting device and the configuration of the receiving device are not limited to the example given in FIG. 99. Note that examples of single carrier methods include Discrete Fourier Transform (DFT)-Spread Orthogonal Frequency Division Multiplexing (OFDM), Trajectory Constrained DFT-Spread OFDM, OFDM based Single Carrier (SC), Single Carrier (SC)-Frequency Division Multiple Access (FDMA), and Guard interval DFT-Spread OFDM.

Even when a transmitting device that transmits optical modulated signals and a receiving device that receives optical modulated signals are implemented in each embodiment according to the present specification in this way, the embodiments can be carried out in the same manner.

Embodiment 17

<Close-Proximity Communication Configuration>

Figure 100:
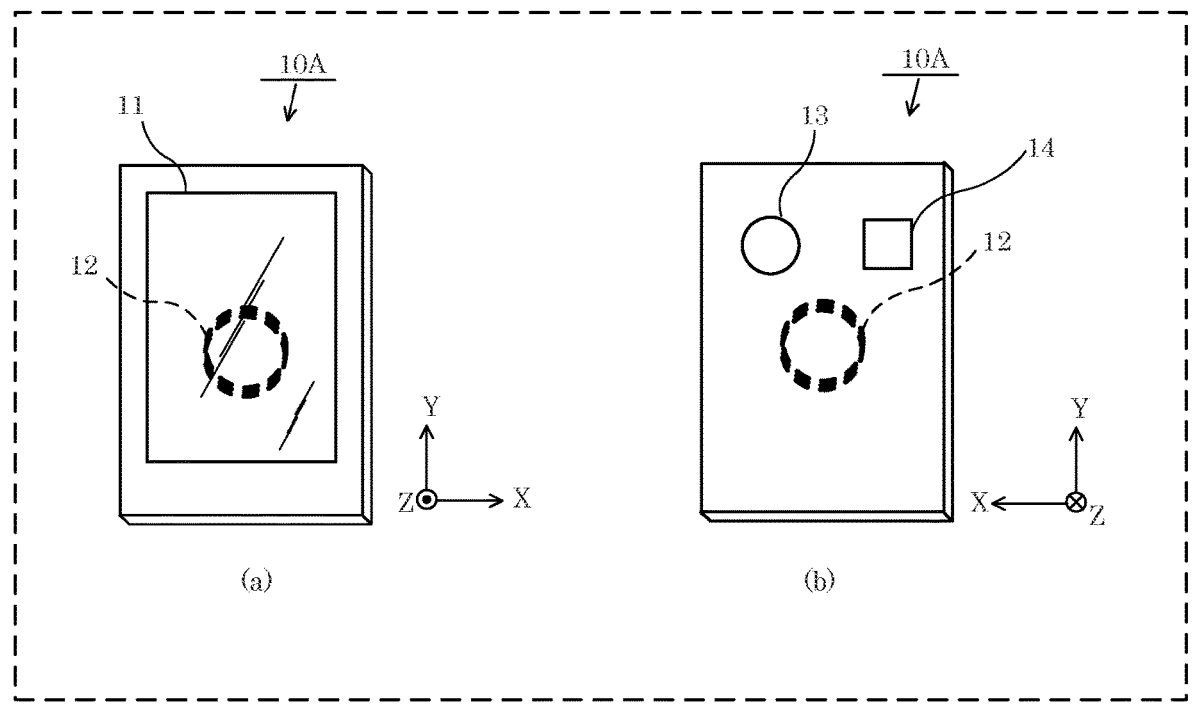
FIG. 100 illustrates one example of the front and back surfaces of a mobile terminal.

FIG. 100 illustrates one example of the front surface and the back surface of a mobile terminal according to the present embodiment. More specifically, (a) in FIG. 100 illustrates the front surface of the mobile terminal, and (h) in FIG. 100 illustrates the back surface of the mobile terminal. Note that in the present embodiment, an axis perpendicular to the display (to be described later) of the mobile terminal is referred to as the Z axis, an axis that extends lengthwise of the mobile terminal and is perpendicular to the Z axis is referred to as the Y axis, and an axis perpendicular to both the Z and Y axes is referred to as the X axis.

Mobile terminal 10A according to the present embodiment is a communication device such as a mobile phone or a smartphone, and includes functionality for wirelessly receiving power and functionality for close-proximity wireless communication. For example, this close-proximity wireless communication is implemented via optical communication such as visible light communication.

Mobile terminal 10A includes display 11, power reception coil 112, light emitter 13, and light receiver 14. As illustrated in (a) in FIG. 100, display 11 is a touch panel display on the surface of mobile terminal 10A that is on the positive side of the Z axis (that is to say, the front surface of mobile terminal 10A). Note that such a display 11 may be a liquid crystal display and, alternatively, may be an organic electroluminescent (EL) display. Power reception coil 112 corresponds to power reception antenna 5701, etc., described above, and receives radio waves transmitted from a device external to mobile terminal 10A. This charges the battery of mobile terminal 10A.

Light emitter 13 is a light source such as a light emitting diode (LED) or an organic EL light source, and transmits a modulated optical signal. Light receiver 14 is an element such as a photodiode or an image sensor element, and receives a modulated optical signal transmitted from another device. As illustrated in (b) in FIG. 100, such a light emitter 13 and light receiver 14 are disposed on the surface of mobile terminal 10A that is on the negative side of the Z axis (that is to say, the back surface of mobile terminal 10A). Mobile terminal 10A can perform visible light communication with another device by using light emitter 13 and light receiver 14. Note that the above-described modulated optical signal is, for example, an optical signal or visible light signal obtained by modulating a transmission signal using the 4PPM modulation method illustrated in FIG. 97A or the Manchester coding scheme illustrated in FIG. 97B, or a modulated signal that is a single-carrier signal or a multi-carrier, such as OFDM that uses a baseband bandwidth, signal, as illustrated in FIG. 99.

In this way, in the present embodiment, light emitter 13 and light receiver 14 are disposed on the surface of mobile terminal 10A that is on the opposite side of display 11 (that is to say, are disposed on the back surface of mobile terminal 10A). Accordingly, the user of mobile terminal 10A can orient the back surface of mobile terminal 10 to face the communication partner device, and can view images displayed on display 11 while performing visible light communication with the communication partner device, and can furthermore make touch gestures on display 11. For example, the communication partner device may be another mobile terminal 10A. In other words, by facing the back surfaces of the two mobile terminals 10A toward each other, light emitters 13 and light receivers 14 oppose each other, and the two mobile terminals 10A can perform visible light communication. Moreover, when the communication partner device includes functionality for wirelessly supplying power, mobile terminal 10A can receive power while performing visible light communication with the communication partner device. This achieves an advantageous effect like described above.

Figure 101:
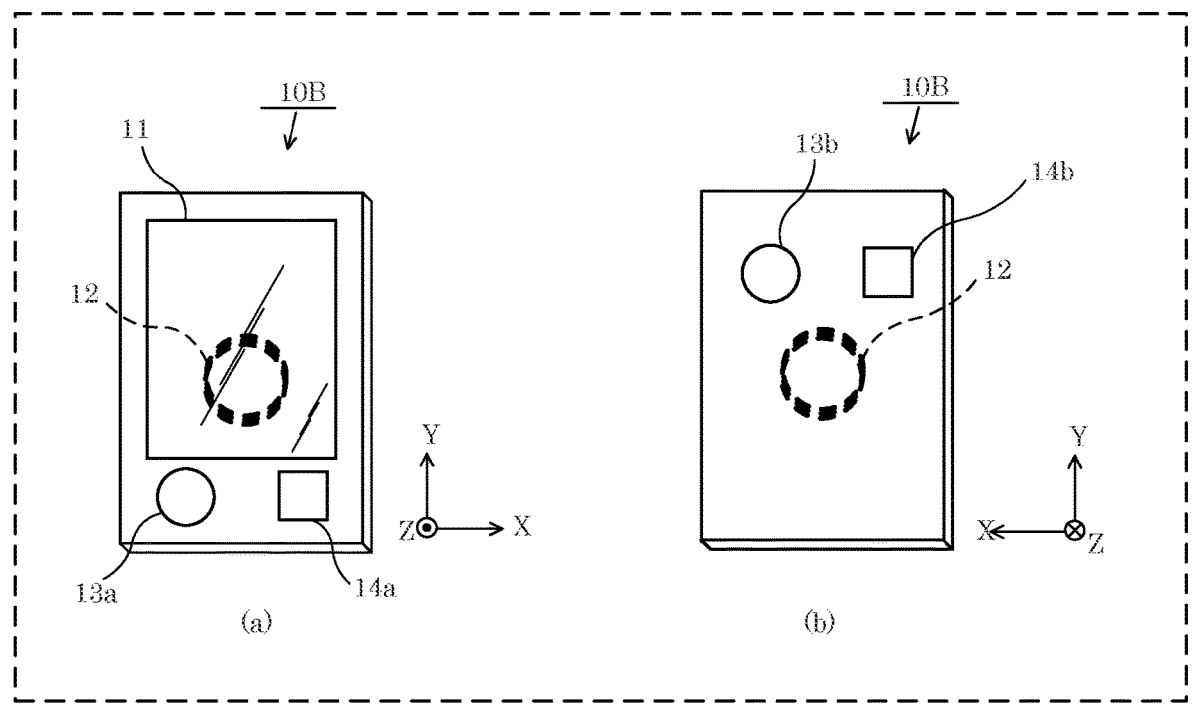
FIG. 101 illustrates one example of the front and back surfaces of another mobile terminal.

FIG. 101 illustrates one example of the front surface and the back surface of another mobile terminal according to the present embodiment. More specifically, (a) in FIG. 101 illustrates the front surface of the mobile terminal, and (b) in FIG. 101 illustrates the hack surface of the mobile terminal.

Like mobile terminal 10A, mobile terminal 10B is configured as a communication device such as a mobile phone or smart phone, but unlike mobile terminal 10A, mobile terminal 10B can further relay visible light communication. With such a mobile terminal 10B, as illustrated in (a) and (b) in FIG. 101, in addition to light emitter 13 and light receiver 14 being disposed on the back surface, like mobile terminal 10A, light emitter 13 and light receiver 14 are also disposed on the front surface. In other words, like mobile terminal 10A, mobile terminal 10B includes display 11 and power reception coil 112, but also includes light emitters 13a and 13b and light receivers 14a and 14b. Light emitter 13b and light receiver 14b are disposed on the back surface of mobile terminal 10B. Light emitter 13a and light receiver 14a are disposed on the front surface of mobile terminal 10B. For example, light emitter 13a and light receiver 14a are disposed on the part of display 11 that is on the negative side of the Y axis (that is to say, disposed on the lower part of display 11). Note that light emitters 13a and 13b are the same light sources as light emitter 13 illustrated in FIG. 100, and light receivers 14a and 14b are the same elements as light receiver 14 illustrated in FIG. 100.

Like mobile terminal 10A, mobile terminal 10B performs visible light communication with a first communication partner device using light emitter 13b and light receiver 14b disposed on the hack surface of mobile terminal 10B. Furthermore, mobile terminal 10B performs visible light communication with a second communication partner device using light, emitter 13a and light receiver 14a disposed on the front surface of mobile terminal 10B. With this configuration, mobile terminal 10B can relay visible light communication between the first communication partner device and the second communication partner device.

Here, as illustrated in (a) in FIG. 101, in a view of the front surface of mobile terminal 10B from the positive side of the Z axis, light emitter 13a is located on the left side, and light receiver 14a is located on the right side. Moreover, as illustrated in (h) in FIG. 101, in a view of the back surface of mobile terminal 10B from the negative side of the Z axis, light emitter 13b is located on the left side, and light receiver 14b is located on the right side. In this way, regarding the front and back surfaces of mobile terminal 10B according to the present embodiment, light emitters 13a and 13b are located on the left side, and light receivers 14a and 14b are located on the right side. In other words, on the front and back surfaces of mobile terminal 10B according to the present embodiment, the light emitters and the light receivers have the same relative positional relationship with respect to the horizontal axis.

Note that the "left" side along the horizontal axis and the "right" side along the horizontal axis are from the perspective of the user when the user views mobile terminal 10B. In other words, the left side along the horizontal axis of mobile terminal 10B and the right side along the horizontal axis of mobile terminal 10B respectively refer to the left side of the front and back surfaces of mobile terminal 10B and the right side of the front and back surfaces of mobile terminal 10B from the perspective of the user when mobile terminal 10B is rotated around the Y axis, without flipping mobile terminal 10B along the Y axis (that is to say, without flipping mobile terminal 10B along the vertical axis so the top is on the bottom and vice versa). In a three-dimensional coordinate system defined by the above-described X, Y, and Z axes with respect to mobile terminal 10B, light emitter 13a is disposed on the negative side of the X axis, and light emitter 13b is disposed on the positive side of the X axis. Similarly, in the three-dimensional coordinate system, light receiver 14a is disposed on the positive side of the X axis, and light receiver 14b is disposed on the negative side of the X axis.

Figure 102A:
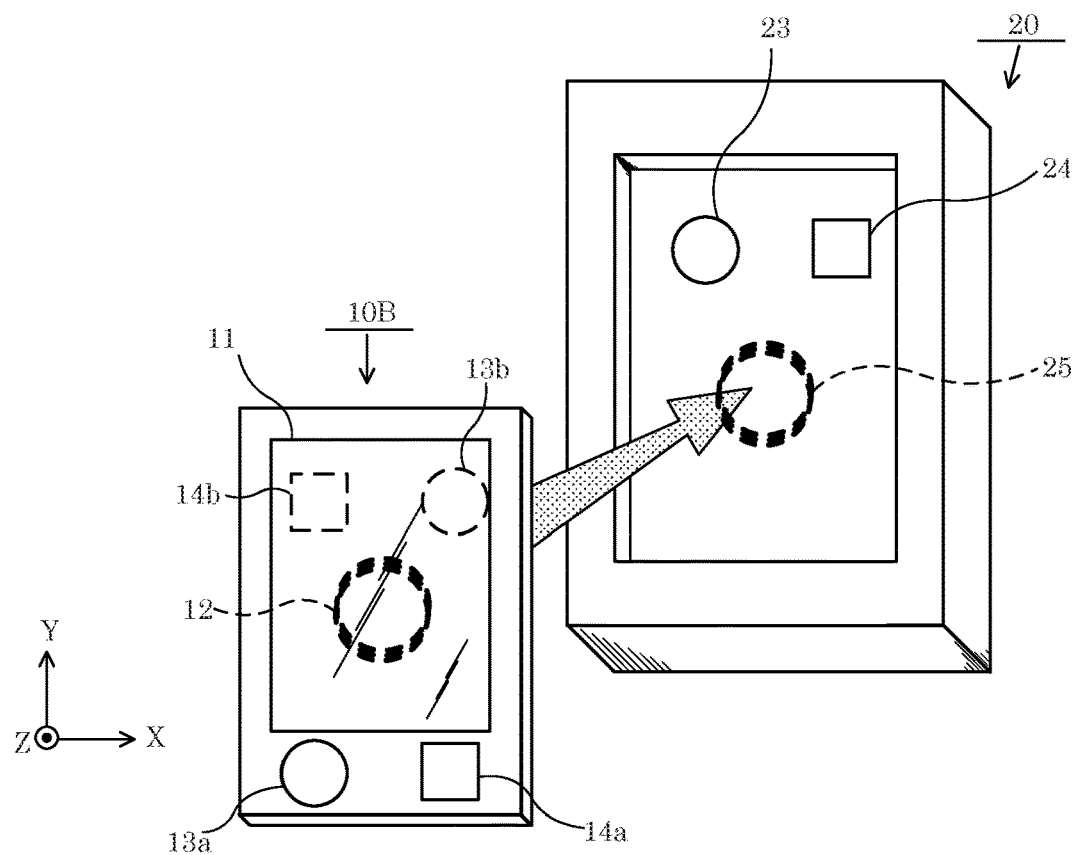
FIG. 102A illustrates one example of a mobile terminal and a power transmission device.

FIG. 102A illustrates one example of mobile terminal 10B and a power transmission device according to the present embodiment.

Power transmission device 20 is, for example, the first communication partner device described above, and is capable of performing visible light communication with mobile terminal 10B while wirelessly supplying power to mobile terminal 10B. Such a power transmission device 20 includes light emitter 23, light receiver 24, and power transmission coil 25.

Here, light emitter 23 and light receiver 24 in power transmission device 20 are disposed on the front surface of power transmission device 20 while maintaining the same positional relationship as mobile terminal 10B. In other words, in a view, from the outside, of the front surface of power transmission device 20, which is the surface on which light emitter 23 and light receiver 24 are disposed, light emitter 23 is disposed on the left side and light receiver 24 is disposed on the right side.

Accordingly, when the back surface of mobile terminal 10B is oriented to face the front surface of power transmission device 20, if mobile terminal 10B is placed in a predetermined position, light emitter 13b and light receiver 14b on the hack surface of mobile terminal 10B are respectively aligned with light receiver 24 and light emitter 23 of power transmission device 20. This achieves the advantageous effect that mobile terminal 10B and power transmission device 20 can adequately perform visible light communication via the communication path between light emitter 13b and light receiver 24 and the communication path between light emitter 23 and light receiver 14b.

Note that a recess, for example, is formed at the above-described predetermined position, and mobile terminal 10B is placed so as to fit in the recess in power transmission device 20. In other words, mobile terminal 10B is placed in power transmission device 20 in a state in which it is aligned with power transmission device 20. With this, breaks in visible light communication caused from misalignment can be inhibited.

Figure 102B:
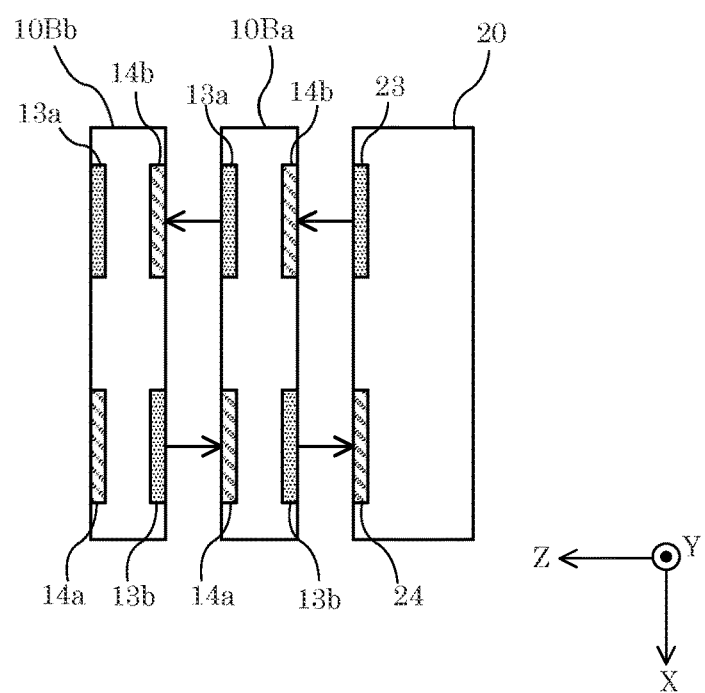
FIG. 102B illustrates a state in which mobile terminal 10B is relaying visible light communication.

FIG. 102B illustrates a state in which mobile terminal 10B is relaying visible light communication.

When mobile terminal 10Ba, which is the above-described mobile terminal 10B, is placed in power transmission device 20, mobile terminal 10Ba receives radio waves transmitted from power transmission device 20, which charges the battery of mobile terminal 10Ba. Furthermore, as described above, mobile terminal 10Ba performs visible light communication with power transmission device 20 using light emitter 13b and light receiver 14b. Here, when mobile terminal 10Bb, which is another mobile terminal 10B, is placed on the front surface side of mobile terminal 10Ba (that is to say, the positive side of the Z axis), mobile terminal 10Ba performs visible light communication with mobile terminal 10Bb using light emitter 13a and light receiver 14a.

More specifically, each of the two mobile terminals 10Ba and 10Bb include light emitters 13a and 13b disposed on the left side of the front surface and back surface, respectively, and light receivers 14a and 14b disposed on the right side of the front surface and the back surface, respectively. Accordingly, in a state in which the front surfaces of the two mobile terminals 10Ba and 10Bb are facing in the same direction, even when mobile terminals 10Ba and 10Bb overlap one another, light emitter 13a and light receiver 14a of mobile terminal 10Ba can be respectively aligned with light receiver 14b and light emitter 13b of mobile terminal 10Bb. With this, the two mobile terminals 10Ba and 10Bb can adequately perform visible light communication. Accordingly, mobile terminal 10Ba can relay visible light communication between mobile terminal 10Bb and power transmission device 20.

In this way, on either surface of either communication device, the light emitters are disposed on the left side and the light receivers are disposed on the right side, which makes it possible to adequately perform visible light communication, specifically visible-light close-proximity communication, between the communication devices. This also makes it possible to easily and clearly define conditions, protocols, and specifications pertaining to the configuration of each communication device. This achieves an advantageous effect like described above. Note that in the above example, the light emitters are disposed on the left side and the light receivers are disposed on the right side, but a configuration in which the light emitters are disposed on the right side and the light receivers are disposed on the left side is acceptable.

Figure 103:
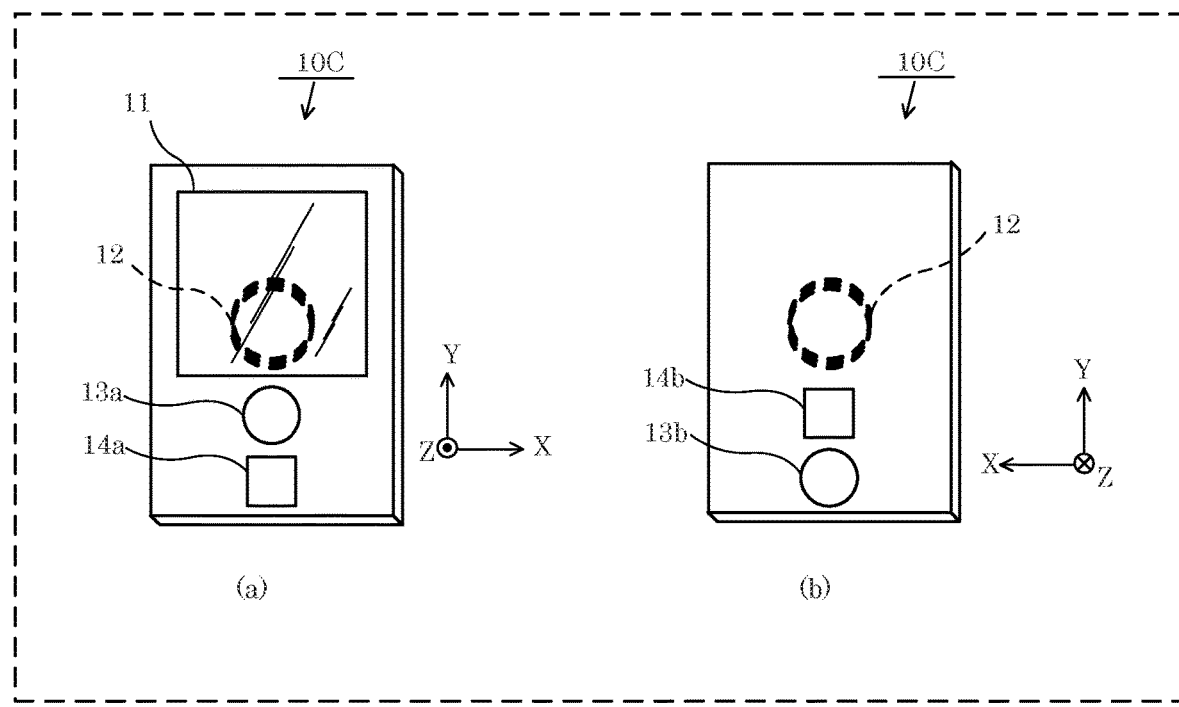
FIG. 103 illustrates one example of the front and back surfaces of another mobile terminal.

FIG. 103 illustrates one example of the front surface and the back surface of another mobile terminal according to the present embodiment. More specifically, (a) in FIG. 103 illustrates the front surface of the mobile terminal, and (b) in FIG. 103 illustrates the back surface of the mobile terminal.

Like mobile terminal 10B, mobile terminal 10C is configured as a communication device such as a mobile phone or smart phone, and can relay visible light communication. Like mobile terminal 10B, light emitter 13a and light receiver 14a are disposed on the front surface of such a mobile terminal 10C, as illustrated in (a) in FIG. 103, and light emitter 13b and light receiver 14b are disposed on the back surface of such a mobile terminal 10C, as illustrated in (b) in FIG. 103. However, on each of the front surface and the back surface, light emitter 1:3a or 13b and light receiver 14a or 14b are arranged along the vertical or longitudinal axis (that is, along the Y axis).

More specifically, on the front surface of mobile terminal 10C, light emitter 13a is arranged above (that is, on the Y axis positive side of) light receiver 14a, and light receiver 14a is arranged below (that is, on the Y axis negative side of) light emitter 13a. Moreover, on the back surface of mobile terminal 10C, light emitter 13a is arranged below (that is, on the Y axis negative side of) light receiver 14a, and light receiver 14a is arranged above (that is, on the Y axis positive side of) light emitter 13a, which is the opposite of the front surface side arrangement.

Accordingly, when the two mobile terminals 10C are overlapped such that the back surface of one of the two mobile terminals 10C faces the front surface of the other of the two mobile terminals 10C, the light emitters and the light receivers are aligned with each other. In other words, light receiver 14b and light emitter 13b on the back surface of one mobile terminal 10C among the two mobile terminals 10C are respectively aligned with light emitter 13a and light receiver 14a on the front surface of the other mobile terminal 10C among the two mobile terminals 10C. As a result, the two mobile terminals 10C can adequately perform visible light communication using light emitters 13a and 13b and light receivers 14a and 14b.

Moreover, even if one more mobile terminal 10C is positioned to overlap the two overlapping mobile terminals 10C, the one more mobile terminal 10C can perform visible light communication with an adjacent mobile terminal 10C. Accordingly, the middle mobile terminal 10C among the three overlapping mobile terminals 10C can relay visible light communication between the two outer mobile terminals 10C.

Figure 104:
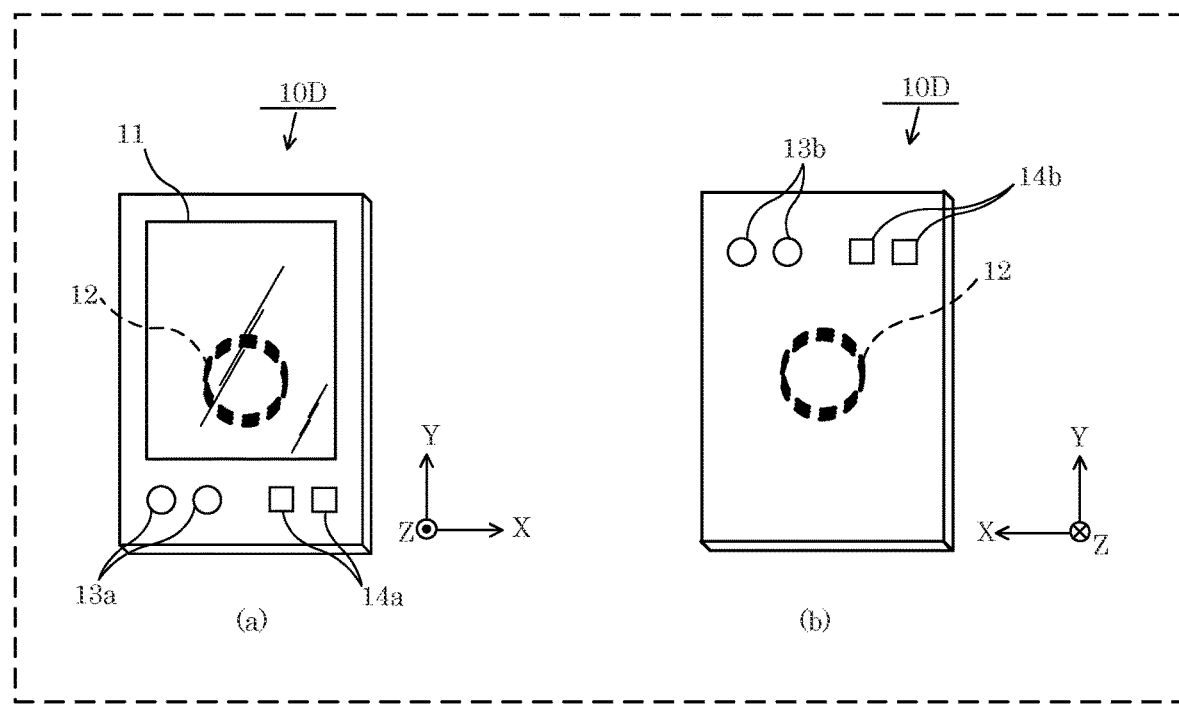
FIG. 104 illustrates one example of the front and back surfaces of another mobile terminal.

FIG. 104 illustrates one example of the front surface and the back surface of another mobile terminal according to the present embodiment. More specifically, (a) in FIG. 104 illustrates the front surface of the mobile terminal, and (b) in FIG. 104 illustrates the back surface of the mobile terminal.

Like mobile terminal 10B, mobile terminal 101) is configured as a communication device such as a mobile phone or smart phone. However, mobile terminal 101) differs from mobile terminal 10B in that a plurality of light emitters and a plurality of light receivers are disposed on each of the front and back surfaces. In other words, as illustrated in FIG. 104, mobile terminal 101) includes two light emitters 13a, two light emitters 13b, two light receivers 14a, and two light receivers 14b. More specifically, with mobile terminal 10C, as illustrated in (a) in FIG. 104, two light emitters 13a and two light receivers 14a are disposed on the front surface, and as illustrated in (b) in FIG. 104, two light emitters 13b and two light receivers 14b are disposed on the back surface. The two light emitters 13a and the two light receivers 14a on the front surface are aligned in a direction parallel to the X axis. The two light emitters 13a are disposed on the left side, and the two light receivers 14a are disposed on the right side. Similar to the front surface, the two light emitters 13b and the two light, receivers 14b on the back surface are also aligned in a direction parallel to the X axis. The two light emitters 13b are disposed on the left side, and the two light receivers 14b are disposed on the right side.

Even with such a mobile terminal 101), as described above, on each of the front and hack surfaces, since all light emitters 13a or 13b are disposed on the left side, and all light receivers 14a or 14b are disposed on the right side, just like with mobile terminal 10B, visible light communication can be adequately relayed.

More specifically, when two mobile terminals 101) are overlapped such that the back surface of one of the two mobile terminals 10D faces the front surface of the other of the two mobile terminals 10D, all of the light emitters and all of the light receivers are respectively aligned with each other. In other words, the two light receivers 14b and the two light emitters 13b on the back surface of one mobile terminal 101) among the two mobile terminals 101) are respectively aligned with the two light emitters 13a and the two light receivers 14a on the front surface of the other mobile terminal 101) among the two mobile terminals 10D. As a result, the two mobile terminals 101) can adequately perform visible light communication using the two light emitters 13a, the two light emitters 13b, the two light receivers 14a, and the two light receivers 14b.

Moreover, even if one more mobile terminal 10D is positioned to overlap the two overlapping mobile terminals 10D, the one more mobile terminal 10D can perform visible light communication with an adjacent mobile terminal 10D. Accordingly, the middle mobile terminal 10D among the three overlapping mobile terminals 101) can relay visible light communication between the two outer mobile terminals 101).

Moreover, with such a mobile terminal 10D, two modulated optical signals can be transmitted in parallel using the two light emitters 13a or the two light emitters 13b. Moreover, with mobile terminal 10D, two modulated optical signals can be received. In parallel using the two light receivers 14a or the two light receivers 14b. Accordingly, mobile terminal 10D both has the characterizing features of mobile terminal 10B and can transmit visible light communication signals in parallel.

Figure 105:
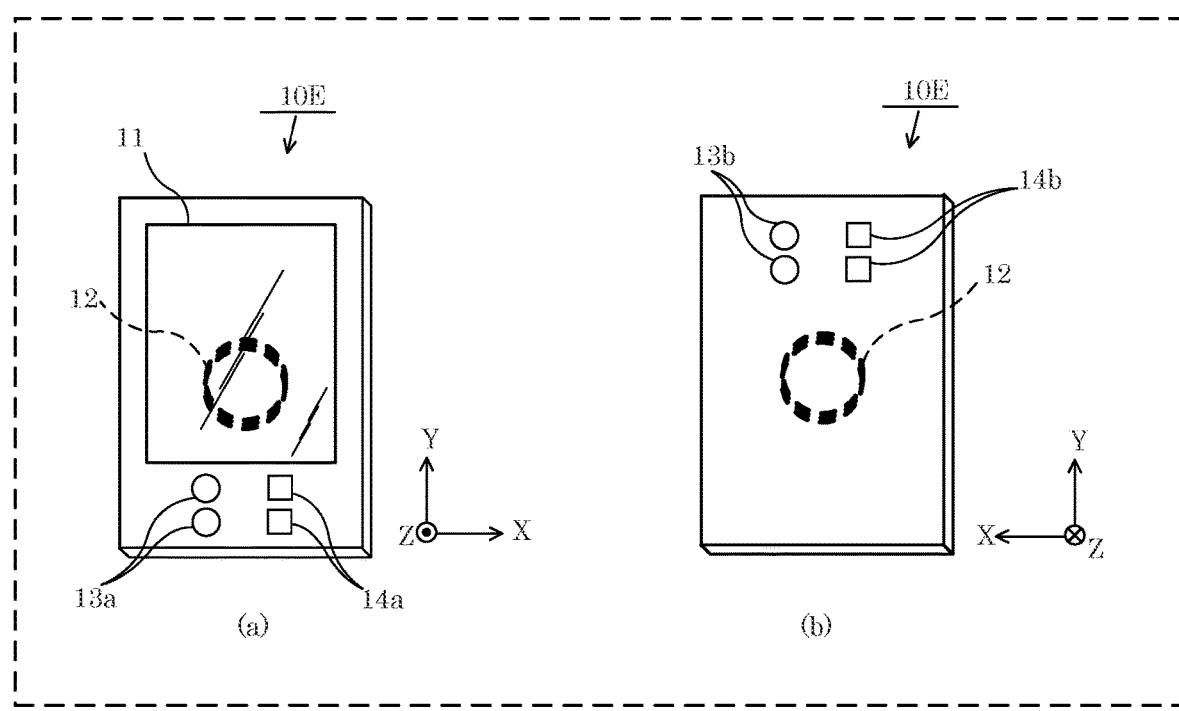
FIG. 105 illustrates one example of the front and back surfaces of another mobile terminal.

FIG. 105 illustrates one example of the front surface and the back surface of another mobile terminal according to the present embodiment. More specifically, (a) in FIG. 105 illustrates the front surface of the mobile terminal, and (b) in FIG. 105 illustrates the back surface of the mobile terminal.

Like mobile terminal 10D, mobile terminal 10E is configured as a communication device such as a mobile phone or a smartphone, and includes two light emitters 13a, two light emitters 13b, two light receivers 14a, and two light receivers 14b. On the front surface of mobile terminal 10E, the two light emitters 13a are disposed on the left side, and the two light receivers 14a are disposed on the right side. Like the front surface, on the back surface of mobile terminal 10E as well, the two light emitters 13b are disposed on the left side, and the two light receivers 14b are disposed on the right side.

However, unlike the front surface of mobile terminal 10D, on the front surface of mobile terminal 10E, the two light emitters 13a are aligned in a direction parallel to the Y axis, and the two light receivers 14a are also aligned in a direction parallel to the Y axis. Similarly, unlike the back surface of mobile terminal 1011, on the back surface of mobile terminal 10E, the two light emitters 13b are aligned in a direction parallel to the Y axis, and the two light receivers 14b are also aligned in a direction parallel to the Y axis.

Even with such a mobile terminal 10E, as described above, on each of the front and back surfaces, since all light emitters 13a or 13b are disposed on the left side, and cell light receivers 14a and 14b are disposed on the right side, just like with mobile terminal 10B, visible light communication can be relayed.

Moreover, with such a mobile terminal 10E, just like with mobile terminal 10D, two modulated optical signals can be transmitted in parallel using the two light emitters 13a or the two light emitters 13b. Moreover, with mobile terminal 10E, two modulated optical signals can be received in parallel using the two light receivers 14a or the two light receivers 14b. Accordingly, mobile terminal 10E both has the characterizing features of mobile terminal 10B and can transmit visible light communication signals in parallel, just like mobile terminal 10D.

As illustrated in FIG. 104 and FIG. 105, mobile terminal 101) or 10E according to the present embodiment is a communication device that communicates using visible light. The communication device includes a plurality of first light emitters and a plurality of first light receivers. Each of the plurality of first light emitters is disposed along a first surface of the communication device and transmits a visible light signal, and each of the plurality of first light receivers is disposed along the first surface and receives a visible light signal. The plurality of first light emitters are disposed on a first side of all of the plurality of first light receivers, and the plurality of first light receivers are disposed on a second side of all of the plurality of first light emitters, the first side and the second side being in opposite directions along a first axis.

For example, the first surface is the back surface, and the plurality of first light emitters and the plurality of first light receivers are the two light emitters 13b and the two light receivers 14b, respectively. As illustrated in FIG. 104 and FIG. 105, along the horizontal axis, the two light emitters 13b are disposed on the left side of all of the two light receivers 14b. Moreover, along the horizontal axis, the two light receivers 14b are disposed on the right side of all of the two light emitters 13b.

With this, since a plurality of light emitters and a plurality of light receivers are disposed on one surface of the communication device according to the present embodiment, it is possible to transmit visible light communication signals in parallel. As a result, it is possible to improve communication speeds. Moreover, in the present embodiment, the plurality of light emitters are disposed on a first side, and the plurality of light receivers are disposed on a second side, the first side and the second side being in opposite directions along a first axis. Accordingly, if two communication devices are arranged so that a surface of one communication device faces the same surface of the other communication device, it is easy to respectively align the plurality of the light emitters and the plurality of the light receivers on the two communication devices. As a result, visible light communication signals can be transmitted in parallel between the two communication devices.

Note that the first surface may be the front surface or a side surface instead of the back surface. Also note that the first axis is not limited to the horizontal axis; the first axis may extend in any direction that is in the same plane as the first surface.

Moreover, as illustrated in FIG. 104 and FIG. 105, the communication device according to the present embodiment further includes a plurality of second light emitters and a plurality of second light receivers. Each of the plurality of second light emitters is disposed along a second surface of the communication device and transmits a visible light signal, and each of the plurality of second light receivers is disposed along the second surface and receives a visible light signal. In a view of each of the first surface and the second surface when the communication device is rotated around a second axis perpendicular to the first axis, the relative positional relationship between the plurality of first light emitters and the plurality of first light receivers on the first surface is the same as the relative positional relationship between the plurality of second light emitters and the plurality of second light receivers on the second surface.

For example, the second surface is the front surface, and the plurality of second light emitters and the plurality of second light receivers are the two light emitters 13a and the two light receivers 14a, respectively. As illustrated in FIG. 104 and FIG. 105, in a view of the back surface, along the horizontal axis, the two light emitters 13a are disposed on the left side of all of the two light receivers 14a. Moreover, along the horizontal axis, the two light receivers 14a are disposed on the right side of all of the two light emitters 13a. In other words, in a view of each of the back surface and the front surface, the relative positional relationship between the two light emitters 13b and the two light receivers 14b on the back surface is the same as the relative positional relationship between the two light emitters 13a and the two light receivers 14a on the front surface. Note that "in a view of each of the back surface and the front surface" refers to a view of each of the back surface and the front surface when the communication device is rotated around an axis (for example, the Y axis) perpendicular to the horizontal axis. In other words, such a view excludes cases in which the back and front surfaces are viewed when the communication device is rotated so as to flip vertically, that is to say, rotated around the horizontal axis (for example, the X axis).

In this way, with the communication device according to the present embodiment, the plurality of light emitters and the plurality of light receivers have the same relative positional relationship on the first surface and the second surface. Accordingly, when the first surface of a first communication device is arranged to face a second communication device and the second surface of the first communication device is arranged to face a third communication device, the plurality of light emitters and plurality of light receivers on the first surface of the first communication device can be easily, aligned with the plurality of light receivers and the plurality of light emitters on the second communication device, respectively, and the plurality of light emitters and plurality of light receivers on the second surface of the first communication device can be easily aligned with the plurality of light receivers and the plurality of light emitters on the third communication device, respectively. With this, visible light communication can be relayed between the two other communication devices.

Note that the relative positional relationship between the plurality of light emitters and the plurality of light receivers may refer to distances between each of the plurality of light emitters and each of the plurality of light receivers, and, alternatively, may refer coordinates of each of the light emitters and each of the light receivers in a coordinate system in which one light emitter or light receiver is set as a reference point. Moreover, the number of light emitters and the number of light receivers disposed on each of the first surface and the second surface is not limited to two; the number may be three or more.

Moreover, as illustrated in FIG. 104 with the communication device according to the present embodiment, the plurality of first light emitters are aligned in a direction parallel to the above-described first axis, and the plurality of second light emitters are also aligned. In a direction parallel to the first axis. Similarly, the plurality of first light receivers are also aligned in a direction parallel to the first axis, and the plurality of second light receivers are also aligned in a direction parallel to the first axis.

For example, the first axis is the horizontal axis or the X axis. With this, visible light communication signals can be transmitted in parallel and relayed adequately.

Alternatively, as illustrated in FIG. 105, with the communication device according to the present embodiment, the plurality of first light emitters are aligned in a direction parallel to the above-described second axis, and the plurality of second light emitters are also aligned in a direction parallel to the second axis. Similarly, the plurality of first light receivers are also aligned in a direction parallel to the second axis, and the plurality of second light receivers are also aligned in a direction parallel to the second axis.

For example, the second axis is the vertical axis or the Y axis. With this, visible light communication signals can be transmitted in parallel and relayed adequately.

As described above, in the present embodiment, it possible to facilitate an improvement in performance of the communication device and support for new forms of services.

<Communication System for Video Data>

Figure 106:
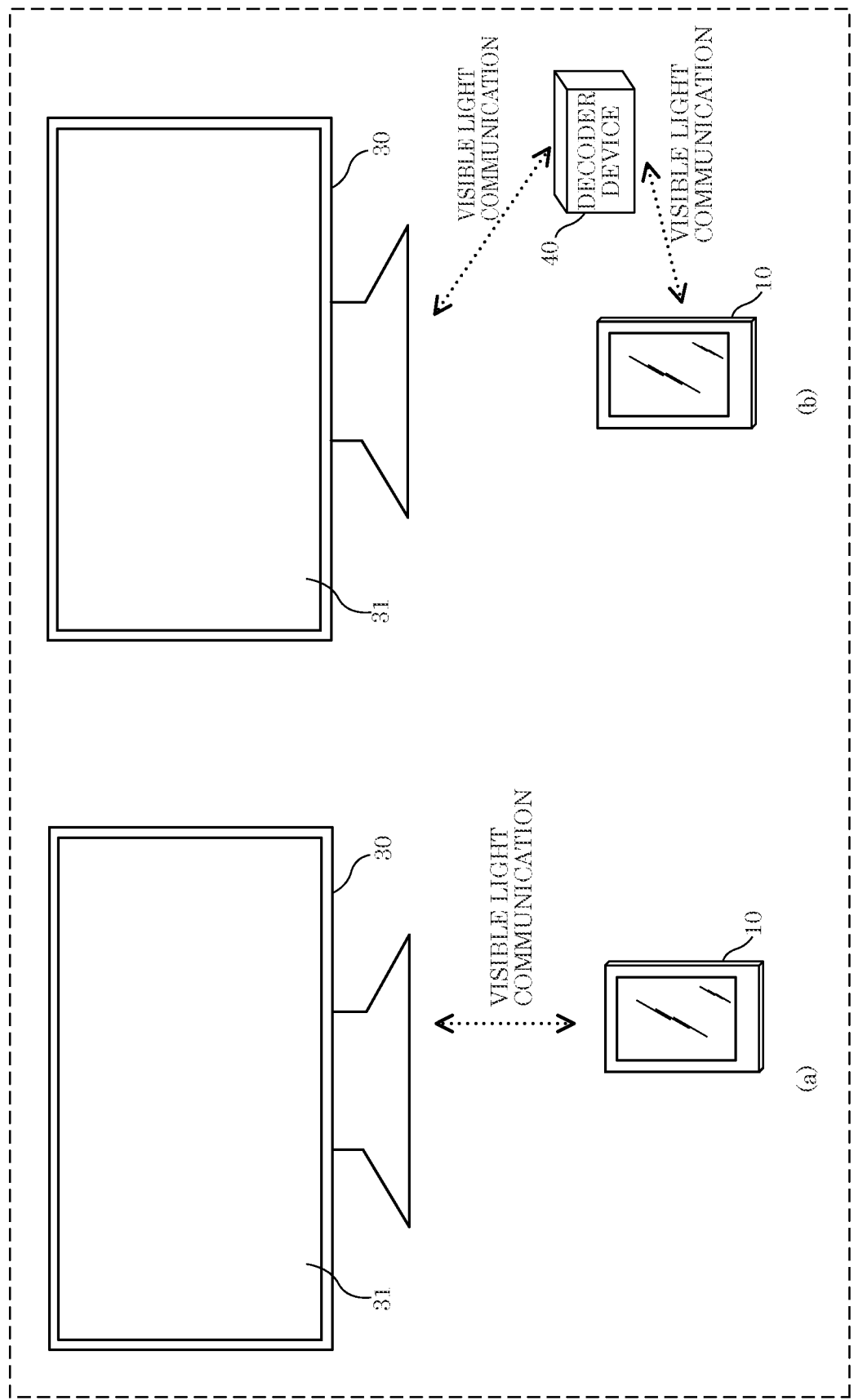
FIG. 106 illustrates one example of a communication system that transmits video data using visible light communication.

FIG. 106 illustrates one example of a communication system that transmits video data using visible light communication. Note that the video data according to the present embodiment is data indicating an image such as a video or still picture.

This communication system includes at least a mobile terminal that stores compression coded video data, that is to say, video data that has been compression coded, and a display device that displays an image corresponding to the video data. Here, the communication system comes in three types. With the first type, the mobile terminal decodes the video data. With the second type, the display device decodes the video data. With the third type, the communication system further includes a decoder device, and the decoder device decodes the video data.

Specifically, with the first and second types, the communication system includes mobile terminal 10 and display device 30, as illustrated in (a) in FIG. 106. Mobile terminal 10 may be any one of the above-described mobile terminals 10A through 10E. Display device 30 includes display 31 and performs visible light communication with mobile terminal 10.

With the first type, mobile terminal 10 decodes the compression coded video data, and transmits, via visible light communication to display device 30, the decoded video data, that is to say, the uncompressed video data (or video data for displaying on the display). In other words, the uncompressed video data is transmitted to display device 30 as a modulated optical signal. Upon receiving the uncompressed video data via visible light communication, display device 30 displays an image corresponding to the video data on display 31.

With the second type, mobile terminal 10 transmits video data to display device 30 video visible light communication, without decoding the compression coded video data. In other words, the compression coded video data is transmitted to display device 30 as a modulated optical signal. Upon receiving the video data via visible light communication, display device 30 decodes the video data and displays an image corresponding to the decoded video data on display 31.

With the third type, the communication system includes mobile terminal 10, display device 30, and decoder device 40, as illustrated in (b) in FIG. 106. Mobile terminal 10 transmits compression coded video data to decoder device 40 via visible light communication. In other words, the compression coded video data is transmitted to decoder device 40 from mobile terminal 10 as a modulated optical signal. Decoder device 40 receives the video data via visible light communication. Decoder device 40 then decodes the video data and transmits the decoded video data, that is to say, the uncompressed video data to display device 30 via visible light communication. In other words, the uncompressed video data is transmitted to display device 30 as a modulated optical signal from decoder device 40. Upon receiving the uncompressed video data via visible light communication, display device 30 displays an image corresponding to the uncompressed video data on display 31.

Figure 107:
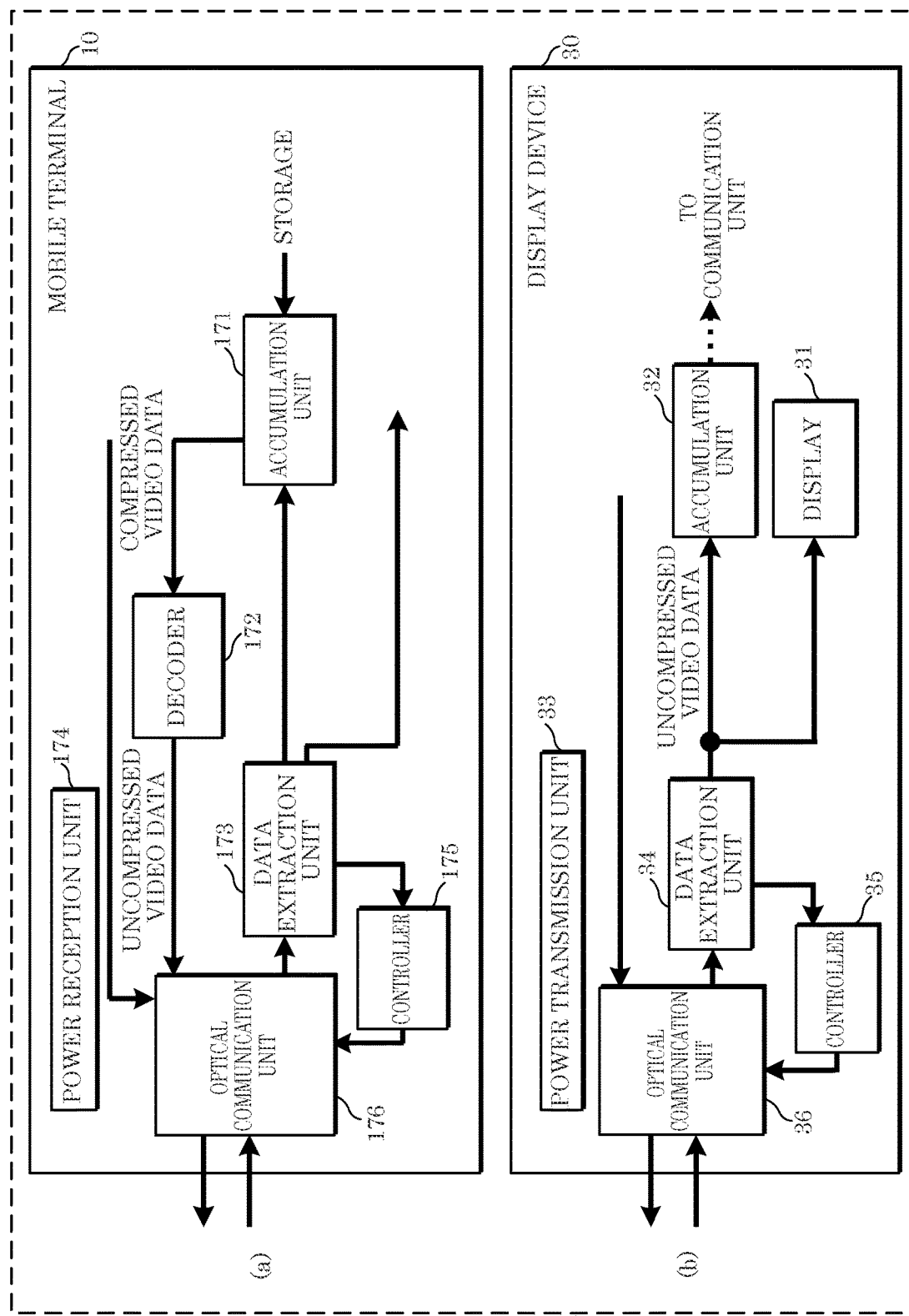
FIG. 107 illustrates one example of configurations of a mobile terminal and a display device in a first type of communication system.

FIG. 107 illustrates one example of configurations of mobile terminal 10 and display device 30 in the first type of communication system.

With the first type, as described above, mobile terminal 10 decodes compression coded video data. Accordingly, mobile terminal 10 includes decoder 172, as illustrated in (a) in FIG. 107. In addition to decoder 172, mobile terminal 10 also includes accumulation unit 171, data extraction unit 173, power reception unit 174, controller 175, and optical communication unit 176.

Power reception unit 174 is the above-described power reception coil 12, and receives radio waves transmitted from display device 30 and supplies power in accordance with the radio waves to a battery included in mobile terminal 10. This charges the battery. Note that in the present embodiment, mobile terminal 10 includes power reception unit 174, but mobile terminal 10 need not include power reception unit 174.

Accumulation unit 171 stores compression coded video data (i.e., compressed video data) output from a storage or data extraction unit 173 included in mobile terminal 10.

Decoder 172 reads out video data accumulated in accumulation unit 171, and decodes the video data. Decoder 172 then outputs uncompressed video data, which is the decoded video data, to optical communication unit 176.

Optical communication unit 176 transmits and receives modulated optical signals in accordance with a control signal output from controller 175. In other words, optical communication unit 176 includes at least one of the above-described light emitters 13, 13a, and 13b, and at least one of the above-described light receivers 14, 14a, and 14b. Such an optical communication unit 176 generates a modulated optical signal by modulating the uncompressed video data output from decoder 172 and control data output from another element included in mobile terminal 10, and transmits the generated modulated optical signal to display device 30. In other words, the uncompressed video data and the control data are transmitted from optical communication unit 176 to display device 30 via visible light communication.

Moreover, optical communication unit 176 receives the modulated optical signal transmitted from display device 30, and generates video data and control data by demodulating the modulated optical signal. In other words, the video data and the control data transmitted via visible light communication from display device 30 are received by optical communication unit 176. Optical communication unit 176 then outputs the received video data and control data to data extraction unit 173.

Data extraction unit 173 obtains the video data and the control data output from optical communication unit 176, extracts the video data from the obtained data, and outputs the video data to accumulation unit 171. Moreover, data extraction unit 173 extracts the control data from the obtained data, and outputs the control data to controller 175. Data extraction unit 173 may output the control data to another element included in mobile terminal 10.

Upon obtaining the control data output from data extraction unit 173, controller 175 generates a control signal for controlling optical communication unit 176 according to the control data, and outputs the control signal to optical communication unit 176.

The first type of display device 30 includes display 31, accumulation unit 32, power transmission unit 33, data extraction unit 34, controller 35, and optical communication unit 36, as illustrated in (b) in FIG. 107.

Power transmission unit 33 is the above-described power transmission coil 25, and wirelessly supplies power to mobile terminal 10 by transmitting radio waves to mobile terminal 10. Note that in the present embodiment, display device 30 includes power transmission unit 33, but display device 30 need not include power transmission unit 33.

Accumulation unit 32 accumulates the uncompressed video data output from data extraction unit 34.

Optical communication unit 36 transmits and receives modulated optical signals in accordance with a control signal output from controller 35. In other words, optical communication unit 36 includes a light emitter that transmits a modulated optical signal and a light receiver that receives the modulated optical signal. Such an optical communication unit 36 generates a modulated optical signal by modulating the control data output from another element included in display device 30, and transmits the generated modulated optical signal to mobile terminal 10. In other words, the control data is transmitted from optical communication unit 36 to mobile terminal 10 via visible light communication.

Moreover, optical communication unit 36 receives the modulated optical signal transmitted from mobile terminal 10, and generates video data and control data by demodulating the modulated optical signal. In other words, the video data and the control data transmitted via visible light communication from mobile terminal 10 are received by optical communication unit 36. Optical communication unit 36 then outputs the received video data and control data to data extraction unit 34. Note that the video data is the uncompressed video data decoded by decoder 172 included in mobile terminal 10.

Data extraction unit 34 obtains the video data and the control data output from optical communication unit 36, extracts the video data from the obtained data, and outputs the video data to accumulation unit 32 and display 31. Display 31 displays an image corresponding to the video data. The video data accumulated in accumulation unit 32 may be transmitted to a communication device such as a cloud server. Moreover, data extraction unit 34 extracts the control data from the obtained data, and outputs the control data to controller 35.

Upon obtaining the control data output from data extraction unit 34, controller 35 generates a control signal for controlling optical communication unit 36 according to the control data, and outputs the control signal to optical communication unit 36.

With this sort of first type of communication system, uncompressed video data is accumulated in accumulation unit 32 included in display device 30.

Figure 108:
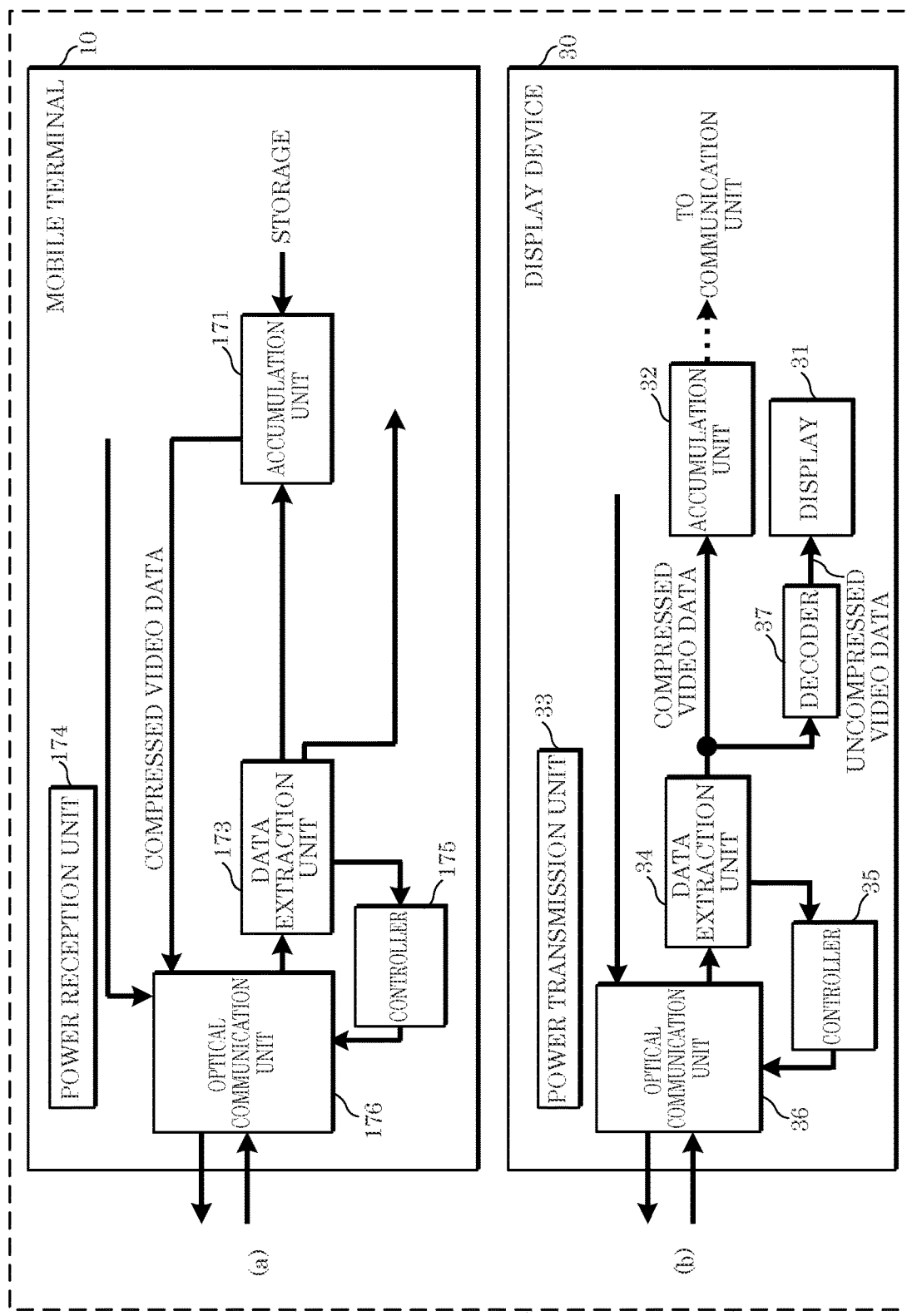
FIG. 108 illustrates one example of configurations of a mobile terminal and a display device in a second type of communication system.

FIG. 108 illustrates one example of configurations of mobile terminal 10 and display device 30 in the second type of communication system.

With the second type, as described above, mobile terminal 10 does not decode compression coded video data. Accordingly, as illustrated in (a) in FIG. 108, mobile terminal 10 does not include decoder 172, but includes accumulation unit 171, data extraction unit 173, power reception unit 174, controller 175, and optical communication unit 176.

Since mobile terminal 10 does not include decoder 172, optical communication unit 176 modulates compression coded video data stored in accumulation unit 171. In other words, optical communication unit 176 generates a modulated optical signal by modulating the compression coded video data and the control data output from another element included in mobile terminal 10, and transmits the generated modulated optical signal to display device 30. In other words, the second type differs from the first type in that the compression coded video data is transmitted from optical communication unit 176 to display device 30 via visible light communication.

As described above, the second type of display device 30 decodes the compression coded video data. Accordingly, as illustrated in (b) in FIG. 108, display device 30 includes the same elements as the first type, and further includes decoder 37.

Decoder 37 obtains compression coded video data that is output from data extraction unit 34, and decodes the video data. Decoder 172 then outputs uncompressed video data, which is the decoded video data, to display 31. Display 31 displays an image corresponding to the video data.

Accumulation unit 32 accumulates the compression coded video output from data extraction unit 34.

Accordingly, with the second type of communication system, compression coded video data is accumulated in accumulation unit 32 included in display device 30. As a result, accumulation unit 32 can store more video data or larger video data than the first type.

Figure 109:
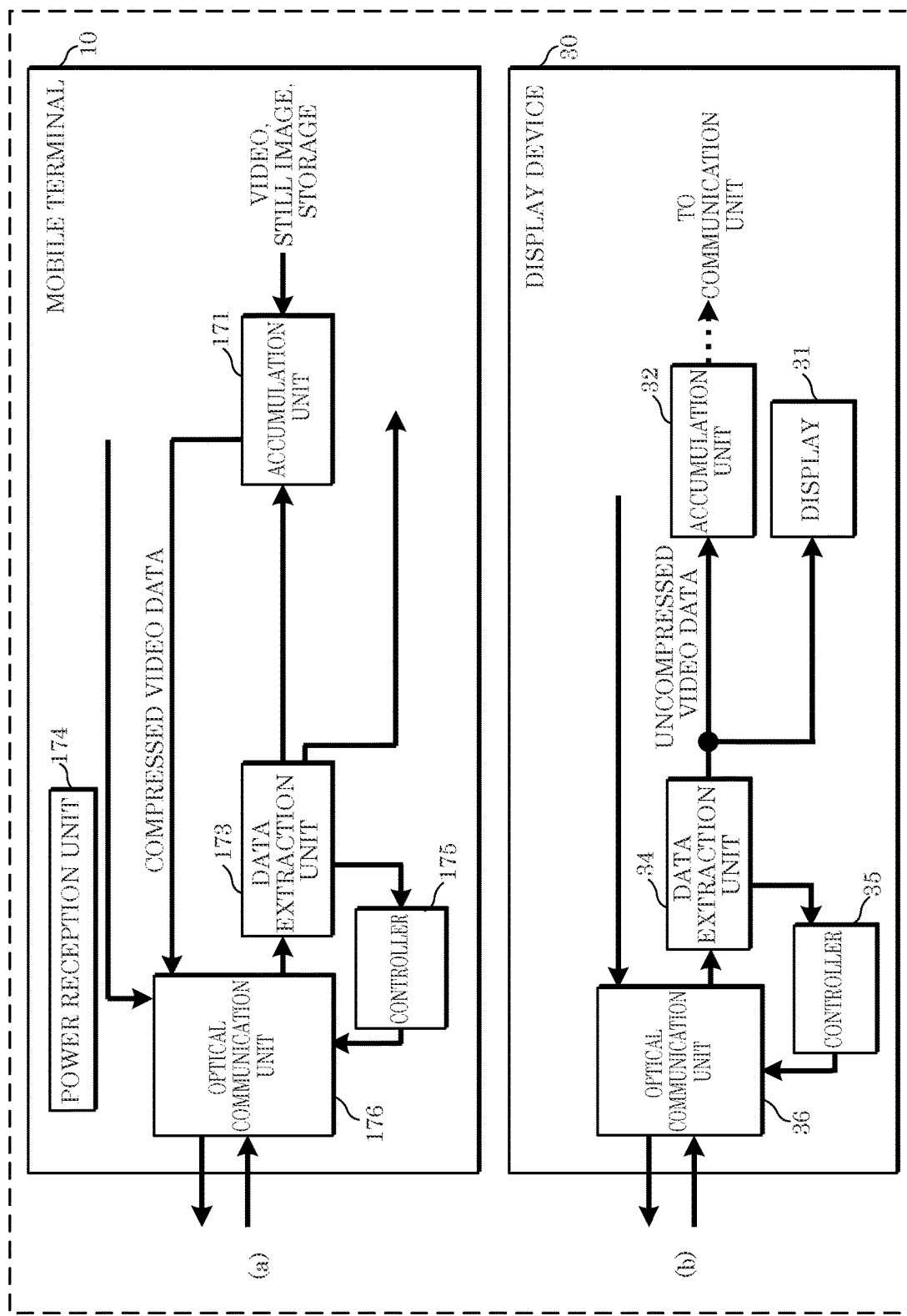
FIG. 109 illustrates one example of configurations of a mobile terminal and a display device in a third type of communication system.
Figure 110:
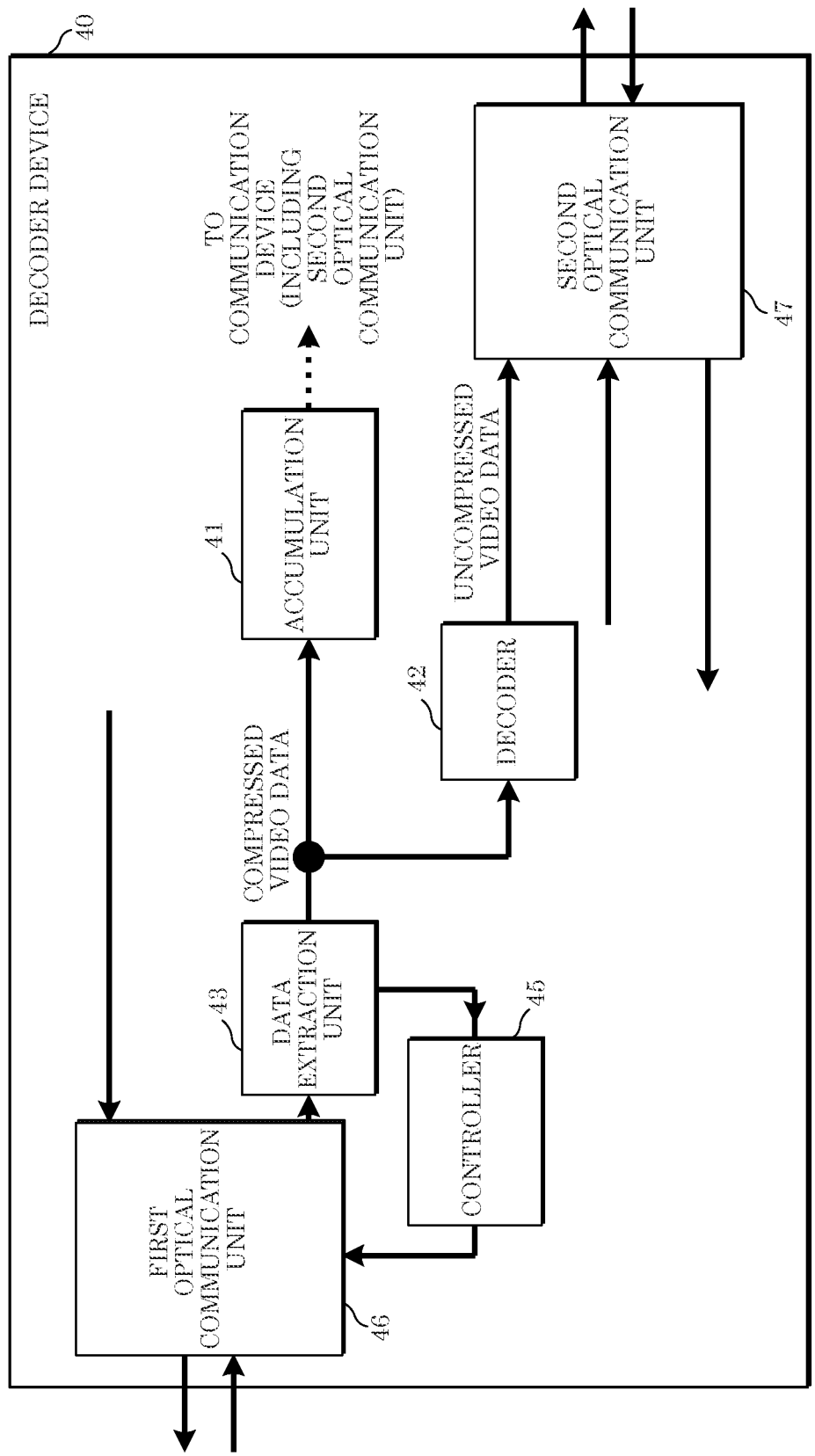
FIG. 110 illustrates an example of a configuration of a decoder device in the third type of communication system.

FIG. 109 illustrates one example of configurations of mobile terminal 10 and display device 30 in the third type of communication system. FIG. 110 illustrates an example of a configuration of decoder device 40 in the third type of communication system.

In the third type, as described above, decoder device 40 decodes the video data. Accordingly, as illustrated in (a) in FIG. 109, the third type of mobile terminal 10 does not include decoder 172 like that included in the first type. Moreover, as illustrated in (b) in FIG. 109, the third type of display device 30 does not include decoder 37 like that included in the second type. Moreover, with the third type, mobile terminal 10 does not include power reception unit 174, and display device 30 does not include power transmission unit 33. However, the configuration illustrated in FIG. 109 is merely one example; mobile terminal 10 may include power reception unit 174, and display device 30 may include power transmission unit 33.

Optical communication unit 176 included in mobile terminal 10 transmits compression coded video data to decoder device 40. Upon receiving the compression coded video data, decoder device 40 decodes the compression coded video data and transmits the decoded video data, which is uncompressed video data, to display device 30. Accordingly, optical communication unit 36 included in display device 30 receives the uncompressed video data from decoder device 40, and the uncompressed video data is accumulated in accumulation unit 32 included in display device 30.

As illustrated in FIG. 110, decoder device 40 includes accumulation unit 41, decoder 42, data extraction unit 43, controller 45, first optical communication unit 46, and second optical communication unit 47.

First optical communication unit 46 transmits and receives modulated optical signals in accordance with a control signal output from controller 45 in other words, first optical communication unit 46 includes a light emitter that transmits a modulated optical signal and a light receiver that receives the modulated optical signal. Such a first optical communication unit 46 generates a modulated optical signal by modulating the control data output from another element included in decoder device 40, and transmits the generated modulated optical signal to mobile terminal 10. In other words, the control data is transmitted from first optical communication unit 46 to mobile terminal 10 via visible light communication.

Moreover, first optical communication unit 46 receives the modulated optical signal transmitted from mobile terminal 10, and generates video data and control data by demodulating the modulated optical signal. In other words, the video data and the control data transmitted via visible light communication from mobile terminal 10 are received by first optical communication unit 46. First optical communication unit 46 then outputs the received video data and control data to data extraction unit 34. Note that the video data is compression coded video data.

Data extraction unit 43 obtains the video data and the control data output from first optical communication unit 46, extracts the video data from the obtained data, and outputs the video data to accumulation unit 41 and decoder 42. Moreover, data extraction unit 43 extracts the control data from the obtained data, and outputs the control data to controller 45.

Accumulation unit 41 accumulates the video data extracted and output by data extraction unit 43, that is to say, the compression coded video data. The video data accumulated in accumulation unit 41 may be transmitted to a communication device such as a cloud server. Moreover, the video data accumulated in accumulation unit 41 may be output to second optical communication unit 47.

Upon obtaining the control data output from data extraction unit 34, controller 45 generates a control signal for controlling first optical communication unit 46 according to the control data, and outputs the control signal to first optical communication unit 46.

Decoder 42 decodes the video data extracted and output by data extraction unit 43, that is to say, the compression coded video data. Decoder 42 then outputs uncompressed video data, which is the decoded video data, to second optical communication unit 47.

Second optical communication unit 47 transmits and receives modulated optical signals, just like first optical communication unit 46 does. In other words, second optical communication unit 47 includes a light emitter that transmits a modulated optical signal and a light receiver that receives the modulated optical signal. Such a second optical communication unit 47 generates a modulated optical signal by modulating the control data output from another element included in decoder device 40 and the uncompressed video data output from decoder 42, and transmits the generated modulated optical signal to display device 30. In other words, the control data and the uncompressed video data are transmitted from second optical communication unit 47 to display device 30 via visible light communication.

Moreover, second optical communication unit 47 receives the modulated optical signal transmitted from display device 30, and demodulates the modulated optical signal. Second optical communication unit 47 then outputs the data obtained as a result of the demodulation to another element included in decoder device 40.

Accordingly, with the third type of communication system, compression coded video data is accumulated in accumulation unit 41 included in decoder device 40. As a result, accumulation unit 41 can store more video data or larger video data than the first type. Note that accumulation unit 32 included in display device 30 or accumulation unit 41 included in decoder device 40 are non-essential elements, <Visible Light Communication Relaying>

Figure 111:
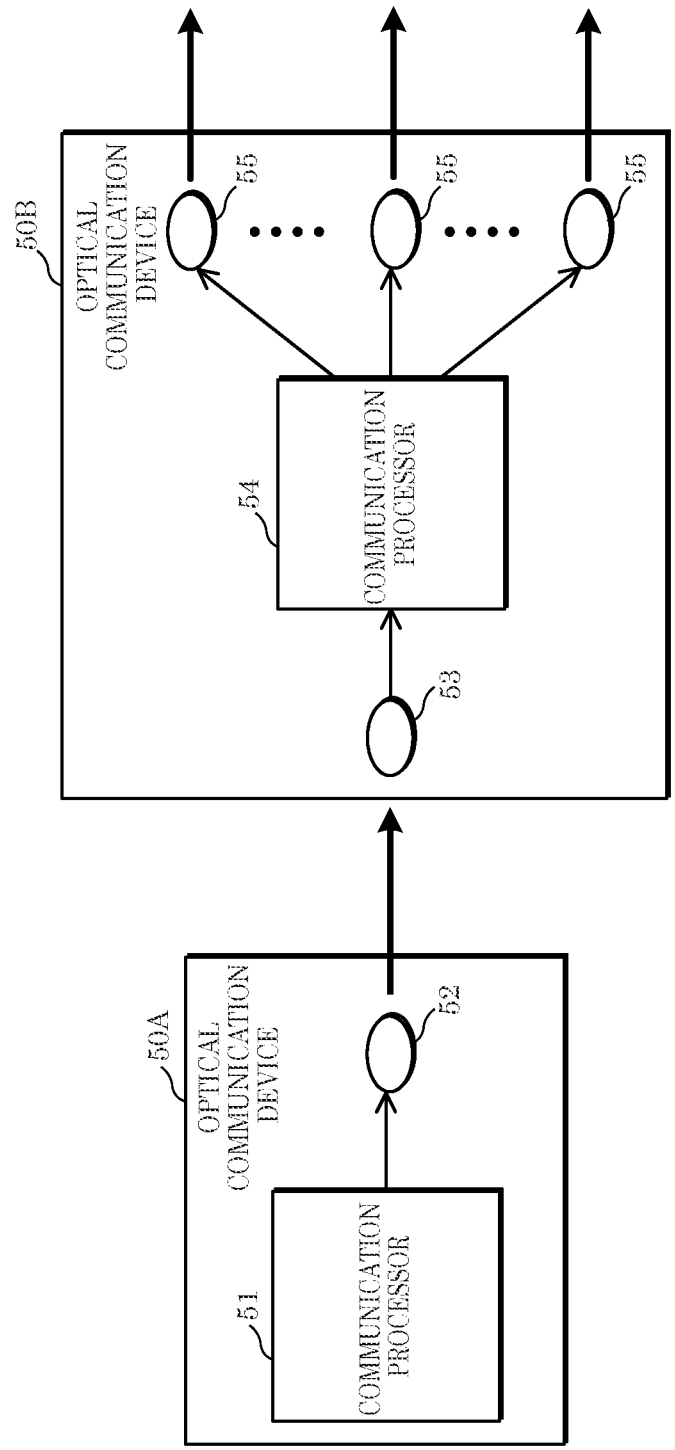
FIG. 111 illustrates one example of the relaying of visible light communication.

FIG. 111 illustrates one example of the relaying of visible light communication.

For example, when optical communication device 50A transmits a modulated optical signal to a communication partner device, optical communication device 50B relays the transmission of that modulated optical signal.

Optical communication device 50A includes communication processor 51 and light emitter 52. Light emitter 52 is a light source such as a light emitting diode (LED, or an organic EL light source. Communication processor 51 causes a modulated optical signal to be transmitted from light emitter 52 by changing the luminance of the light emitted by light emitter 52.

Optical communication device 50B includes light receiver 53, communication processor 54, and a plurality of light emitters 55. Light receiver 53 is an element such as an image sensor or photodiode, and receives a modulated optical signal transmitted from light emitter 52 included in optical communication device 50A and outputs a signal indicated by the modulated optical signal to communication processor 54. Communication processor 54 causes a modulated optical signal to be transmitted from each of the plurality of light emitters 55 by changing the luminance of the light emitted by the plurality of light emitters 55 in accordance with the signal. In this way, optical communication device 50B relays the transmission of a modulated optical signal from optical communication device 50A to a communication partner device.

Here, in the relaying of the modulated optical signal, the frame of the transmission signal may include a region for transmitting destination information, and either groupcast or multicast may be specified as the destination information. Moreover, in the above example, optical communication device 50B is exemplified as transmitting a modulated optical signal from each of the plurality of light emitters 55, but a modulated optical signal may be transmitted from a single light emitter 55. Moreover, in the relaying of the modulated optical signal, the number of hops may be specified. For example, the frame of the modulated optical signal may include a region for transmitting the number of hops. In such cases, optical communication device 50B may increment the number of hops, and when the number of hops reaches the upper limit, may stop the relaying. Moreover, the frame of the modulated optical signal that is transmitted may include information indicating the upper limit of the number of hops. Accordingly, optical communication device 50B transmits a transmission frame including information indicating destination information, a number of hops, and the upper limit for the number of hops.

Moreover, optical communication device 50B may continuously or regularly transmit the modulated optical signal a plurality of times rather than transmitting the modulated optical signal a single time. Furthermore, optical communication device 50B may transmit the same modulated optical signal as the modulated optical signal transmitted by optical communication device 50A, may further append additional data to the data indicated by the modulated optical signal transmitted by optical communication device 50A, and then transmit a modulated optical signal indicating that data.

<Amount of Light Output by Light Source>

When performing close-proximity communication via visible light, it is necessary to decrease the brightness of the light source more so than when performing communication other than close-proximity communication. Next, a method for adjusting the light source will be described.

Assume the first communication device includes a charger for wireless charging. Then, a communication partner is communicated with and power is wirelessly transmitted. Here, when the first communication device detects that wireless charging is being performed, the first communication device sets the amount of light to be emitted by the communication device when emitting the modulated optical signal to an amount of light appropriate for close-proximity communication (which is less light than when close-proximity communication is not being performed). With this, the communication partner of the first communication device can receive the modulated signal without being saturated upon receiving the modulated optical signal, which makes it possible to achieve the advantageous effect that a high data reception quality can be achieved.

Note that the method used to adjust the amount of light emitted by the first communication device may be one that increases and decreases the amount of light itself, and may be one that regularly changes the amount of light over time in order to either increase the amount of light or decrease the amount of light, in order to regulate the amount of light.

<Vehicle Digital Signage>

Figure 112:
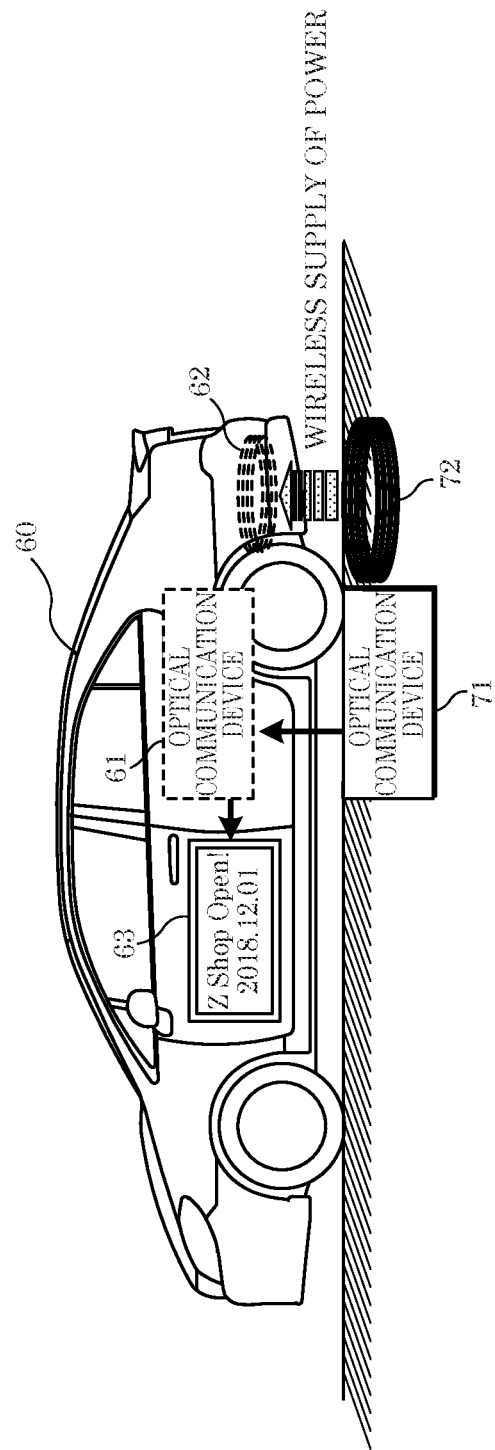
FIG. 112 illustrates one example of a vehicle fitted with digital signage.

FIG. 112 illustrates one example of a vehicle fitted with digital signage. Vehicle 60 includes optical communication device (or wireless communication device that uses, e.g., radio waves) 61, power reception coil 62, and display 63. Moreover, optical communication device (or wireless communication device that uses, e.g., radio waves) 71 and power transmission coil 72 are disposed on the ground of the parking lot. When vehicle 60 parks in the parking lot, vehicle 60 receives a wireless supply of power from power transmission coil 72 as a result of receiving, via power reception coil 62, radio waves transmitted from power transmission coil 72.

While vehicle 60 is wirelessly receiving the supply of power, optical communication device (or wireless communication device that uses, e.g., radio waves) 71 that is in the parking lot performs error correction coding and mapping in order to generate a modulated optical signal (or modulated signal) for transmitting video (and audio) data indicating, for example, an advertisement for a store, and transmits the modulated optical signal (or modulated signal) to optical communication device 61 (or wireless communication device that uses, e.g., radio waves) included in vehicle 60. Note that optical communication device 71 (or wireless communication device that uses, e.g., radio waves) may communicate with an external device such as a cloud server and obtain video (and audio) data from the external device.

Optical communication device (or wireless communication device that uses, e.g., radio waves) 61 included in vehicle 60 receives the modulated optical signal (or modulated signal) transmitted from optical communication device (or wireless communication device that uses, e.g., radio waves) 71 that is in the parking lot, and demodulates that modulated optical signal (or modulated signal). Then, optical communication device (or wireless communication device that uses, e.g., radio waves) 61 outputs the video data (and audio) obtained as a result of the demodulation to display 63 (and to a speaker), to display, on display 63 (and output sound from the speaker), a video or still image of, for example, an advertisement for a store that is indicated in the video data (and audio). With this, display 63 (and the speaker) can be used as digital signage. Note that in FIG. 112, vehicle 60 is not depicted as including a speaker, but vehicle 60 may include a speaker.

For example, the above-described vehicle 60 and parking lot may be used as the vehicle sharing system described in Embodiment 14. Vehicle 60 may be an electric automobile or electric two-wheeled vehicle, like vehicle 9001 in Embodiment 14. In such cases, each of the plurality of users that share vehicle 60 transports the signage along the driving route while driving vehicle 60. Accordingly, more people see the digital signage, achieving the advantageous effect of highly effective advertisement. Moreover, it is possible to reduce costs associated with securing a location to place the signage, and furthermore, costs associated with setting up electricity, protecting against dust, protecting against weather, etc., which are required when signage is used in such a location, can be reduced. For example, it is expensive to put up signage at a high-traffic train station or high-traffic facility, but when signage is put up on a shared vehicle 60, it is possible to greatly reduce costs.

Figure 113:
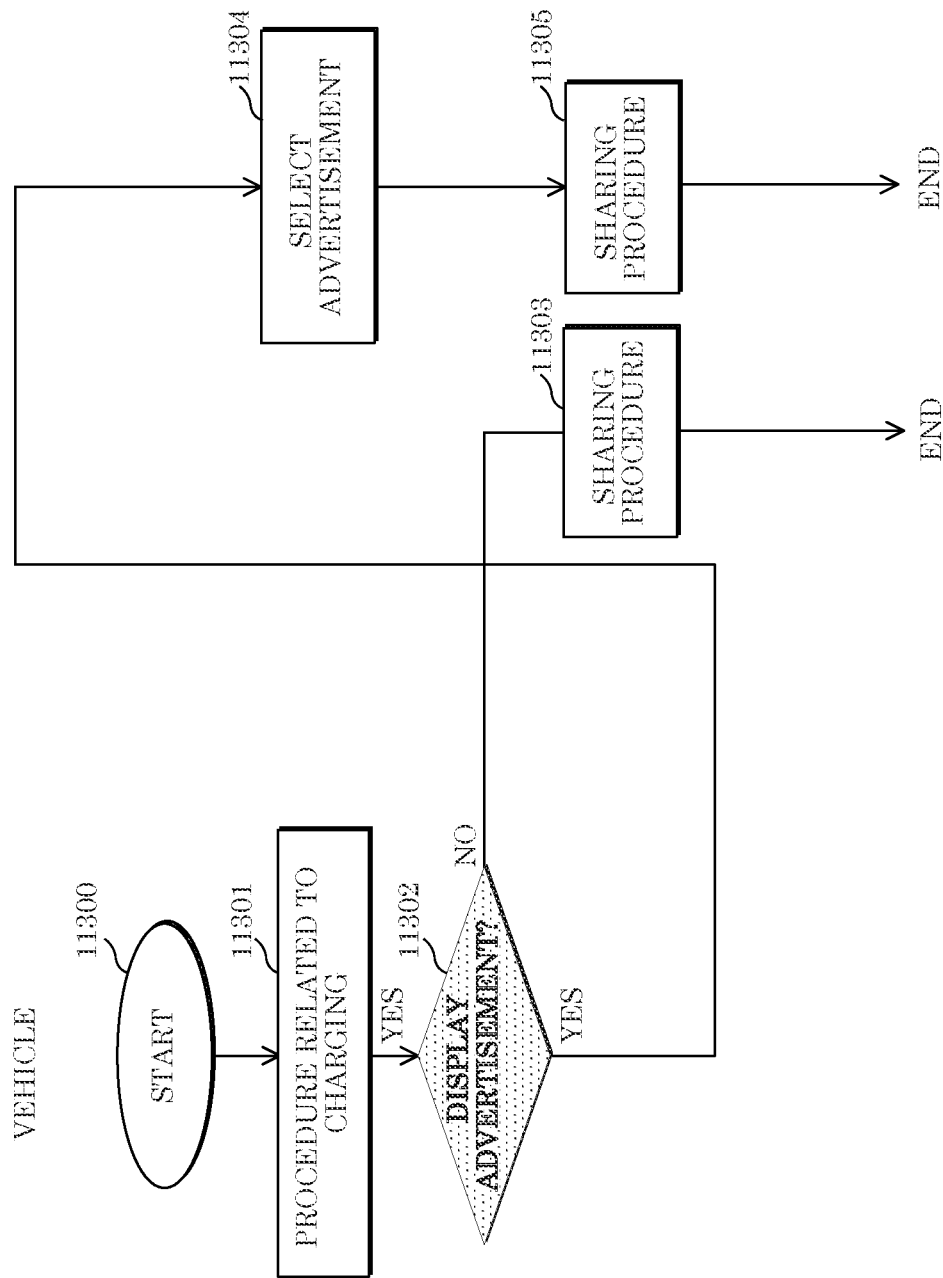
FIG. 113 relates to operations performed by a vehicle and a communication device included in the vehicle.

Next, operations related to vehicle 60 and devices (including the communication device) included in vehicle 60 will be described with reference to FIG. 113. As illustrated in FIG. 113, first, the vehicle and the devices included in the vehicle start the operation.

Next, vehicle 60 and the devices included in vehicle 60 perform a procedure related to charging 11301. Note that although "procedure related to charging 11301" is depicted in FIG. 113, this procedure need not be performed. Moreover, the procedure related to charging 11301 need not be performed first; this procedure may be performed at any stage. As the details regarding the procedure related to charging 11301 have already been described. In another embodiment, repeated description thereof will be omitted.

Vehicle 60 and the devices included in vehicle 60 determines whether to display an advertisement or not 11302 using display 63 included in vehicle 60 used in the sharing service.

When vehicle 60 and the devices included in vehicle 60 (the user riding in vehicle 60) selects NO in response to the determination, next, sharing procedure 11303 is performed, and the processing ends. Note that since the details regarding the sharing procedure have already been described in another embodiment, repeated description thereof will be omitted.

When vehicle 60 and the devices included in vehicle 60 (the user riding in vehicle 60) selects YES in response to the determination of whether to display an advertisement or not 11302, one or more or a plurality of items of data, for example, video or still image data (and audio data), related to an advertisement, are received from optical communication device (or wireless communication device that uses, e.g., radio waves) 71.

Then, vehicle 60 and the devices included in vehicle 60 (the user riding in vehicle 60) select an advertisement 11304. At this time, assume the user receives a discount on the fee for the sharing service (the vehicle rental fee). The user may receive a discount coupon, and when the bill for the sharing service fee is calculated, the discounted total may be presented to the user. Next, sharing procedure 11305 is performed, and the processing ends. Note that since the details regarding the sharing procedure have already been described in another embodiment, repeated description thereof will be omitted.

Note that, for example, optical communication device (or wireless communication device that uses, e.g., radio waves) 71 in the parking lot may communicate with an external device such as a (cloud) server and obtain candidate information on the advertisement data from the server. In such cases, the server stores one or a plurality of advertisements, and candidate information on the advertisements is obtained by vehicle 60 and the devices included in vehicle 60 via optical communication device (or wireless communication device that uses, e.g., radio waves) 71.

Then, based on this information, information on the selected advertisement data is transmitted, and vehicle 60 and the devices included in vehicle 60 obtain the information from the external device.

Moreover, the external device may include an interface (or communication device) for obtaining advertisement data from a device possessed by the user to which the advertisement is to be provided. At this time, the external device may receive, from the user, provision of information on the total amount of a discount for the sharing service fee.

Note that in the above example, the setting is exemplified as a parking lot, but the location in which optical communication device (or wireless communication device that uses, e.g., radio waves) 71 and coil (system) 72 for wireless power transmission are disposed is not limited to a parking lot. Moreover, the present embodiment can be implemented even without coil (system) 72 for wireless power transmission.

Variation of Embodiment 13

The following description is included in Embodiment 13: In the above example, the power transmission system can move the location of the power transmission antenna included in the power transmission system, but this example is not limiting; the location of the power transmission antenna included in the power transmission system may be fixed relative to the parking space. In such cases, the vehicle can autonomously move itself into a favorable location so as to move the power reception antenna into a favorable location, to achieve high charging efficiency. At this time, in order to change the location to a favorable location, the communication device included in the vehicle may transmit the power reception unit location information to the communication device included in the power transmission system. Moreover, the communication device included in the power transmission system may transmit the power transmission unit location information. Note that the power transmission unit location information may indicate where in the parking space the power transmission unit is located (for example, at the front or right-hand side of the parking space), and may include specific numerical values, such as, in cases where there is a white line in the parking space, information indicating "3 meters behind the white line, 2 meters from the right-hand side of the white line".

The above describes a case in which "the vehicle can autonomously move itself into a favorable location so as to move the power reception antenna into a favorable location, to achieve high charging efficiency", but here, a case in which "the vehicle can autonomously move itself into a favorable location so as to move a solar panel into a favorable location, to achieve high charging efficiency" will be described.

Figure 114:
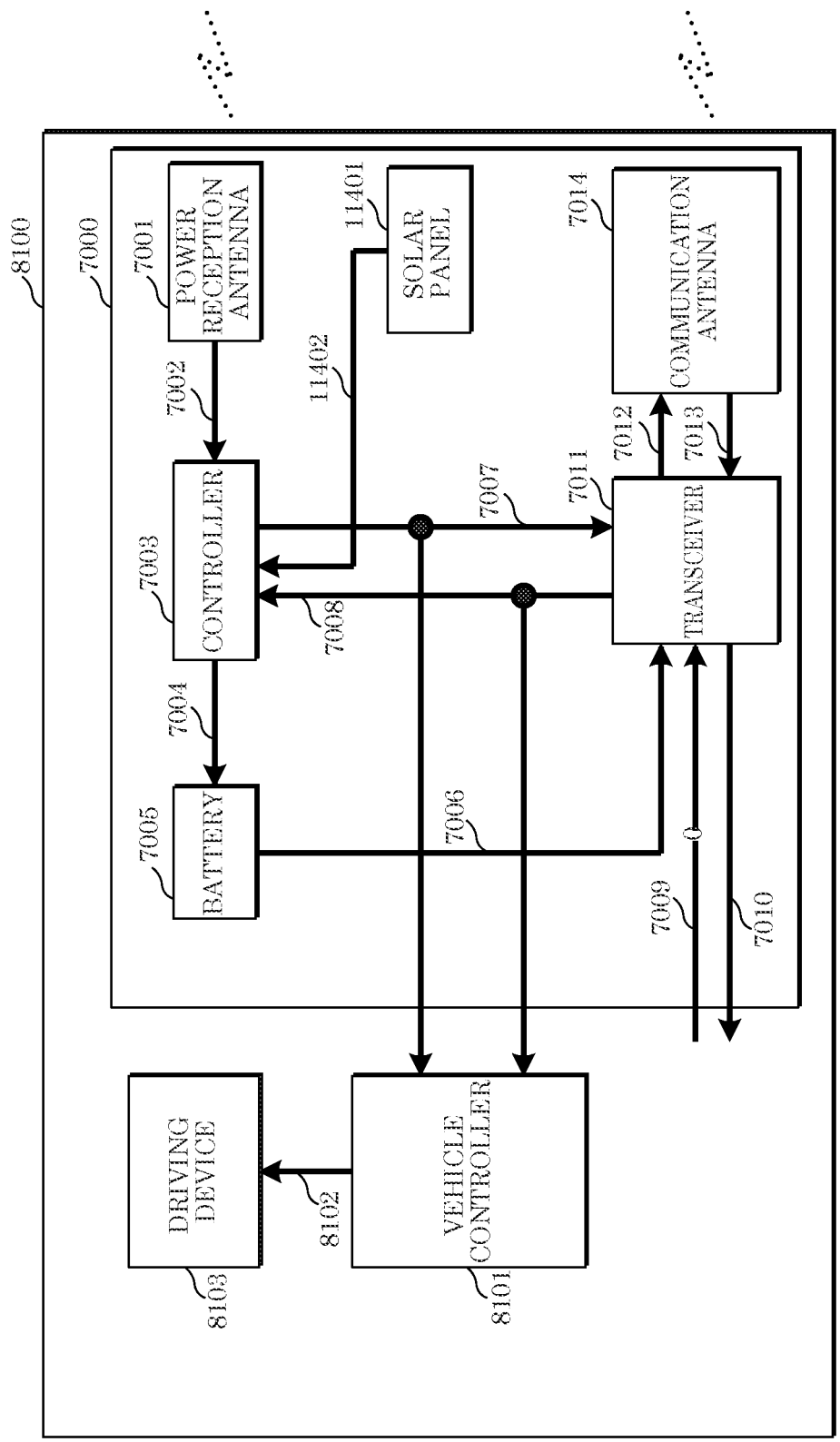
FIG. 114 illustrates an example of a configuration of a vehicle.

FIG. 114 illustrates one example of a configuration of vehicle 8100. In FIG. 114, elements which operate in the same manner as those in FIG. 81 are assigned the same reference numerals, and repeated description thereof is omitted. Vehicle 8100 illustrated in FIG. 114 differs from vehicle 8100 illustrated in FIG. 81 in that vehicle 8100 illustrated in FIG. 114 includes solar panel 11401.

Note that solar panel 11401 comes in two types, as described below; solar panel 11401 may be either one.

(A) Solar panel 11401 is equipped with a battery. In this case, when solar panel 11401 is irradiated with sunlight, the battery is charged. The battery serves as a source of power for devices in the vehicle.

(B) Solar panel 11401 is not equipped with a battery. In this case, when solar panel 11401 is irradiated with sunlight, battery 7005 illustrated in FIG. 114 is charged, and this battery serves as a source of power for devices in the vehicle.

Controller 7003 receives an input of solar panel output signal 11402. The controller outputs first control signal 7007 for moving the location of the vehicle to a favorable location, based on solar panel output signal 11402.

For example, here, a favorable location is a location at which the charging efficiency of solar panel 11401 is high, for example, a location at which sunlight efficiently irradiates solar panel 11401.

Then, based on first control signal 7007, vehicle controller 8101 moves and stops the vehicle at the favorable location. However, vehicle controller 8101 may take a combination of other elements into consideration to determine the location at which to move and stop the vehicle. Note that since operations for moving and stopping the vehicle have already been described in Embodiment 13, repeated description will be omitted.

Even when the vehicle illustrated in FIG. 114 does not include transceiver device 7011 and communication antenna 7014 and the like for performing communication, the above operations still can be carried out. In this way, the vehicle configuration illustrated in FIG. 114 is merely one non-limiting example.

Figure 115:
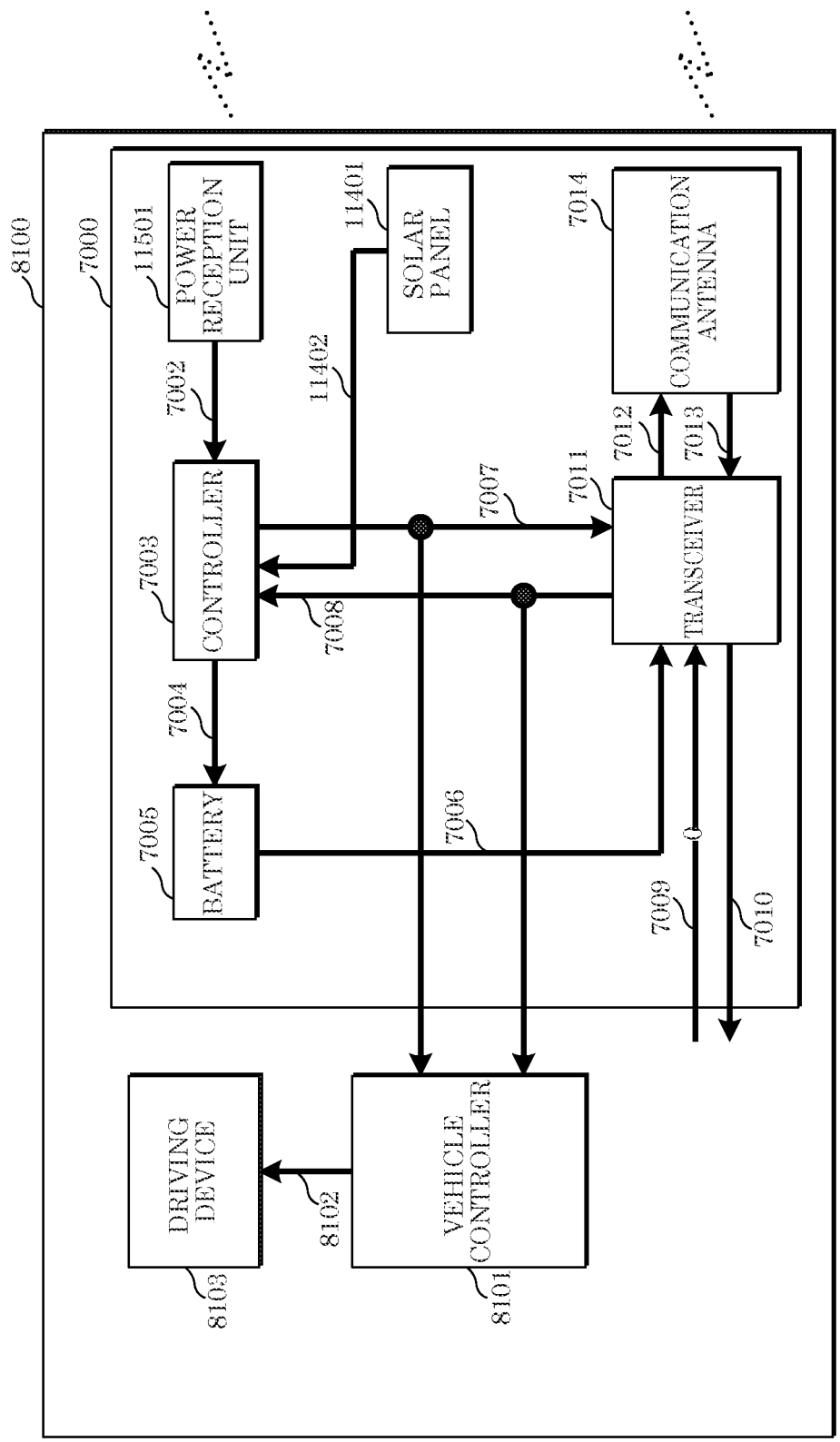
FIG. 115 illustrates an example of a configuration of a vehicle.

FIG. 115 illustrates one example of a configuration of vehicle 8100 that differs from the example illustrated in FIG. 114. In FIG. 115, elements which operate in the same manner as those in FIG. 81 and FIG. 114 are assigned the same reference numerals, and repeated description thereof is omitted. Vehicle 8100 illustrated in FIG. 115 differs from vehicle 8100 illustrated in FIG. 114 in that vehicle 8100 illustrated in FIG. 115 includes power reception unit 11501 in place of power reception antenna 7001. Power reception unit 11501 is, for example, an interface for charging battery 7005 over wire.

Note that since the operations performed by solar panel 11401, controller 7003, vehicle controller 8101 and the like are the same as described above, repeated description will be omitted.

Even when the vehicle illustrated in FIG. 115 does not include transceiver device 7011 and communication antenna 7014 and the like for performing communication, the above operations still can be carried out. In this way, the vehicle configuration illustrated in FIG. 115 is merely one non-limiting example.

Figure 116:
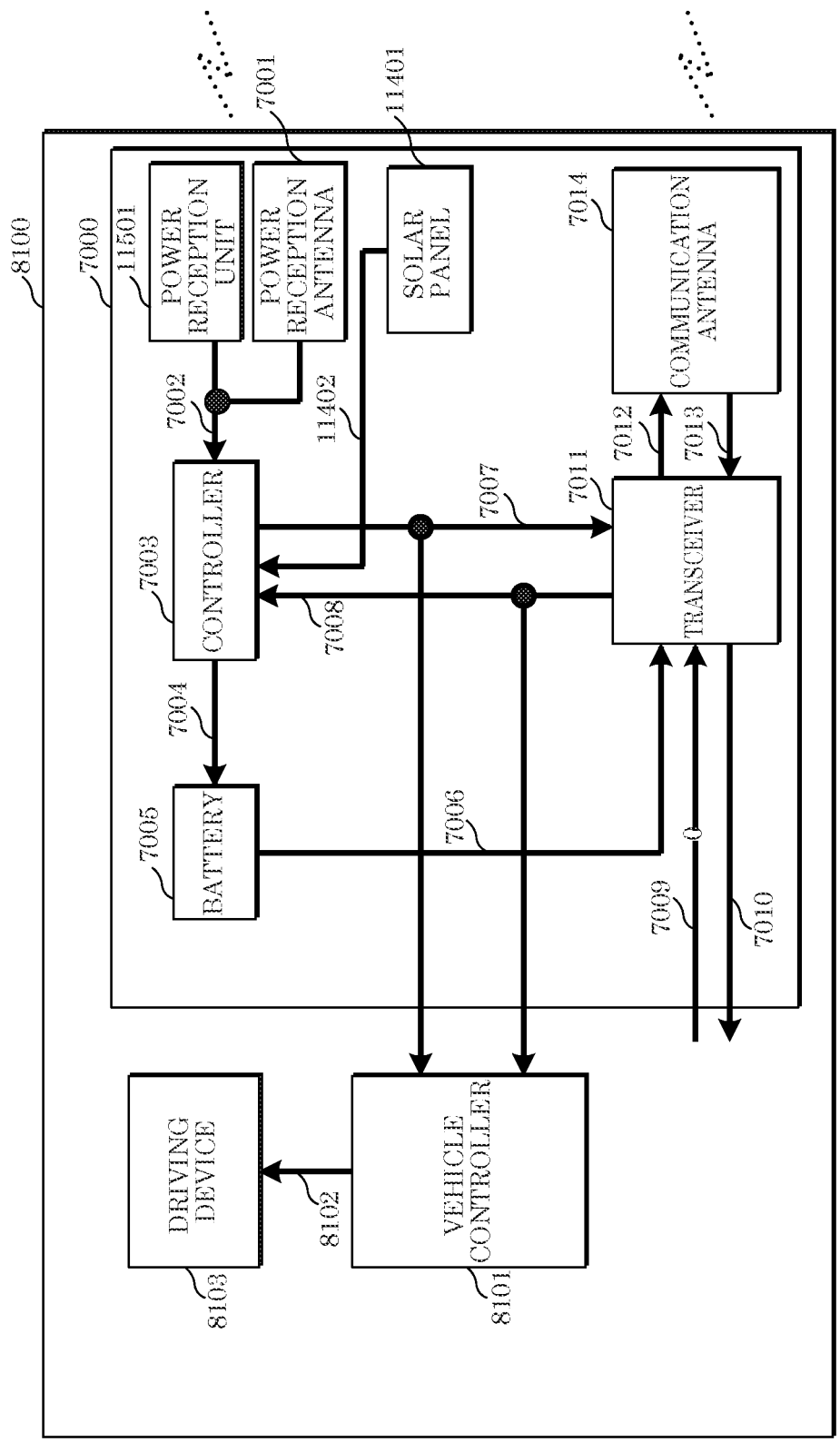
FIG. 116 illustrates an example of a configuration of a vehicle.

FIG. 116 illustrates one example of a configuration of vehicle 8100 that differs from the examples illustrated in FIG. 114 and FIG. 115. In FIG. 116, elements which operate in the same manner as those in FIG. 81, FIG. 114, and FIG. 115 are assigned the same reference numerals, and repeated description thereof is omitted. Vehicle 8100 illustrated in FIG. 116 differs from vehicle 8100 illustrated in FIG. 114 or FIG. 115 in that vehicle 8100 illustrated in FIG. 116 includes power reception unit 11501 and power reception antenna 7001. Accordingly, battery 7005 is charged by either "power reception unit 11501 or power reception antenna 7001" or "power reception unit 11501 or power reception antenna 7001".

Note that since the operations performed by solar panel 11401, controller 7003, vehicle controller 8101 and the like are the same as described above, repeated description will be omitted.

Even when the vehicle illustrated in FIG. 116 does not include transceiver device 7011 and communication antenna 7014 and the like for performing communication, the above operations still can be carried out. In this way, the vehicle configuration illustrated in FIG. 116 is merely one non-limiting example.

By implementing the above, battery 7005 and the battery included in solar panel 11401 can be charged efficiently, which in turn achieves the advantageous effect that devices used in the vehicle can operate stably and more devices can be equipped in the vehicle.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable in communication systems.

What is claimed is:

1. A power transmission system comprising:
   a power transmission antenna movably disposed in a parking space;
   a receiver that receives, from a vehicle parked in the parking space, power reception unit location information indicating a location of a power reception unit of the vehicle, information on whether or not to restrict an amount of time to receive power or an amount of power to be received, and information on a payment settlement method;
   a controller that determines a power transmission method and a payment settlement method, and determines that the vehicle can be charged; and
   a moving mechanism that moves the power transmission antenna based on the power reception unit location information, wherein
   the power transmission antenna transmits power to the power reception unit of the vehicle from a location to which the power transmission antenna has been moved by the moving mechanism,
   the receiver includes a plurality of communication antennas,
   the power transmission antenna is a power transmission coil,
   N communication antennas among the plurality of communication antennas are arranged inside the power transmission coil to form a polygonal shape, N being an integer greater than or equal to 3, and
   M remaining communication antennas among the plurality of communication antennas are arranged outside the power transmission coil, M being an integer greater than or equal to 1.

2. A power transmission method comprising;
   receiving, using a receiver, from a vehicle parked in a parking space, power reception unit location information indicating a location of a power reception unit of the vehicle, information on whether or not to restrict an amount of time to receive power or an amount of power to be received, and information on a payment settlement method;
   determining a power transmission method and a payment settlement method, and determining that the vehicle can be charged;
   moving a power transmission antenna movably disposed in the parking space, based on the power reception unit location information; and
   transmitting power, by the power transmission antenna, to the power reception unit of the vehicle from a location to which the power transmission antenna has been moved, wherein
   the receiver includes a plurality of communication antennas,
   the power transmission antenna is a power transmission coil,
   N communication antennas among the plurality of communication antennas are arranged inside the power transmission coil to form a polygonal shape, N being an integer greater than or equal to 3, and
   M remaining communication antennas among the plurality of communication antennas are arranged outside the power transmission coil, M being an integer greater than or equal to 1.

* * * * *